US012374069B2

(12) United States Patent
Chand et al.

(10) Patent No.: US 12,374,069 B2
(45) Date of Patent: Jul. 29, 2025

(54) DEVICES, METHODS, AND GRAPHICAL USER INTERFACES FOR REAL-TIME COMMUNICATION

(71) Applicant: Apple Inc., Cupertino, CA (US)

(72) Inventors: Jesse Chand, San Francisco, CA (US); Shih-Sang Chiu, San Francisco, CA (US); Wesley M. Holder, Union City, CA (US); Stephen O. Lemay, Palo Alto, CA (US); William A. Sorrentino, III, Mill Valley, CA (US); Rajat Bhardwaj, Walnut Creek, CA (US); Giancarlo Yerkes, San Francisco, CA (US); Jason D. Rickwald, Santa Cruz, CA (US); Rupert Burton, San Francisco, CA (US); Kaely Coon, San Francisco, CA (US); Connor A. Smith, Sunnyvale, CA (US); Joseph P. Cerra, San Francisco, CA (US); Tommy Rochette, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/610,103

(22) Filed: Mar. 19, 2024

(65) Prior Publication Data

US 2024/0402868 A1 Dec. 5, 2024

Related U.S. Application Data

(60) Provisional application No. 63/527,530, filed on Jul. 18, 2023, provisional application No. 63/470,968, filed on Jun. 4, 2023.

(51) Int. Cl.

| | |
|---|---|
| ***G06T 19/00*** | (2011.01) |
| ***G06F 3/01*** | (2006.01) |
| ***G06F 3/04815*** | (2022.01) |
| ***G06F 3/0484*** | (2022.01) |
| ***G06T 5/70*** | (2024.01) |
| ***G06T 19/20*** | (2011.01) |
| ***H04L 65/1069*** | (2022.01) |
| ***H04L 65/1083*** | (2022.01) |
| ***H04L 65/1089*** | (2022.01) |
| ***H04N 7/15*** | (2006.01) |

(52) U.S. Cl.

CPC .............. *G06T 19/20* (2013.01); *G06F 3/013* (2013.01); *G06F 3/04815* (2013.01); *G06F 3/0484* (2013.01); *G06T 5/70* (2024.01); *G06T 19/006* (2013.01); *H04L 65/1069* (2013.01); *H04L 65/1086* (2013.01); *H04L 65/1089* (2013.01); *H04N 7/152* (2013.01); *H04N 7/157* (2013.01); *G06T 2200/24* (2013.01); *G06T 2219/024* (2013.01); *G06T 2219/2004* (2013.01)

(58) Field of Classification Search

CPC ......... G06T 19/20; G06T 5/70; G06T 19/006; G06T 2200/24; G06T 2219/024; G06T 2219/2004; G06F 3/013; G06F 3/04815; G06F 3/0484; H04L 65/1069; H04L 65/1086; H04L 65/1089; H04N 7/152; H04N 7/157; G06V 20/20

See application file for complete search history.

(56) References Cited

U.S. PATENT DOCUMENTS 11,948,263 B1 * 4/2024 Rudman ................ G06V 20/20

* cited by examiner

*Primary Examiner* — Abdul-Samad A Adediran

(74) *Attorney, Agent, or Firm* — DLA Piper LLP (US)

(57) ABSTRACT

The present disclosure generally relates to user interfaces for electronic devices, including user interfaces for real-time communications.

51 Claims, 65 Drawing Sheets

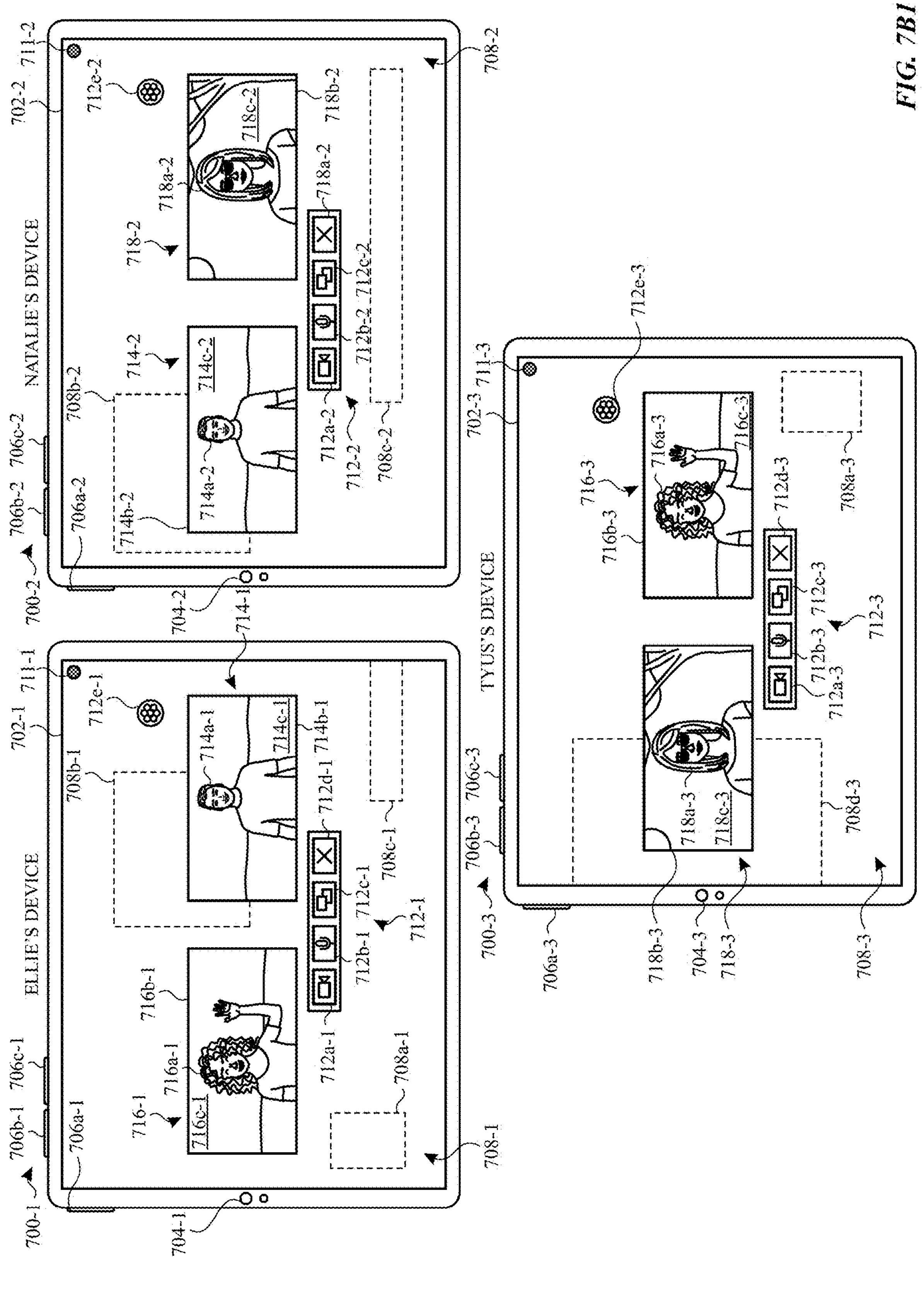
FIG. 7B1

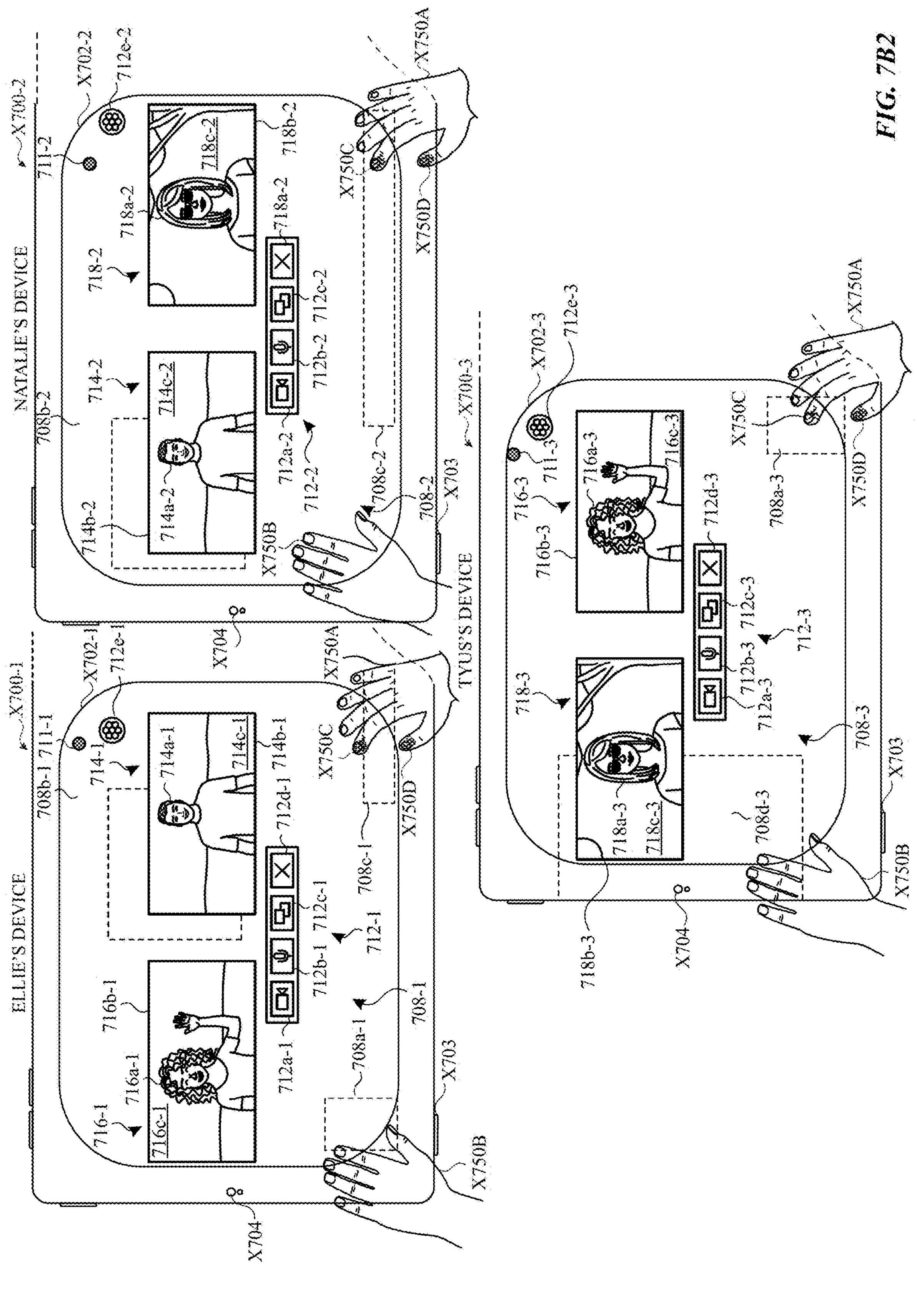
FIG. 7B2

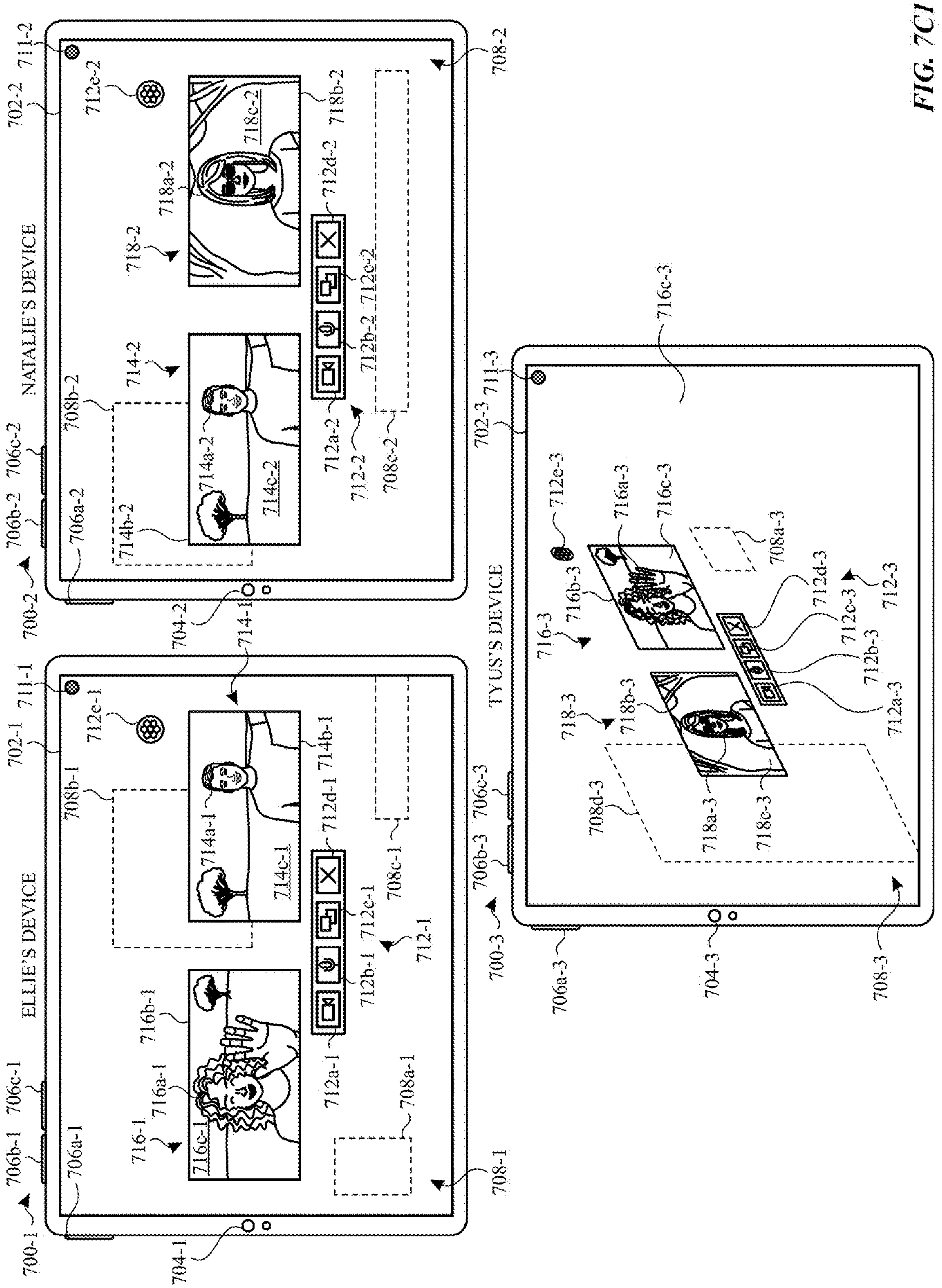
FIG. 7C1

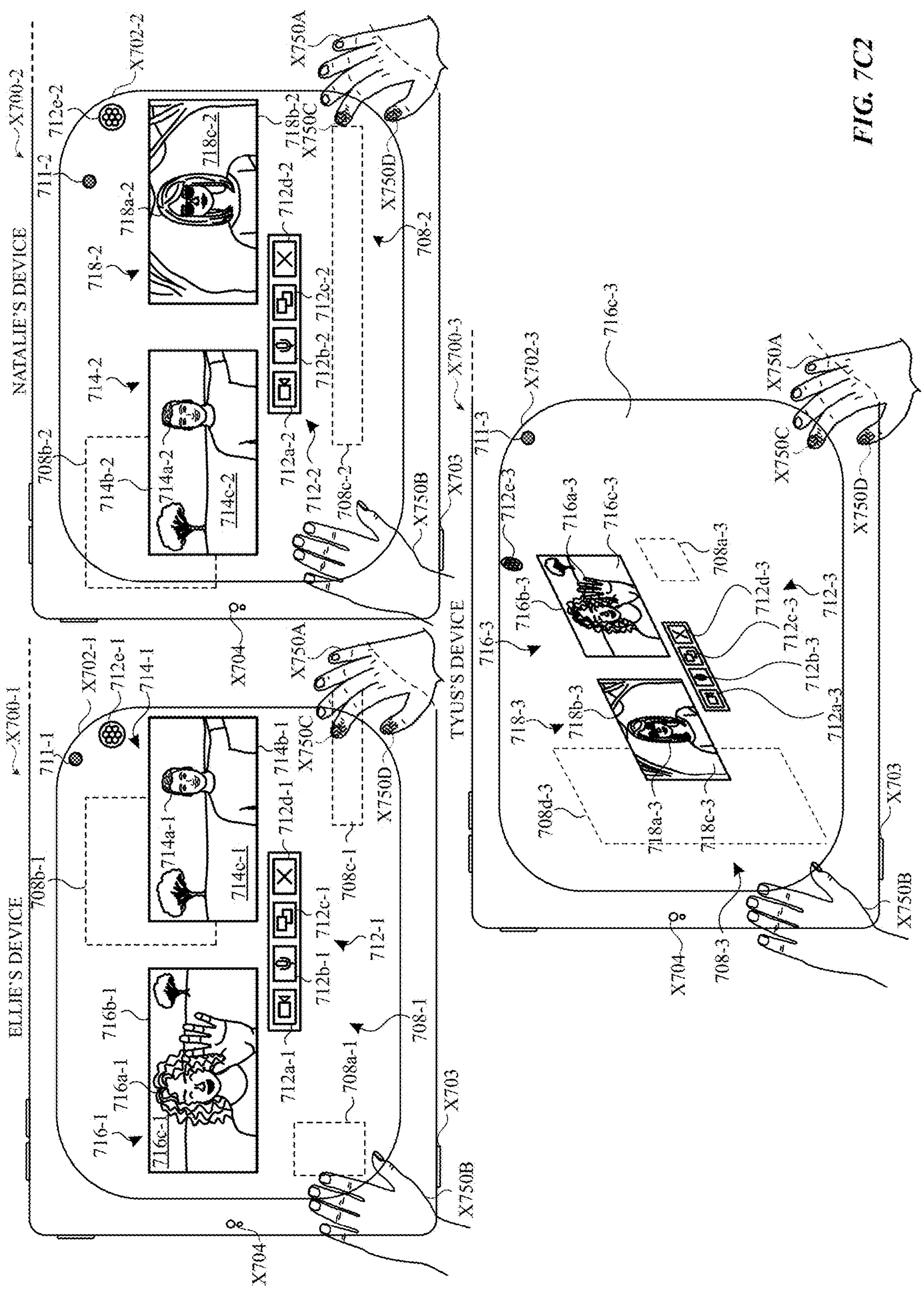
FIG. 7C2

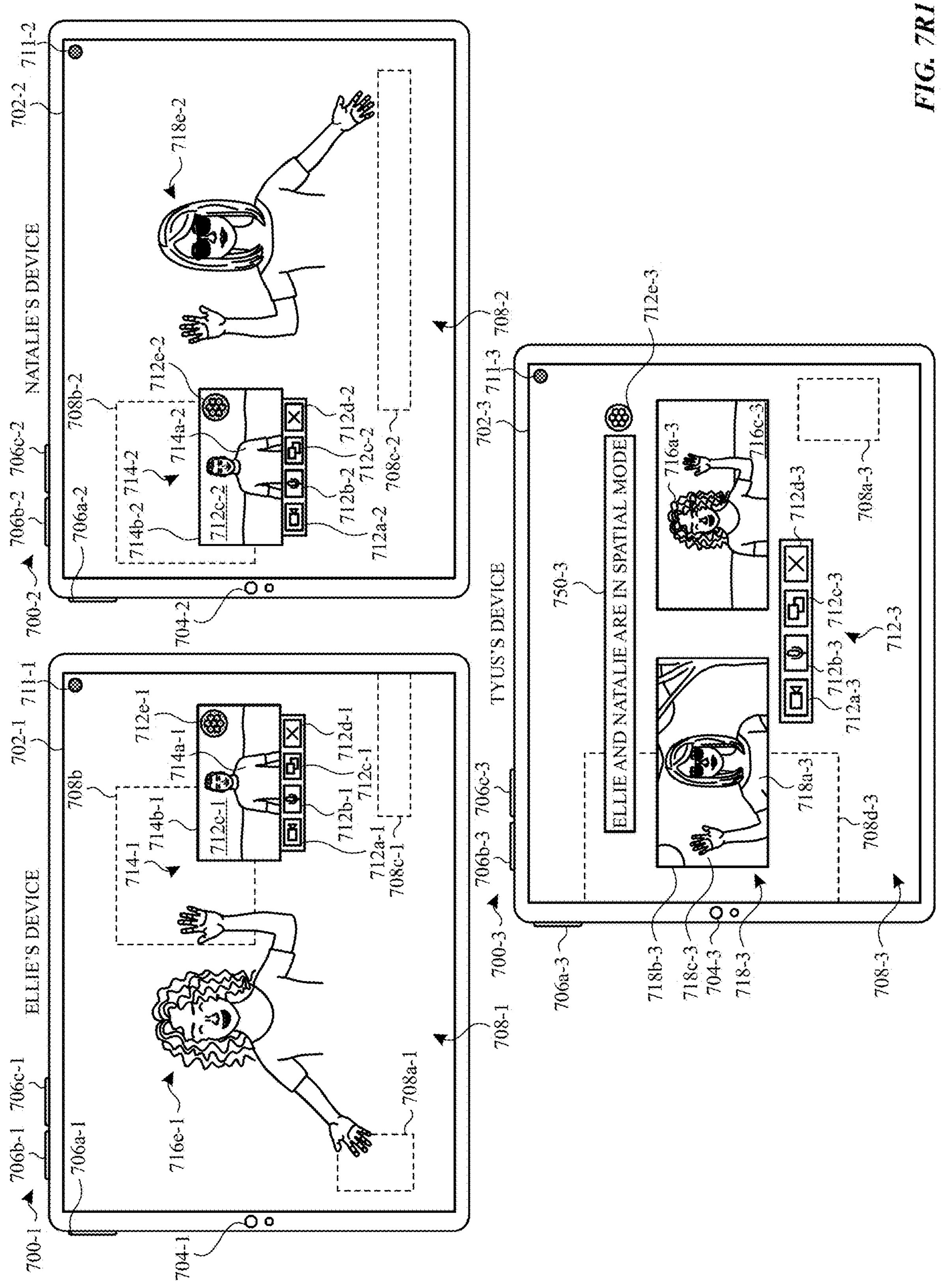
FIG. 7R1

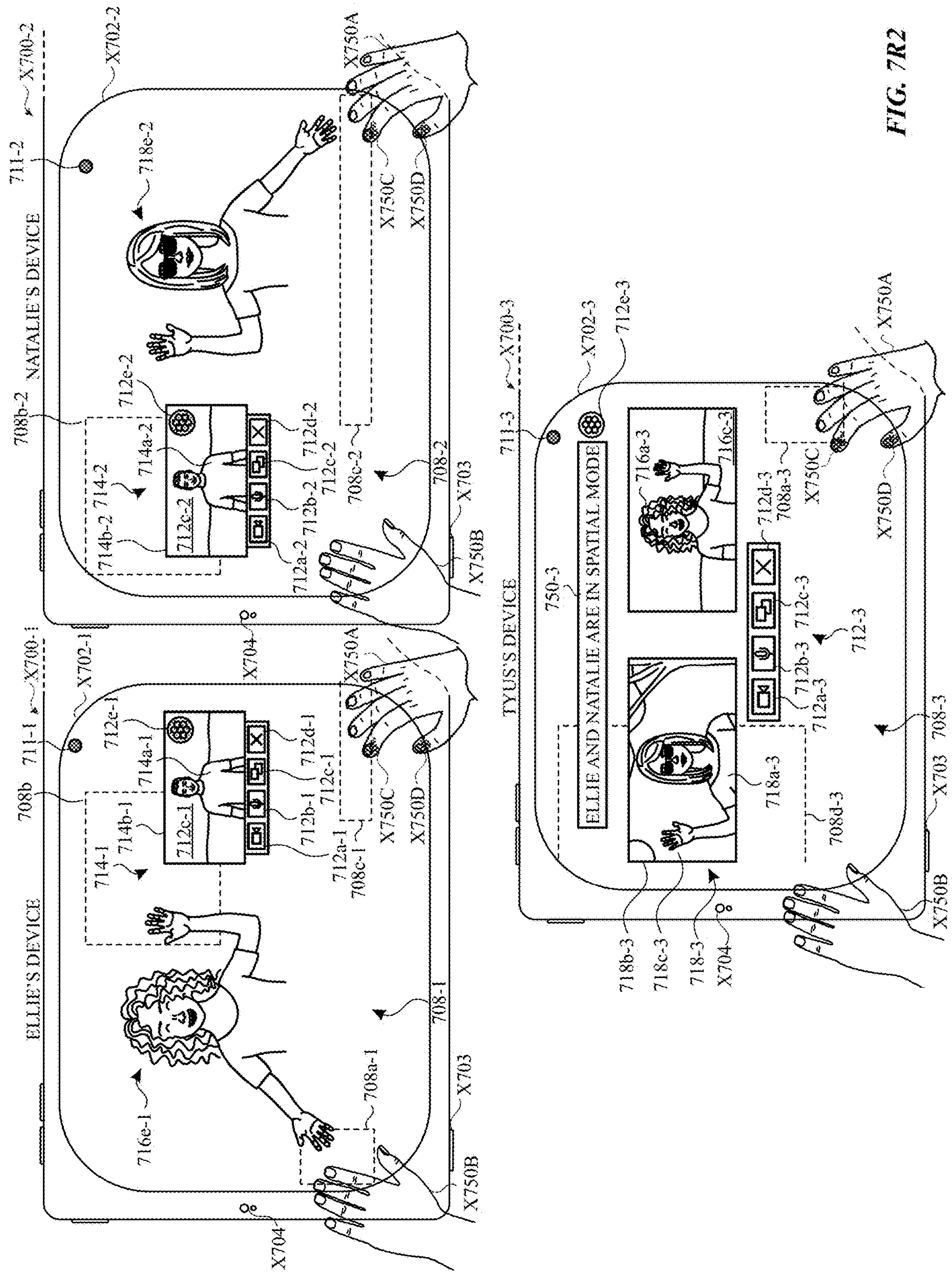
FIG. 7R2

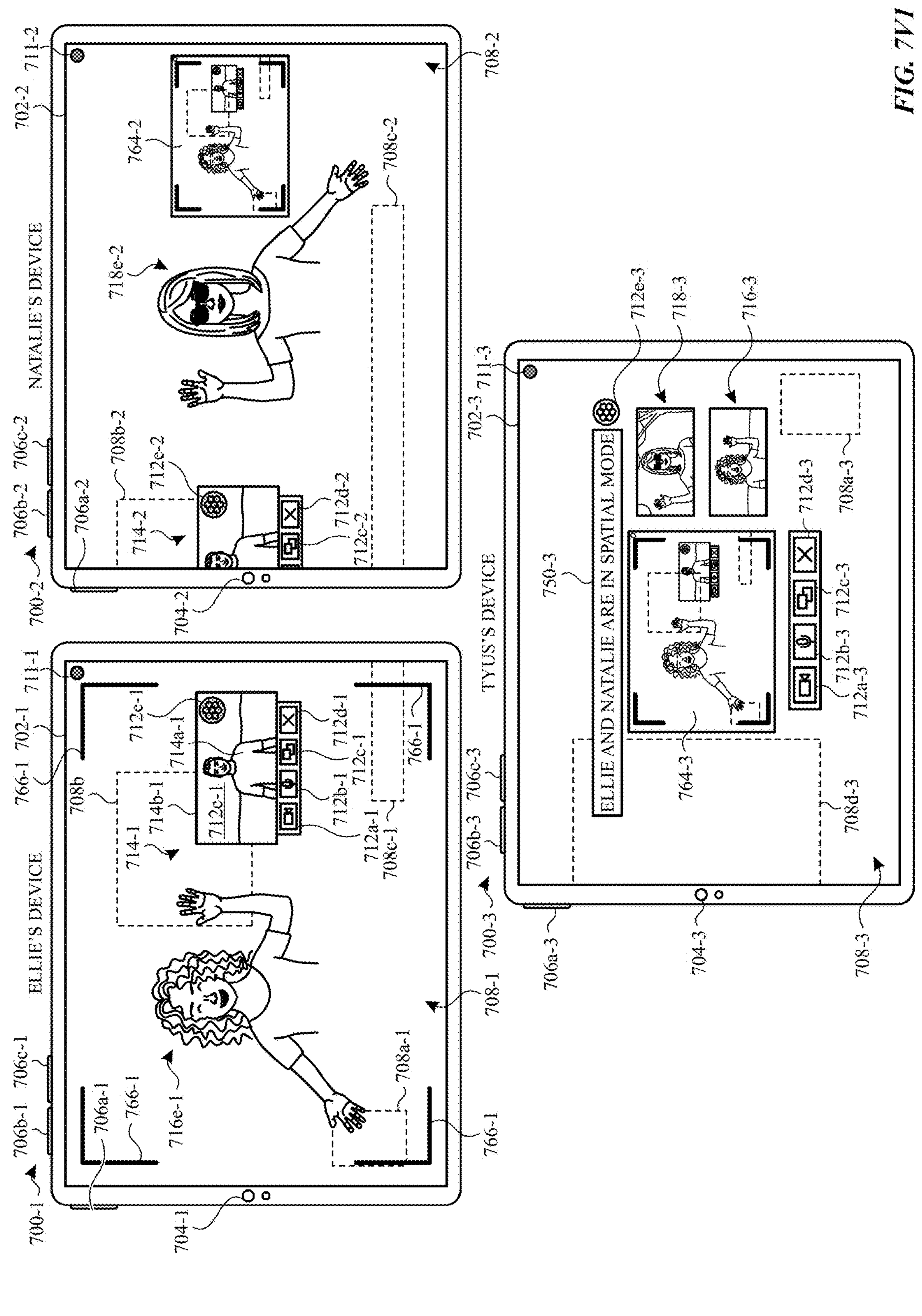
FIG. 7V1

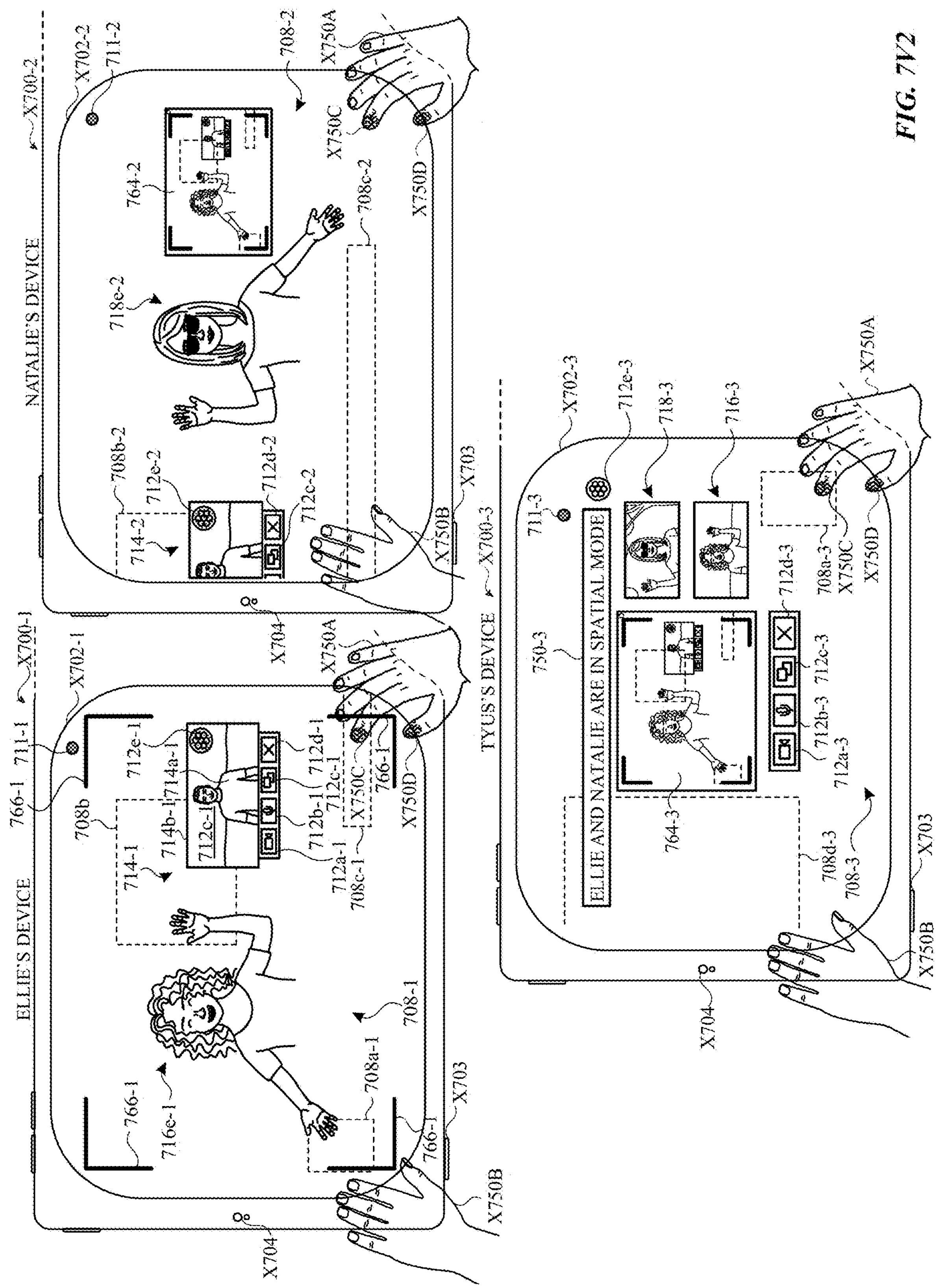
FIG. 7V2

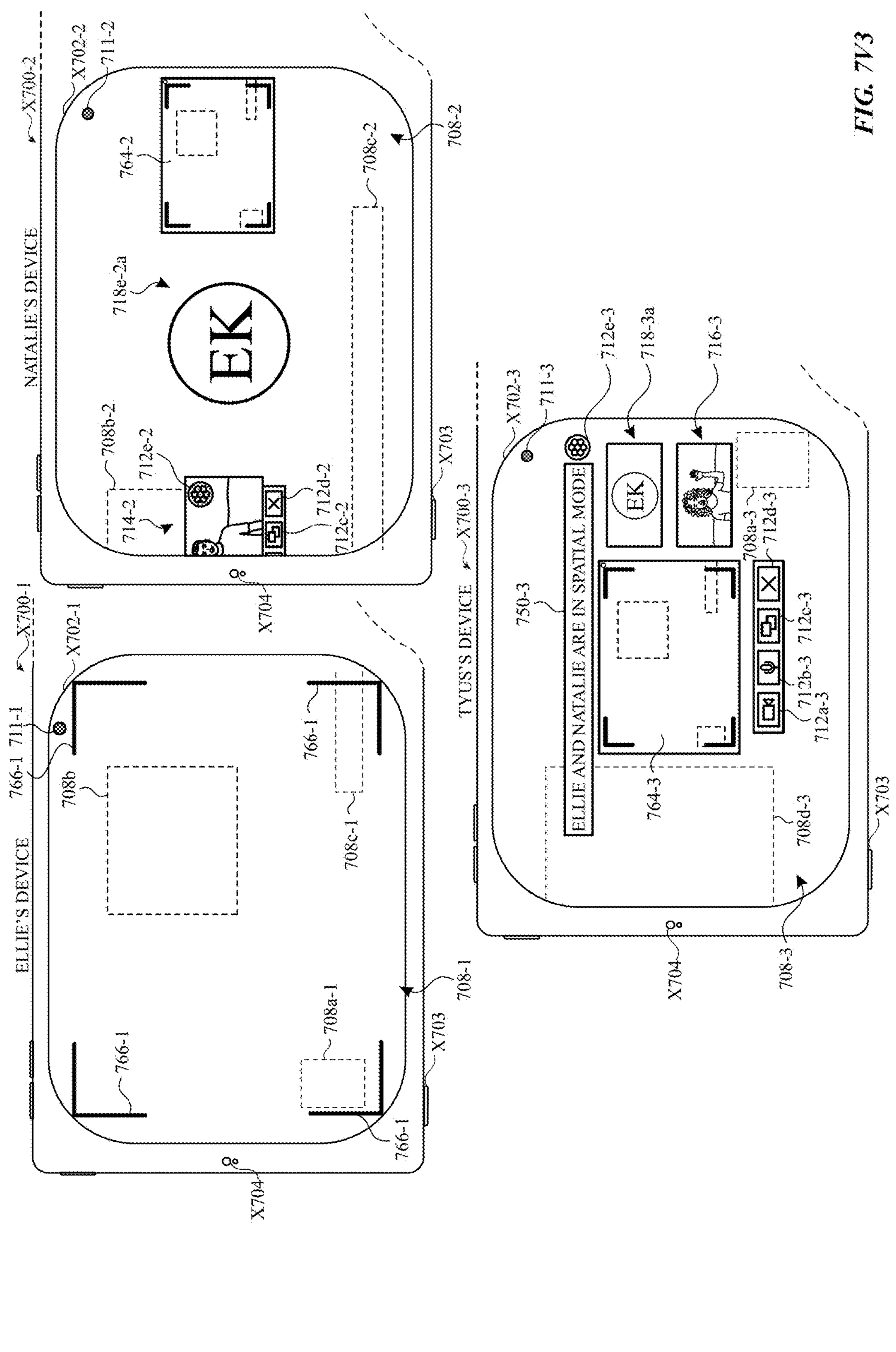
FIG. 7V3

DEVICES, METHODS, AND GRAPHICAL USER INTERFACES FOR REAL-TIME COMMUNICATION

CROSS-REFERENCE TO RELATED APPLICATIONS

This application claims priority to U.S. Provisional Application No. 63/527,530, filed Jul. 18, 2023 and entitled, "DEVICES, METHODS, AND GRAPHICAL USER INTERFACES FOR REAL-TIME COMMUNICATION," and to U.S. Provisional Application No. 63/470,968, filed Jun. 4, 2023 and entitled "DEVICES, METHODS, AND GRAPHICAL USER INTERFACES FOR REAL-TIME COMMUNICATION," the entire contents of which are incorporated by reference for all purposes.

TECHNICAL FIELD

The present disclosure relates generally to computer systems that are in communication with one or more display generation components and, optionally, one or more input devices that provide computer-generated experiences, including, but not limited to, electronic devices that provide virtual reality and mixed reality experiences via one or more displays.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for real-time communication on devices that display and/or provide at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for real-time communication that make interaction with the computer systems more efficient and intuitive for a user. Such methods and interfaces optionally complement or replace conventional methods for real-time communication. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for real-time communication. Such methods and interfaces may complement or replace conventional methods for real-time communication. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a method is described. The method comprises: at a computer system that is in communication with one or more display generation components: displaying, via the one or more display generation components and within a three-dimensional environment, a real-time communication user interface that corresponds to a real-time communication session between a user of the computer system and one or more participants in the real-time communication session different from the user of the computer system; displaying, via the one or more display generation components, a first spatially-constrained representation of a first participant of the one or more participants in the real-time communication session, wherein the first spatially-constrained representation of the first participant includes: a first portal that has a spatial position in the three-dimensional environment that is determined by the computer system; and a first visual representation of the first participant that moves based on detected movement of the first participant, wherein the first visual representation is displayed at least partially within the first portal; while displaying the first spatially-constrained representation of the first participant within the real-time communication user interface, detecting a request from a respective participant in the real-time communication session to transition from a spatially-constrained representation mode to a spatially-flexible representation mode different from the spatially-constrained representation mode; and in response to detecting the request from the respective participant in the real-time communication session to transition from the spatially-constrained representation mode to the spatially-flexible representation mode: displaying, via the one or more display generation components, a first spatially-flexible representation of the first participant that moves based on detected movement of the first participant and has a spatial position in the three-dimensional environment relative to one or more other objects in the three-dimensional environment that is determined at least in part based on movement of the first participant.

In some embodiments, a non-transitory computer-readable storage medium is described. The non-transitory computer-readable storage medium stores one or more programs configured to be executed by one or more processors of a computer system that is in communication with one or more display generation components, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; displaying, via the one or more display generation components, a first spatially-constrained representation of a first participant of the one or more participants in the real-time communication session, wherein the first spatially-constrained representation of the first participant includes: a first portal that has a spatial position in the three-dimensional environment that is determined by the computer system; and a first visual representation of the first participant that moves based on detected movement of the first participant, wherein the first visual representation is displayed at least partially within the first portal; while displaying the first spatially-constrained representation of the first participant within the real-time communication user interface, detecting a request from a respective participant in the real-time communication session to transition from a spatially-constrained representation mode to a spatially-flexible representation mode different from the spatially-constrained representation mode; and in response to detecting the request from the respective participant in the real-time communication session to transition from the spatially-constrained representation mode to the spatially-flexible representation mode: displaying, via the one or more display generation components, a first spatially-flexible representation of the first participant that moves based on detected movement of the first participant and has a spatial position in the three-dimensional environment relative to one or more other objects in the three-dimensional environment that is determined at least in part based on movement of the first participant.

In some embodiments, a transitory computer-readable storage medium is described. The transitory computer-readable storage medium stores one or more programs configured to be executed by one or more processors of a computer system that is in communication with one or more display generation components, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; displaying, via the one or more display generation components, a first spatially-constrained representation of a first participant of the one or more participants in the real-time communication session, wherein the first spatially-constrained representation of the first participant includes: a first portal that has a spatial position in the three-dimensional environment that is determined by the computer system; and a first visual representation of the first participant that moves based on detected movement of the first participant, wherein the first visual representation is displayed at least partially within the first portal; while displaying the first spatially-constrained representation of the first participant within the real-time communication user interface, detecting a request from a respective participant in the real-time communication session to transition from a spatially-constrained representation mode to a spatially-flexible representation mode different from the spatially-constrained representation mode; and in response to detecting the request from the respective participant in the real-time communication session to transition from the spatially-constrained representation mode to the spatially-flexible representation mode: displaying, via the one or more display generation components, a first spatially-flexible representation of the first participant that moves based on detected movement of the first participant and has a spatial position in the three-dimensional environment relative to one or more other objects in the three-dimensional environment that is determined at least in part based on movement of the first participant.

In some embodiments, a computer system is described. The computer system is configured to communicate with one or more display generation components and comprises: one or more processors; and memory storing one or more programs configured to be executed by the one or more processors, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; displaying, via the one or more display generation components, a first spatially-constrained representation of a first participant of the one or more participants in the real-time communication session, wherein the first spatially-constrained representation of the first participant includes: a first portal that has a spatial position in the three-dimensional environment that is determined by the computer system; and a first visual representation of the first participant that moves based on detected movement of the first participant, wherein the first visual representation is displayed at least partially within the first portal; while displaying the first spatially-constrained representation of the first participant within the real-time communication user interface, detecting a request from a respective participant in the real-time communication session to transition from a spatially-constrained representation mode to a spatially-flexible representation mode different from the spatially-constrained representation mode; and in response to detecting the request from the respective participant in the real-time communication session to transition from the spatially-constrained representation mode to the spatially-flexible representation mode: displaying, via the one or more display generation components, a first spatially-flexible representation of the first participant that moves based on detected movement of the first participant and has a spatial position in the three-dimensional environment relative to one or more other objects in the three-dimensional environment that is determined at least in part based on movement of the first participant.

In some embodiments, a computer system is described. The computer system is configured to communicate with one or more display generation components and comprises: means for displaying, via the one or more display generation components and within a three-dimensional environment, a real-time communication user interface that corresponds to a real-time communication session between a user of the computer system and one or more participants in the real-time communication session different from the user of the computer system; means for displaying, via the one or more display generation components, a first spatially-constrained representation of a first participant of the one or more participants in the real-time communication session, wherein the first spatially-constrained representation of the first participant includes: a first portal that has a spatial position in the three-dimensional environment that is determined by the computer system; and a first visual representation of the first participant that moves based on detected movement of the first participant, wherein the first visual representation is displayed at least partially within the first portal; while displaying the first spatially-constrained representation of the first participant within the real-time communication user interface, detecting a request from a respective participant in the real-time communication session to transition from a spatially-constrained representation mode to a spatially-flexible representation mode different from the spatially-constrained representation mode; and means, responsive to detecting the request from the respective participant in the real-time communication session to transition from the spatially-constrained representation mode to the spatially-flexible representation mode, for: displaying, via the one or more display generation components, a first spatially-flexible representation of the first participant that moves based on detected movement of the first participant and has a spatial position in the three-dimensional environment relative to one or more other objects in the three-dimensional environment that is determined at least in part based on movement of the first participant.

In some embodiments, a computer program product is described. The computer program product comprises one or more programs configured to be executed by one or more processors of a computer system that is in communication with one or more display generation components, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; displaying, via the one or more display generation components, a first spatially-constrained representation of a first participant of the one or more participants in the real-time communication session, wherein the first spatially-constrained representation of the first participant includes: a first portal that has a spatial position in the three-dimensional environment that is determined by the computer system; and a first visual representation of the first participant that moves based on detected movement of the first participant, wherein the first visual representation is displayed at least partially within the first portal; while displaying the first spatially-constrained representation of the first participant within the real-time communication user interface, detecting a request from a respective participant in the real-time communication session to transition from a spatially-constrained representation mode to a spatially-flexible representation mode different from the spatially-constrained representation mode; and in response to detecting the request from the respective participant in the real-time communication session to transition from the spatially-constrained representation mode to the spatially-flexible representation mode: displaying, via the one or more display generation components, a first spatially-flexible representation of the first participant that moves based on detected movement of the first participant and has a spatial position in the three-dimensional environment relative to one or more other objects in the three-dimensional environment that is determined at least in part based on movement of the first participant.

In some embodiments, a method is described. The method comprises: at a computer system that is in communication with one or more display generation components and one or more input devices: displaying, via the one or more display generation components and within a first three-dimensional environment, a real-time communication user interface that corresponds to a real-time communication session between a user of the computer system and one or more participants in the real-time communication session different from the user of the computer system, wherein: the real-time communication user interface includes a spatially-flexible representation option; while displaying the real-time communication session user interface, including the spatially-flexible representation option, receiving, via the one or more input devices, one or more user inputs corresponding to selection of the spatially-flexible representation option; and in response to receiving the one or more user inputs corresponding to selection of the spatially-flexible representation option, changing whether the user is represented to other participants in the real-time communication session with a spatially-flexible representation or a spatially-constrained representation, wherein: a spatially-flexible representation has a spatial position in a second three-dimensional environment relative to one or more other objects in the second three-dimensional environment that is determined at least in part based on movement of the user in the physical environment in which the user is located, wherein the second three-dimensional environment is a three-dimensional environment in which a participant in the real-time communication session other than the user is viewing user interface elements corresponding to the real-time communication session; and a spatially-constrained representation has a spatial position in the second three-dimensional environment that is determined by a second computer system that is controlling display of the second three-dimensional environment, wherein the second computer system is different from the computer system.

In some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components and within a first three-dimensional environment, a real-time communication user interface that corresponds to a real-time communication session between a user of the computer system and one or more participants in the real-time communication session different from the user of the computer system, wherein: the real-time communication user interface includes a spatially-flexible representation option; while displaying the real-time communication session user interface, including the spatially-flexible representation option, receiving, via the one or more input devices, one or more user inputs corresponding to selection of the spatially-flexible representation option; and in response to receiving the one or more user inputs corresponding to selection of the spatially-flexible representation option, changing whether the user is represented to other participants in the real-time communication session with a spatially-flexible representation or a spatially-constrained representation, wherein: a spatially-flexible representation has a spatial position in a second three-dimensional environment relative to one or more other objects in the second three-dimensional environment that is determined at least in part based on movement of the user in the physical environment in which the user is located, wherein the second three-dimensional environment is a three-dimensional environment in which a participant in the real-time communication session other than the user is viewing user interface elements corresponding to the real-time communication session; and a spatially-constrained representation has a spatial position in the second three-dimensional environment that is determined by a second computer system that is controlling display of the second three-dimensional environment, wherein the second computer system is different from the computer system.

In some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components and within a first three-dimensional environment, a real-time communication user interface that corresponds to a real-time communication session between a user of the computer system and one or more participants in the real-time communication session different from the user of the computer system, wherein: the real-time communication user interface includes a spatially-flexible representation option; while displaying the real-time communication session user interface, including the spatially-flexible representation option, receiving, via the one or more input devices, one or more user inputs corresponding to selection of the spatially-flexible representation option; and in response to receiving the one or more user inputs corresponding to selection of the spatially-flexible representation option, changing whether the user is represented to other participants in the real-time communication session with a spatially-flexible representation or a spatially-constrained representation, wherein: a spatially-flexible representation has a spatial position in a second three-dimensional environment relative to one or more other objects in the second three-dimensional environment that is determined at least in part based on movement of the user in the physical environment in which the user is located, wherein the second three-dimensional environment is a three-dimensional environment in which a participant in the real-time communication session other than the user is viewing user interface elements corresponding to the real-time communication session; and a spatially-constrained representation has a spatial position in the second three-dimensional environment that is determined by a second computer system that is controlling display of the second three-dimensional environment, wherein the second computer system is different from the computer system.

In some embodiments, a computer system is described. The computer system is configured to communicate with one or more display generation components and one or more input devices and comprises: one or more processors; and memory storing one or more programs configured to be executed by the one or more processors, the one or more programs including instructions for: displaying, via the one or more display generation components and within a first three-dimensional environment, a real-time communication user interface that corresponds to a real-time communication session between a user of the computer system and one or more participants in the real-time communication session different from the user of the computer system, wherein: the real-time communication user interface includes a spatially-flexible representation option; while displaying the real-time communication session user interface, including the spatially-flexible representation option, receiving, via the one or more input devices, one or more user inputs corresponding to selection of the spatially-flexible representation option; and in response to receiving the one or more user inputs corresponding to selection of the spatially-flexible representation option, changing whether the user is represented to other participants in the real-time communication session with a spatially-flexible representation or a spatially-constrained representation, wherein: a spatially-flexible representation has a spatial position in a second three-dimensional environment relative to one or more other objects in the second three-dimensional environment that is determined at least in part based on movement of the user in the physical environment in which the user is located, wherein the second three-dimensional environment is a three-dimensional environment in which a participant in the real-time communication session other than the user is viewing user interface elements corresponding to the real-time communication session; and a spatially-constrained representation has a spatial position in the second three-dimensional environment that is determined by a second computer system that is controlling display of the second three-dimensional environment, wherein the second computer system is different from the computer system.

In some embodiments, a computer system is described. The computer system is configured to communicate with one or more display generation components and one or more input devices and comprises: means for displaying, via the one or more display generation components and within a first three-dimensional environment, a real-time communication user interface that corresponds to a real-time communication session between a user of the computer system and one or more participants in the real-time communication session different from the user of the computer system, wherein: the real-time communication user interface includes a spatially-flexible representation option; means, while displaying the real-time communication session user interface, including the spatially-flexible representation option, for receiving, via the one or more input devices, one or more user inputs corresponding to selection of the spatially-flexible representation option; and means, responsive to receiving the one or more user inputs corresponding to selection of the spatially-flexible representation option, for changing whether the user is represented to other participants in the real-time communication session with a spatially-flexible representation or a spatially-constrained representation, wherein: a spatially-flexible representation has a spatial position in a second three-dimensional environment relative to one or more other objects in the second three-dimensional environment that is determined at least in part based on movement of the user in the physical environment in which the user is located, wherein the second three-dimensional environment is a three-dimensional environment in which a participant in the real-time communication session other than the user is viewing user interface elements corresponding to the real-time communication session; and a spatially-constrained representation has a spatial position in the second three-dimensional environment that is determined by a second computer system that is controlling display of the second three-dimensional environment, wherein the second computer system is different from the computer system.

In some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components and within a first three-dimensional environment, a real-time communication user interface that corresponds to a real-time communication session between a user of the computer system and one or more participants in the real-time communication session different from the user of the computer system, wherein: the real-time communication user interface includes a spatially-flexible representation option; while displaying the real-time communication session user interface, including the spatially-flexible representation option, receiving, via the one or more input devices, one or more user inputs corresponding to selection of the spatially-flexible representation option; and in response to receiving the one or more user inputs corresponding to selection of the spatially-flexible representation option, changing whether the user is represented to other participants in the real-time communication session with a spatially-flexible representation or a spatially-constrained representation, wherein: a spatially-flexible representation has a spatial position in a second three-dimensional environment relative to one or more other objects in the second three-dimensional environment that is determined at least in part based on movement of the user in the physical environment in which the user is located, wherein the second three-dimensional environment is a three-dimensional environment in which a participant in the real-time communication session other than the user is viewing user interface elements corresponding to the real-time communication session; and a spatially-constrained representation has a spatial position in the second three-dimensional environment that is determined by a second computer system that is controlling display of the second three-dimensional environment, wherein the second computer system is different from the computer system.

In some embodiments, a method is described. The method comprises: at a computer system that is in communication with one or more display generation components: displaying, via the one or more display generation components and within a three-dimensional environment, a real-time communication user interface that corresponds to a real-time communication session between a user of the computer system and one or more participants in the real-time communication session different from the user of the computer system, wherein displaying the real-time communication user interface includes displaying a first spatially-constrained representation of a first participant of the one or more participants in the real-time communication session, wherein the first spatially-constrained representation of the first participant includes: a first portal; and a first three-dimensional representation of the first participant that is displayed within the portal, and while displaying the real-time communication user interface, including the first spatially-constrained representation of the first participant, receiving an indication of detected movement by the first participant; and in response to receiving the indication of detected movement by the first participant, displaying, via the one or more display generation components, movement of the first three-dimensional representation within the first portal.

In some embodiments, a non-transitory computer-readable storage medium is described. The non-transitory computer-readable storage medium stores one or more programs configured to be executed by one or more processors of a computer system that is in communication with one or more display generation components, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system, wherein displaying the real-time communication user interface includes displaying a first spatially-constrained representation of a first participant of the one or more participants in the real-time communication session, wherein the first spatially-constrained representation of the first participant includes: a first portal; and a first three-dimensional representation of the first participant that is displayed within the portal, and while displaying the real-time communication user interface, including the first spatially-constrained representation of the first participant, receiving an indication of detected movement by the first participant; and in response to receiving the indication of detected movement by the first participant, displaying, via the one or more display generation components, movement of the first three-dimensional representation within the first portal.

In some embodiments, a transitory computer-readable storage medium is described. The transitory computer-readable storage medium stores one or more programs configured to be executed by one or more processors of a computer system that is in communication with one or more display generation components, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system, wherein displaying the real-time communication user interface includes displaying a first spatially-constrained representation of a first participant of the one or more participants in the real-time communication session, wherein the first spatially-constrained representation of the first participant includes: a first portal; and a first three-dimensional representation of the first participant that is displayed within the portal, and while displaying the real-time communication user interface, including the first spatially-constrained representation of the first participant, receiving an indication of detected movement by the first participant; and in response to receiving the indication of detected movement by the first participant, displaying, via the one or more display generation components, movement of the first three-dimensional representation within the first portal.

In some embodiments, a computer system is described. The computer system is configured to communicate with one or more display generation components and comprises: one or more processors; and memory storing one or more programs configured to be executed by the one or more processors, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system, wherein displaying the real-time communication user interface includes displaying a first spatially-constrained representation of a first participant of the one or more participants in the real-time communication session, wherein the first spatially-constrained representation of the first participant includes: a first portal; and a first three-dimensional representation of the first participant that is displayed within the portal, and while displaying the real-time communication user interface, including the first spatially-constrained representation of the first participant, receiving an indication of detected movement by the first participant; and in response to receiving the indication of detected movement by the first participant, displaying, via the one or more display generation components, movement of the first three-dimensional representation within the first portal.

In some embodiments, a computer system is described. The computer system is configured to communicate with one or more display generation components and comprises: means for displaying, via the one or more display generation components and within a three-dimensional environment, a real-time communication user interface that corresponds to a real-time communication session between a user of the computer system and one or more participants in the real-time communication session different from the user of the computer system, wherein displaying the real-time communication user interface includes displaying a first spatially-constrained representation of a first participant of the one or more participants in the real-time communication session, wherein the first spatially-constrained representation of the first participant includes: a first portal; and a first three-dimensional representation of the first participant that is displayed within the portal, and means, while displaying the real-time communication user interface, including the first spatially-constrained representation of the first participant, for receiving an indication of detected movement by the first participant; and means, in response to receiving the indication of detected movement by the first participant, for displaying, via the one or more display generation components, movement of the first three-dimensional representation within the first portal.

In some embodiments, a computer program product is described. The computer program product comprises one or more programs configured to be executed by one or more processors of a computer system that is in communication with one or more display generation components, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system, wherein displaying the real-time communication user interface includes displaying a first spatially-constrained representation of a first participant of the one or more participants in the real-time communication session, wherein the first spatially-constrained representation of the first participant includes: a first portal; and a first three-dimensional representation of the first participant that is displayed within the portal, and while displaying the real-time communication user interface, including the first spatially-constrained representation of the first participant, receiving an indication of detected movement by the first participant; and in response to receiving the indication of detected movement by the first participant, displaying, via the one or more display generation components, movement of the first three-dimensional representation within the first portal.

In some embodiments, a method is described. The method comprises: at a computer system that is in communication with one or more display generation components: displaying, via the one or more display generation components, a real-time communication user interface that corresponds to a real-time communication session between a user of the computer system and one or more participants in the real-time communication session different from the user of the computer system, wherein displaying the real-time communication user interface includes: displaying a first representation of a first participant of the one or more participants in the real-time communication session, wherein: the first participant corresponds to a first external device separate from the computer system; the first representation is displayed with a first background; and the first background is displayed based on visual information captured by one or more cameras of the first external device that are directed away from the first participant.

In some embodiments, a non-transitory computer-readable storage medium is described. The non-transitory computer-readable storage medium stores one or more programs configured to be executed by one or more processors of a computer system that is in communication with one or more display generation components, the one or more programs including instructions for: displaying, via the one or more display generation components, a real-time communication user interface that corresponds to a real-time communication session between a user of the computer system and one or more participants in the real-time communication session different from the user of the computer system, wherein displaying the real-time communication user interface includes: displaying a first representation of a first participant of the one or more participants in the real-time communication session, wherein: the first participant corresponds to a first external device separate from the computer system; the first representation is displayed with a first background; and the first background is displayed based on visual information captured by one or more cameras of the first external device that are directed away from the first participant.

In some embodiments, a transitory computer-readable storage medium is described. The transitory computer-readable storage medium stores one or more programs configured to be executed by one or more processors of a computer system that is in communication with one or more display generation components, the one or more programs including instructions for: displaying, via the one or more display generation components, a real-time communication user interface that corresponds to a real-time communication session between a user of the computer system and one or more participants in the real-time communication session different from the user of the computer system, wherein displaying the real-time communication user interface includes: displaying a first representation of a first participant of the one or more participants in the real-time communication session, wherein: the first participant corresponds to a first external device separate from the computer system; the first representation is displayed with a first background; and the first background is displayed based on visual information captured by one or more cameras of the first external device that are directed away from the first participant.

In some embodiments, a computer system is described. The computer system is configured to communicate with one or more display generation components and comprises: one or more processors; and memory storing one or more programs configured to be executed by the one or more processors, the one or more programs including instructions for: displaying, via the one or more display generation components, a real-time communication user interface that corresponds to a real-time communication session between a user of the computer system and one or more participants in the real-time communication session different from the user of the computer system, wherein displaying the real-time communication user interface includes: displaying a first representation of a first participant of the one or more participants in the real-time communication session, wherein: the first participant corresponds to a first external device separate from the computer system; the first representation is displayed with a first background; and the first background is displayed based on visual information captured by one or more cameras of the first external device that are directed away from the first participant.

In some embodiments, a computer system is described. The computer system is configured to communicate with one or more display generation components and comprises: means for displaying, via the one or more display generation components, a real-time communication user interface that corresponds to a real-time communication session between a user of the computer system and one or more participants in the real-time communication session different from the user of the computer system, wherein displaying the real-time communication user interface includes: displaying a first representation of a first participant of the one or more participants in the real-time communication session, wherein: the first participant corresponds to a first external device separate from the computer system; the first representation is displayed with a first background; and the first background is displayed based on visual information captured by one or more cameras of the first external device that are directed away from the first participant.

In some embodiments, a computer program product is described. The computer program product comprises one or more programs configured to be executed by one or more processors of a computer system that is in communication with one or more display generation components, the one or more programs including instructions for: displaying, via the one or more display generation components, a real-time communication user interface that corresponds to a real-time communication session between a user of the computer system and one or more participants in the real-time communication session different from the user of the computer system, wherein displaying the real-time communication user interface includes: displaying a first representation of a first participant of the one or more participants in the real-time communication session, wherein: the first participant corresponds to a first external device separate from the computer system; the first representation is displayed with a first background; and the first background is displayed based on visual information captured by one or more cameras of the first external device that are directed away from the first participant.

In some embodiments, a method is described. The method comprises: at a computer system that is in communication with one or more display generation components and one or more input devices: displaying, via the one or more display generation components and within a three-dimensional environment, a real-time communication user interface that corresponds to a real-time communication session between a user of the computer system and one or more participants in the real-time communication session different from the user of the computer system; while displaying the real-time communication session user interface, receiving, via the one or more input devices, one or more user inputs corresponding to a user request to share content corresponding to a viewpoint of the user of the computer system; and in response to receiving the one or more user inputs corresponding to a user request to share content corresponding to the viewpoint of the user of the computer system, sharing a view of the three-dimensional environment that corresponds to the viewpoint of the user of the computer system in the real-time communication session, including: causing a first external device corresponding to a first participant of the one or more participants in the real-time communication session to display a representation of the view of the three-dimensional environment that corresponds to the viewpoint of the user of the computer system.

In some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; while displaying the real-time communication session user interface, receiving, via the one or more input devices, one or more user inputs corresponding to a user request to share content corresponding to a viewpoint of the user of the computer system; and in response to receiving the one or more user inputs corresponding to a user request to share content corresponding to the viewpoint of the user of the computer system, sharing a view of the three-dimensional environment that corresponds to the viewpoint of the user of the computer system in the real-time communication session, including: causing a first external device corresponding to a first participant of the one or more participants in the real-time communication session to display a representation of the view of the three-dimensional environment that corresponds to the viewpoint of the user of the computer system.

In some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; while displaying the real-time communication session user interface, receiving, via the one or more input devices, one or more user inputs corresponding to a user request to share content corresponding to a viewpoint of the user of the computer system; and in response to receiving the one or more user inputs corresponding to a user request to share content corresponding to the viewpoint of the user of the computer system, sharing a view of the three-dimensional environment that corresponds to the viewpoint of the user of the computer system in the real-time communication session, including: causing a first external device corresponding to a first participant of the one or more participants in the real-time communication session to display a representation of the view of the three-dimensional environment that corresponds to the viewpoint of the user of the computer system.

In some embodiments, a computer system is described. The computer system is configured to communicate with one or more display generation components and one or more input devices and comprises: one or more processors; and memory storing one or more programs configured to be executed by the one or more processors, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; while displaying the real-time communication session user interface, receiving, via the one or more input devices, one or more user inputs corresponding to a user request to share content corresponding to a viewpoint of the user of the computer system; and in response to receiving the one or more user inputs corresponding to a user request to share content corresponding to the viewpoint of the user of the computer system, sharing a view of the three-dimensional environment that corresponds to the viewpoint of the user of the computer system in the real-time communication session, including: causing a first external device corresponding to a first participant of the one or more participants in the real-time communication session to display a representation of the view of the three-dimensional environment that corresponds to the viewpoint of the user of the computer system.

In some embodiments, a computer system is described. The computer system is configured to communicate with one or more display generation components and one or more input devices and comprises: means for displaying, via the one or more display generation components and within a three-dimensional environment, a real-time communication user interface that corresponds to a real-time communication session between a user of the computer system and one or more participants in the real-time communication session different from the user of the computer system; means, while displaying the real-time communication session user interface, for receiving, via the one or more input devices, one or more user inputs corresponding to a user request to share content corresponding to a viewpoint of the user of the computer system; and means, responsive to receiving the one or more user inputs corresponding to a user request to share content corresponding to the viewpoint of the user of the computer system, for sharing a view of the three-dimensional environment that corresponds to the viewpoint of the user of the computer system in the real-time communication session, including: causing a first external device corresponding to a first participant of the one or more participants in the real-time communication session to display a representation of the view of the three-dimensional environment that corresponds to the viewpoint of the user of the computer system.

In some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components and within a three-dimensional environment, a real-time communication user interface that corresponds to a real-time communication session between a user of the computer system and one or more participants in the real-time communication session different from the user of the computer system; while displaying the real-time communication session user interface, receiving, via the one or more input devices, one or more user inputs corresponding to a user request to share content corresponding to a viewpoint of the user of the computer system; and in response to receiving the one or more user inputs corresponding to a user request to share content corresponding to the viewpoint of the user of the computer system, sharing a view of the three-dimensional environment that corresponds to the viewpoint of the user of the computer system in the real-time communication session, including: causing a first external device corresponding to a first participant of the one or more participants in the real-time communication session to display a representation of the view of the three-dimensional environment that corresponds to the viewpoint of the user of the computer system.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The present disclosure relates to user interfaces for providing an extended reality (XR) experience to a user, in accordance with some embodiments.

The systems, methods, and GUIs described herein improve user interface interactions with virtual/augmented reality environments in multiple ways.

Figure 8:
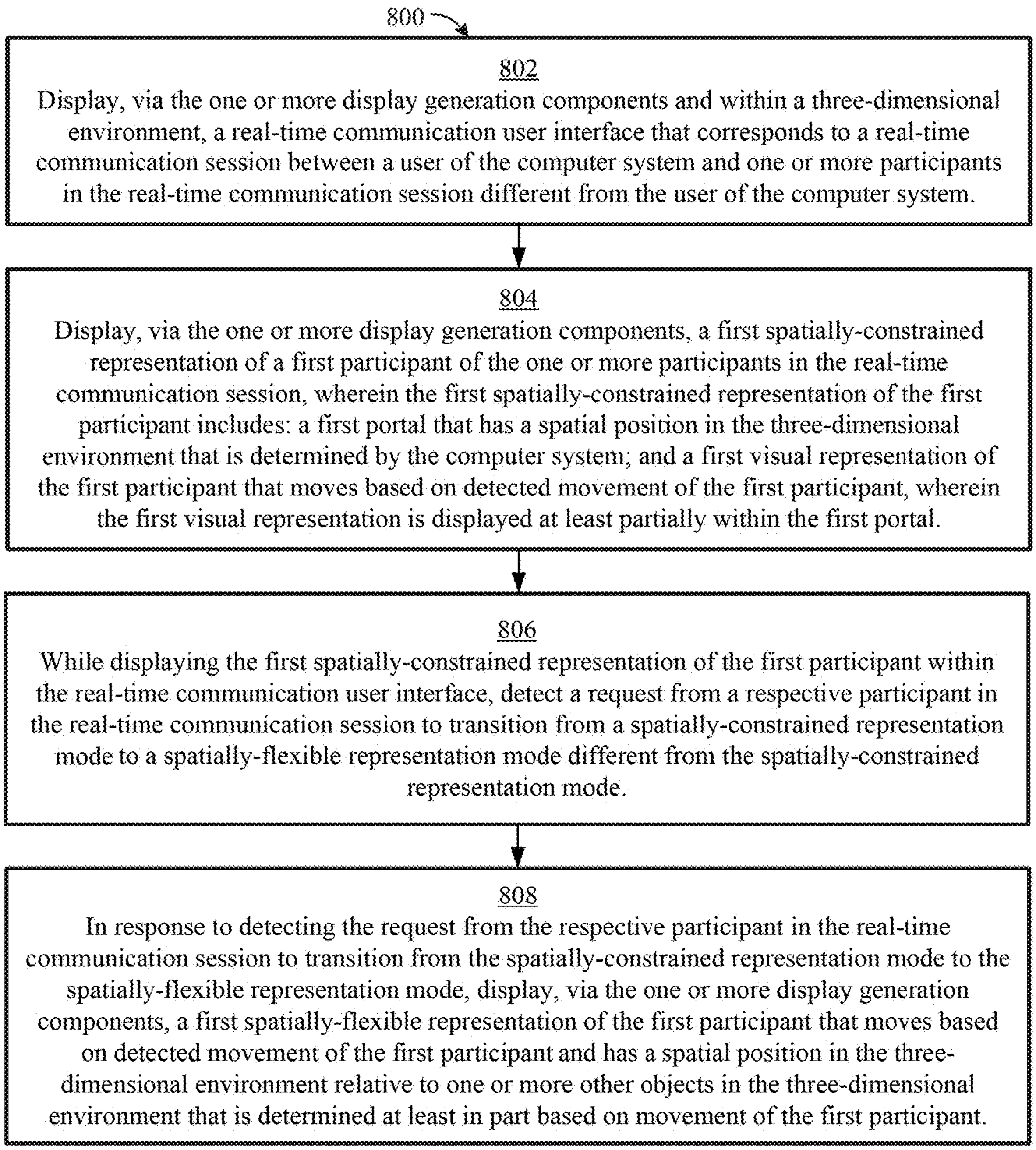
FIG. 8 is a flow diagram of methods of real-time communication, in accordance with various embodiments.
Figure 9:
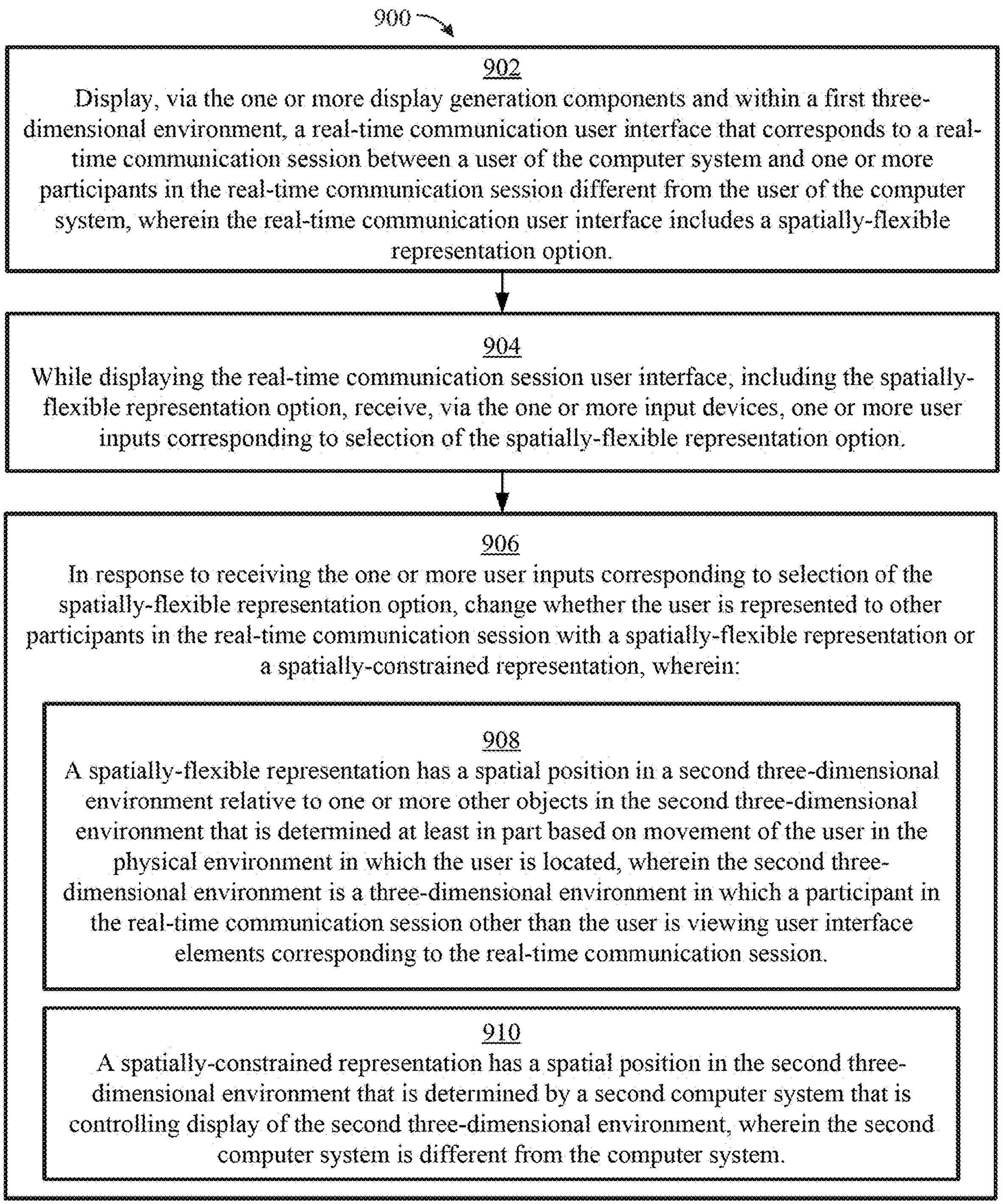
FIG. 9 is a flow diagram of methods of real-time communication, in accordance with various embodiments.
Figure 10:
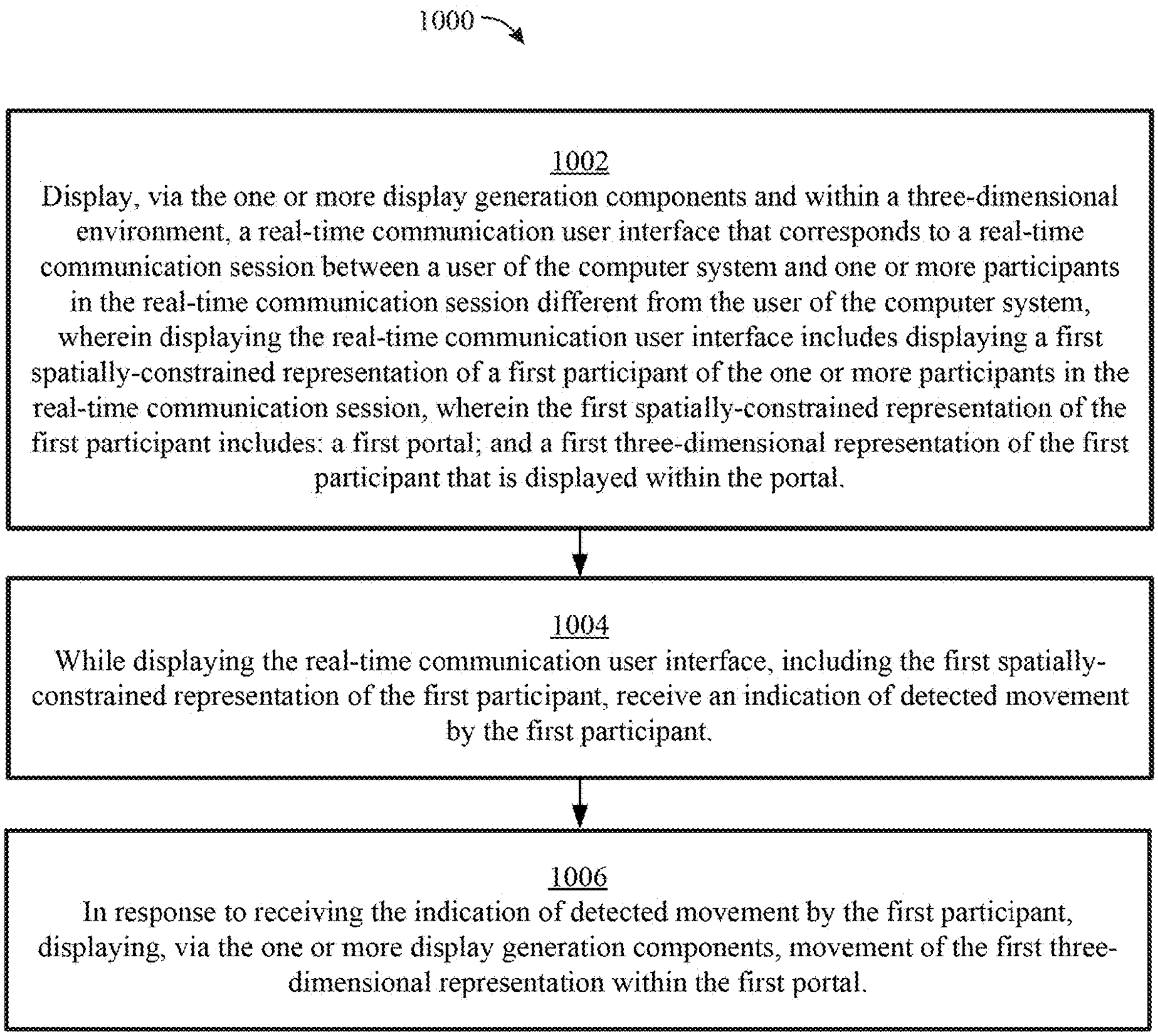
FIG. 10 is a flow diagram of methods of real-time communication, in accordance with various embodiments.
Figure 11:
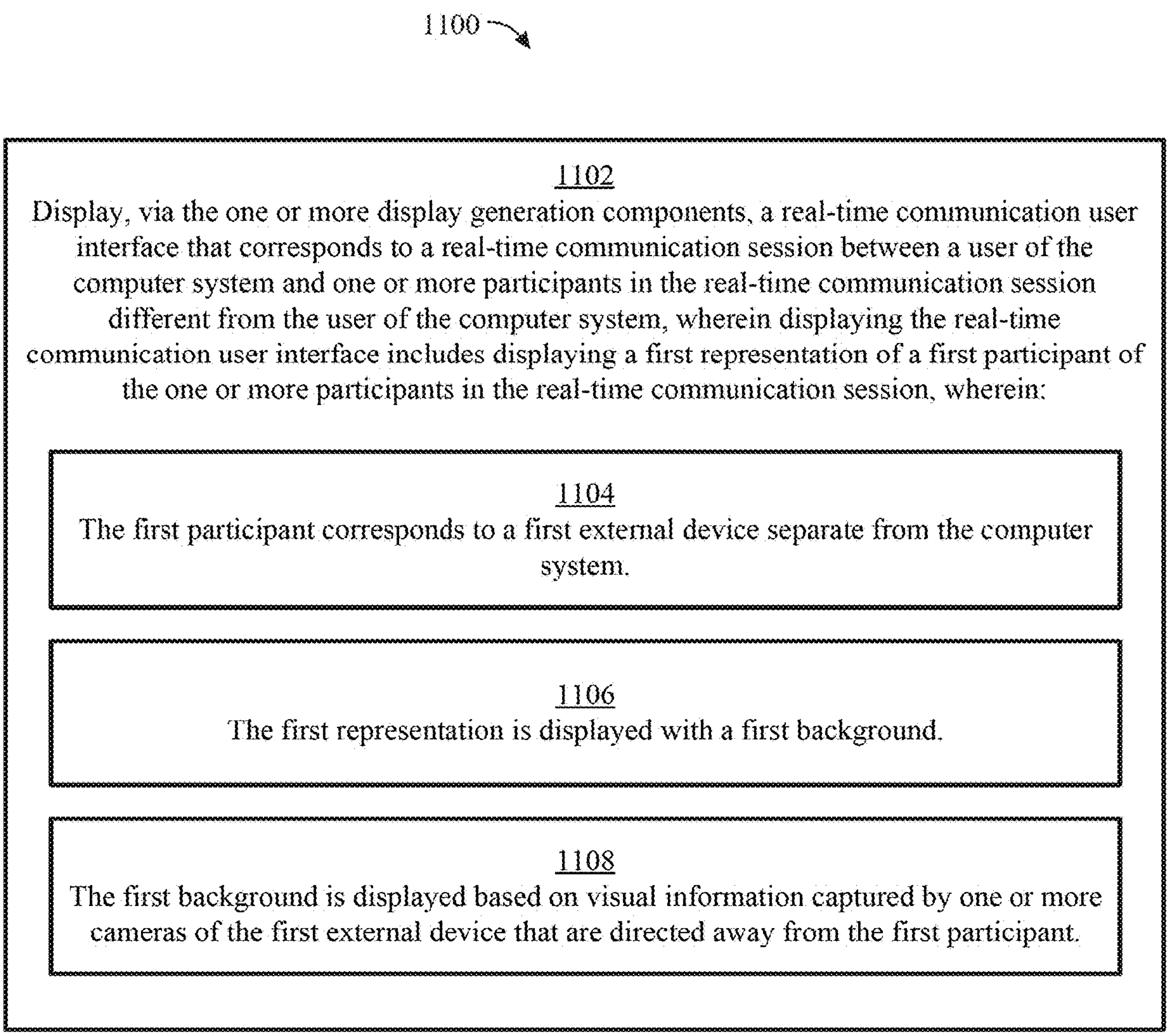
FIG. 11 is a flow diagram of methods of real-time communication, in accordance with various embodiments.
Figure 12:
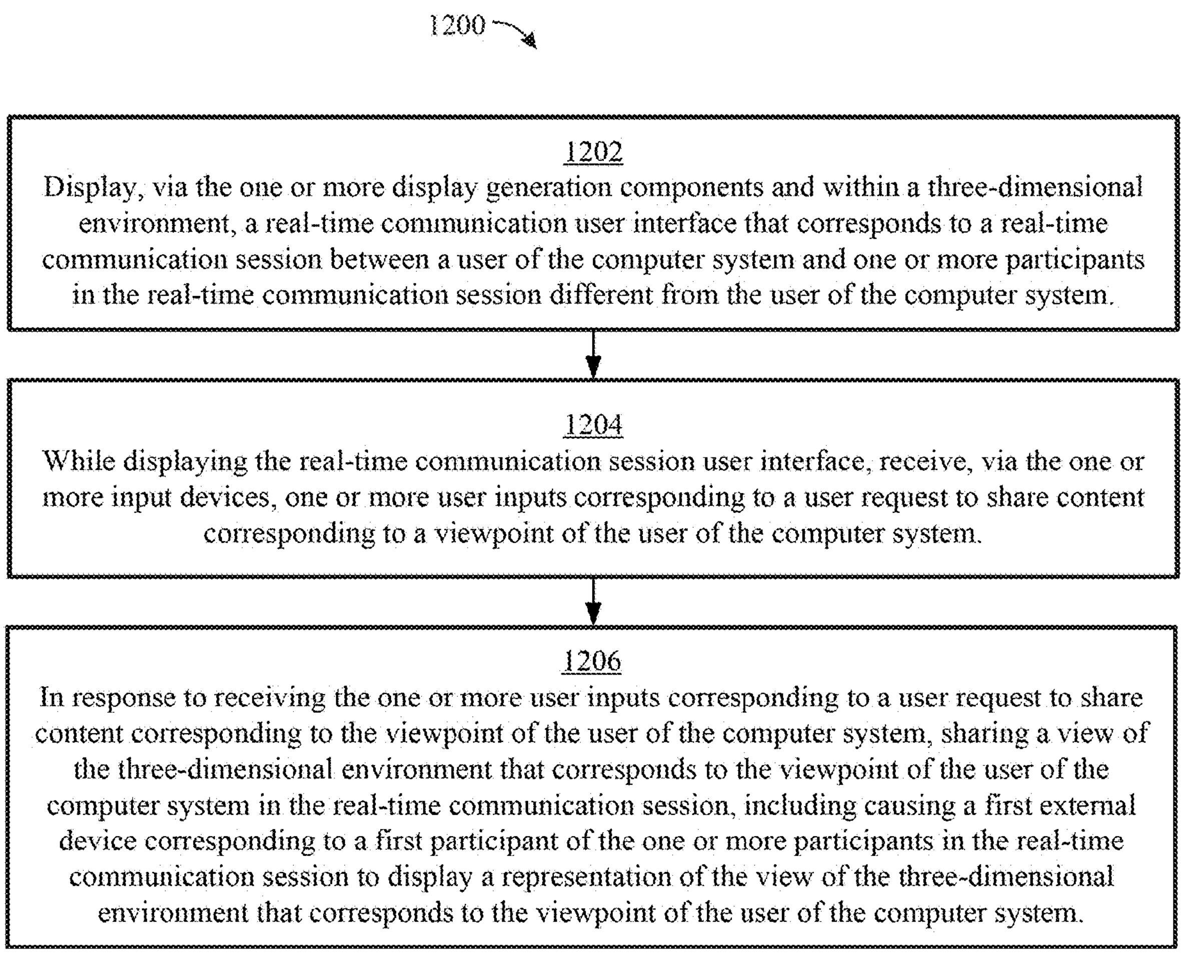
FIG. 12 is a flow diagram of methods of real-time communication, in accordance with various embodiments.

FIGS. 1A-6 provide a description of example computer systems for providing XR experiences to users. FIGS. 7A-7LL illustrate example techniques for real-time communication, in accordance with some embodiments. FIG. 8 is a flow diagram of methods of real-time communication, in accordance with various embodiments. FIG. 9 is a flow diagram of methods of real-time communication, in accordance with various embodiments. FIG. 10 is a flow diagram of methods of real-time communication, in accordance with various embodiments. FIG. 11 is a flow diagram of methods of real-time communication, in accordance with various embodiments. FIG. 12 is a flow diagram of methods of real-time communication, in accordance with various embodiments. The user interfaces in FIGS. 7A-7LL are used to illustrate the processes in FIGS. 8-12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1A:
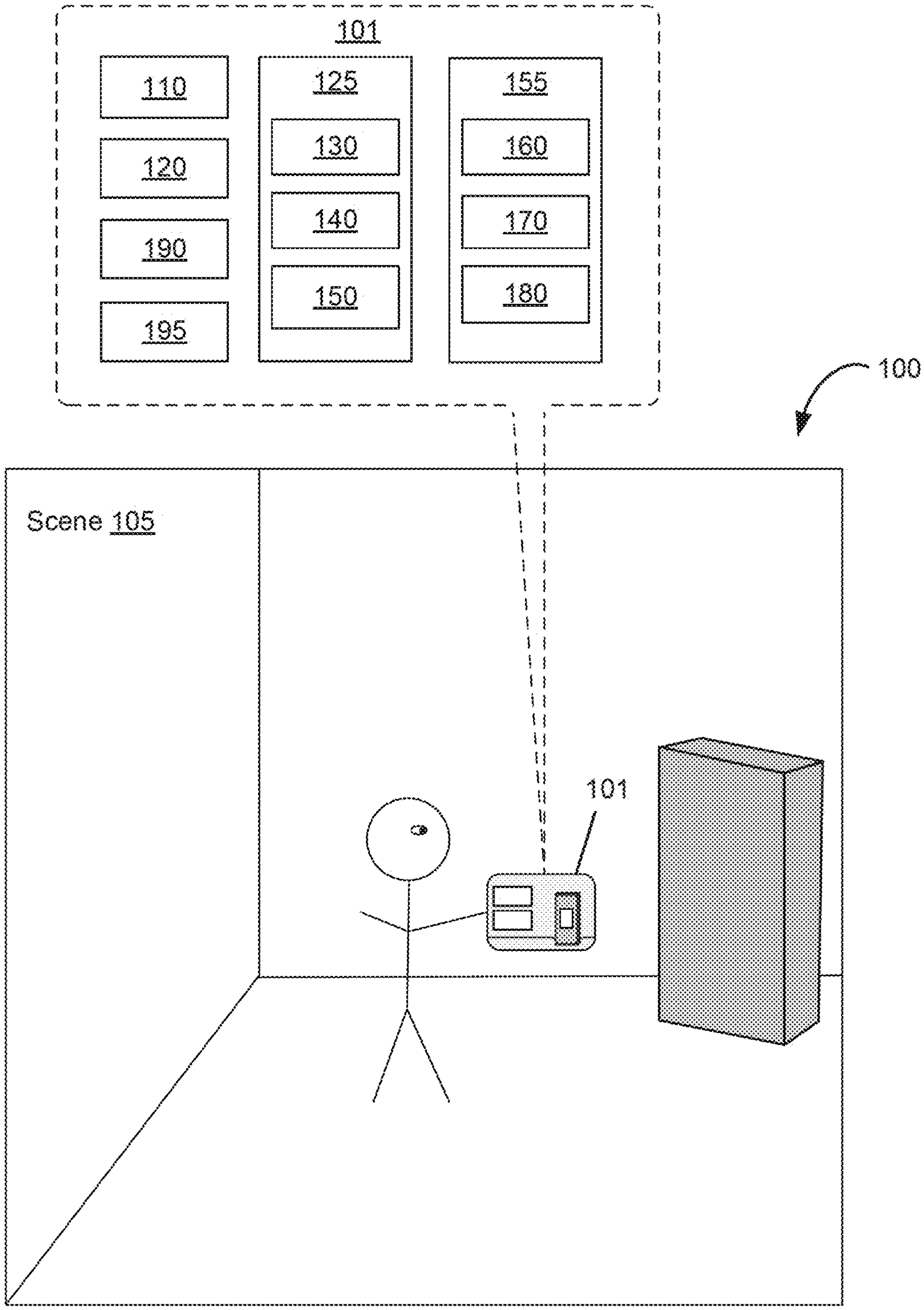
FIG. 1A is a block diagram illustrating an operating environment of a computer system for providing XR experiences in accordance with some embodiments.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a “lazy follow” threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person’s eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person’s eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person’s retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user’s body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user’s body (e.g., the user’s eye(s), head, or hand)) could similarly be implemented with an HMD where the movement is caused by movement of the HMD relative to the physical environment (e.g., the scene 105 or a part of the user’s body (e.g., the user’s eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
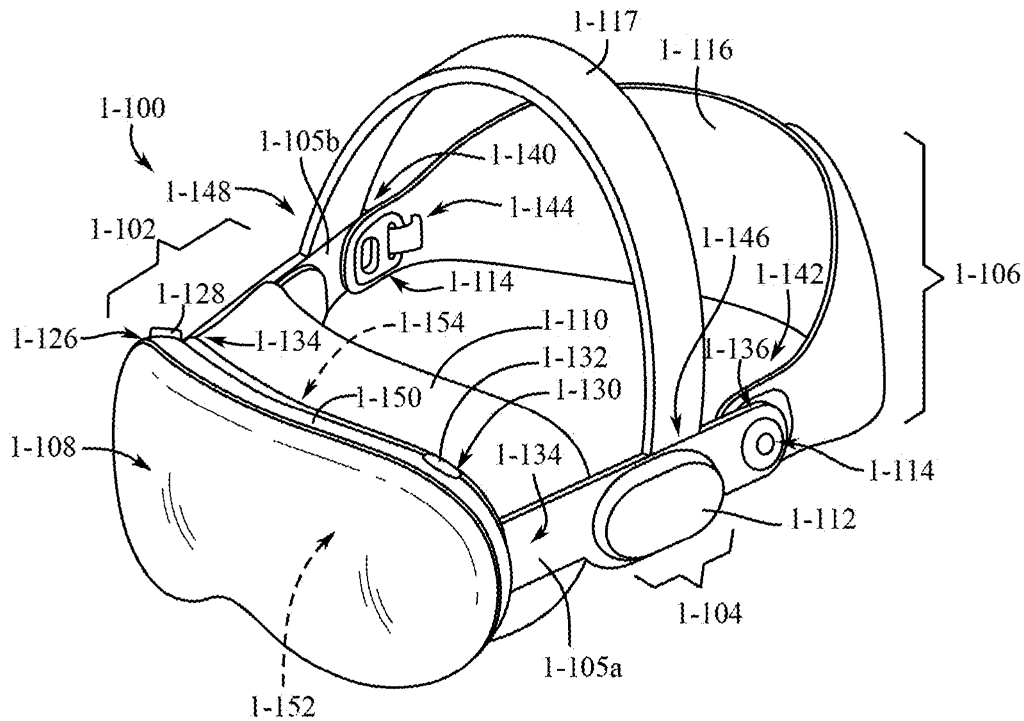
FIGS. 1B-1P are examples of a computer system for providing XR experiences in the operating environment of FIG. 1A.
Figure 1C:
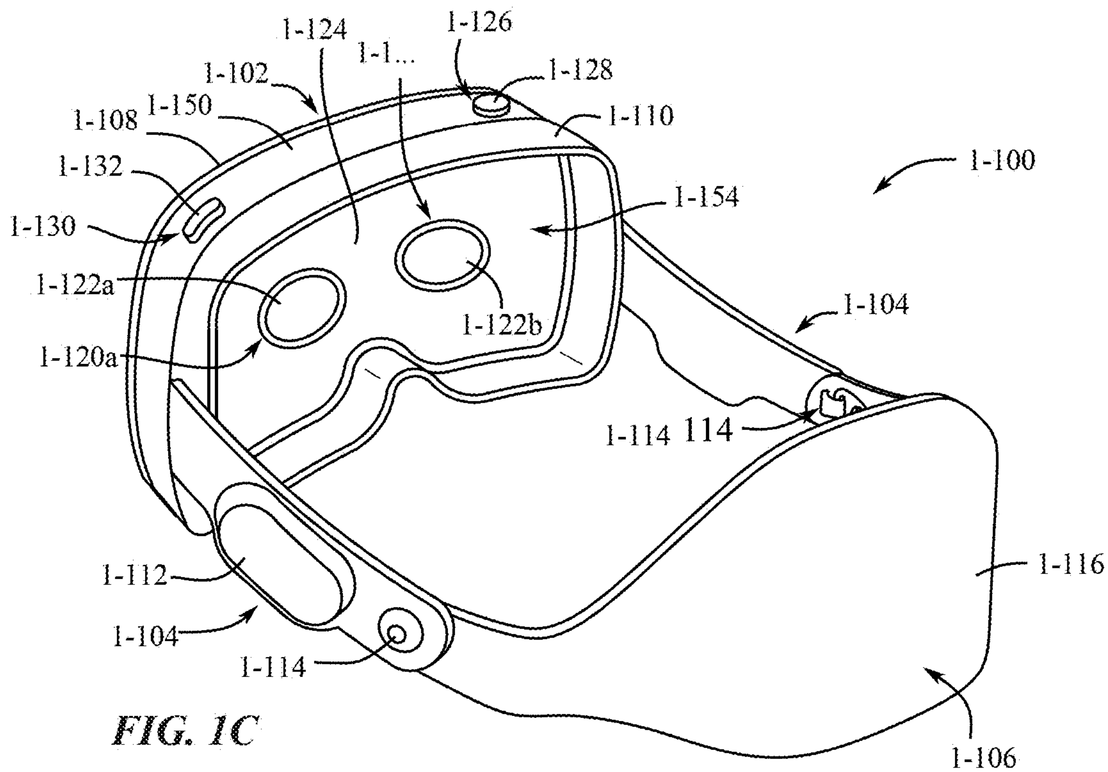
Figure 1D:
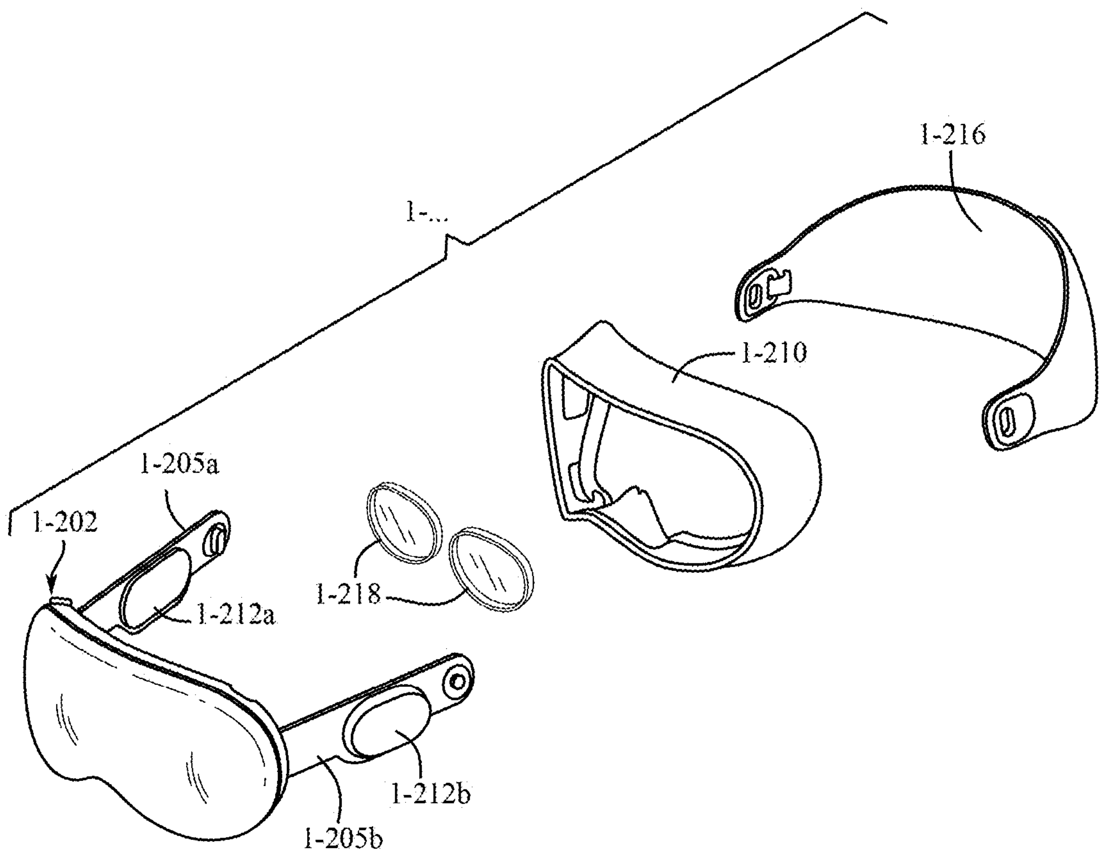
Figure 1E:
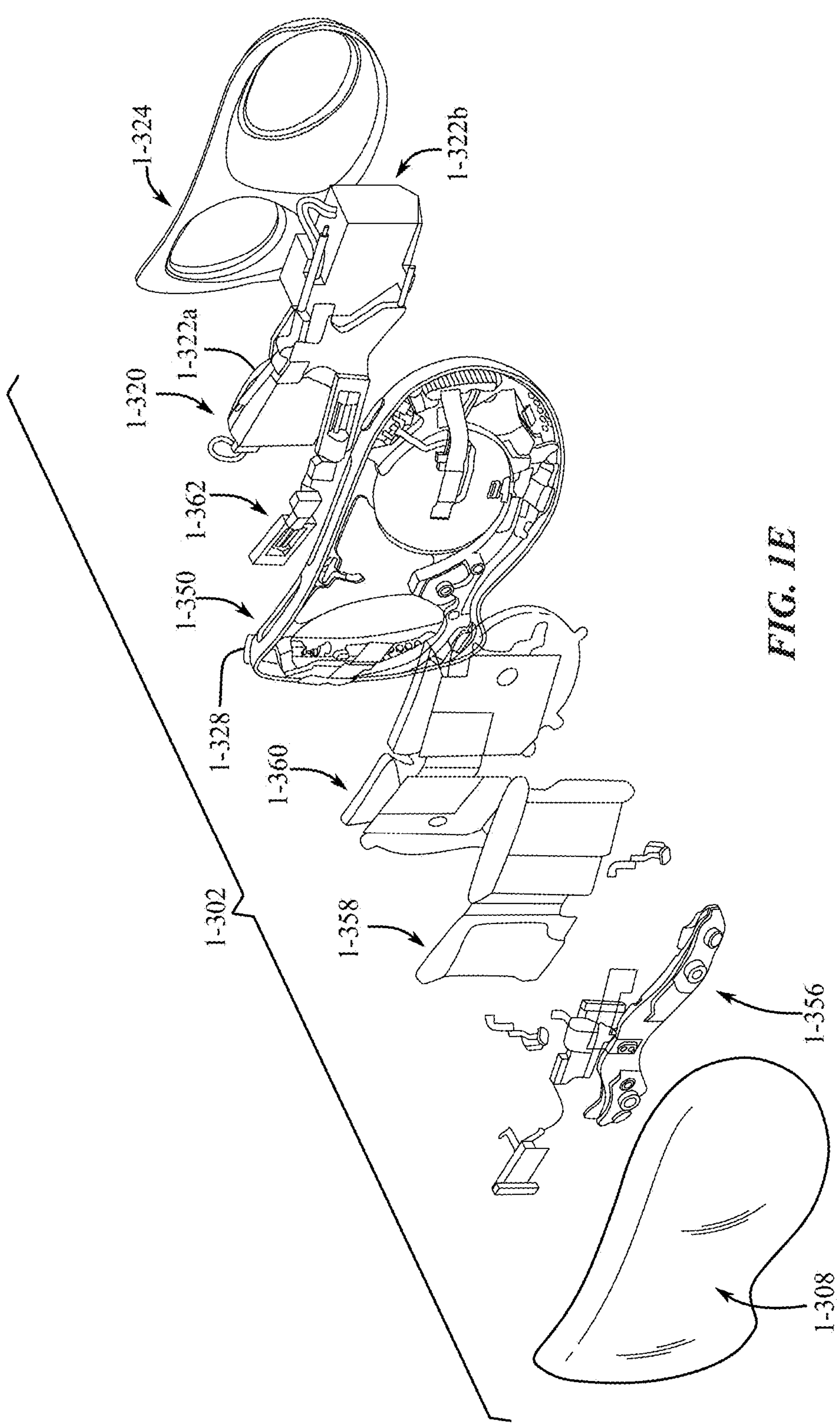
Figure 1F:
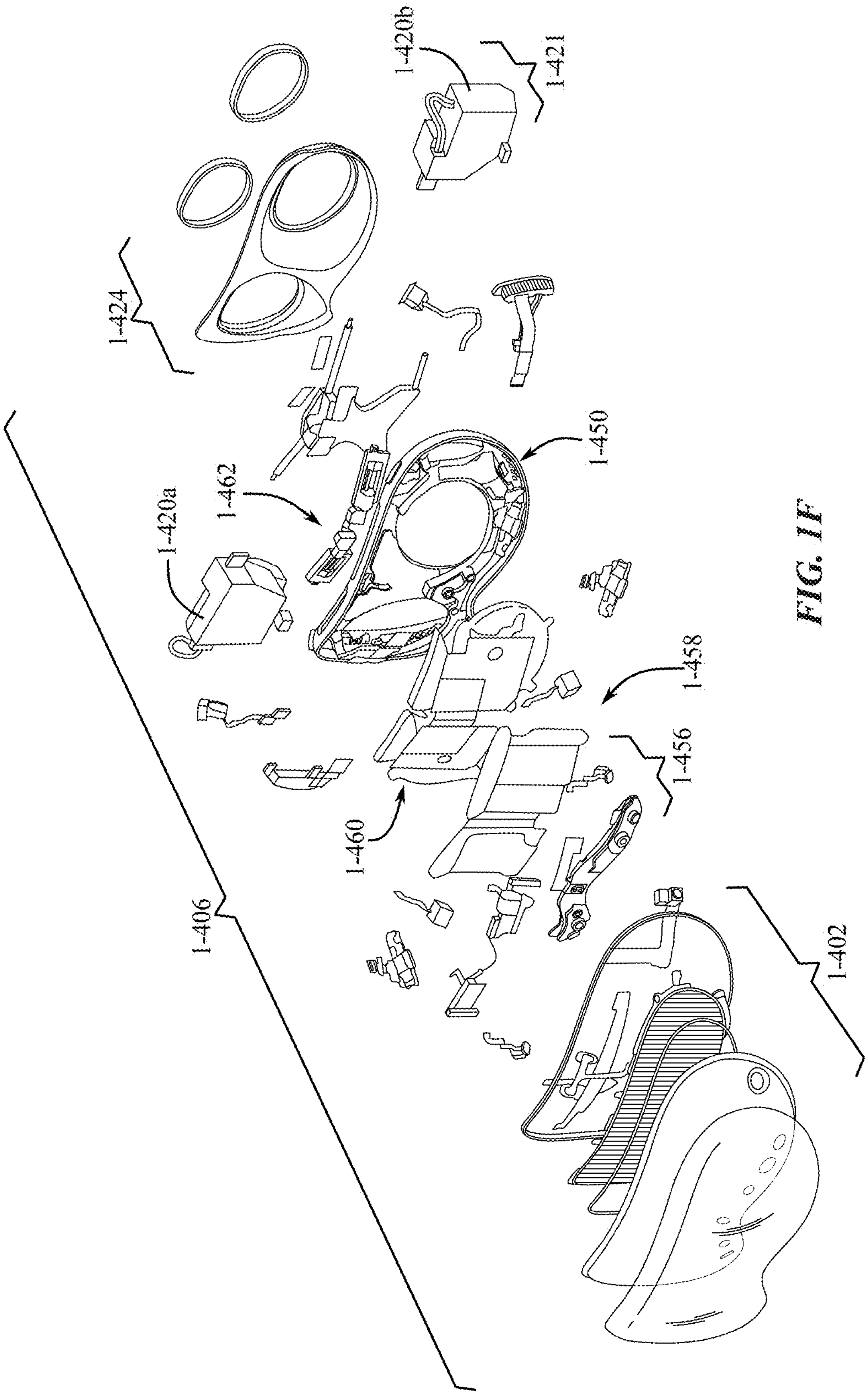
Figure 1G:
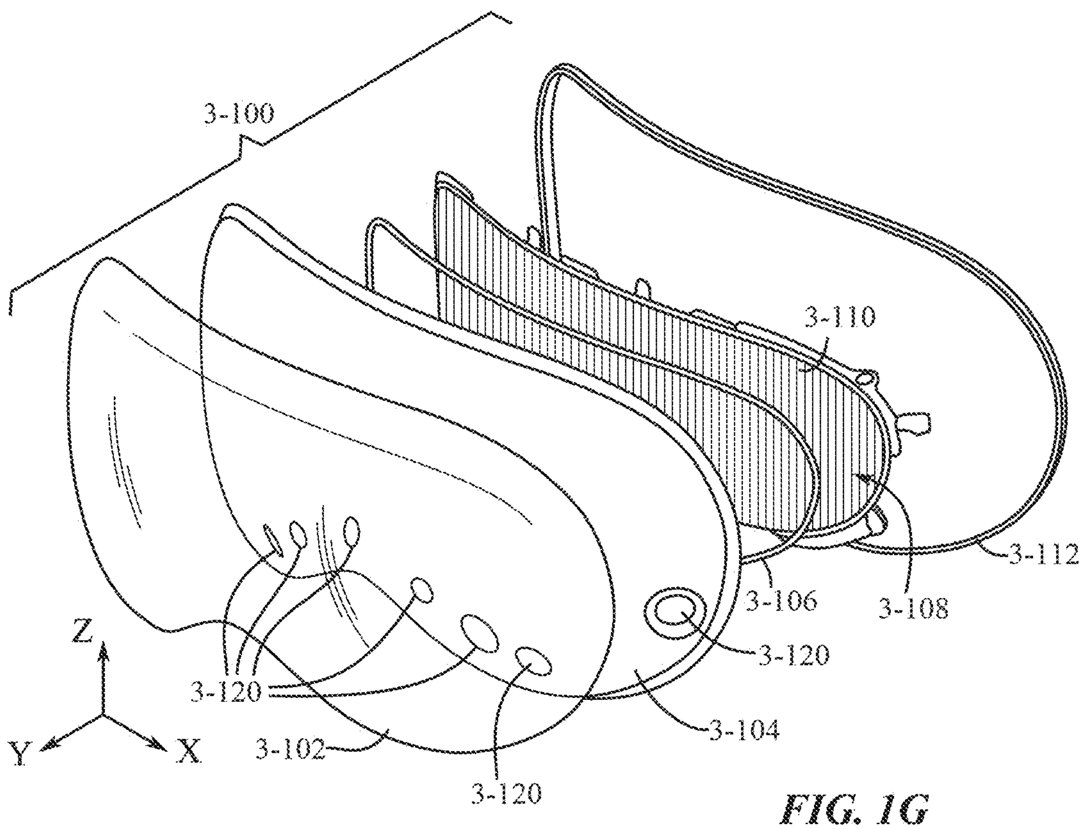
Figure 1H:
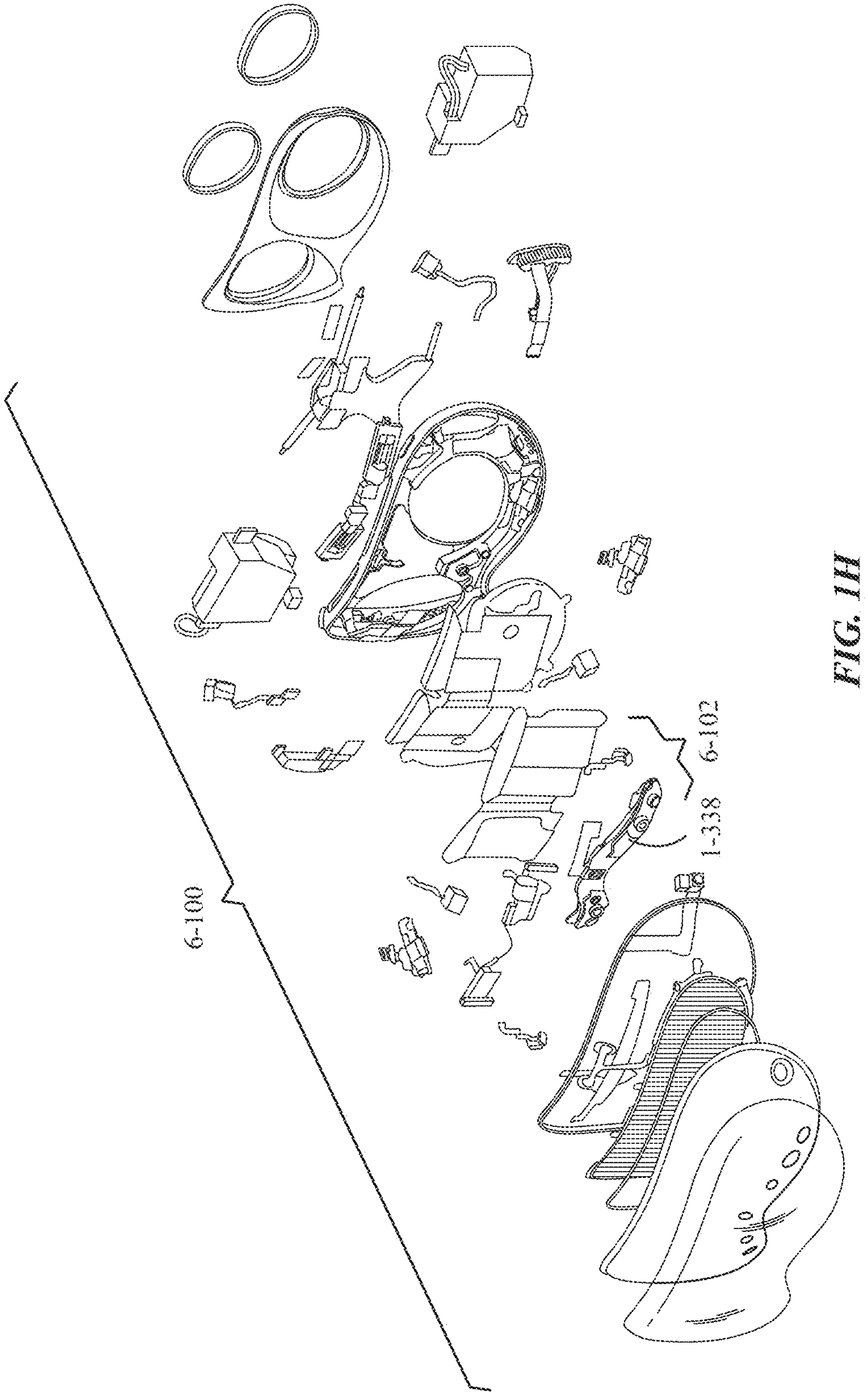
Figure 1I:
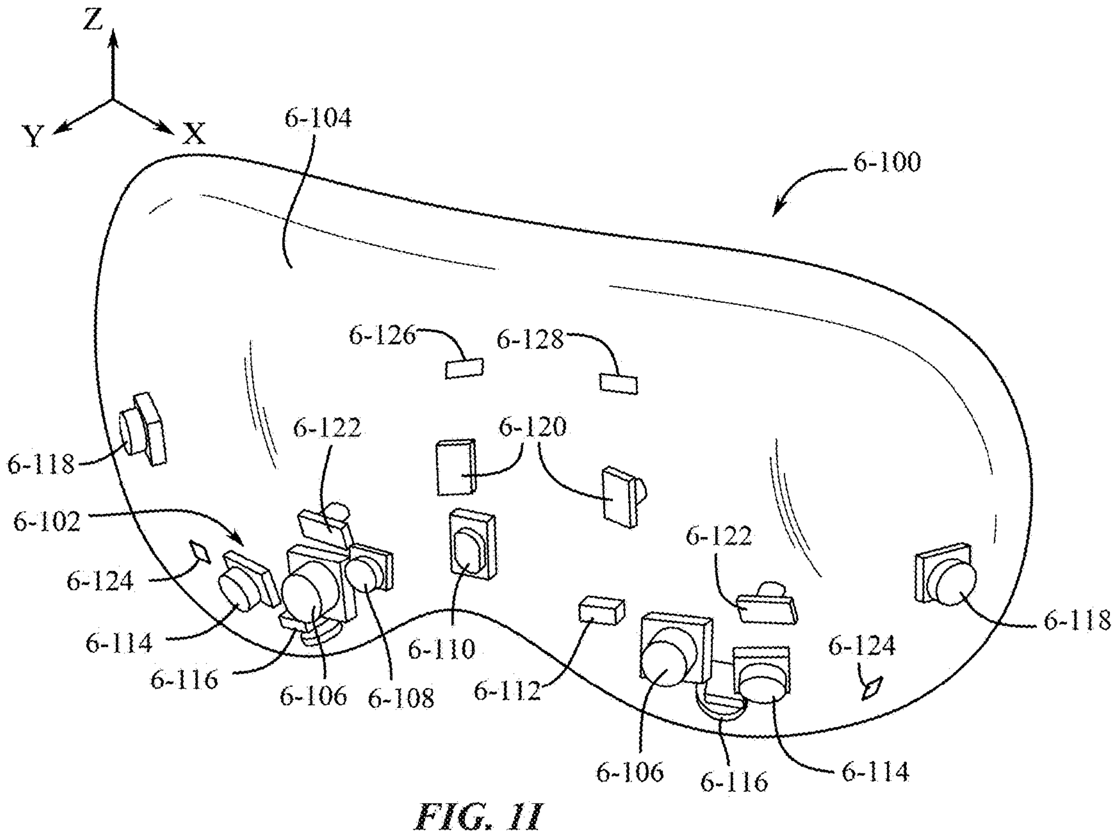
Figure 1J:
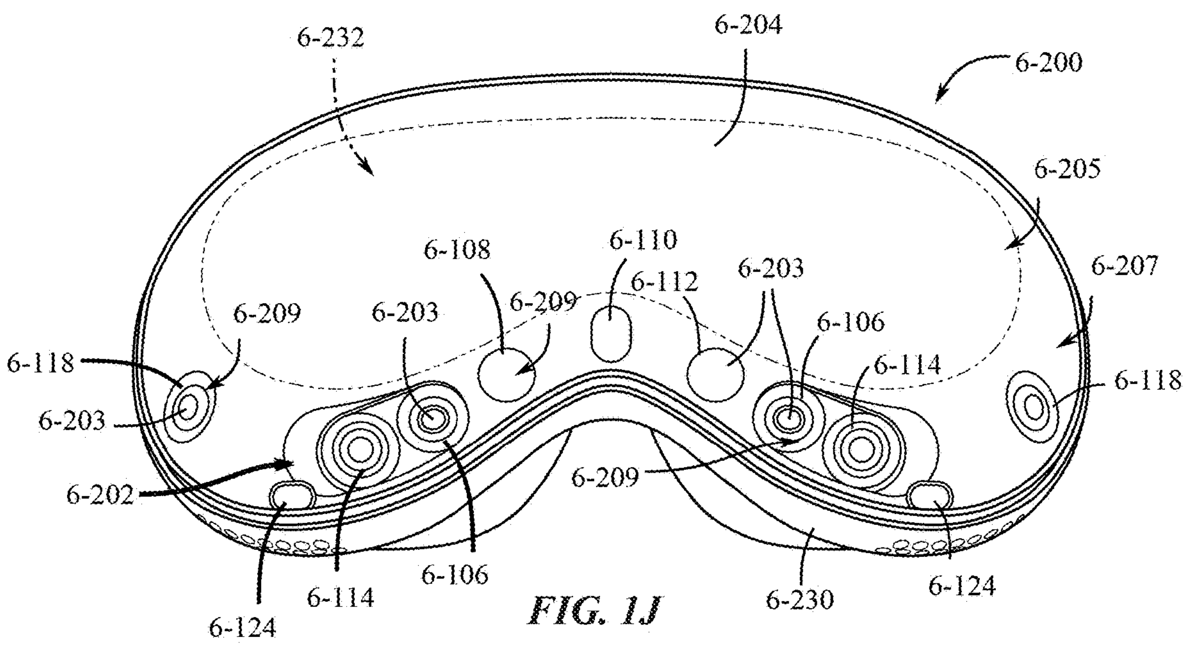
Figure 1K:
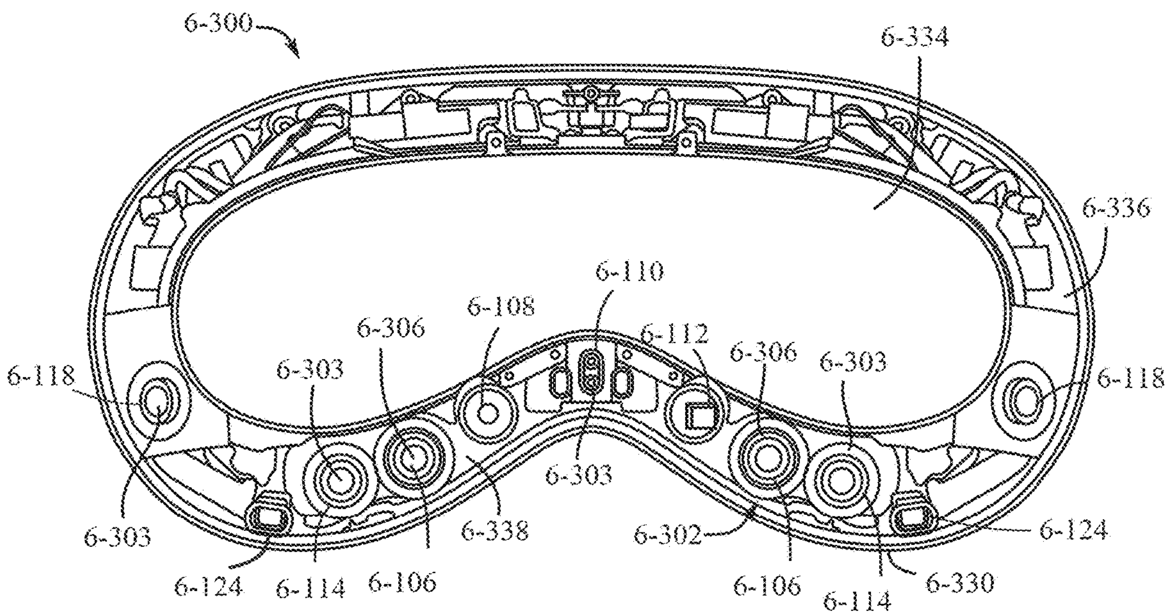
Figure 1L:
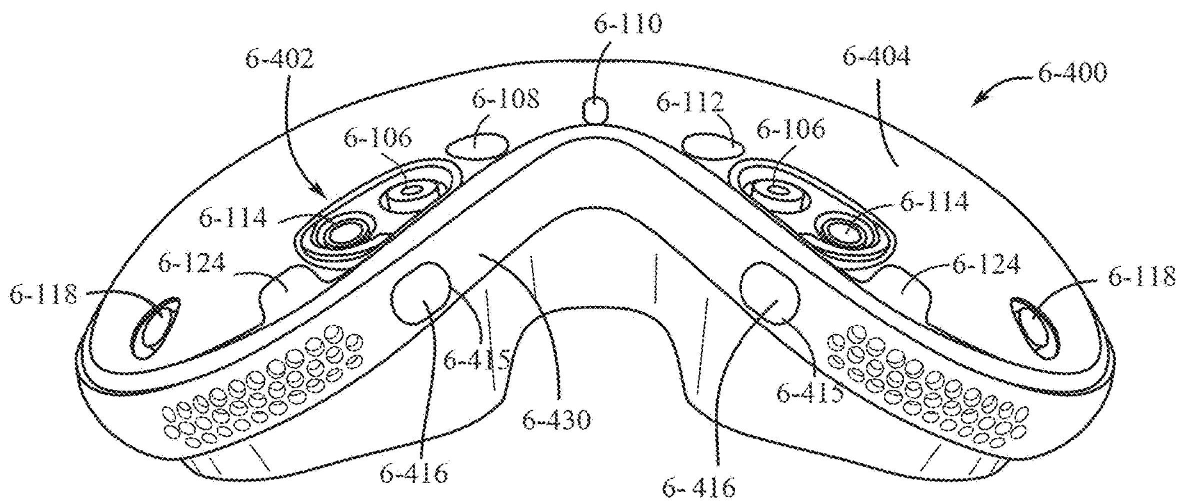
Figure 1M:
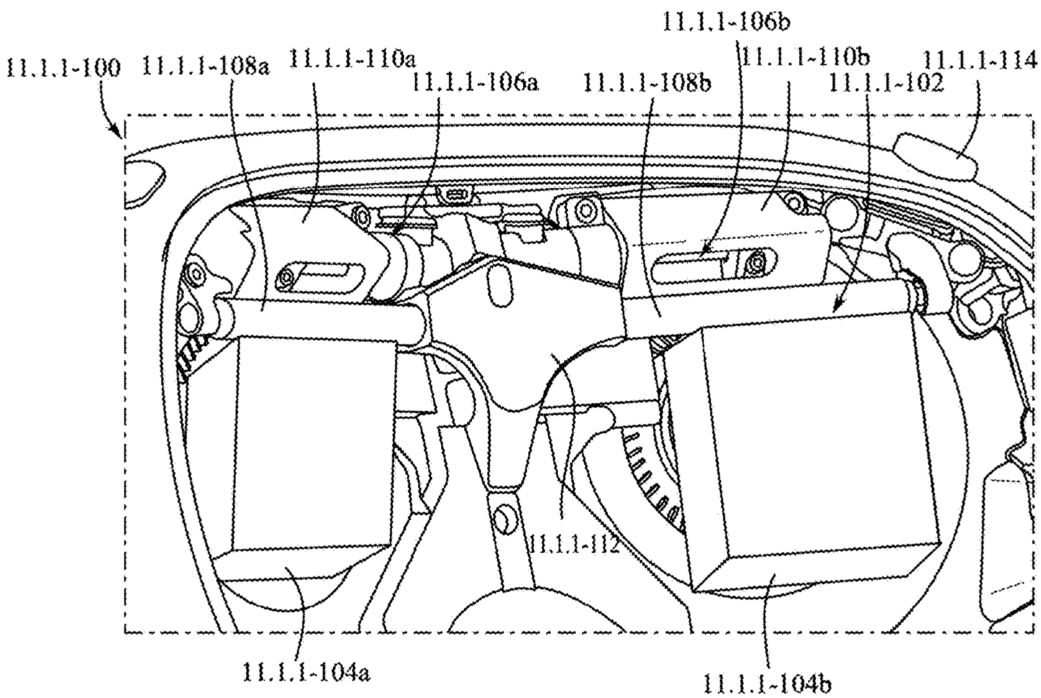
Figure 1N:
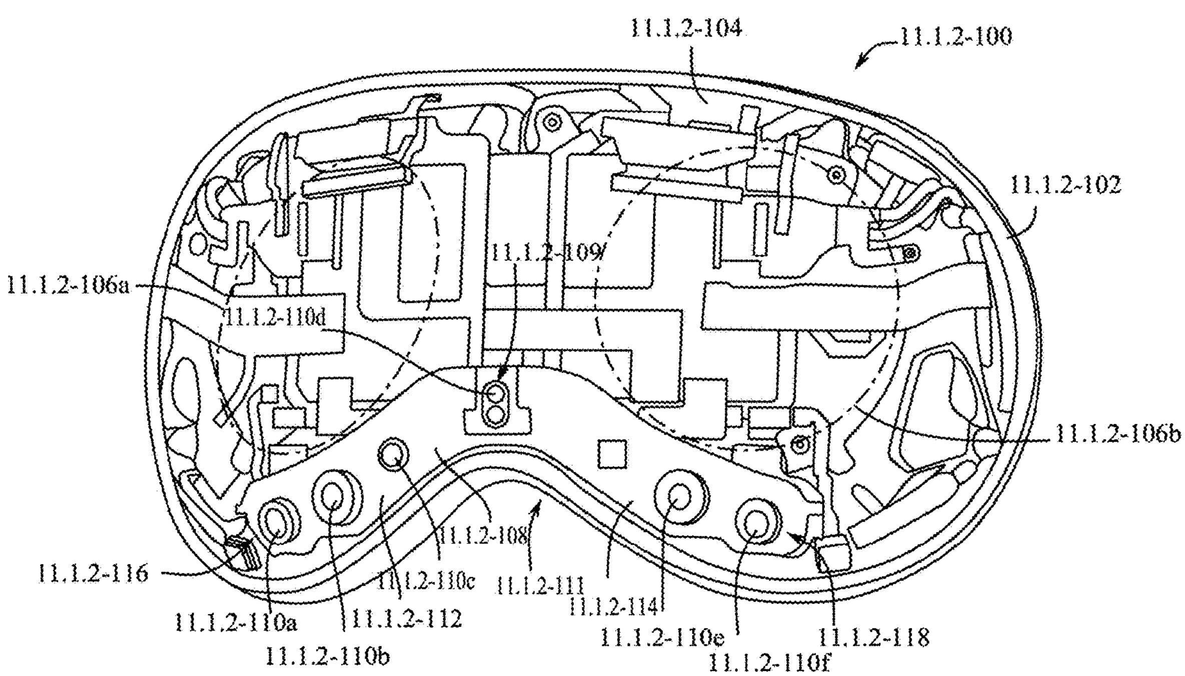
Figure 1O:
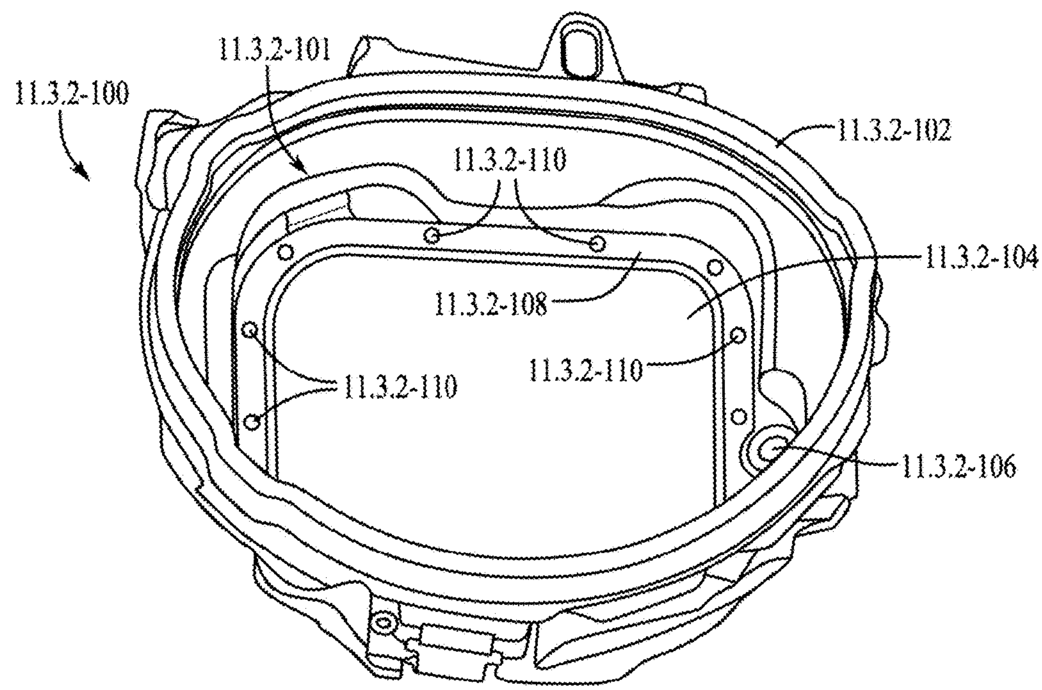
Figure 1P:
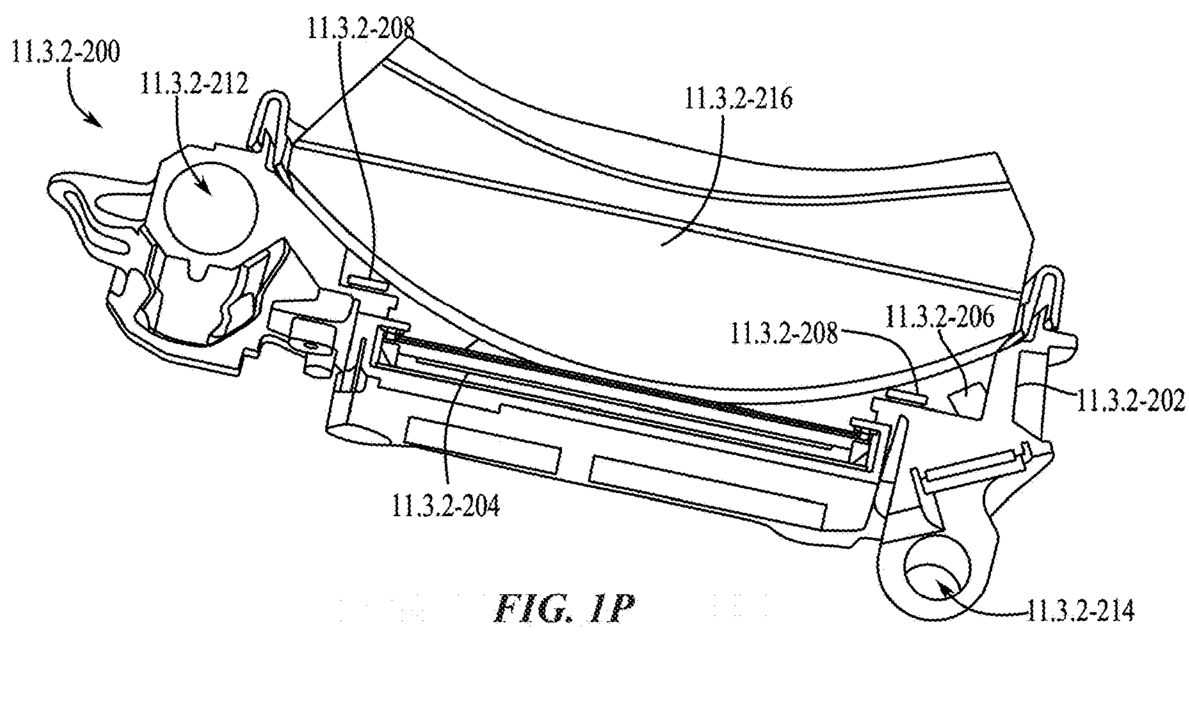

FIGS. 1A-1P illustrate various examples of a computer system that is used to perform the methods and provide audio, visual and/or haptic feedback as part of user interfaces described herein. In some embodiments, computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 (sometimes referred to as prescription lenses or non-prescription lenses) that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators describe in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 describe in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* includes plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the front cover assembly 1-108 is disposed to occlude the first opening 1-152 from view when the HMD is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-130 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display unit 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be clastic or at least partially clastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, cither alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-IF and described herein. Likewise, any of the features, components, and/or parts, including the arrangements and configurations thereof shown and described with reference to FIGS. 1B, 1C, and 1E-IF can be included, cither alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and IF and described herein. Likewise, any of the features, components, and/or parts, including the arrangements and configurations thereof shown and described with reference to FIGS. 1B-1D and IF can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, cither alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1B can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
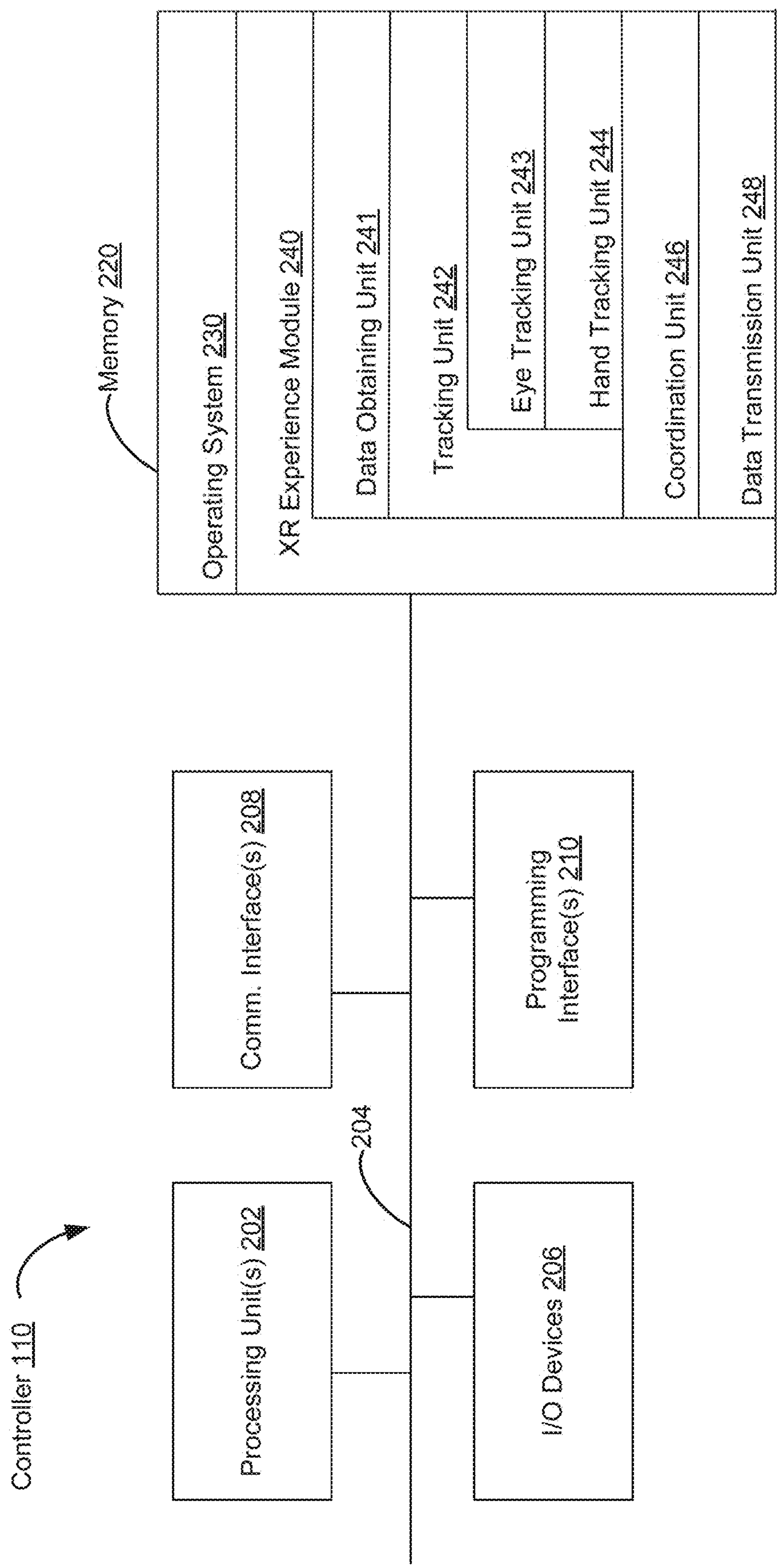
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
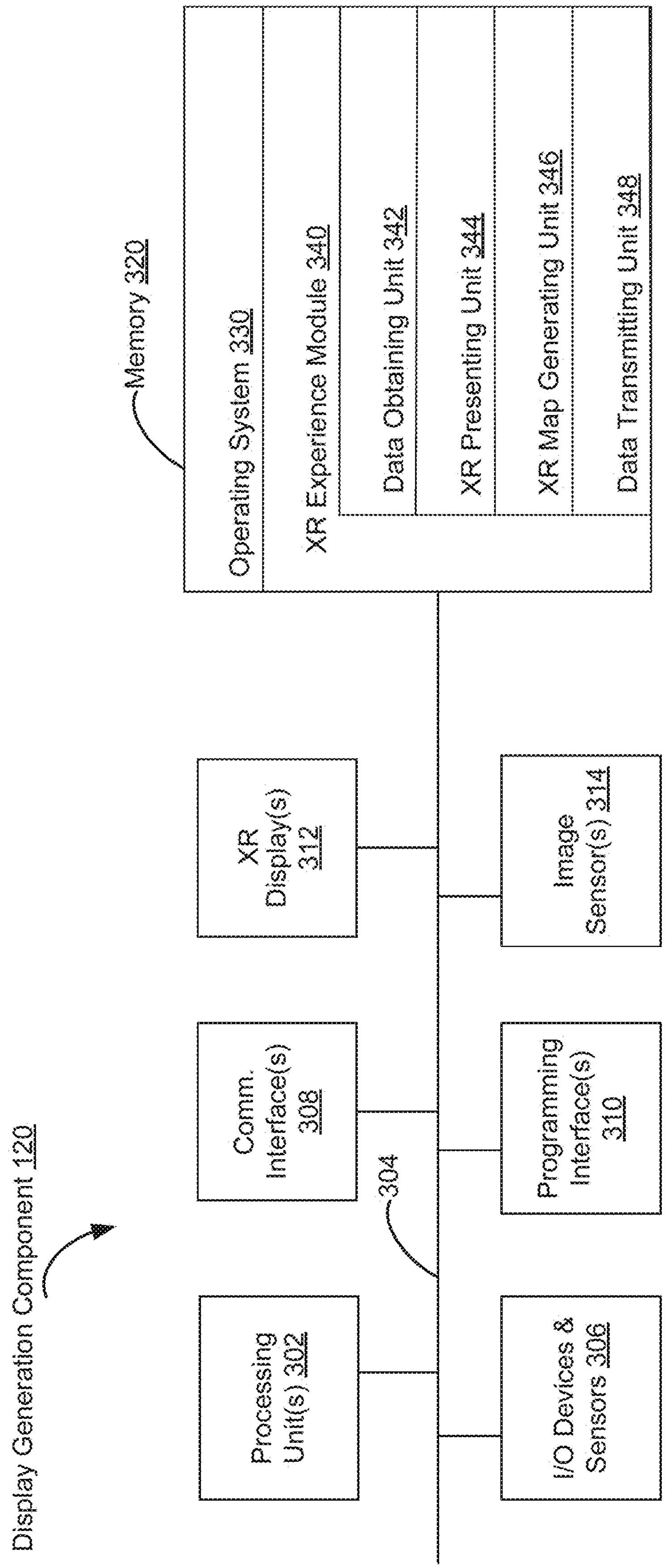
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
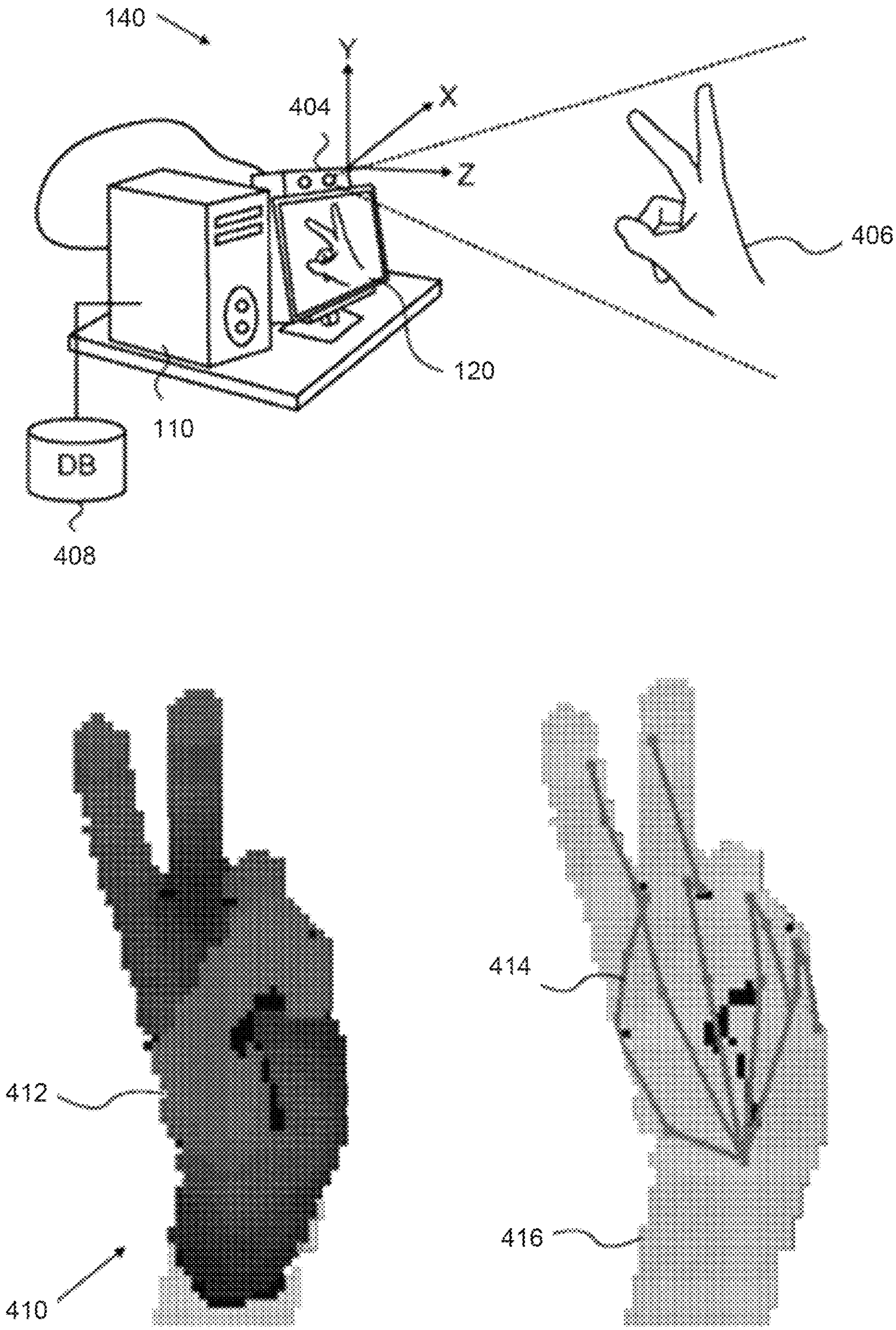
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture (e.g., an air drag gesture or an air swipe gesture) that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
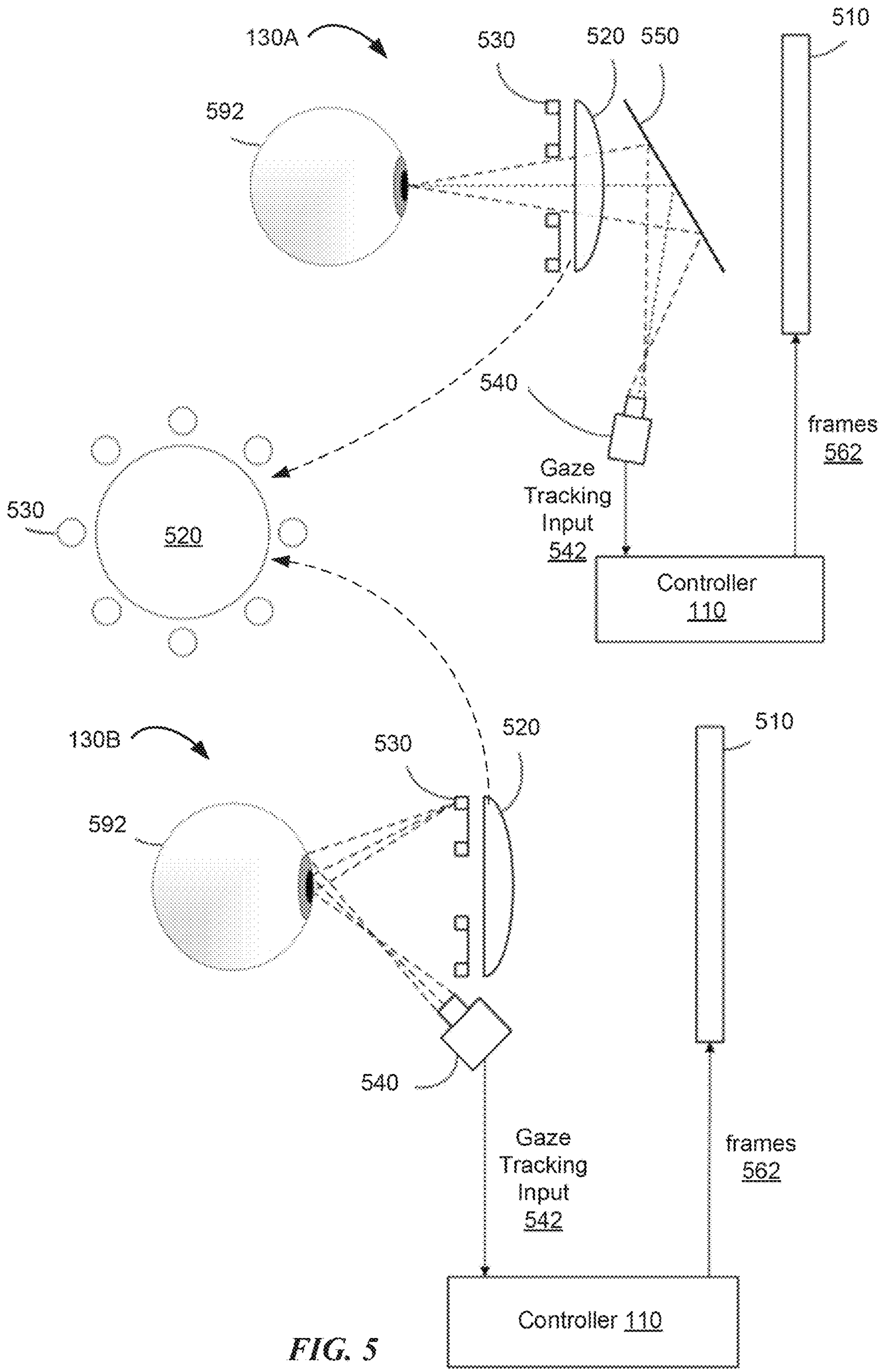
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
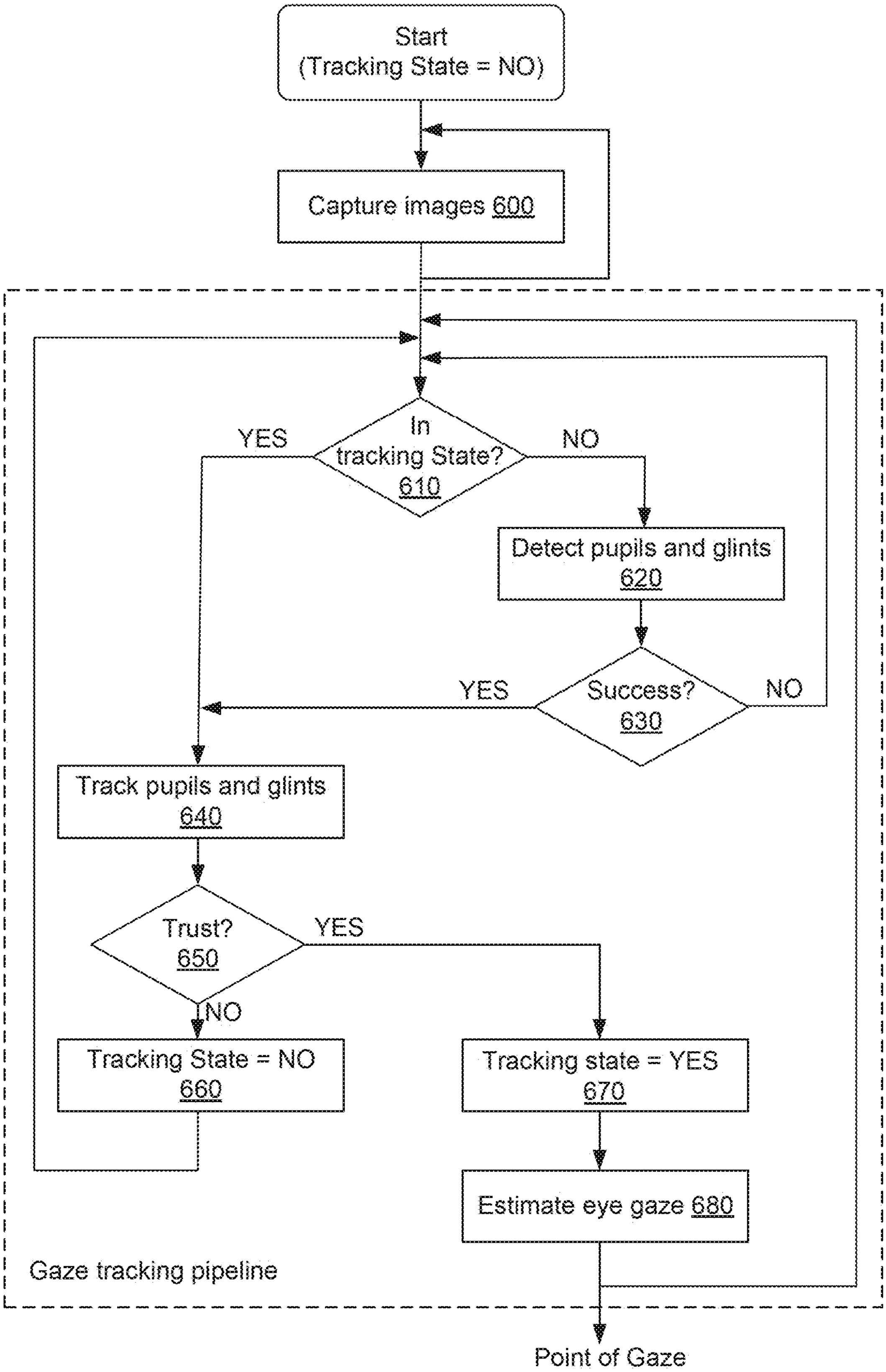
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A-1P and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, and (optionally) one or more input devices.

FIGS. 7A-7LL illustrate example techniques and user interfaces for real-time communication. FIG. 8 is a flow diagram of an exemplary method 800 for real-time communication. FIG. 9 is a flow diagram of an exemplary method 900 for real-time communication. FIG. 10 is a flow diagram of an exemplary method 1000 for real-time communication. FIG. 11 is a flow diagram of an exemplary method 1100 for real-time communication. FIG. 12 is a flow diagram of an exemplary method 1200 for real-time communication. The user interfaces in FIGS. 7A-7LL are used to illustrate the processes described below, including the processes in FIGS. 8, 9, 10, 11, and 12.

Figure 7A:
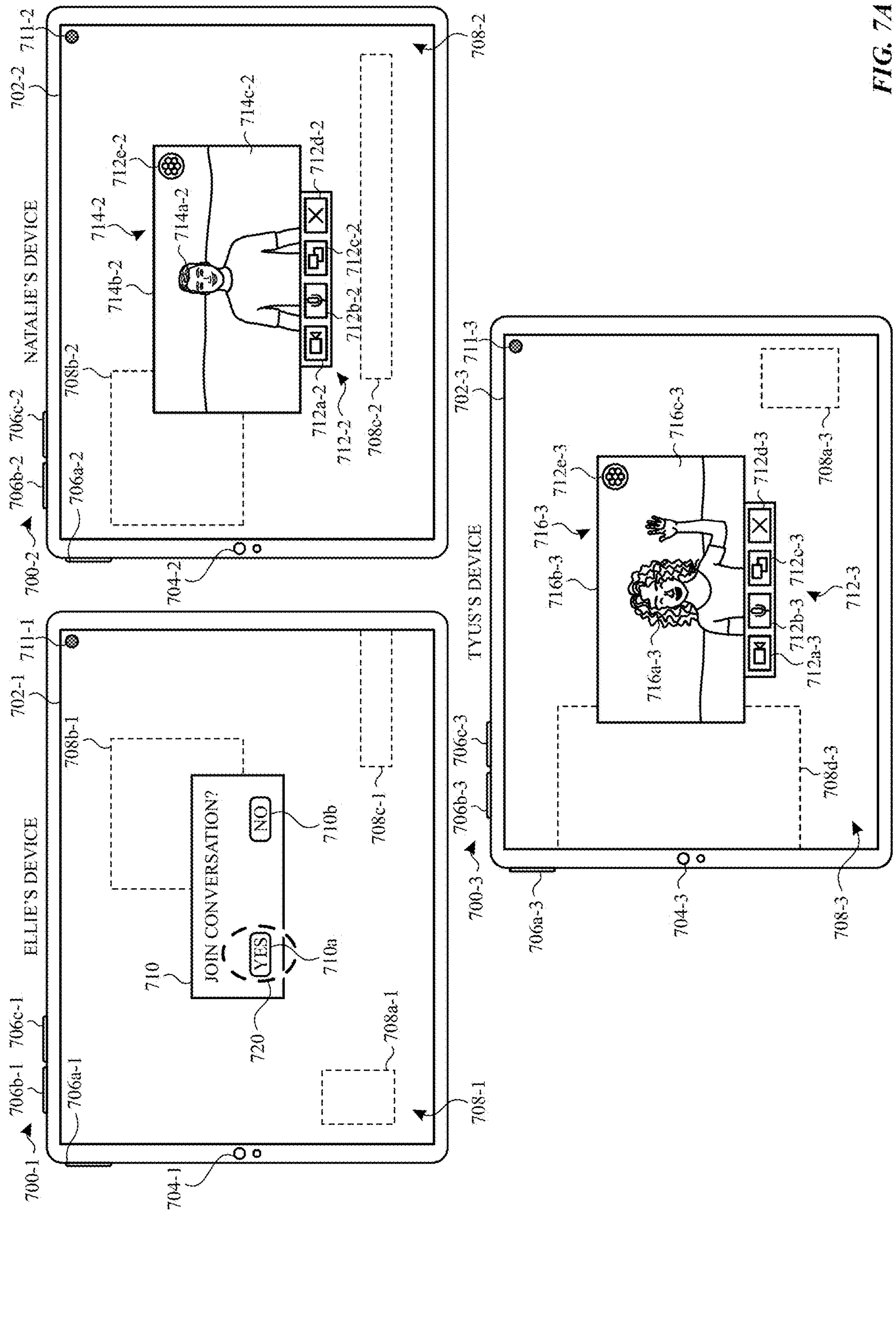
FIGS. 7A-7LL illustrate example techniques for real-time communication, in accordance with some embodiments.

FIG. 7A depicts electronic device 700-1, which is a tablet that includes touch-sensitive display 702-1, one or more input sensors 704-1 (e.g., one or more cameras, eye gaze trackers, hand movement trackers, and/or head movement trackers), and one or more buttons 706*a*-1, 706*b*-1, 706*c*-1. In some embodiments described below, electronic device 700-1 is a tablet. In some embodiments, electronic device 700-1 is a smart phone, a wearable device, a wearable smartwatch device, a head-mounted system (e.g., a headset), or other computer system that includes and/or is in communication with one or more display devices (e.g., display screen, projection device, or the like). Electronic device 700-1 is a computer system (e.g., computer system 101 in FIG. 1A).

FIG. 7A also depicts electronic device 700-2, which is a tablet that includes touch-sensitive display 702-2, one or more input sensors 704-2 (e.g., one or more cameras, eye gaze trackers, hand movement trackers, and/or head movement trackers), and one or more buttons 706*a*-2, 706*b*-2, 706*c*-2. In some embodiments described below, electronic device 700-2 is a tablet. In some embodiments, electronic device 700-2 is a smart phone, a wearable device, a wearable smartwatch device, a head-mounted system (e.g., a headset), or other computer system that includes and/or is in communication with one or more display devices (e.g., display screen, projection device, or the like). Electronic device 700—is a computer system (e.g., computer system 101 in FIG. 1A).

FIG. 7A also depicts electronic device 700-3, which is a tablet that includes touch-sensitive display 702-3, one or more input sensors 704-3 (e.g., one or more cameras, eye gaze trackers, hand movement trackers, and/or head movement trackers), and one or more buttons 706*a*-3, 706*b*-3, 706*c*-3. In some embodiments described below, electronic device 700-3 is a tablet. In some embodiments, electronic device 700-3 is a smart phone, a wearable device, a wearable smartwatch device, a head-mounted system (e.g., a headset), or other computer system that includes and/or is in communication with one or more display devices (e.g., display screen, projection device, or the like). Electronic device 700-3 is a computer system (e.g., computer system 101 in FIG. 1A).

In FIG. 7A, the users of electronic device 700-2 (named Natalie) and electronic device 700-3 (named Tyus) are participating in a real-time (e.g., synchronous) communication session. Electronic device 700-2 displays user interface 712-2 that corresponds to the real-time communication session. In FIG. 7A, user interface 712-2 is overlaid on three-dimensional environment 708-2, which includes object 708*b*-2 and object 708*c*-2. In some embodiments, three-dimensional environment 708-2 is displayed by a display (as depicted in FIG. 7A). In some embodiments, three-dimensional environment 708-2 is a virtual environment. In some embodiments, three-dimensional environment 708-2 includes a virtual environment or an image (or video) of a physical environment captured by one or more cameras. In some embodiments, three-dimensional environment 708-2 is a shared three-dimensional virtual environment that is shared by participants in the real-time communication session. For example, in FIG. 7A, electronic device 700-3 displays three-dimensional environment 708-3. In some embodiments, three-dimensional environment 708-3 and three-dimensional environment 708-2 are the same virtual environment.

User interface 712-2 includes one or more controls 712*a*-2, 712*b*-2, 712*c*-2, 712*d*-2, and 712*e*-2, as well as representation 714-2 that is representative of Tyus, the user of electronic device 700-3. Control 712*a*-2 is selectable to switch between an avatar representation representing the user of electronic device 700-2 in the real-time communication session and having a non-avatar representation representing the user of electronic device 700-2 in the real-time communication session, as will be described in greater detail below. Control 712*b*-2 is selectable to mute the microphone of electronic device 700-2 and/or cause electronic device 700-2 to cease transmitting audio content into the real-time communication session. Control 712*c*-2 is selectable to share a viewpoint of the user of electronic device 700-2 (and/or the viewpoint of one or more cameras of electronic device 700-2) into the real-time communication session, as will be described in greater detail below. Control 712*d*-2 is selectable for the user of electronic device 700-2 to leave the real-time communication session. Control 712*e*-2 is selectable for the user of electronic device 700-2 to request a transition from a spatially-constrained representation mode to a spatially-flexible representation mode, as will be described in greater detail below. Electronic device 700-2 also displays indication 711-2 which, in some embodiments, can be interacted with by a user to open a system user interface, as will be described in greater detail below. For example, in some embodiments, a gaze input directed to indication 711-2 causes electronic device 700-2 to display the system user interface.

Similar to electronic device 700-2, electronic device 700-3 displays user interface 712-3 that corresponds to the real-time communication session. In FIG. 7A, user interface 712-3 is overlaid on three-dimensional environment 708-3, which includes object 708*a*-3 and object 708*d*-3. In some embodiments, three-dimensional environment 708-3 is displayed by a display (as depicted in FIG. 7A). In some embodiments, three-dimensional environment 708-3 is a virtual environment. In some embodiments, three-dimensional environment 708-3 includes a virtual environment or an image (or video) of a physical environment captured by one or more cameras. As also discussed above, in some embodiments, three-dimensional environment 708-3 is a shared three-dimensional virtual environment that is shared by participants in the real-time communication session. For example, in FIG. 7A, three-dimensional environment 708-3 and three-dimensional environment 708-2 are the same virtual environment that are shared by the users of electronic devices 700-1, 700-2, 700-3.

User interface 712-3 includes one or more controls 712*a*-3, 712*b*-3, 712*c*-3, 712*d*-3, and 712*e*-3, as well as representation 716-3 that is representative of Natalie, the user of electronic device 700-2. Controls 712*a*-3, 712*b*-3, 712*c*-3, 712*d*-3, and 712*e*-3 perform the same functions described above for controls 712*a*-2, 712*b*-2, 712*c*-2, 712*d*-2, and 712*e*-2. Control 712*a*-3 is selectable to switch between an avatar representation representing the user of electronic device 700-3 in the real-time communication session and having a non-avatar representation representing the user of electronic device 700-3 in the real-time communication session, as will be described in greater detail below. Control 712*b*-3 is selectable to mute the microphone of electronic device 700-3 and/or cause electronic device 700-3 to cease transmitting audio content into the real-time communication session. Control 712*c*-3 is selectable to share a viewpoint of the user of electronic device 700-3 (and/or the viewpoint of one or more cameras of electronic device 700-3) into the real-time communication session, as will be described in greater detail below. Control 712*d*-3 is selectable for the user of electronic device 700-3 to leave the real-time communication session. Control 712*e*-3 is selectable for the user of electronic device 700-3 to request a transition from a spatially-constrained representation mode to a spatially-flexible representation mode, as will be described in greater detail below. Electronic device 700-3 also displays indication 711-3 which, in some embodiments, can be interacted with by a user to open a system user interface, as will be described in greater detail below. For example, in some embodiments, a gaze input directed to indication 711-3 causes electronic device 700-3 to display the system user interface.

In some embodiments, the real-time communication session includes a spatially-constrained representation mode and a spatially-flexible representation mode. In FIG. 7A, both participants in the real-time communication session are in the spatially-constrained representation mode. Accordingly, the user of electronic device 700-2 is represented in the real-time communication session by spatially-constrained representation 716-3, and the user of electronic device 700-3 is represented in the real-time communication session by spatially-constrained representation 714-3. Spatially constrained representation 716-3 (displayed on electronic device 700-3) includes user representation **716*a*-3 displayed within boundary 716*b*-3 in front of background content 716*c*-3. User representation 716*a*-3 is an avatar-based representation, and moves based on detected movement of the user of electronic device 700-2. In some embodiments, user representation 716*a*-3 is a virtual representation. Similarly, spatially constrained representation 714-2 (displayed on electronic device 700-2) includes user representation 714*a*-2 displayed within boundary 714*b*-2 in front of background content 714*c*-2. User representation 714*a*-2 is an avatar-based representation, and moves based on detected movement of the user of electronic device 700-3. In some embodiments, user representation 714*a*-2** is a virtual representation.

In some embodiments, spatially-constrained representations are displayed within a three-dimensional environment, but do not move freely within the three-dimensional environment based on movement of the corresponding user, whereas spatially-flexible representations have a greater degree of movement and/or greater freedom of movement within the three-dimensional environment based on movement of the corresponding user. For example, in FIG. 7A, spatially-constrained representation 714-2 (which is displayed on electronic device 700-2 and representative of the user of electronic device 700-3) is displayed within three-dimensional environment 708-2. In some embodiments, user representation **714*a*-2 is able to move within boundary 714*b*-2 but, in some embodiments, cannot move outside of boundary 714*b*-2. Accordingly, user representation 714*a*-2 is constrained to the location of boundary 714*b*-2. Furthermore, in some embodiments, boundary 714*b*-2 of spatially-constrained representation 714-2 does not move within three-dimensional environment 708-2 based on movement of the user of electronic device 700-3. In some embodiments, boundary 714*b*-2 is displayed as an environment-locked virtual object. However, in some embodiments, were the user of electronic device 700-3 to transition to a spatially-flexible representation, the spatially-flexible representation could move to different positions within three-dimensional environment 708-2 based on movement of the user of electronic device 700-3. Similarly, in some embodiments, spatially-constrained representation 716-3 (which is displayed on electronic device 700-3 and representative of the user of electronic device 700-2) is displayed within three-dimensional environment 708-3. In some embodiments, user representation 716*a*-3 is able to move within boundary 716*b*-3 but, in some embodiments, cannot move outside of boundary 716*b*-3. Accordingly, user representation 716*a*-3 is constrained to the location of boundary 716*b*-3. Furthermore, in some embodiments, boundary 716*b*-3 of spatially-constrained representation 716-3 does not move within three-dimensional environment 708-3 based on movement of the user of electronic device 700-2. In some embodiments, boundary 716*b*-3 is displayed as an environment-locked virtual object. However, in some embodiments, were the user of electronic device 700-2 to transition to a spatially-flexible representation, the spatially-flexible representation could move to different positions within three-dimensional environment 708-3 based on movement of the user of electronic device 700-2**. These concepts will be described in greater detail below.

In FIG. 7A, electronic device 700-1, corresponding to the user Ellie, is not participating in the real-time communication session. In FIG. 7A, electronic device 700-1 displays user interface 710 indicative of a received invitation and/or request to join the real-time communication session. User interface 710 includes option **710*a* that is selectable to join the real-time communication session, and option 710*b* that is selectable to forgo joining the real-time communication session (e.g., to decline the invitation to join the real-time communication session). Electronic device 700-1 also displays indication 711-1 which, in some embodiments, can be interacted with by a user to open a system user interface, as will be described in greater detail below. For example, in some embodiments, a gaze input directed to indication 711-1 causes electronic device 700-1 to display the system user interface. At FIG. 7A, electronic device 700-1 detects user input 720 corresponding to selection of option 710*a*. In the depicted embodiment, user input 720 is a touch input via touch-sensitive display 702-1. However, in some embodiments, user input 720 is a non-touch input, such as a gesture or other action taken by a user. For example, in some embodiments, electronic device 700-1 is a head-mounted system, and user input 720 includes, for example, a gaze input directed to option 710*a* (e.g., the user looking at option 710*a***) while the user performs an air gesture (e.g., a pinch air gesture).

Figure 7D:
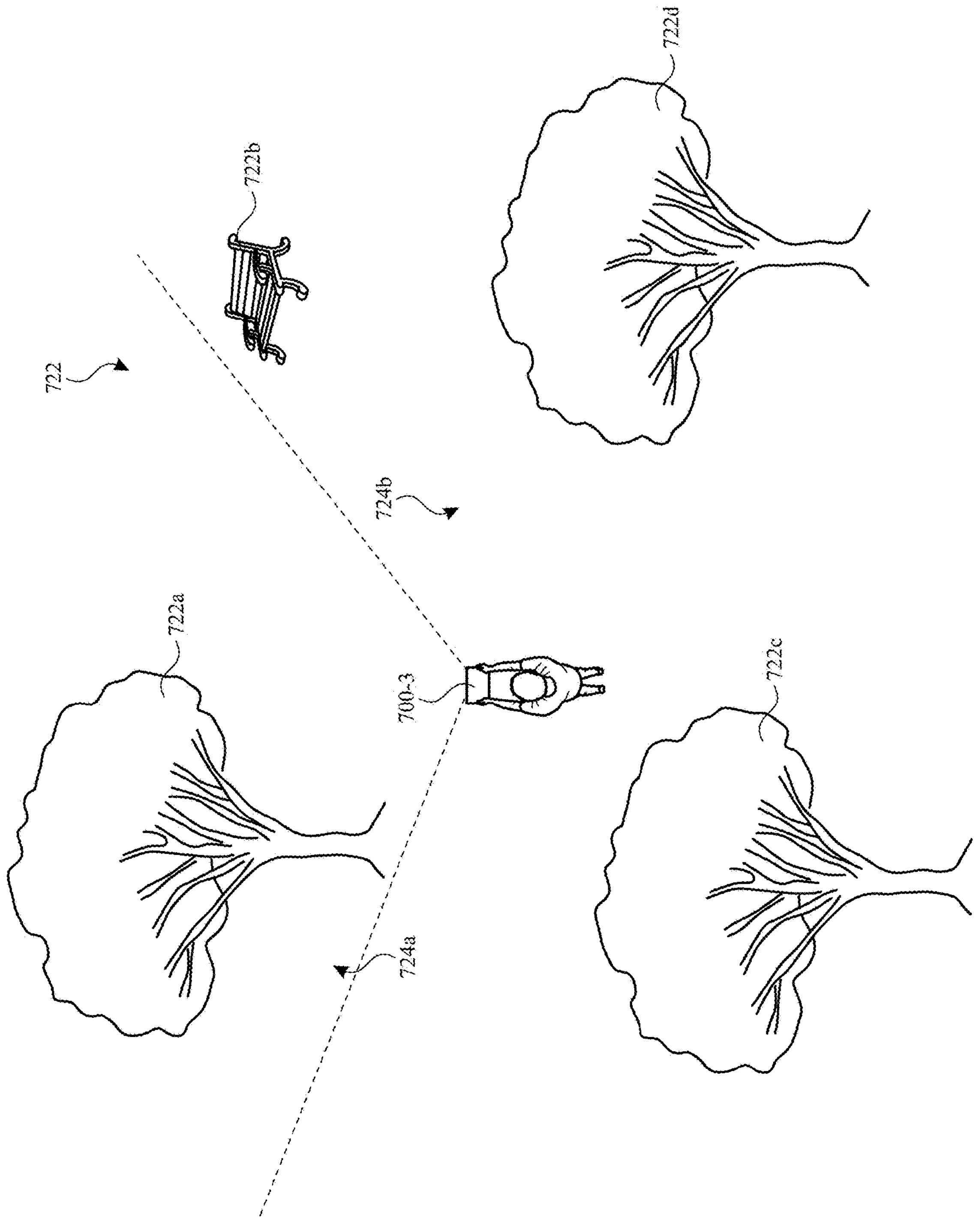
Figure 7E:
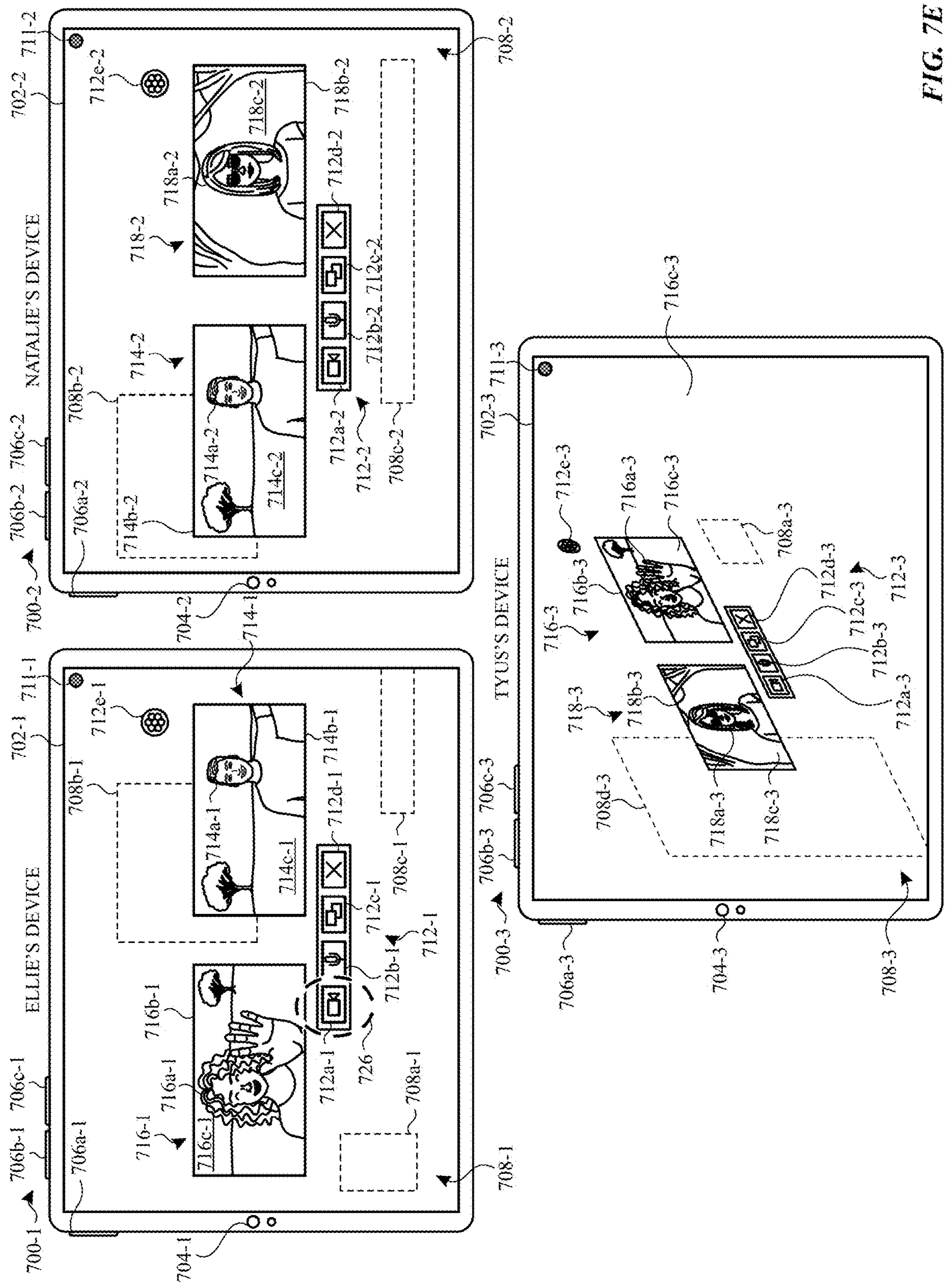
Figure 7F:
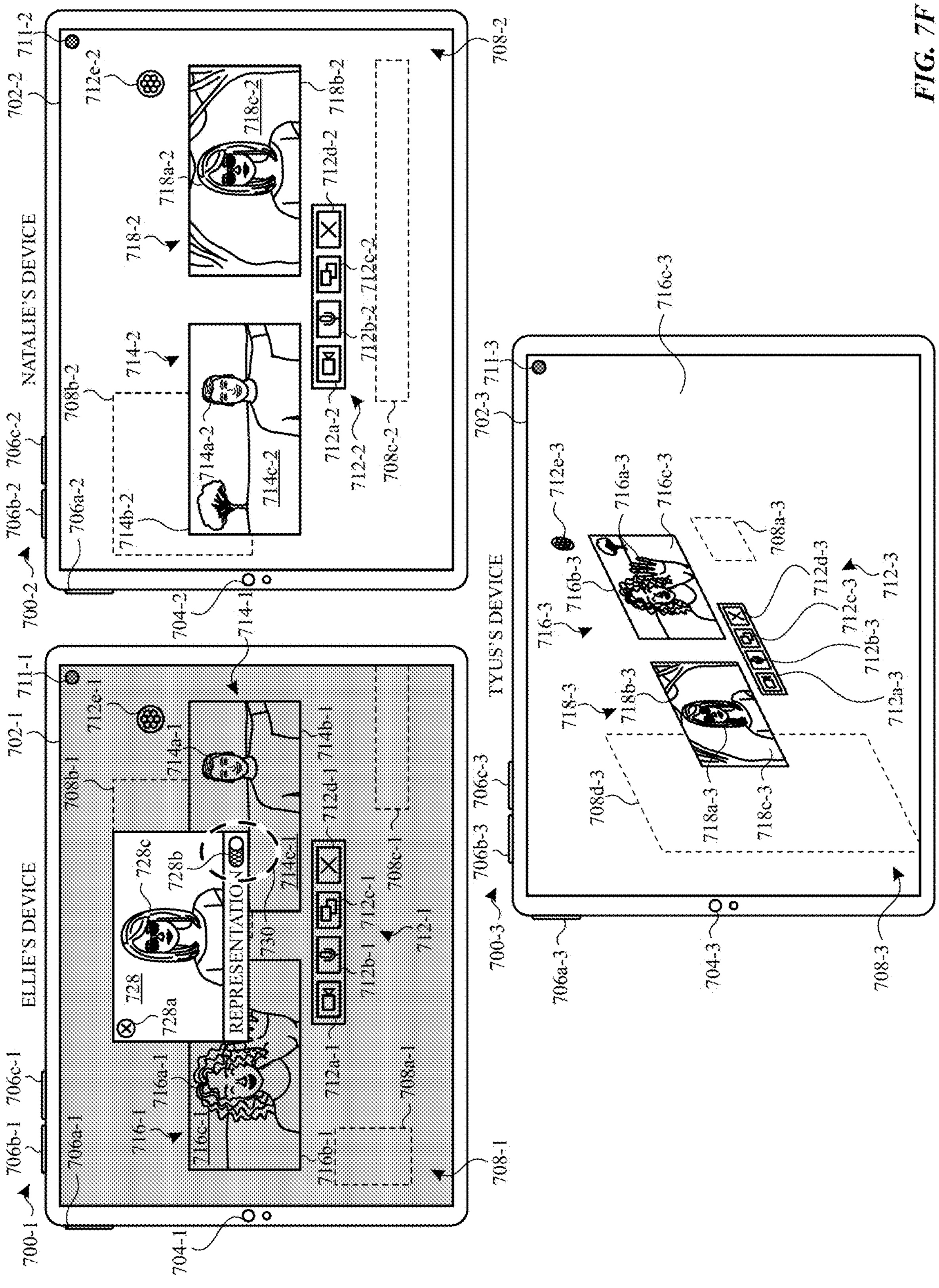
Figure 7G:
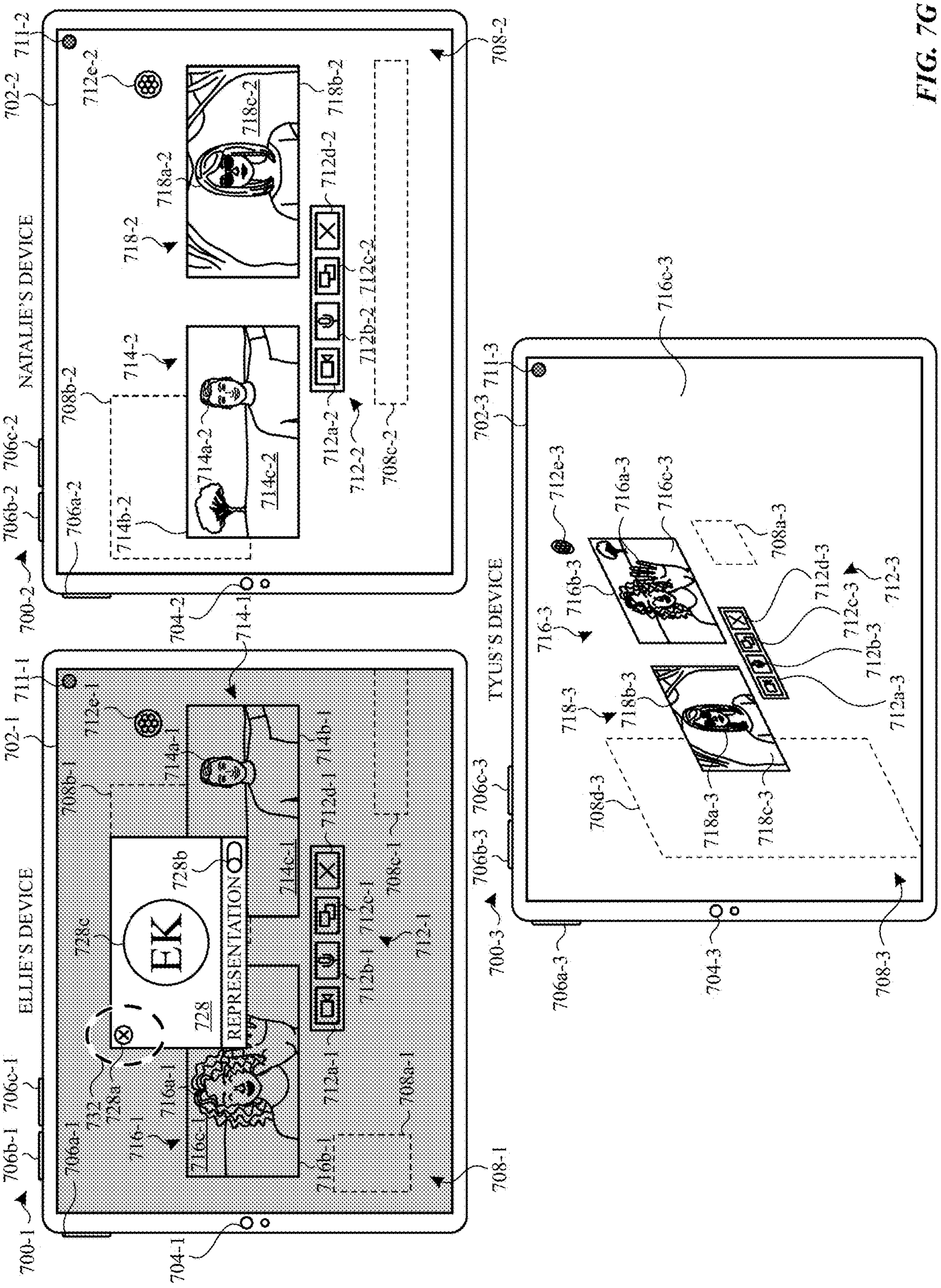
Figure 7H:
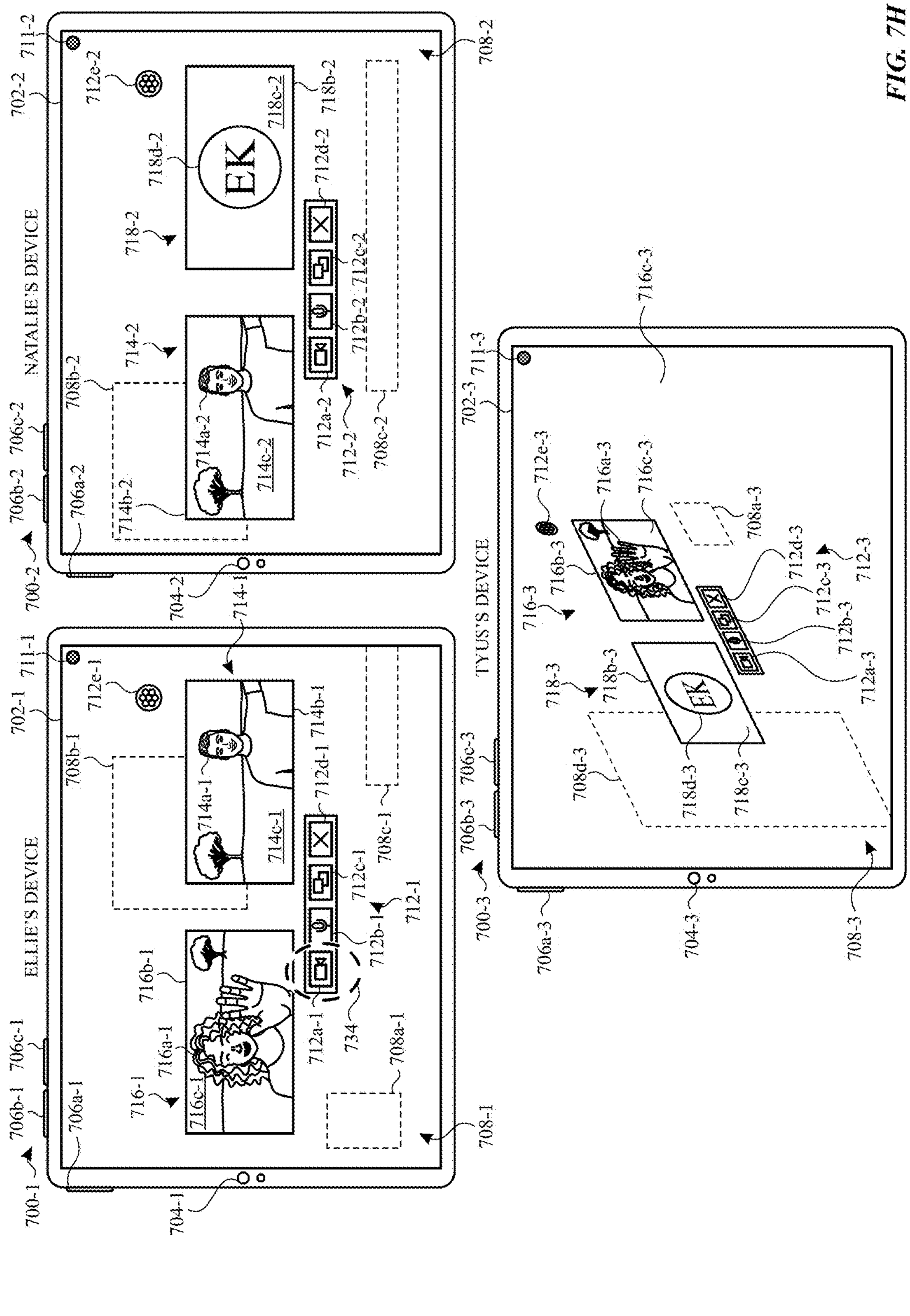
Figure 7I:
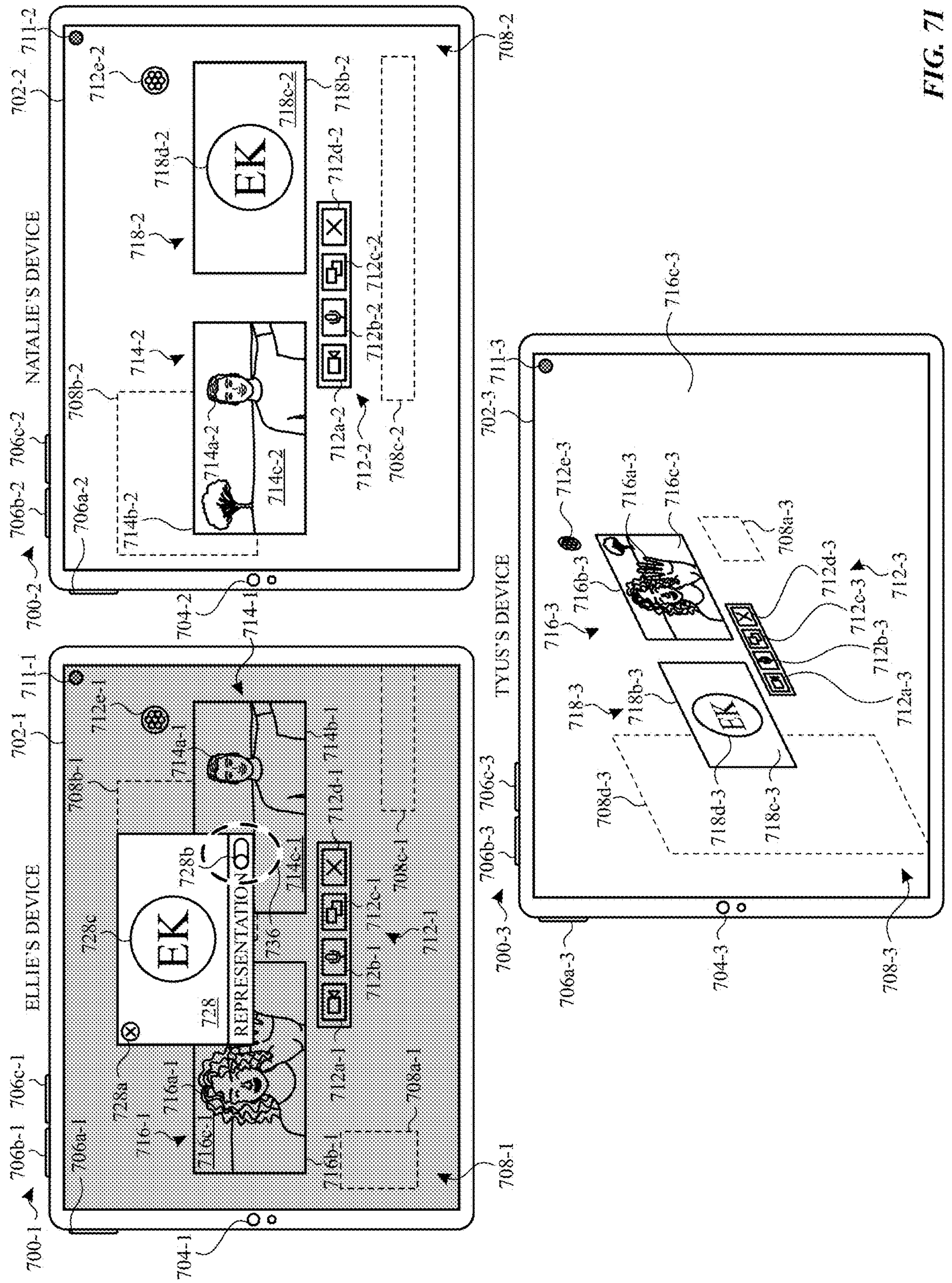
Figure 7J:
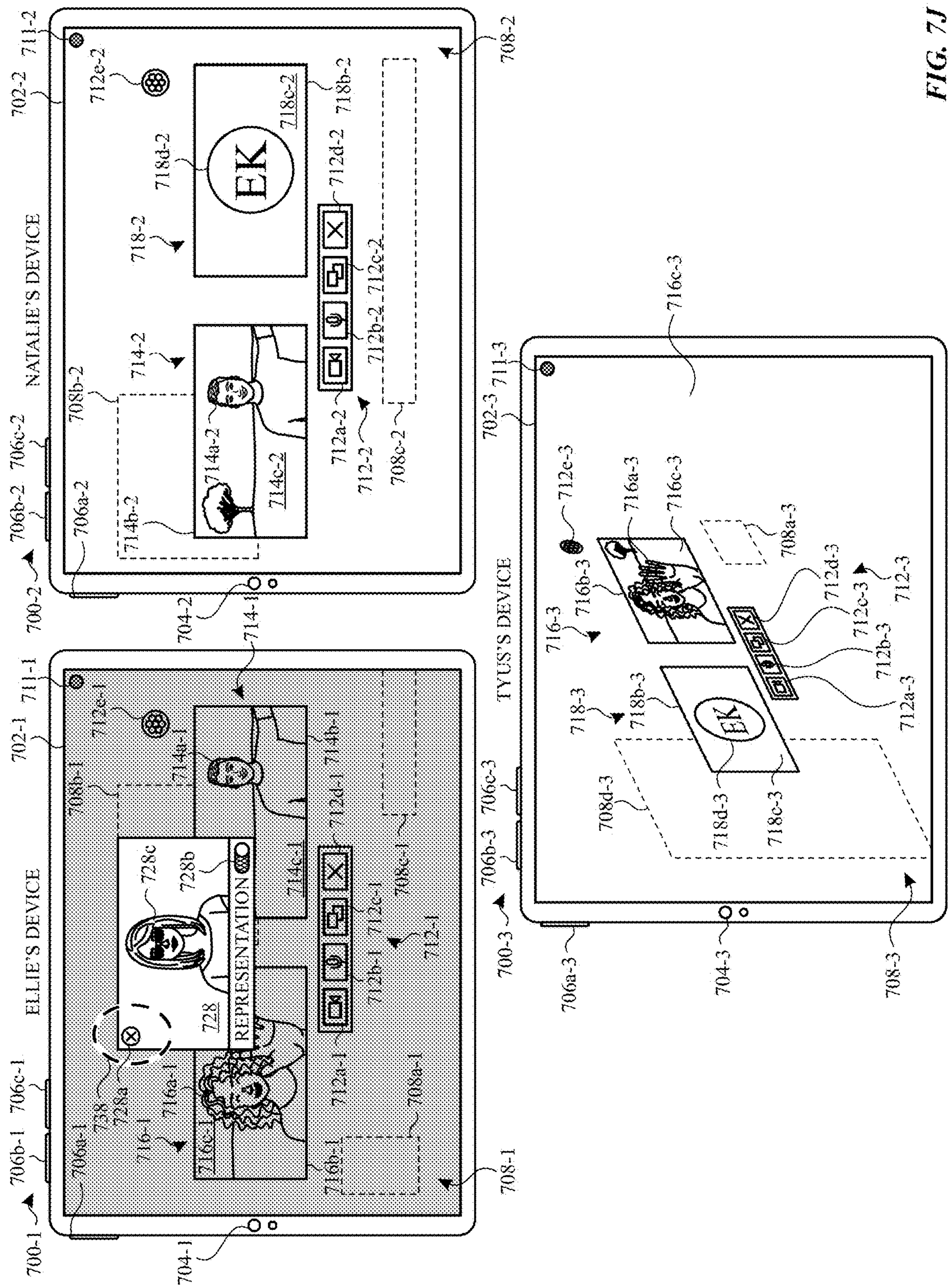
Figure 7K:
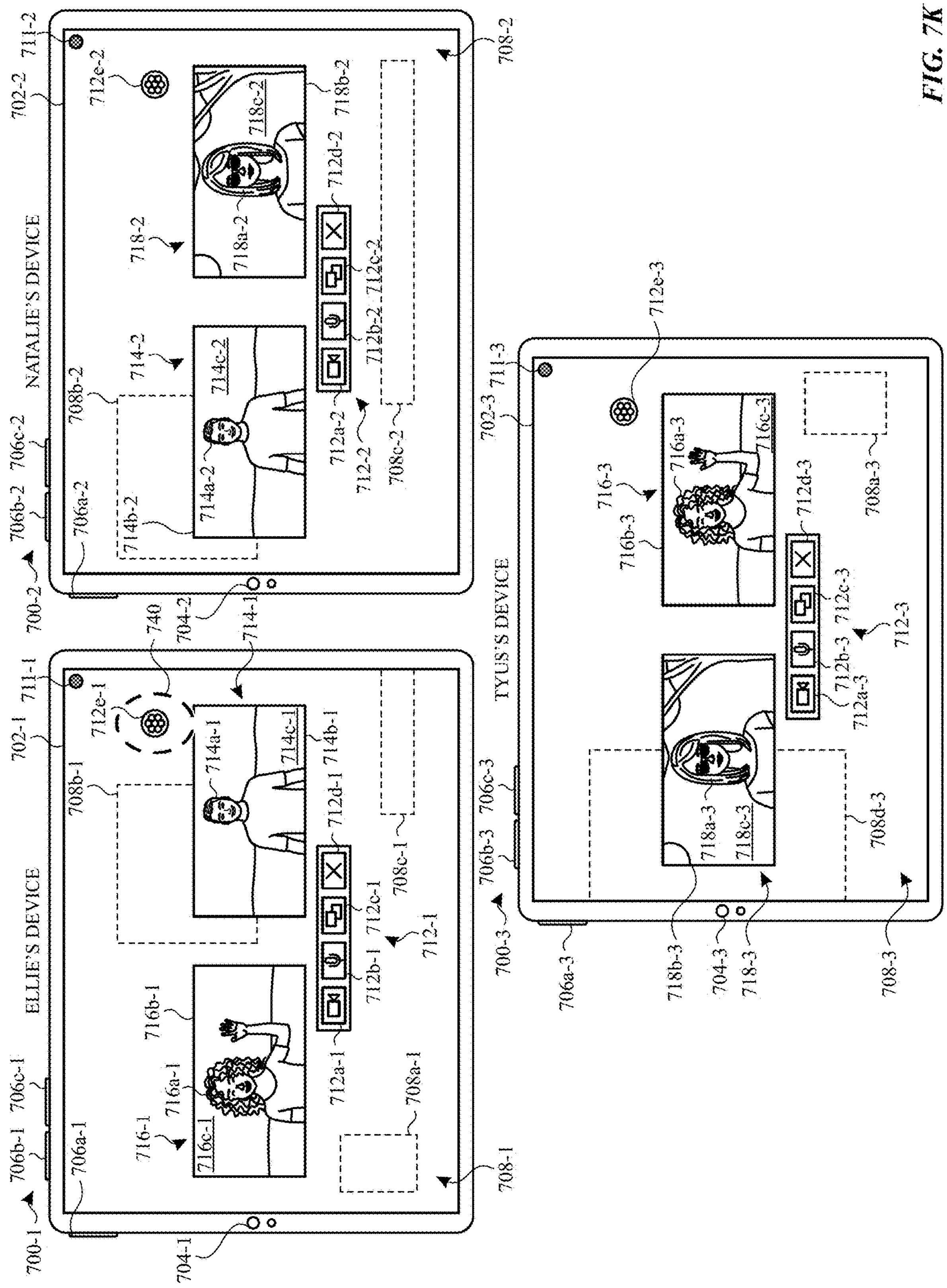
Figure 7L:
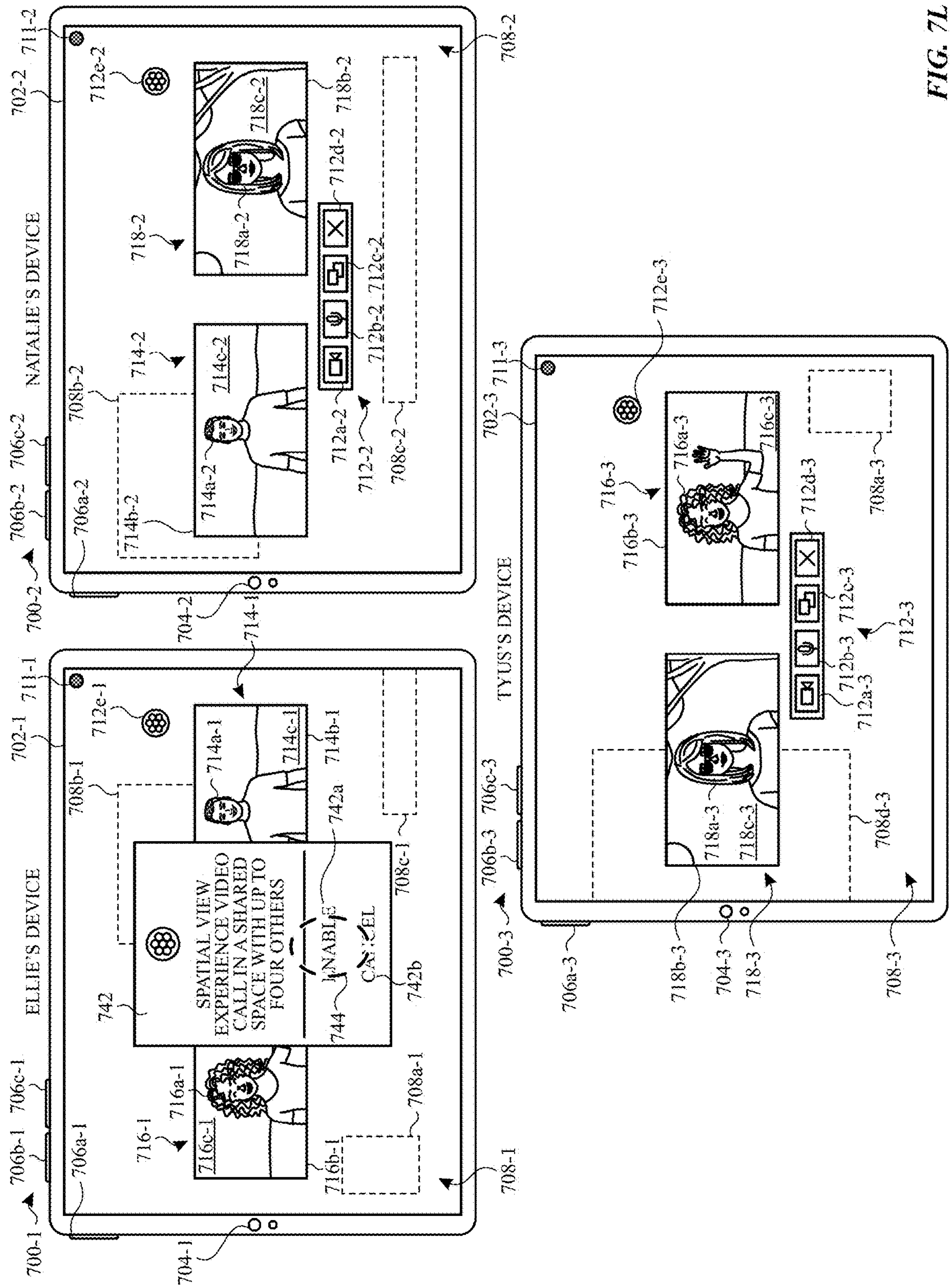
Figure 7M:
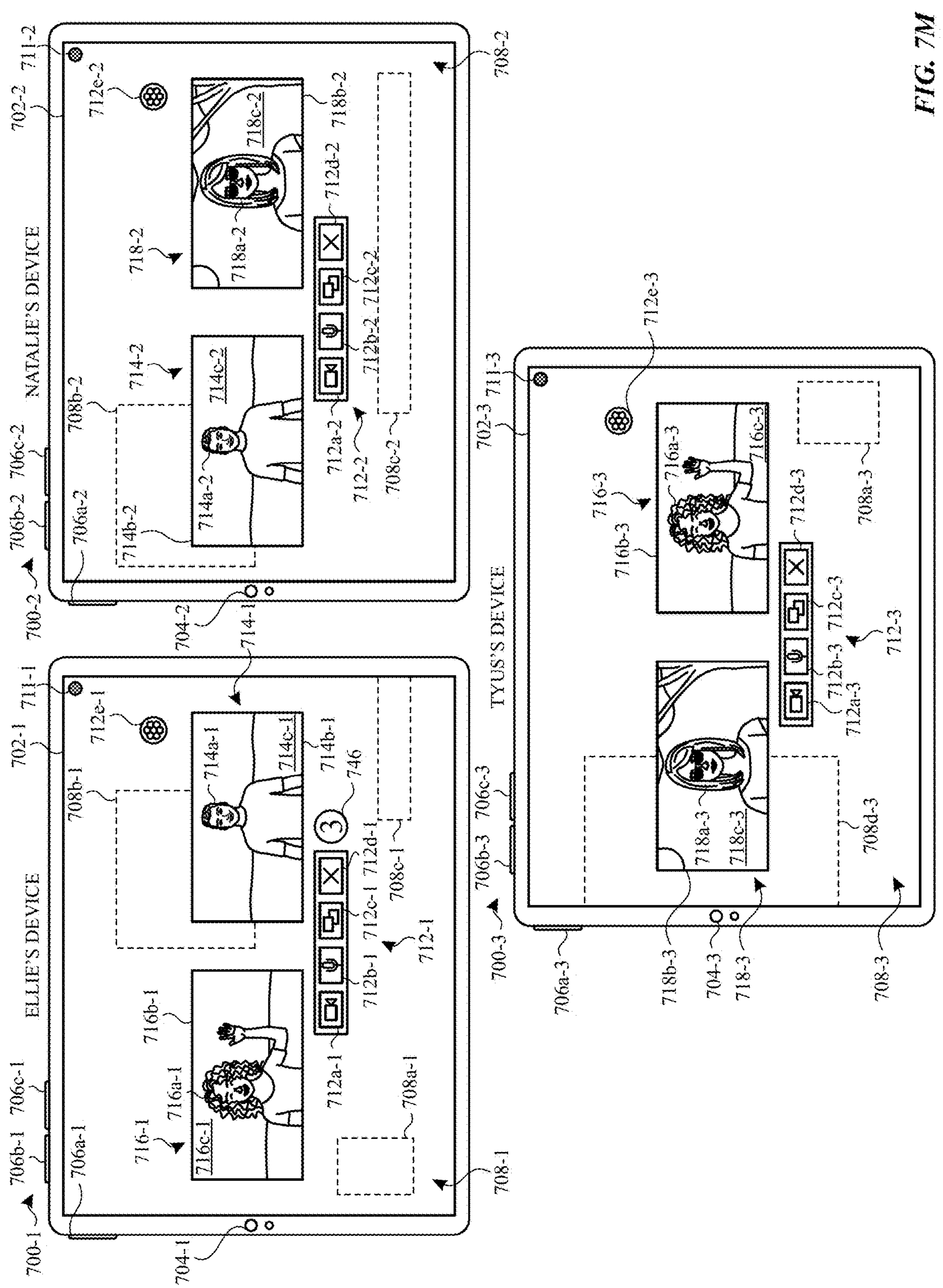
Figure 7N:
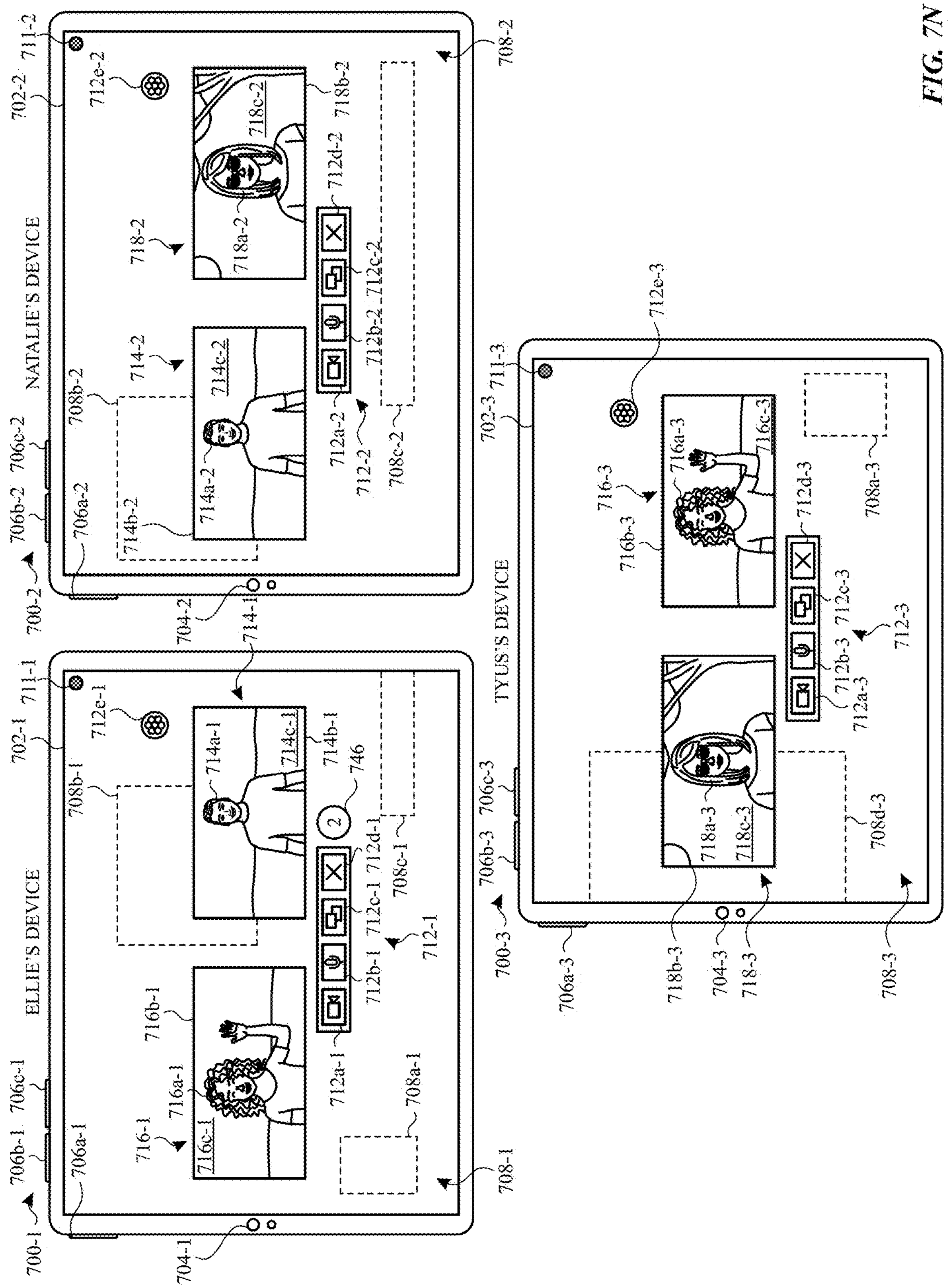
Figure 7O:
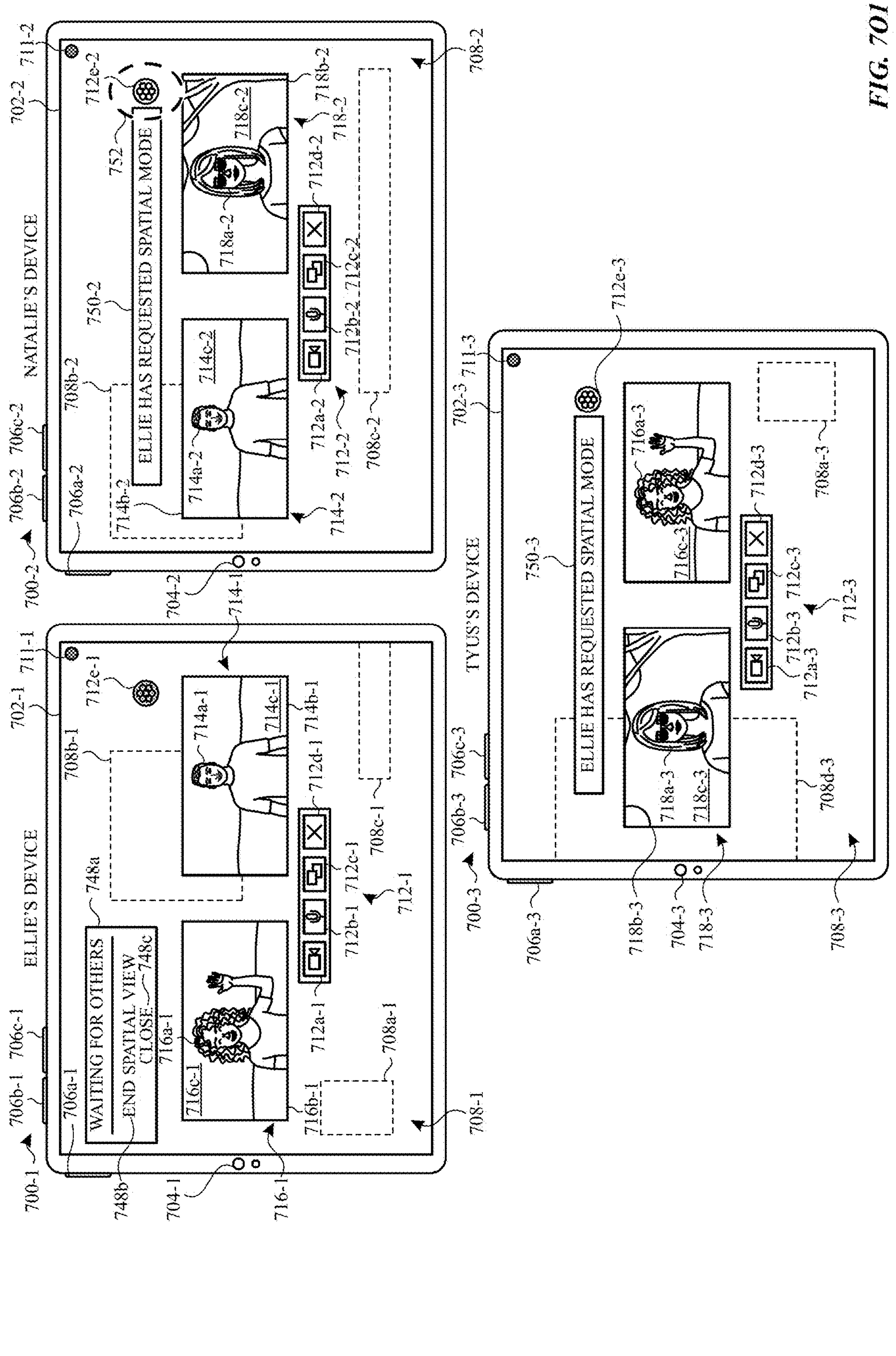
Figure 702:
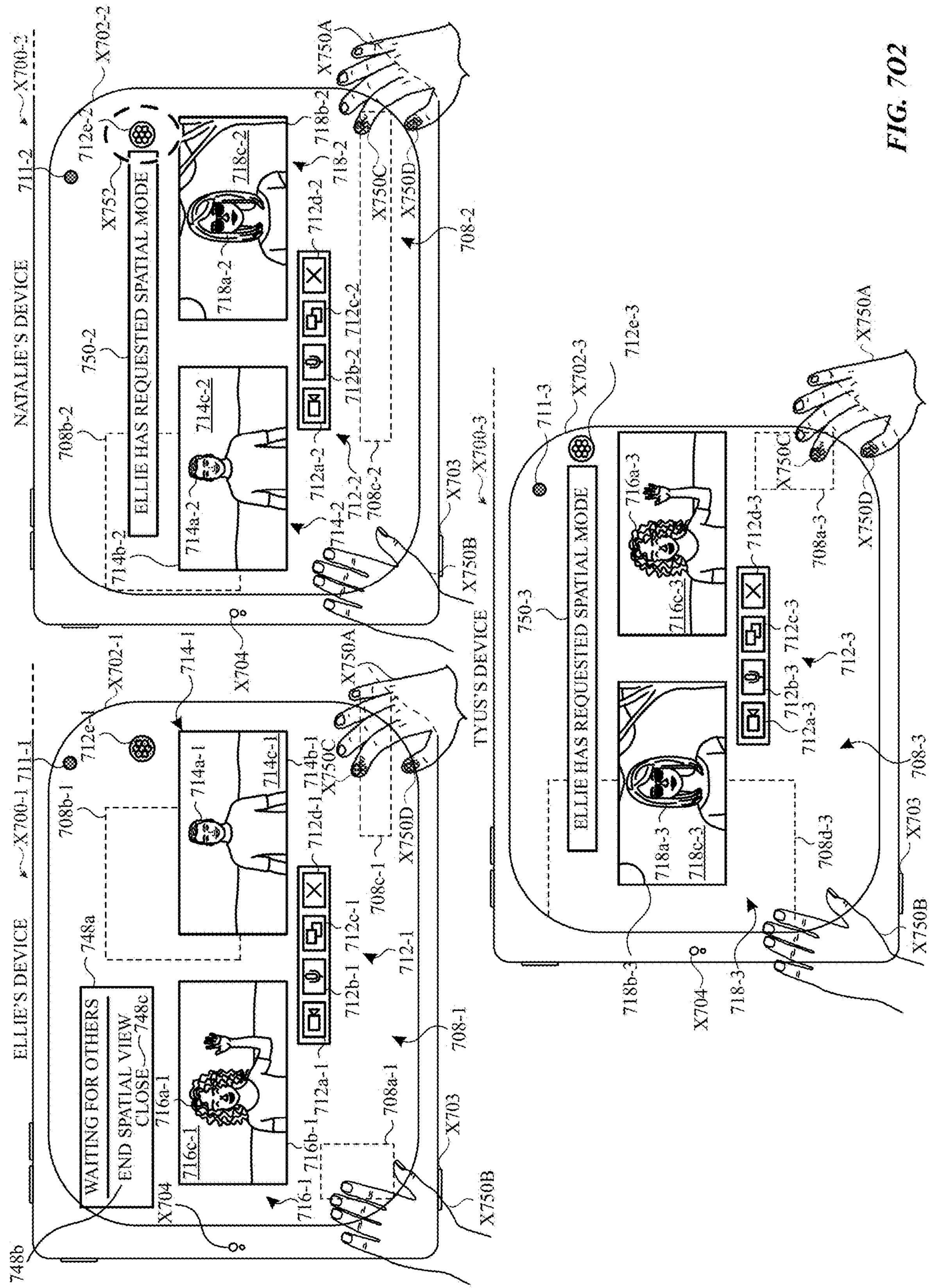
Figure 7P:
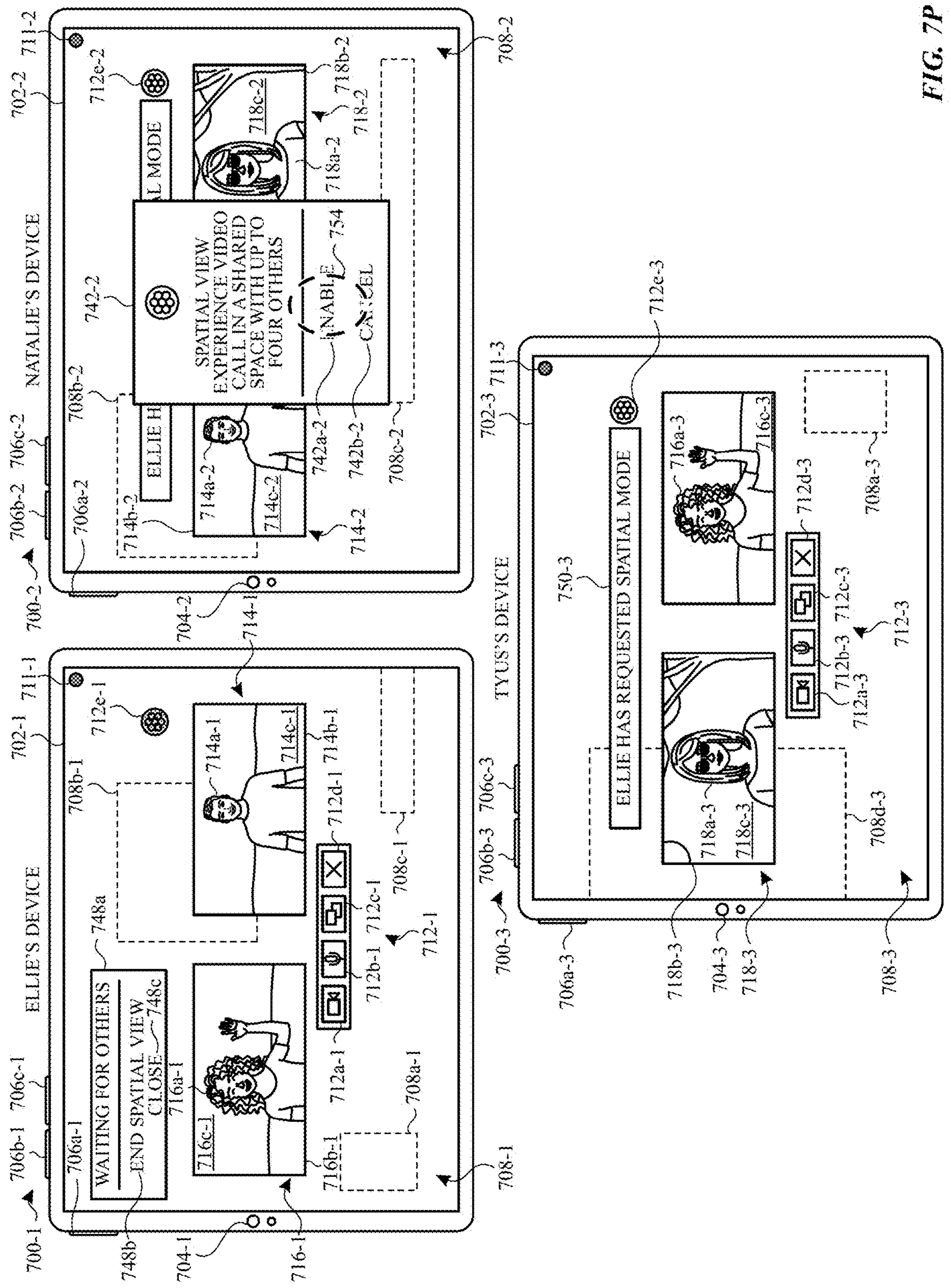
Figure 7Q:
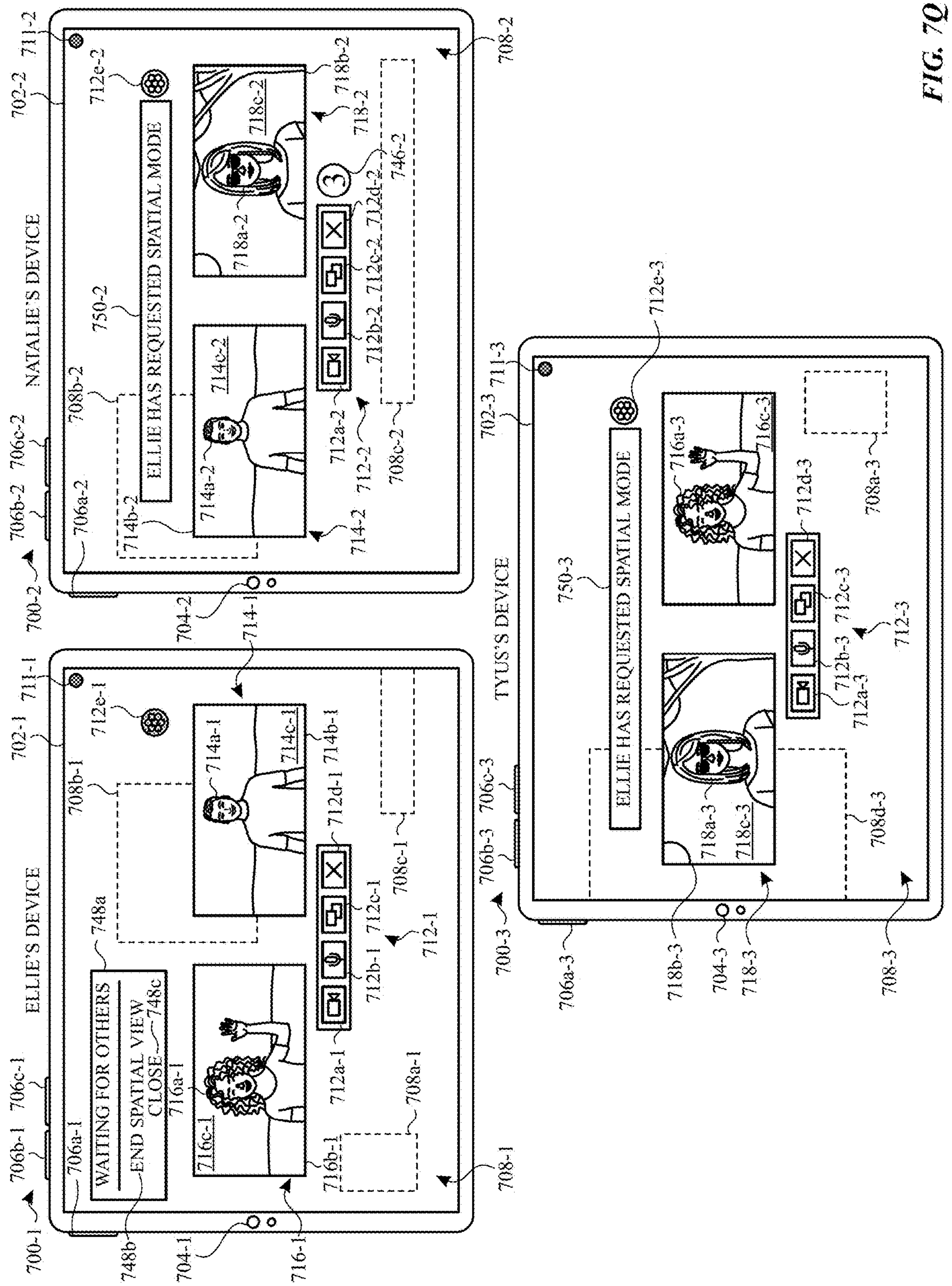
Figure 7S:
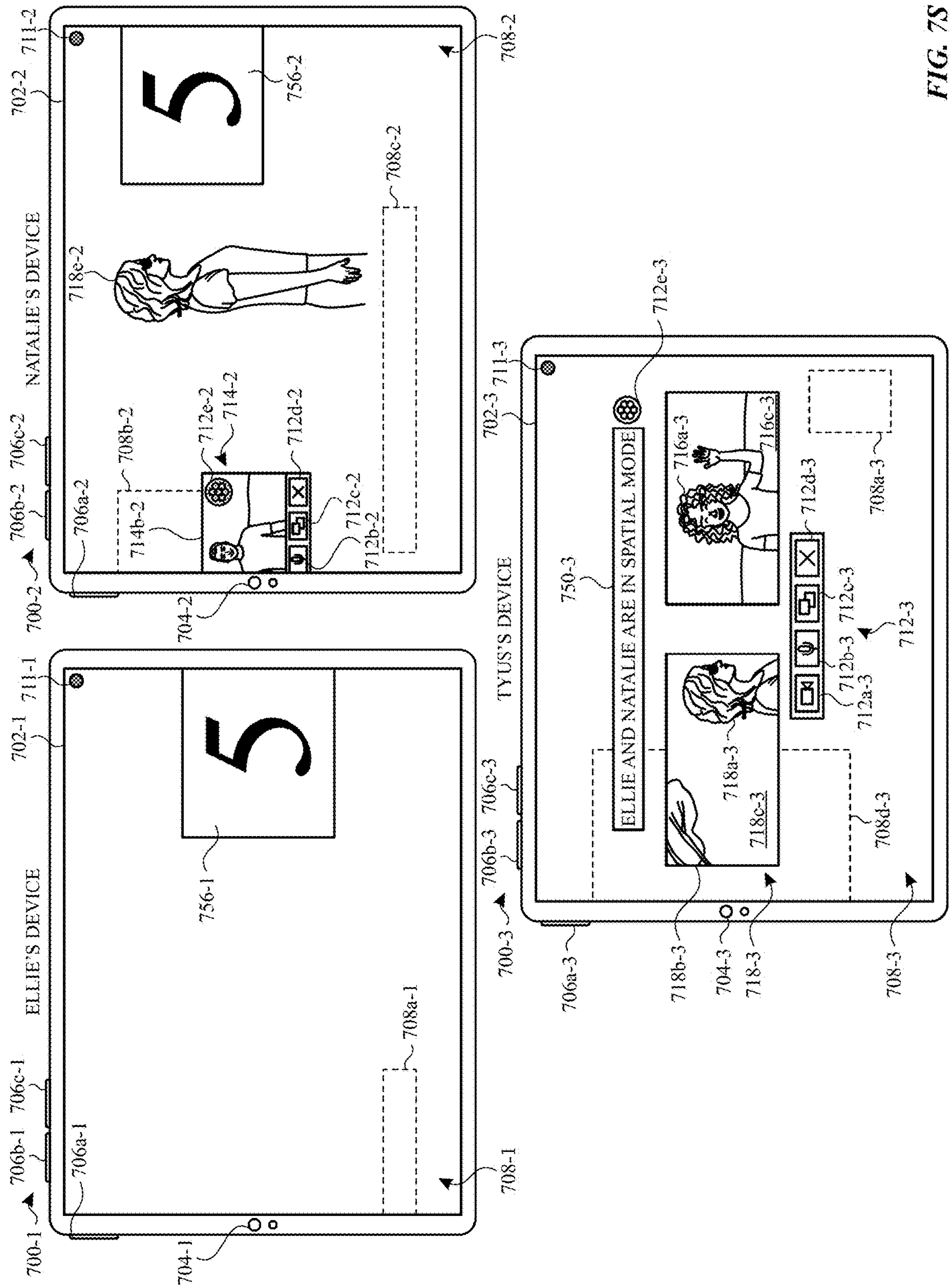
Figure 7T:
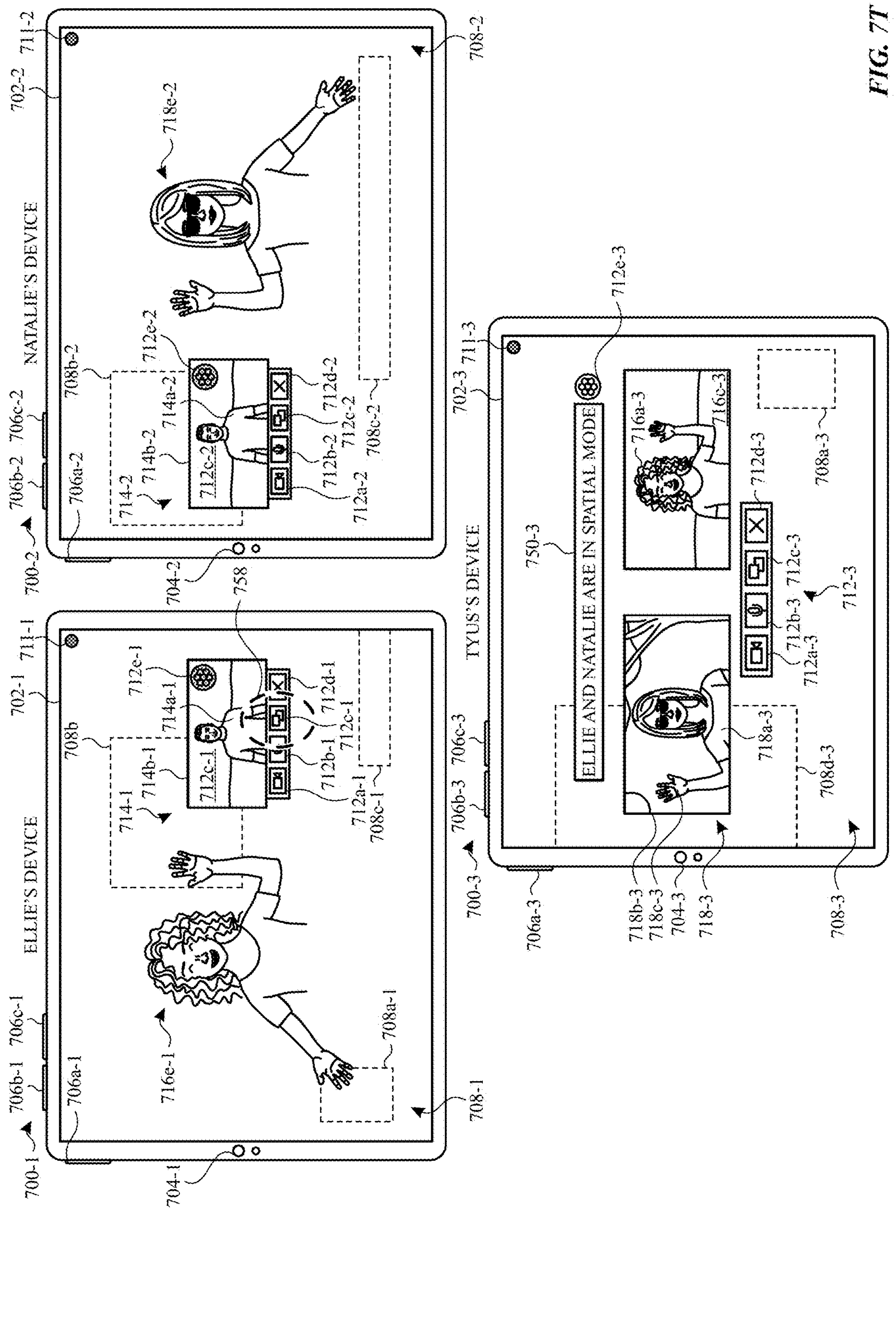
Figure 7U:
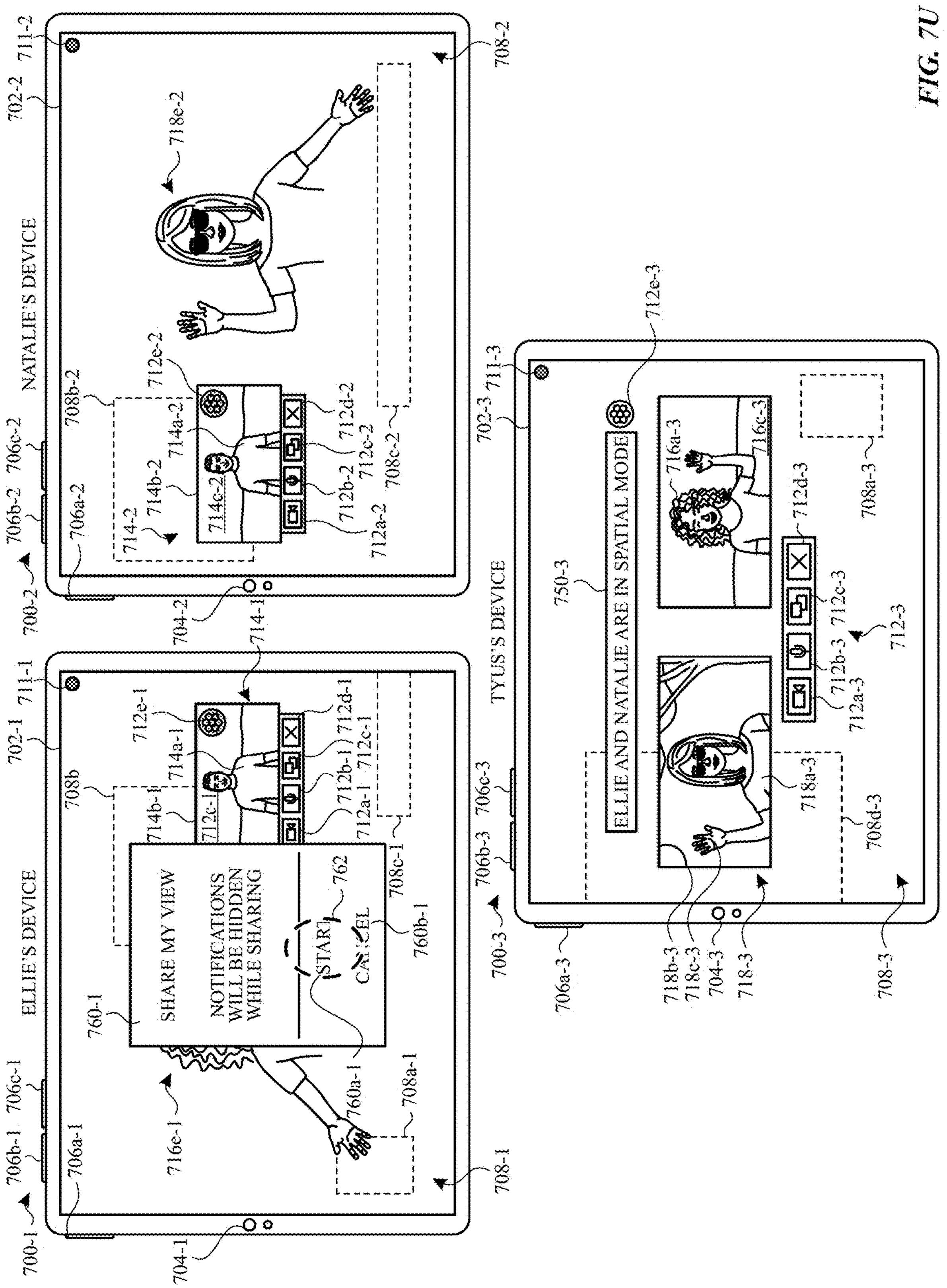
Figure 7W:
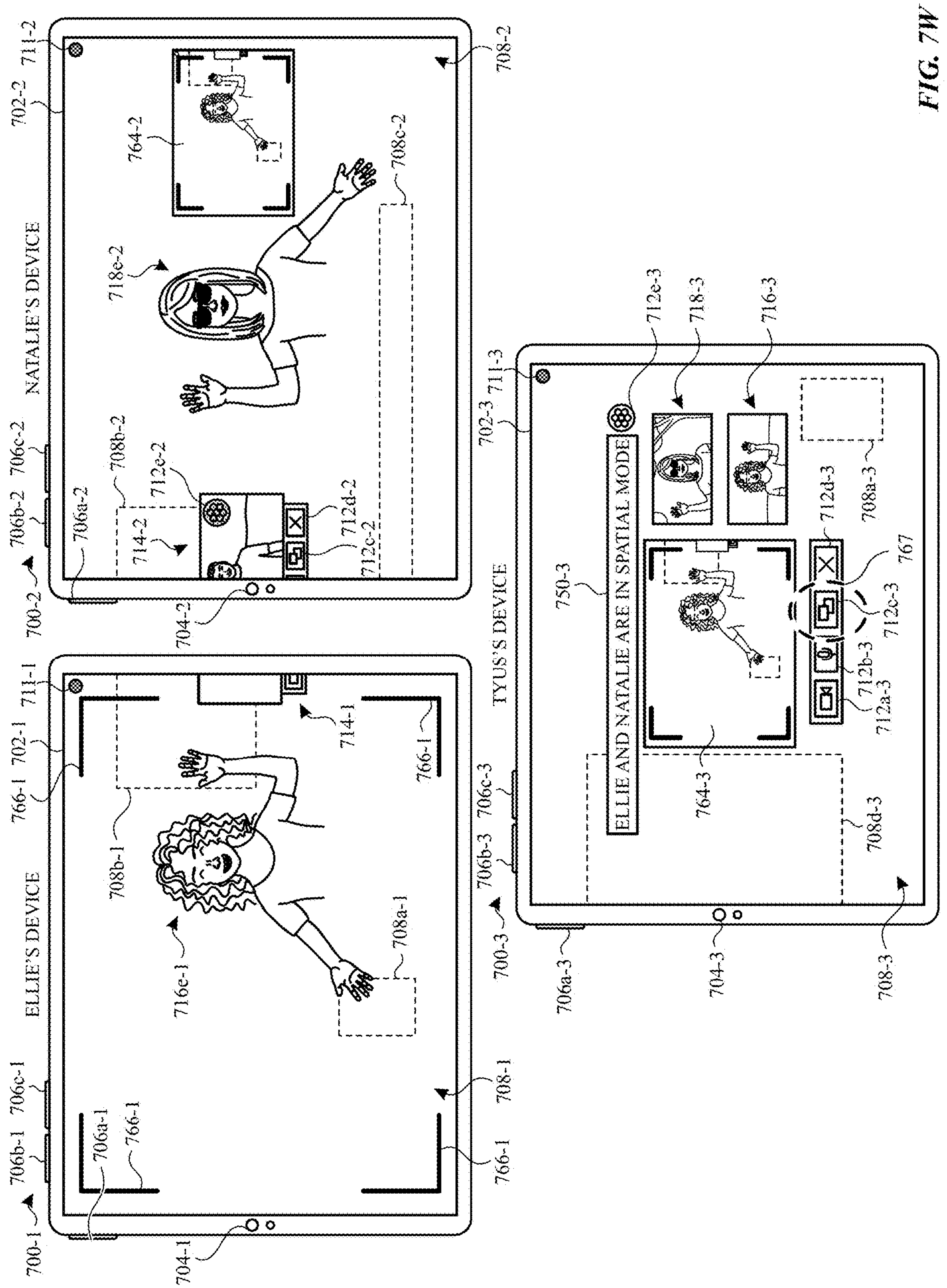
Figure 7X:
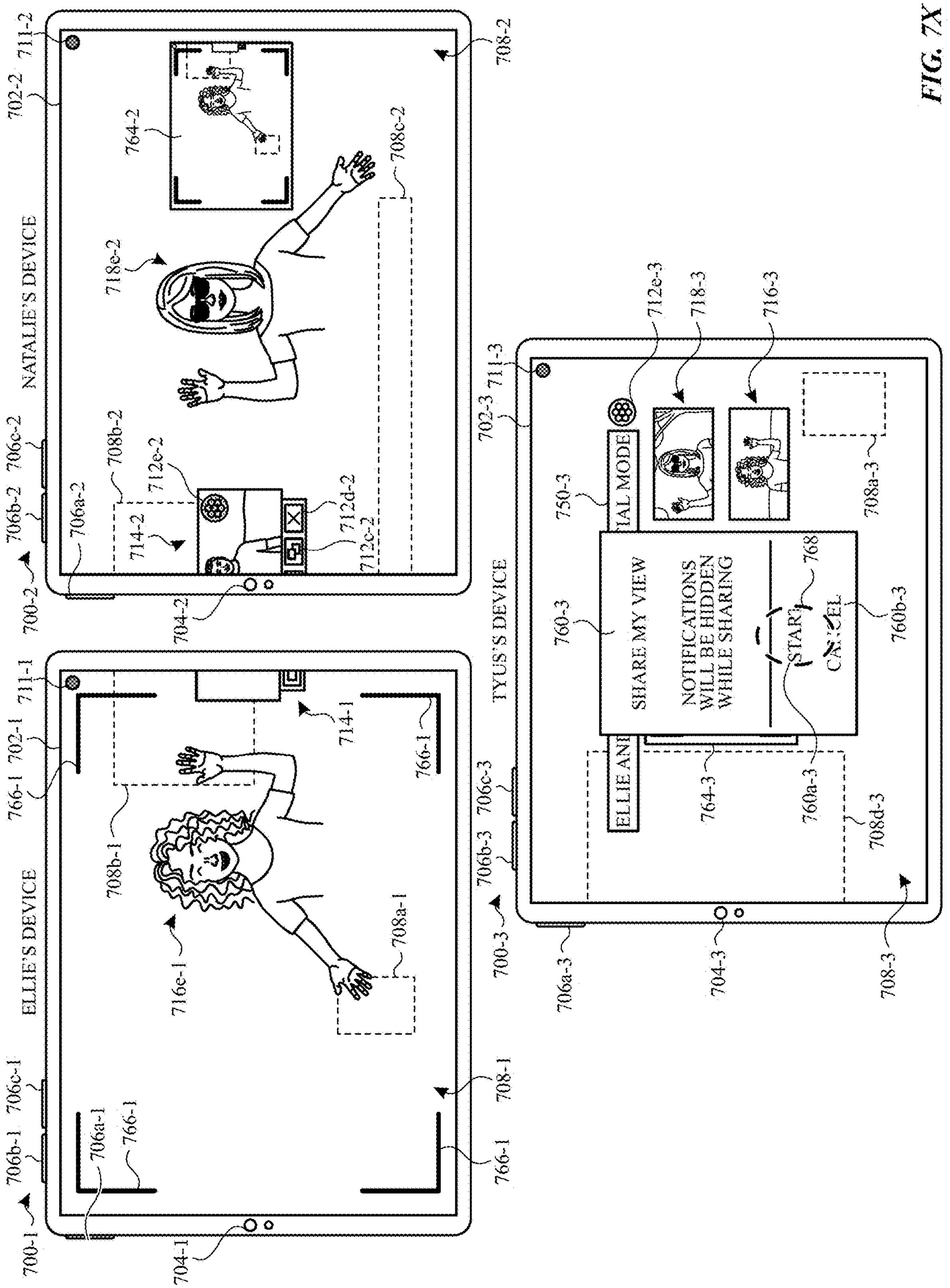
Figure 7Y:
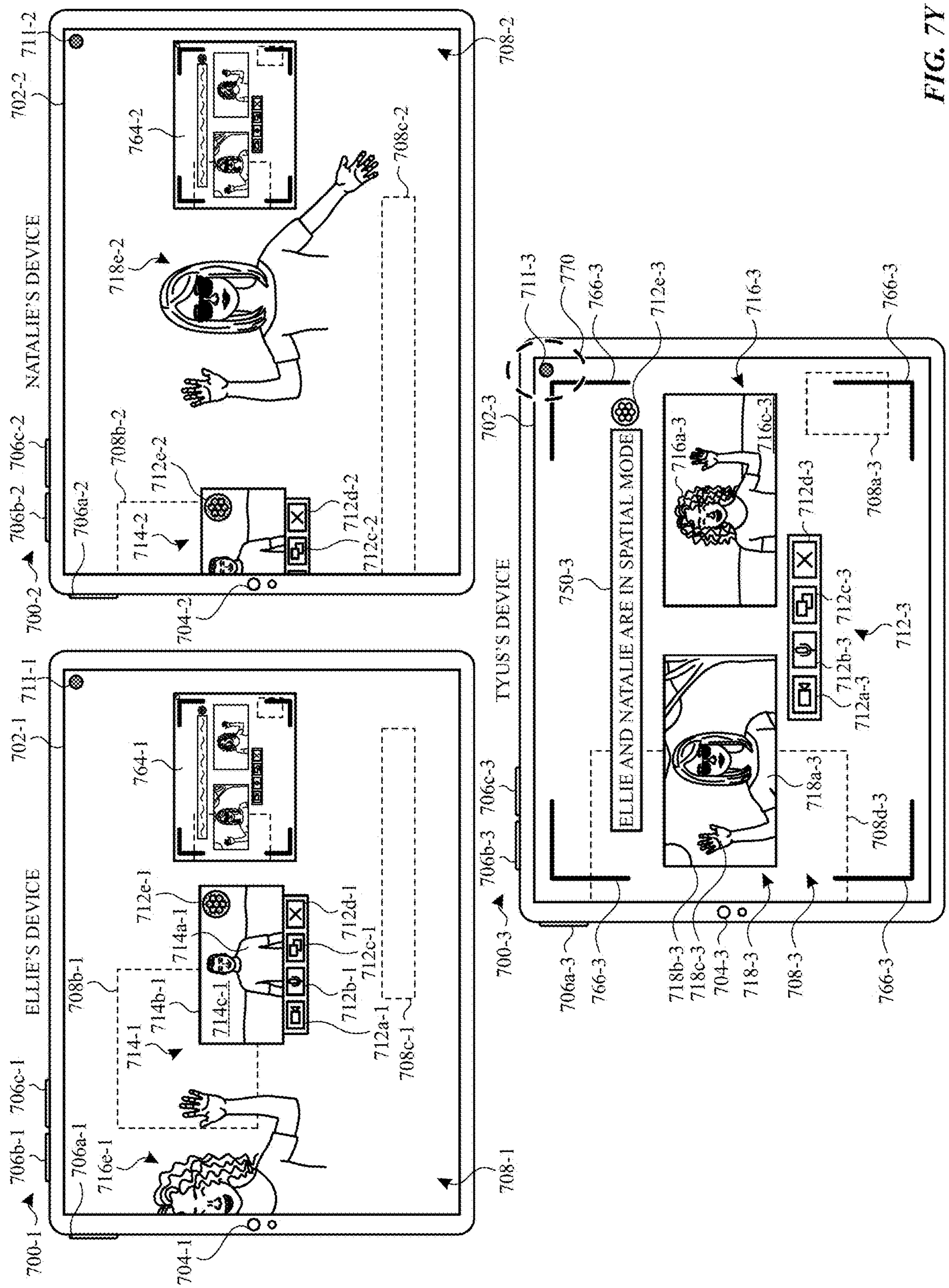
Figure 7Z:
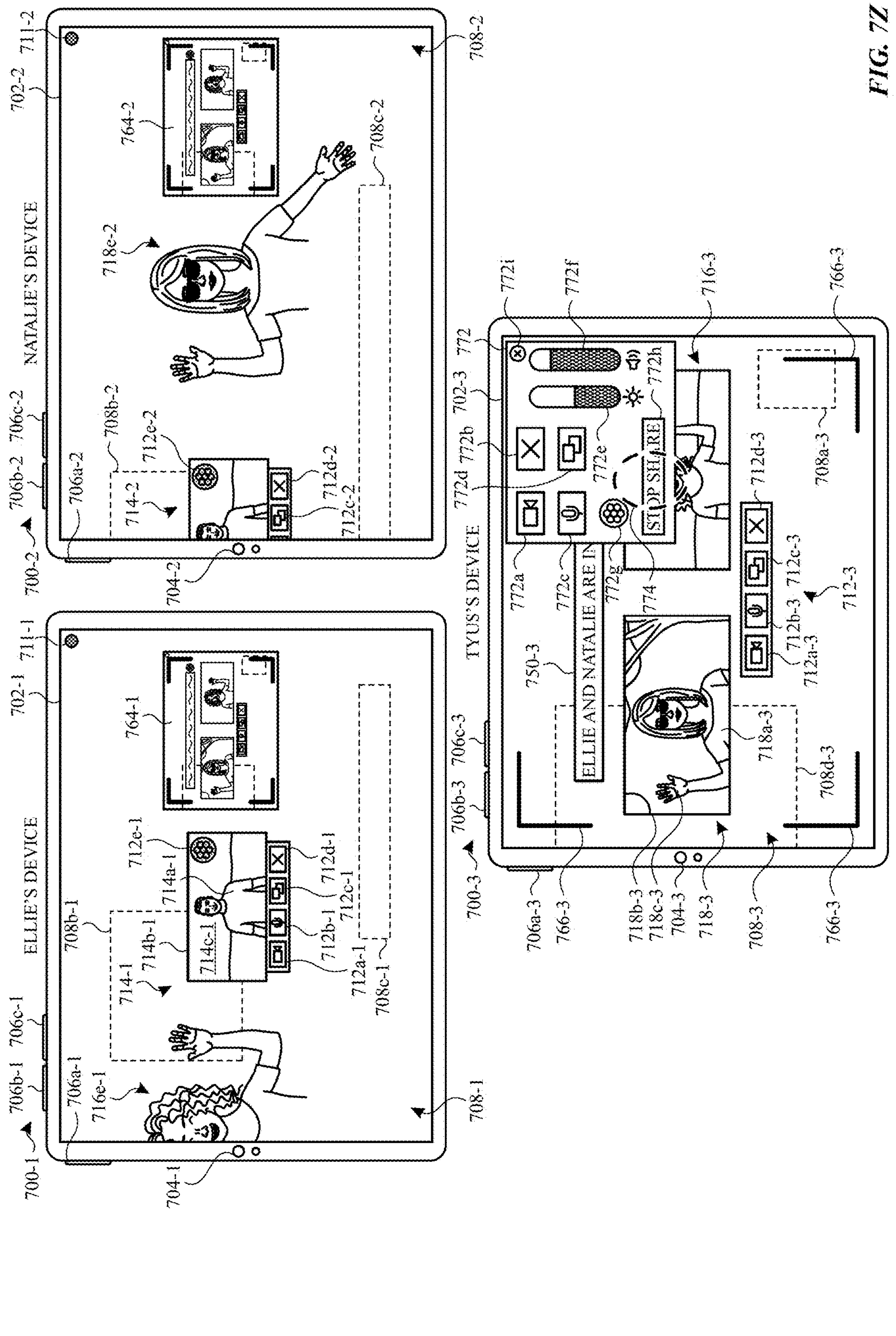
Figure 7A:
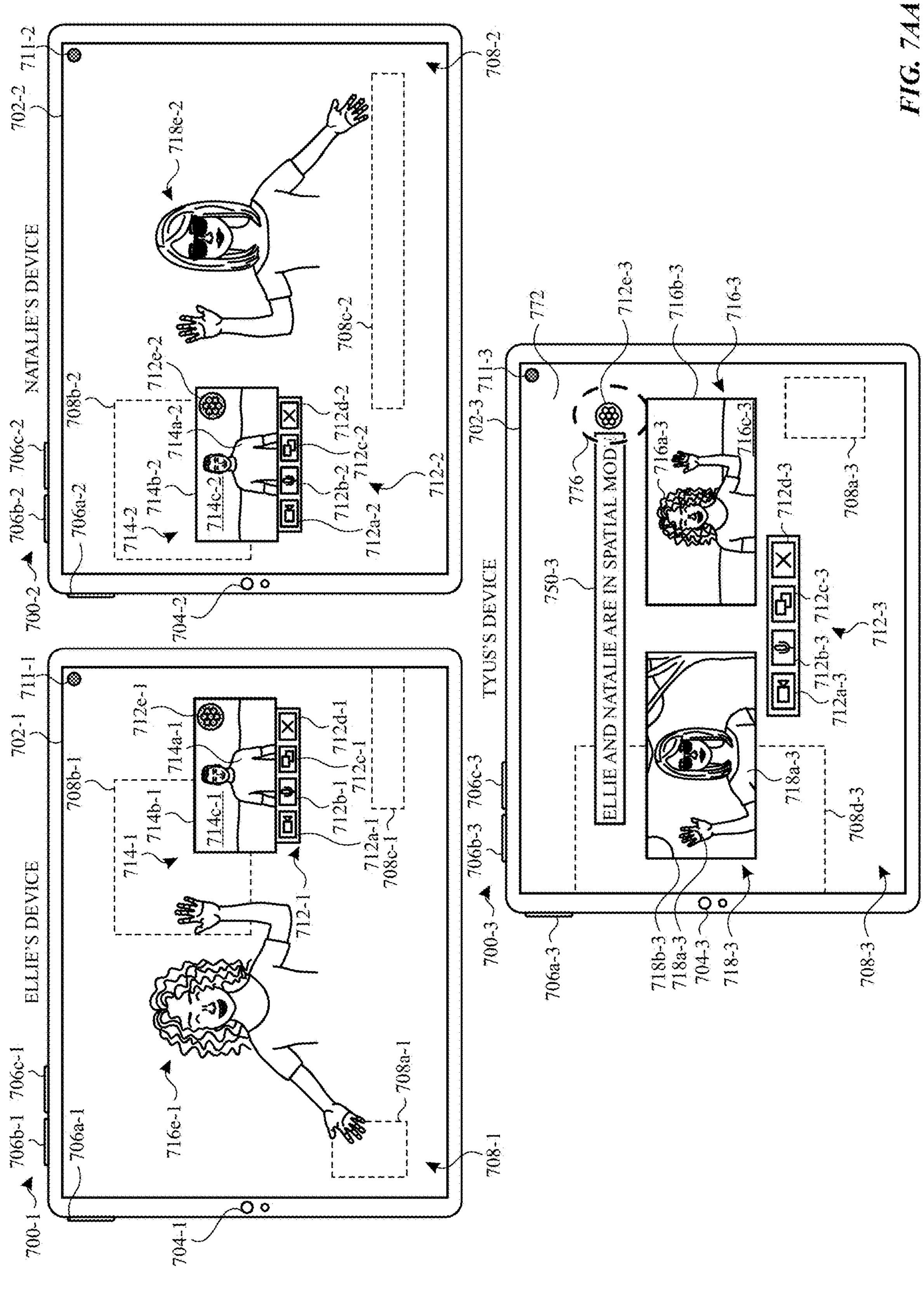
Figure 7B:
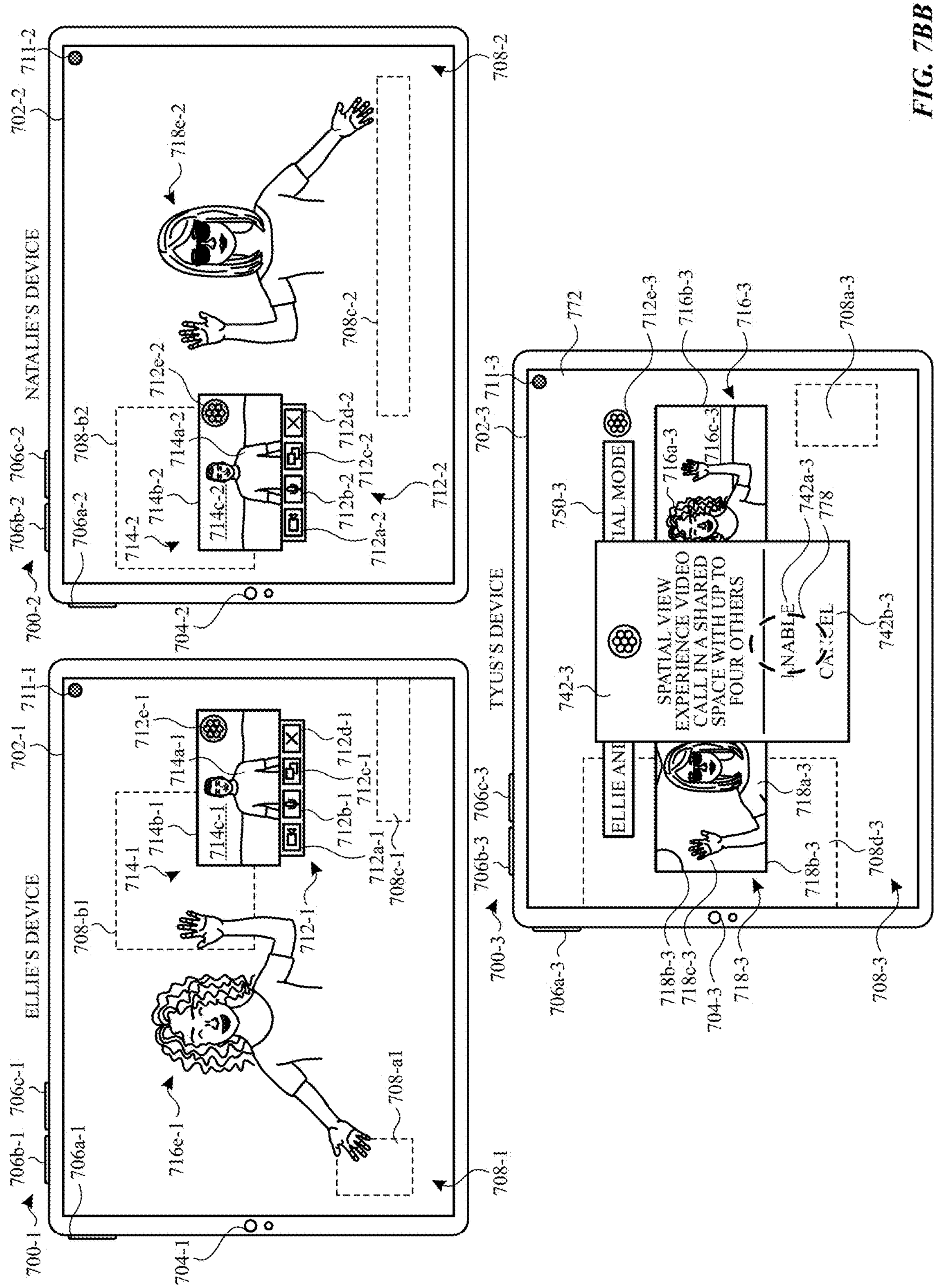

At FIG. 7B1, in response to user input 720, electronic device 700-1 joins the real-time communication session, and displays spatially-constrained representation 716-1 representative of the user of electronic device 700-2, and spatially-constrained representation 714-1 representative of the user of electronic device 700-3. Electronic device 700-3 also displays controls **712*a*-1, 712*b*-1, 712*c*-1, 712*d*-1, and 712*e*-1 corresponding to the real-time communication session, and which have the same functions as controls 712*a*-2 through 712*e*-2 described above. Furthermore, in response to electronic device 700-1 joining the real-time communication session, electronic device 700-2 displays spatially-constrained representation 718-2 representative of the user of electronic device 700-1, and electronic device 700-3 displays spatially-constrained representation 718-3 representative of the user of electronic device 700-1. It can be seen that in FIG. 7A, when there is only one spatially-constrained representation displayed on electronic device 700-2, control 712*e*-2 is displayed within boundary 714*b*-2, and controls 712*a*-2, 712*b*-2, 712*c*-2, and 712*d*-2 are displayed attached to boundary 714*b*-2. However, in FIG. 7B1, when there are multiple spatially-constrained representations displayed on electronic device 700-2, control 712*e*-2 is displayed outside of any of the spatially-constrained representations, and controls 712*a*-2, 712*b*-2, 712*c*-2, and 712*d*-2 are displayed separated from any of the spatially-constrained representations. Similar features can also be seen on electronic device 700-3 and electronic device 700-1**.

In some embodiments, the techniques and user interface(s) described in FIGS. 7A-7LL are provided by one or more of the devices described in FIGS. 1A-IP. For example, FIG. 7B2 illustrates an embodiment in which spatially-constrained representations 714-1 and 716-1 (e.g., as described in FIG. 7B1) is displayed on display module X702-1 of head-mounted device (HMD) X700-1. In some embodiments, device X700-1 includes a pair of display modules that provide stereoscopic content to different eyes of the same user. For example, HMD X700-1 includes display module X702-1 (which provides content to a left eye of the user) and a second display module (which provides content to a right eye of the user). In some embodiments, the second display module displays a slightly different image than display module X702-1 to generate the illusion of stereoscopic depth.

At FIG. 7B2, in response to user input 720, HMD X700-1 joins the real-time communication session, and displays spatially-constrained representation 716-1 representative of the user of HMD X700-2, and spatially-constrained representation 714-1 representative of the user of HMD X700-3. HMD X700-3 also displays controls 712*a*-1, 712*b*-1, 712*c*-1, 712*d*-1, and 712*e*-1 corresponding to the real-time communication session, and which have the same functions as controls 712*a*-2 through 712*e*-2 described above. Furthermore, in response to HMD X700-1 joining the real-time communication session, HMD X700-2 displays spatially-constrained representation 718-2 representative of the user of HMD X700-1, and HMD X700-3 displays spatially-constrained representation 718-3 representative of the user of HMD X700-1. It can be seen that in FIG. 7A, when there is only one spatially-constrained representation displayed on HMD X700-2, control 712*e*-2 is displayed within boundary 714*b*-2, and controls 712*a*-2, 712*b*-2, 712*c*-2, and 712*d*-2 are displayed attached to boundary 714*b*-2. However, in FIG. 7B2, when there are multiple spatially-constrained representations displayed on HMD X700-2, control 712*e*-2 is displayed outside of any of the spatially-constrained representations, and controls 712*a*-2, 712*b*-2, 712*c*-2, and 712*d*-2 are displayed separated from any of the spatially-constrained representations. Similar features can also be seen on HMD X700-3 and HMD X700-1.

In some embodiments, HMD X700-1, HMD X700-2, and/or HMD X700-3 detect one or more inputs (e.g., user inputs) based on an air gesture performed by a user of HMD X700-1, HMD X700-2, and/or HMD X700-3. In some embodiments, HMD X700-1, HMD X700-2, and/or HMD X700-3 detect hands X750A and/or X750B of the user of HMD X700-1, HMD X700-2, and/or HMD X700-3 and determine whether motion of hands X750A and/or X750B perform a predetermined air gesture corresponding to an input. In some embodiments, the predetermined air gesture includes a pinch gesture. In some embodiments, the pinch gesture includes detecting movement of finger X750C and thumb X750D toward one another. In some embodiments, HMD X700-1, HMD X700-2, and/or HMD X700-3 detect an input based on a gaze and air gesture input performed by the user of HMD X700-1, HMD X700-2, and/or HMD X700-3. In some embodiments, the gaze and air gesture input includes detecting that the user of HMD X700 is looking a selectable object (e.g., for more than a predetermined amount of time) and hands X750A and/or X750B of the user of HMD X700 perform a pinch gesture. For instance, in some embodiments, at FIG. 7A, HMD X700-1 detects hands X750A and/or X750B of a user of HMD X700-1 and determines that hands X750A and/or X750B perform a predetermined gesture (e.g., a gaze and pinch gesture) corresponding to selection of option 710*a*.

Any of the features, components, and/or parts, including the arrangements and configurations thereof shown in FIGS. 1B-1P can be included, either alone or in any combination, in HMD X700-1, HMD X700-2, and/or HMD X700-3. For example, in some embodiments, HMD X700-1, HMD X700-1, and/or HMD X700-3 include any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702-1, display module X702-2, and/or display module X702-3 include any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700-1, HMD X700-2, and/or HMD X700-3 include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700-1, HMD X700-2, and/or HMD X700-3 include one or more input devices, which include any of the features, components, and/or parts of any of first button 1-128, button 11.1.1-114, second button 1-132, and or dial or button 1-328, either alone or in any combination. In some embodiments, HMD X700-1, HMD X700-2, and/or HMD X700-3 include one or more audio output components (e.g., electronic component 1-112) for generating audio feedback (e.g., audio output), optionally generated based on detected events and/or user inputs detected by the HMD X700-1, HMD X700-2, and/or HMD X700-3.

Figure 7C:
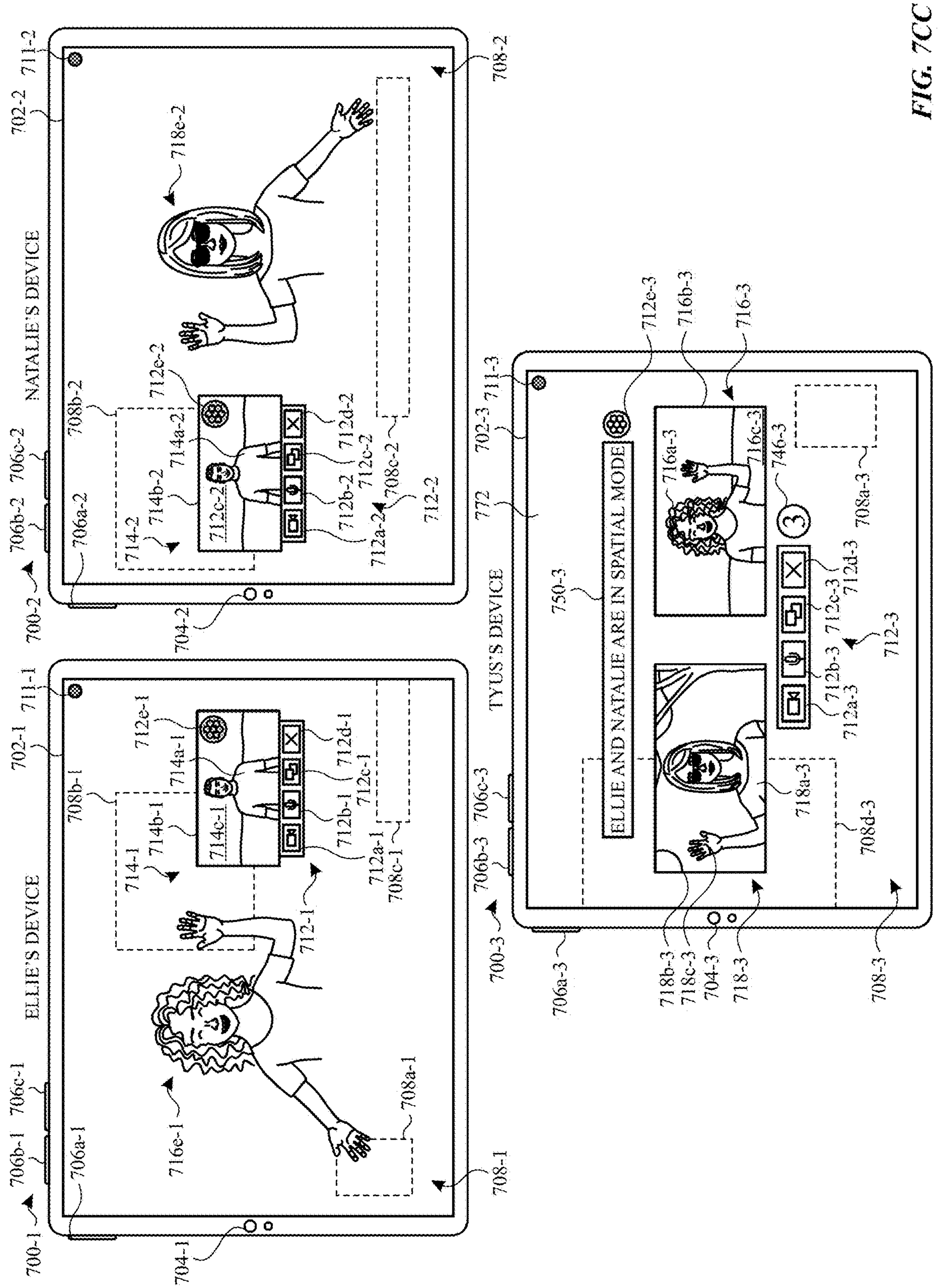
Figure 7D:
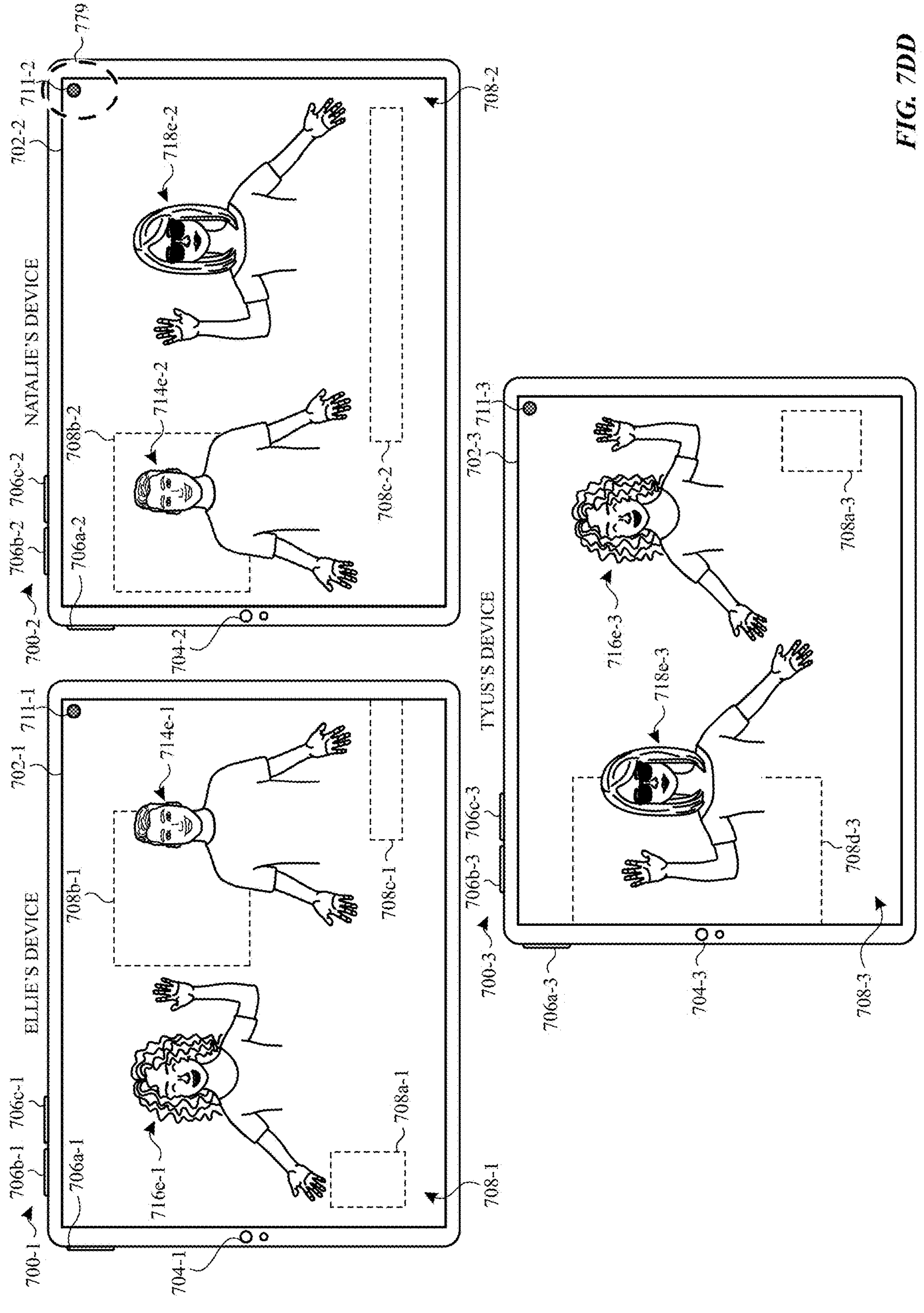
Figure 7E:
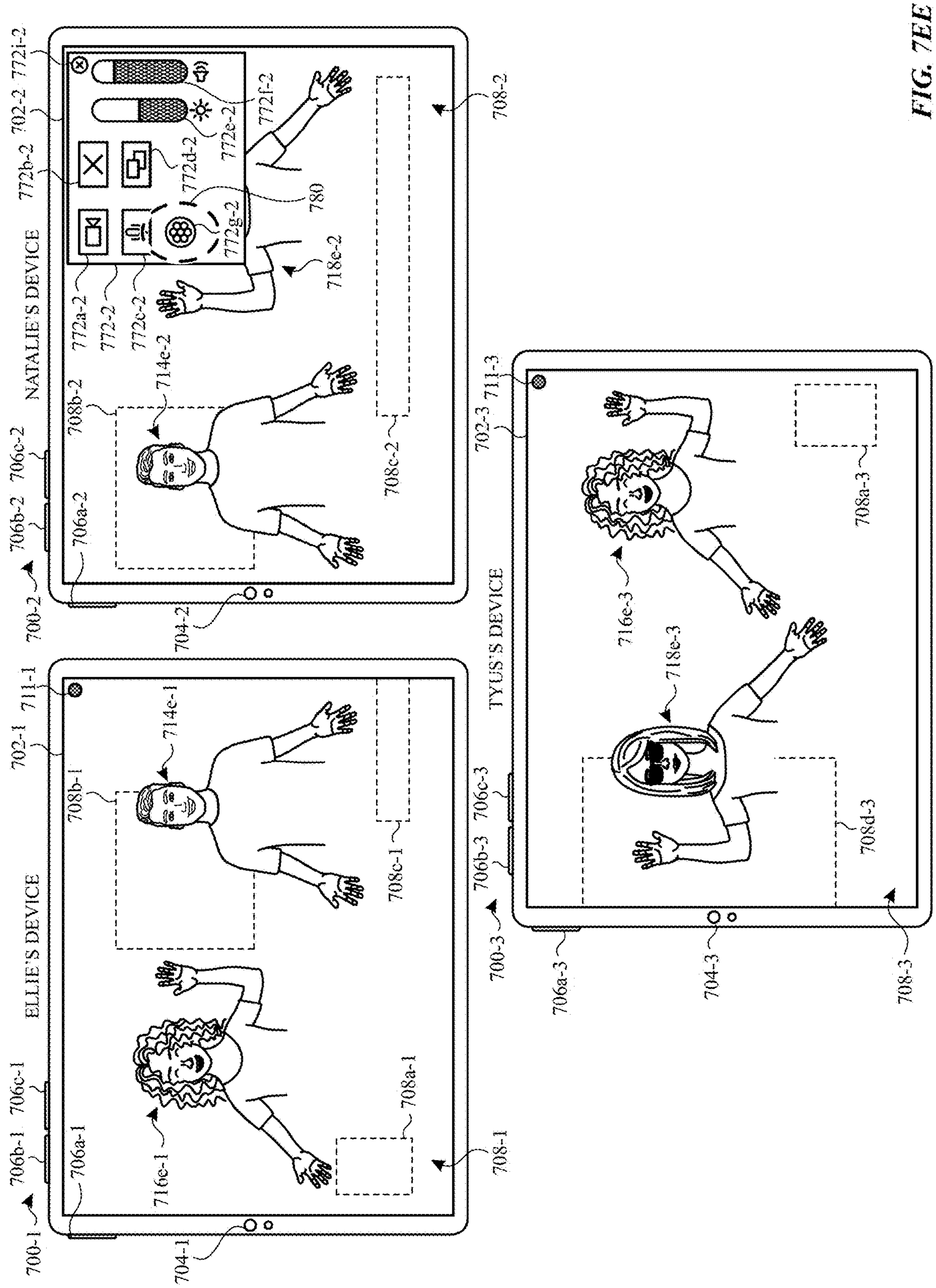
Figure 7F:
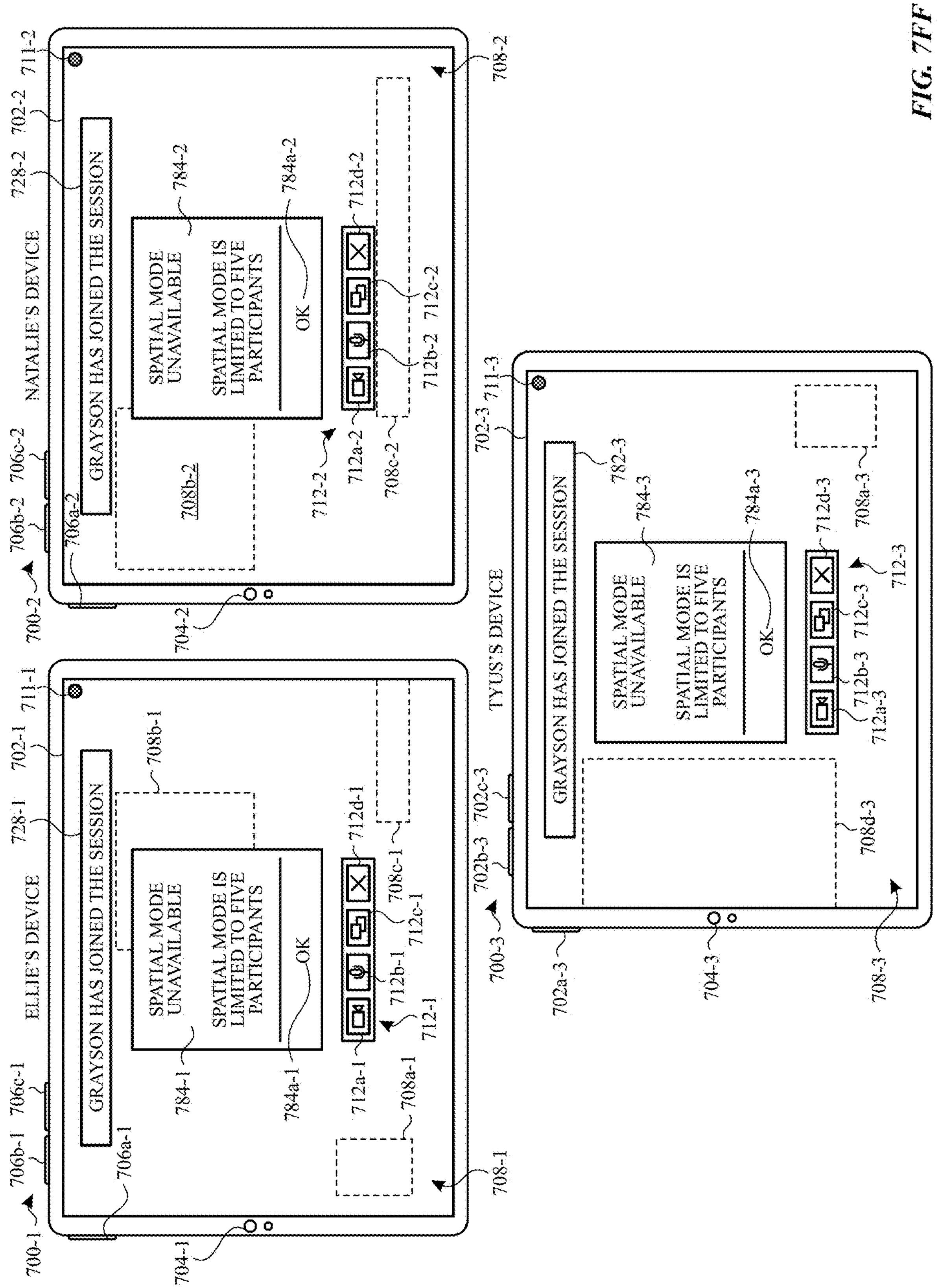
Figure 7G:
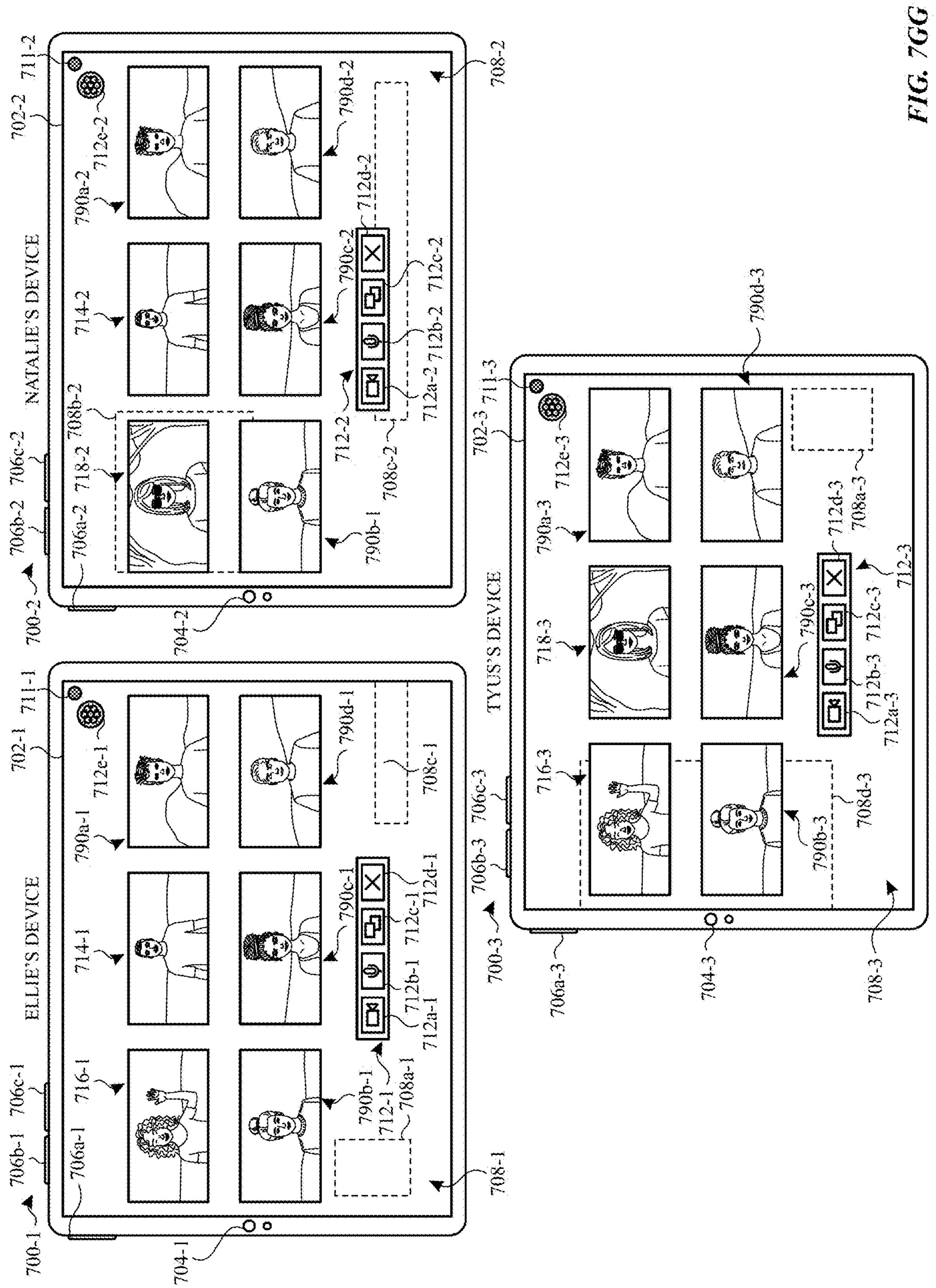
Figure 7H:
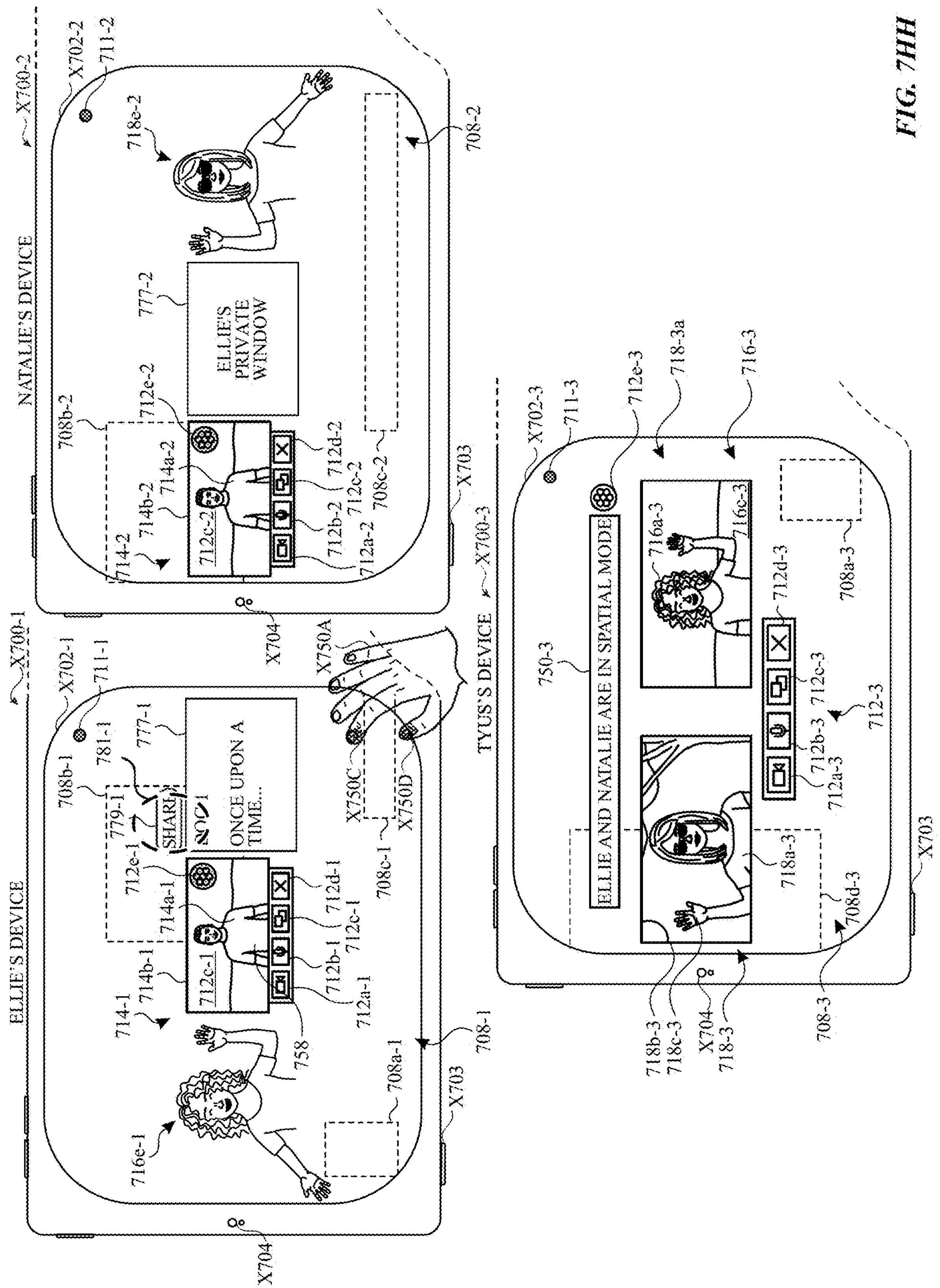
Figure 7I:
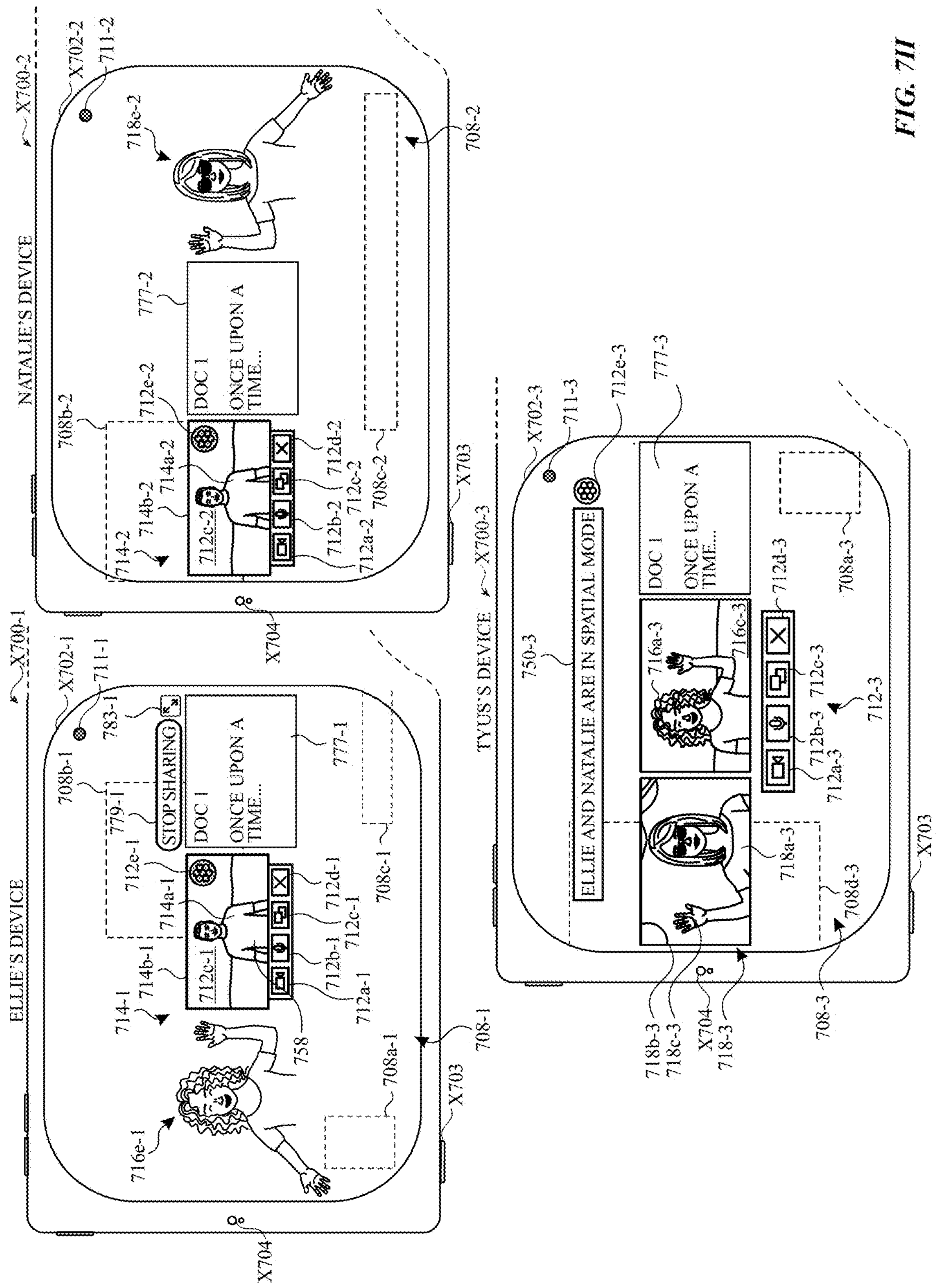
Figure 7J:
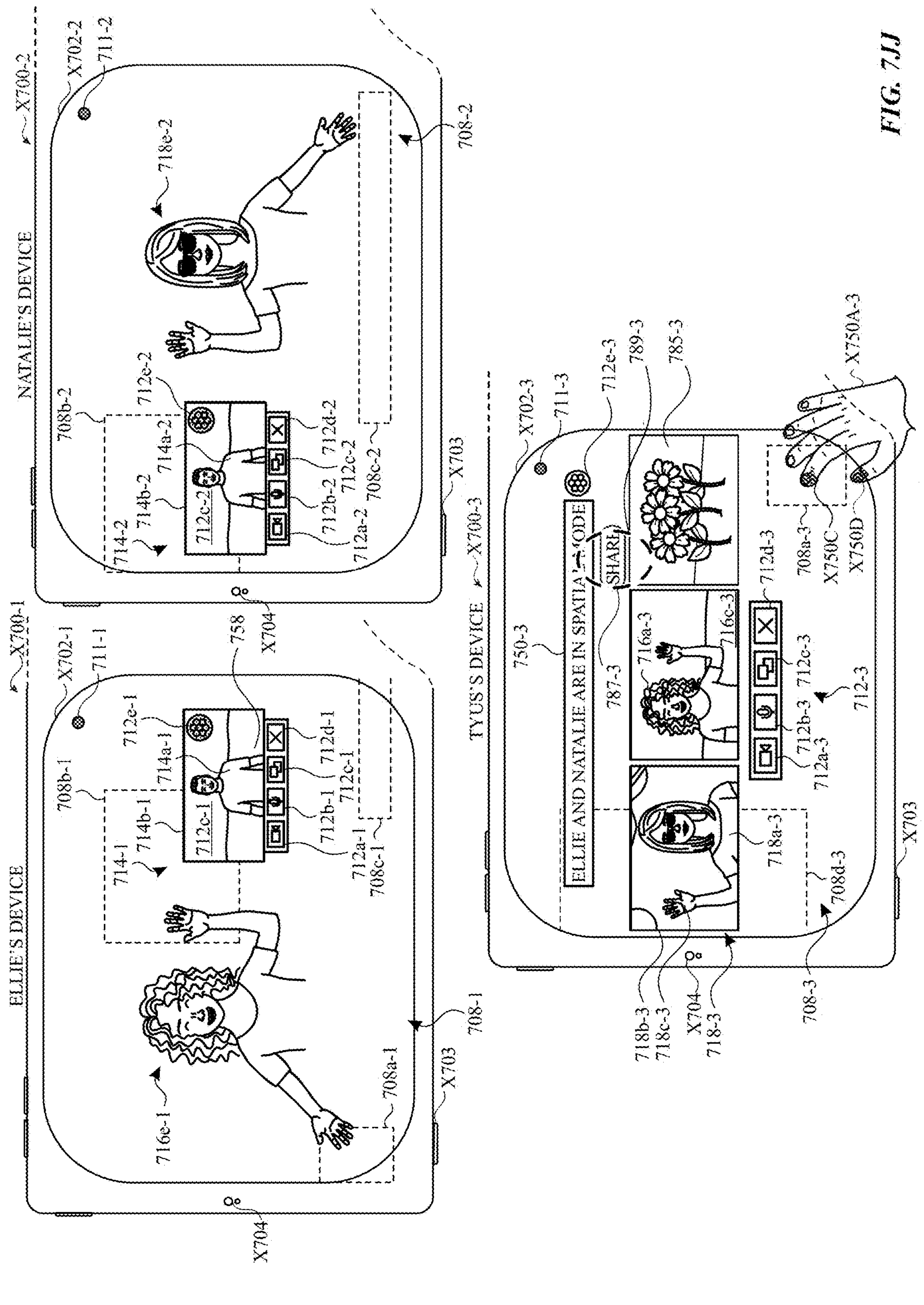
Figure 7K:
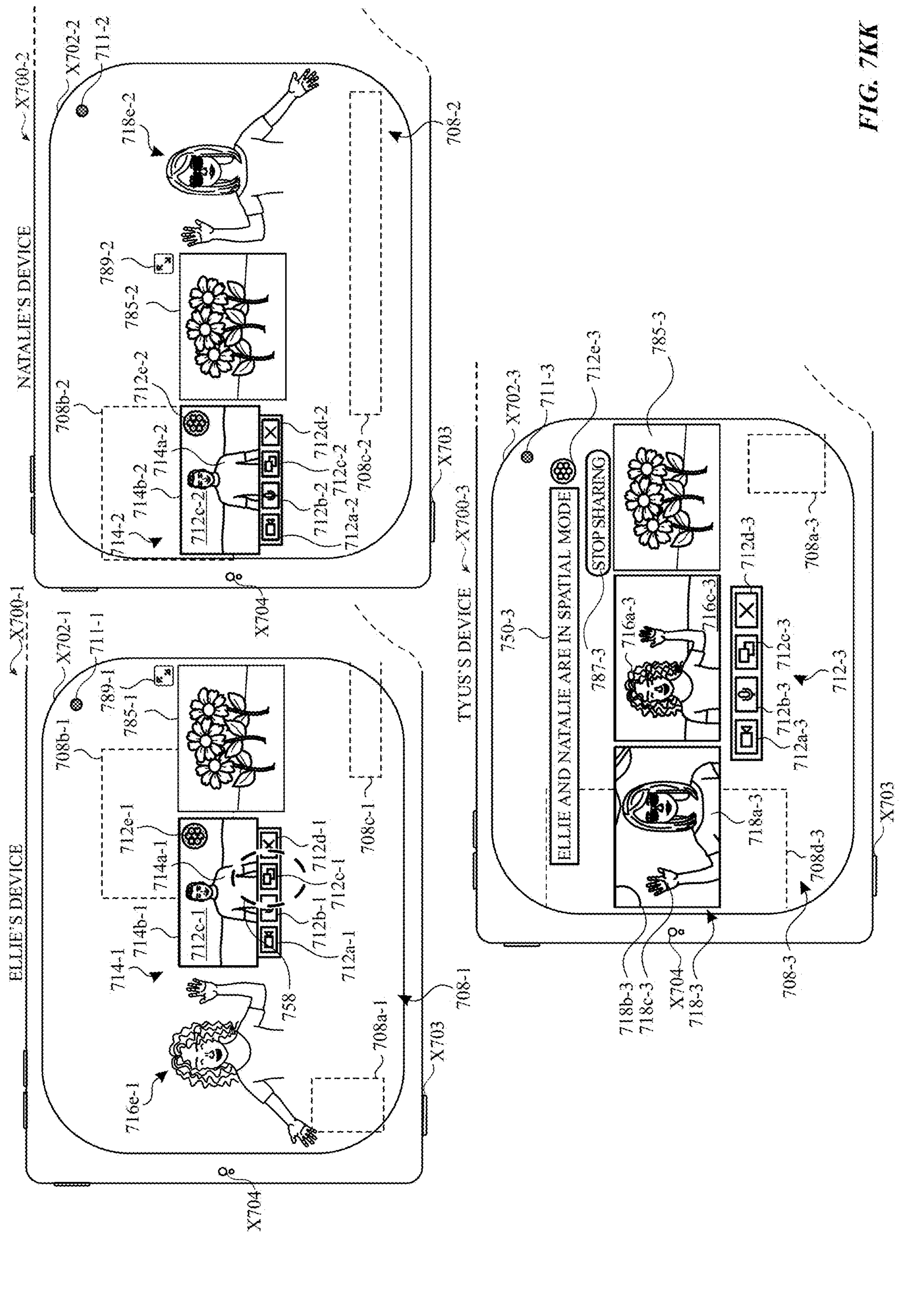
Figure 7L:
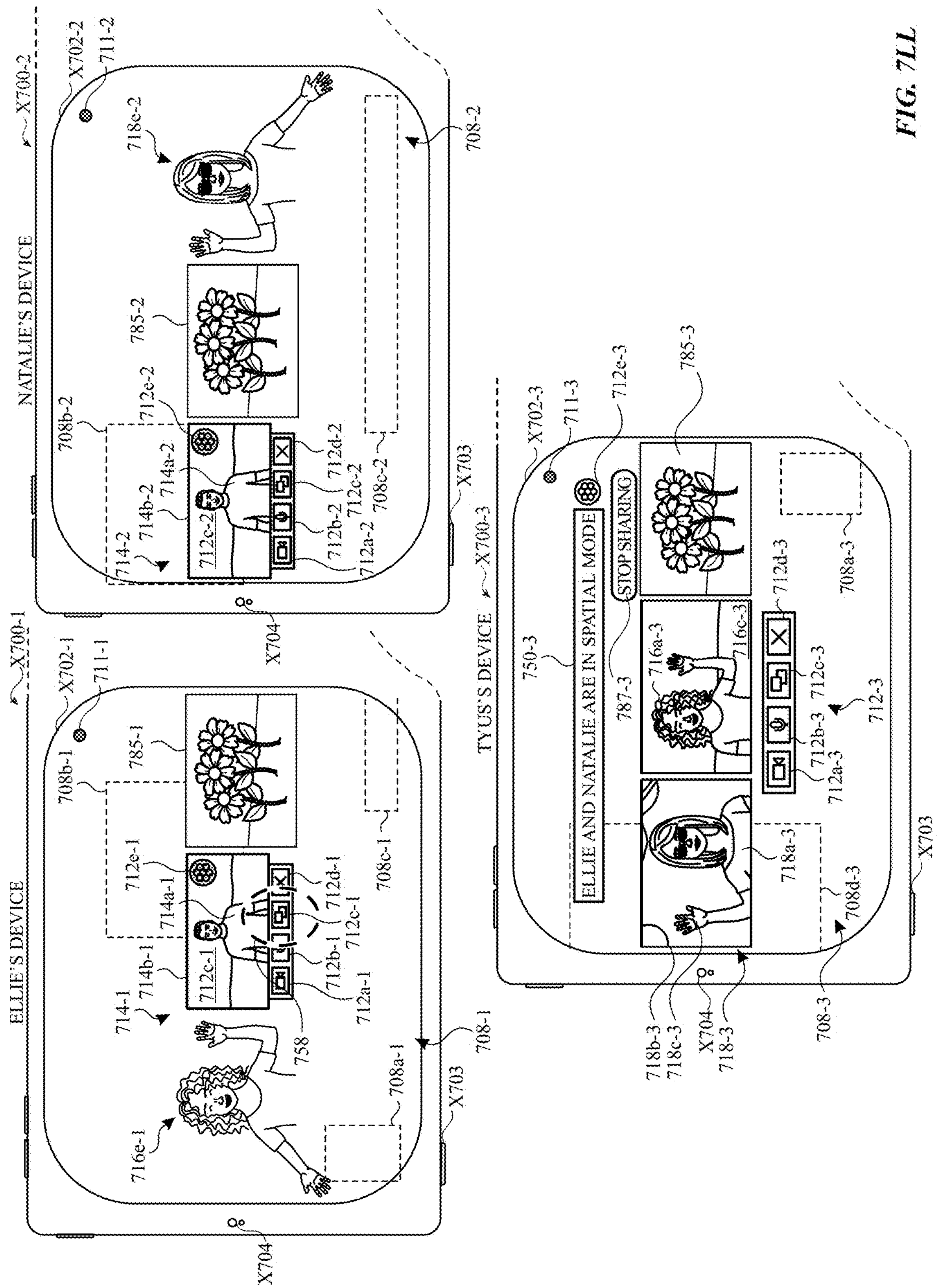

At FIG. 7C1, electronic device 700-3 displays a different viewpoint of three-dimensional environment 708-3. In some embodiments, electronic device 700-3 is a head-mounted system, and the view of three-dimensional environment 708-3 displayed on electronic device 700-3 changes as the user of electronic device 700-3 moves within a physical environment that surrounds electronic device 700-3 (e.g., moves as the user of electronic device 700-3 turns his or her head and/or turns his or her body; and/or as the user moves from one position in the physical environment to a different position in the physical environment). In the depicted embodiments, spatially-constrained representation 718-3 and spatially constrained representation 716-3, and controls 712*a*-3, 712*b*-3, 712*c*-3, 712*d*-3, and 712*e*-3 are shown as environment-locked objects that stay in the same position in three-dimensional environment 708-3 as the viewpoint of the user changes.

Furthermore, in FIG. 7C1, the user of electronic device 700-2 moves her hand forward and, in response, representation 716*a*-1 and representation 716*a*-3 are shown putting their hands forward. As discussed above, in some embodiments, spatially-constrained representations are prevented from extending beyond their boundaries (e.g., boundaries 714*b*-1, 714*b*-2, 716*b*-1, 716*b*-3, 718*b*-2, and/or 718*b*-3). As can be seen in electronic device 700-3, the hand of representation 716*a*-3 does not extend outside of boundary 716*b*-3 even as it moves forward. In some embodiments, one or more portions of representation 716*a*-3 are distorted in order to keep representation 716*a*-3 within boundary 716*b*-3. In some embodiments, one or more portions of representation 716*a*-3 are cropped and/or faded in order to keep representation 716*a*-3 within boundary 716*b*-3. For example, it can be seen on electronic device 700-1 and electronic device 700-2 that the user of electronic device 700-3 (Tyus) has moved to his left, and, in response, representation 714*a*-1 and representation 714*a*-2 move to the left within boundary 714*b*-1 and boundary 714*b*-2, respectively. Furthermore, the left arm of representation 714*a*-1 and representation 714*a*-2 has been cropped in order to keep the representations within their respective boundaries.

As mentioned above, in some embodiments, spatially-constrained representations are displayed with a background displayed behind the representation of the user. For example, spatially constrained representation 714-1 (and spatially constrained representation 714-2) representative of the user of electronic device 700-3 is displayed with background 714*c*-1 displayed behind representation 714*a*-1, and within boundary 714*b*-1. In some embodiments, background 714*c*-1 (and background 714*c*-2) is generated based on visual content captured by one or more outward facing (e.g., forward facing) cameras of electronic device 700-3. In some embodiments, electronic device 700-3 is a head-mounted device, and the one or more outward facing cameras capture visual content corresponding to a physical environment that surrounds the user and electronic device 700-3.

In some embodiments, the techniques and user interface(s) described in FIGS. 7A-7LL are provided by one or more of the devices described in FIGS. 1A-1P. For example, FIG. 7C2 illustrates an embodiment in which spatially-constrained representations 714-1 and 716-1 (e.g., as described in FIGS. 7B1, 7B2, and/or 7C1) is displayed on display module X702-1 of head-mounted device (HMD) X700-1. In some embodiments, device X700-1 includes a pair of display modules that provide stereoscopic content to different eyes of the same user. For example, HMD X700-1 includes display module X702-1 (which provides content to a left eye of the user) and a second display module (which provides content to a right eye of the user). In some embodiments, the second display module displays a slightly different image than display module X702-1 to generate the illusion of stereoscopic depth.

At FIG. 7C2, HMD X700-3 displays a different viewpoint of three-dimensional environment 708-3. At FIG. 7C2, HMD X700-3 is a head-mounted system, and the view of three-dimensional environment 708-3 displayed on HMD X700-3 changes as the user of HMD X700-3 moves within a physical environment that surrounds HMD X700-3 (e.g., moves as the user of HMD X700-3 turns his or her head and/or turns his or her body; and/or as the user moves from one position in the physical environment to a different position in the physical environment). In the depicted embodiments, spatially-constrained representation 718-3 and spatially constrained representation 716-3, and controls 712*a*-3, 712*b*-3, 712*c*-3, 712*d*-3, and 712*e*-3 are shown as environment-locked objects that stay in the same position in three-dimensional environment 708-3 as the viewpoint of the user changes.

Furthermore, in FIG. 7C2, the user of HMD X700-2 moves her hand forward and, in response, representation 716*a*-1 and representation 716*a*-3 are shown putting their hands forward. As discussed above, in some embodiments, spatially-constrained representations are prevented from extending beyond their boundaries (e.g., boundaries 714*b*-1, 714*b*-2, 716*b*-1, 716*b*-3, 718*b*-2, and/or 718*b*-3). As can be seen in HMD X700-3, the hand of representation 716*a*-3 does not extend outside of boundary 716*b*-3 even as it moves forward. In some embodiments, one or more portions of representation 716*a*-3 are distorted in order to keep representation 716*a*-3 within boundary 716*b*-3. In some embodiments, one or more portions of representation 716*a*-3 are cropped and/or faded in order to keep representation 716*a*-3 within boundary 716*b*-3. For example, it can be seen on HMD X700-1 and HMD X700-2 that the user of HMD X700-3 (Tyus) has moved to his left, and, in response, representation 714*a*-1 and representation 714*a*-2 move to the left within boundary 714*b*-1 and boundary 714*b*-2, respectively. Furthermore, the left arm of representation 714*a*-1 and representation 714*a*-2 has been cropped in order to keep the representations within their respective boundaries.

As mentioned above, in some embodiments, spatially-constrained representations are displayed with a background displayed behind the representation of the user. For example, spatially constrained representation 714-1 (and spatially constrained representation 714-2) representative of the user of electronic device 700-3 is displayed with background 714*c*-1 displayed behind representation 714*a*-1, and within boundary 714*b*-1. In some embodiments, background 714*c*-1 (and background 714*c*-2) is generated based on visual content captured by one or more outward facing (e.g., forward facing) cameras of HMD X700-3. At FIG. 7C2, HMD X700-3 is a head-mounted device, and the one or more outward facing cameras capture visual content corresponding to a physical environment that surrounds the user and HMD X700-3.

In some embodiments, HMD X700-1, HMD X700-2, and/or HMD X700-3 detect one or more inputs (e.g., user inputs) based on an air gesture performed by a user of HMD X700-1, HMD X700-2, and/or HMD X700-3. In some embodiments, HMD X700-1, HMD X700-2, and/or HMD X700-3 detect hands X750A and/or X750B of the user of HMD X700-1, HMD X700-2, and/or HMD X700-3 and determine whether motion of hands X750A and/or X750B perform a predetermined air gesture corresponding to an input. In some embodiments, the predetermined air gesture includes a pinch gesture. In some embodiments, the pinch gesture includes detecting movement of finger X750C and thumb X750D toward one another. In some embodiments, HMD X700-1, HMD X700-2, and/or HMD X700-3 detect an input based on a gaze and air gesture input performed by the user of HMD X700-1, HMD X700-2, and/or HMD X700-3. In some embodiments, the gaze and air gesture input includes detecting that the user of HMD X700-1, HMD X700-2, and/or HMD X700-3 is looking at a selectable object (e.g., for more than a predetermined amount of time) and hands X750A and/or X750B of the user of HMD X700-1, HMD X700-2, and/or HMD X700-3 perform a pinch gesture. For instance, in some embodiments, at FIG. 7A, HMD X700-1 detects hands X750A and/or X750B of a user of HMD X700-1 and determines that hands X750A and/or X750B perform a predetermined gesture (e.g., a gaze and pinch gesture) corresponding to selection of option 710*a*.

Any of the features, components, and/or parts, including the arrangements and configurations thereof shown in FIGS. 1B-1P can be included, either alone or in any combination, in HMD X700-1, HMD X700-2, and/or HMD X700-3. For example, in some embodiments, HMD X700-1, HMD X700-1, and/or HMD X700-3 include any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702-1, display module X702-2, and/or display module X702-3 include any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700-1, HMD X700-2, and/or HMD X700-3 include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700-1, HMD X700-2, and/or HMD X700-3 include one or more input devices, which include any of the features, components, and/or parts of any of first button 1-128, button 11.1.1-114, second button 1-132, and or dial or button 1-328, either alone or in any combination. In some embodiments, HMD X700-1, HMD X700-2, and/or HMD X700-3 include one or more audio output components (e.g., electronic component 1-112) for generating audio feedback (e.g., audio output), optionally generated based on detected events and/or user inputs detected by the HMD X700-1, HMD X700-2, and/or HMD X700-3.

FIG. 7D depicts an example scenario that depicts electronic device 700-3 and its corresponding user in a physical environment 722 that includes trees 722*a*, 722*c*, and 722*d* and bench 722*b*. In the depicted embodiment, outward facing cameras of electronic device 700-3 are currently capturing visible content corresponding to region 724*a*, while region 724*b* is not visible to electronic device 700-3. In some embodiments, background 714*c*-1 and background 714*c*-2 depict visual content corresponding to region 724*a* being captured by electronic device 700-3. In some embodiments, background 714*c*-1 and background 714*c*-2 depict visual content corresponding to region 724*b*, which is not visible to electronic device 700-3. In some embodiments, background 714*c*-1 and background 714*c*-2 are generated based on previously-captured visible content that was captured by electronic device while portions of region 724*b* were visible to electronic device 700-3 (e.g., while the user was facing the other way). In some embodiments, background 714*c*-1 and background 714*c*-2 are generated using a machine learning model and/or artificial intelligence to generate a representation of region 724*b* based on visual content captured from region 724*a*, even if region 724*b* has never been visible to electronic device 700-3 during the real-time communication session.

At FIG. 7E, electronic device 700-1 detects user input 726 corresponding to selection of control 712*a*-1. In the depicted embodiment, user input 726 is a touch input via touch-sensitive display 702-1. However, in some embodiments, user input 726 is a non-touch input, such as a gesture or other action taken by a user. For example, in some embodiments, electronic device 700-1 is a head-mounted system, and user input 726 includes, for example, a gaze input directed to control 712*a*-1 (e.g., the user looking at control 712*a*-1) while the user performs an air gesture (e.g., a pinch air gesture).

At FIG. 7F, in response to detecting user input 726, electronic device 700-1 displays user interface 728. User interface 728 includes self-view region 728*c* that provides the user of electronic device 700-1 with a preview of how the user appears to other participants in the real-time communication session. User interface 728 also includes option 728*a* that is selectable to cease display of user interface 728. User interface 728 also includes option 728*b* that is selectable by a user to selectively enable or disable use of an avatar-based representation to represent the user of electronic device 700-1 in the real-time communication session. In FIG. 7F, the user of electronic device 700-1 is represented using an avatar-based representation that has a plurality of different movable parts that move based on movements of corresponding body parts of the user of electronic device 700-1. At FIG. 7F, electronic device 700-1 detects user input 730 corresponding to selection of option 728*b*. In the depicted embodiment, user input 730 is a touch input via touch-sensitive display 702-1. However, in some embodiments, user input 730 is a non-touch input, such as a gesture or other action taken by a user. For example, in some embodiments, electronic device 700-1 is a head-mounted system, and user input 730 includes, for example, a gaze input directed to option 728*b* (e.g., the user looking at option 728*b*) while the user performs an air gesture (e.g., a pinch air gesture).

At FIG. 7G, in response to detecting user input 730, electronic device 700-1 displays a non-avatar representation (e.g., a monogram representation) of the user of electronic device 700-1 within self-view region 728*c* to indicate that the user will be represented with the monogram representation within the real-time communication session if the user proceeds with this setting. In some embodiments, a non-avatar representation of a user has fewer points of movement that move based on movement of corresponding parts of the body of the user. For example, the monogram representation of the user of electronic device 700-1 does not move or moves in only one way based on movement of the body of the user of electronic device 700-1, whereas the avatar based representation moves in a plurality of ways based on movement of corresponding parts of the body of the user (e.g., the face of the avatar moves based on changes in facial expression of the user, the arms of the avatar move based on movements in the arms of the user, the hands of the avatar move based on movements in the hands of the user, and/or the head of the avatar moves based on movements in the head of the user). At FIG. 7G, electronic device 700-1 detects user input 732 corresponding to selection of option 728*a*. In the depicted embodiment, user input 732 is a touch input via touch-sensitive display 702-1. However, in some embodiments, user input 732 is a non-touch input, such as a gesture or other action taken by a user. For example, in some embodiments, electronic device 700-1 is a head-mounted system, and user input 732 includes, for example, a gaze input directed to option 728*a* (e.g., the user looking at option 728*a*) while the user performs an air gesture (e.g., a pinch air gesture).

At FIG. 7H, in response to detecting user input 732, the user of electronic device 700-1 is represented in the real-time communication session using the non-avatar, monogram representation. Accordingly, electronic device 700-2 displays representation 718*d*-2 to represent the user of electronic device 700-1, and electronic device 700-3 displays representation 718*d*-3 to represent the user of electronic device 700-3. At FIG. 7H, electronic device 700-1 detects user input 734 corresponding to selection of control 712*a*-1. In the depicted embodiment, user input 734 is a touch input via touch-sensitive display 702-1. However, in some embodiments, user input 734 is a non-touch input, such as a gesture or other action taken by a user. For example, in some embodiments, electronic device 700-1 is a head-mounted system, and user input 734 includes, for example, a gaze input directed to control 712*a*-1 (e.g., the user looking at control 712*a*-1) while the user performs an air gesture (e.g., a pinch air gesture).

At FIG. 7I, in response to detecting user input 734, electronic device 700-1 re-displays user interface 728. At FIG. 7I, electronic device 700-1 detects user input 736 corresponding to selection of option 728*b*. In the depicted embodiment, user input 736 is a touch input via touch-sensitive display 702-1. However, in some embodiments, user input 736 is a non-touch input, such as a gesture or other action taken by a user. For example, in some embodiments, electronic device 700-1 is a head-mounted system, and user input 736 includes, for example, a gaze input directed to option 728*b* (e.g., the user looking at option 728*b*) while the user performs an air gesture (e.g., a pinch air gesture).

At FIG. 7J, in response to detecting user input 736, electronic device 700-1 re-displays the avatar-based representation of the user of electronic device 700-1 within self-view region 728*c*. At FIG. 7J, electronic device 700-1 detects user input 738 corresponding to selection of option 728*a*. In the depicted embodiment, user input 738 is a touch input via touch-sensitive display 702-1. However, in some embodiments, user input 738 is a non-touch input, such as a gesture or other action taken by a user. For example, in some embodiments, electronic device 700-1 is a head-mounted system, and user input 738 includes, for example, a gaze input directed to option 728*a* (e.g., the user looking at option 728*a*) while the user performs an air gesture (e.g., a pinch air gesture).

At FIG. 7K, in response to detecting user input 738, the user of electronic device 700-1 is once again represented in the real-time communication session using an avatar-based representation. Accordingly, electronic device 700-2 re-displays avatar representation 718*a*-2, and electronic device 700-3 re-displays avatar representation 718*a*-3. At FIG. 7K, electronic device 700-1 detects user input 740 corresponding to selection of control 712*e*-1. In the depicted embodiment, user input 740 is a touch input via touch-sensitive display 702-1. However, in some embodiments, user input 740 is a non-touch input, such as a gesture or other action taken by a user. For example, in some embodiments, electronic device 700-1 is a head-mounted system, and user input 740 includes, for example, a gaze input directed to control 712*e*-1 (e.g., the user looking at control 712*e*-1) while the user performs an air gesture (e.g., a pinch air gesture). As mentioned above, in some embodiments, selection of control 712*e*-1 represents a user request to transition from a spatially-constrained representation mode to a spatially-flexible representation mode.

At FIG. 7L, in response to detecting user input 740, electronic device 700-1 displays user interface 742, which asks the user to confirm his or her request to transition from the spatially-constrained representation mode to the spatially-flexible representation mode. User interface 742 also indicates that there is a maximum number of participants that can be participate in the spatially-flexible representation mode. User interface 742 includes option 742*a* that is selectable to confirm the request, and option 724*b* that is selectable to cancel the request and cease display of user interface 742-1. At FIG. 7L, electronic device 700-1 detects user input 744 corresponding to selection of option 742*a*. In the depicted embodiment, user input 744 is a touch input via touch-sensitive display 702-1. However, in some embodiments, user input 744 is a non-touch input, such as a gesture or other action taken by a user. For example, in some embodiments, electronic device 700-1 is a head-mounted system, and user input 744 includes, for example, a gaze input directed to option 742*a* (e.g., the user looking at option 742*a*) while the user performs an air gesture (e.g., a pinch air gesture).

At FIG. 7M, in response to detecting user input 744, electronic device 700-1 ceases display of user interface 742, and displays countdown timer 746. Countdown timer 746 counts down a predetermined amount of time (e.g., 3 seconds) before electronic device 700-1 will transition from the spatially-constrained representation mode to the spatially-flexible representation mode. At FIG. 7N, countdown timer 746 counts down to two seconds. At FIG. 7O1, countdown timer 746 has counted down to zero seconds and ceases to be displayed. However, electronic device 700-1 is still not in the spatially-flexible representation mode because it is the first device to request to transition to the spatially-flexible representation mode. In some embodiments, two or more participants and/or devices must request transition to the spatially-flexible representation mode in order for those participants and/or devices to transition to the spatially-flexible representation mode. At FIG. 7O1, based on electronic device 700-1 request to transition to the spatially-flexible representation mode, electronic device 700-2 displays indication 750-2, and electronic device 700-3 displays indication 750-3. At FIG. 7O1, electronic device 700-2 detects user input 752 corresponding to selection of control 712*e*-2. In the depicted embodiment, user input 752 is a touch input via touch-sensitive display 702-2. However, in some embodiments, user input 752 is a non-touch input, such as a gesture or other action taken by a user. For example, in some embodiments, electronic device 700-2 is a head-mounted system, and user input 752 includes, for example, a gaze input directed to control 712*e*-2 (e.g., the user looking at control 712*e*-2) while the user performs an air gesture (e.g., a pinch air gesture).

In some embodiments, the techniques and user interface(s) described in FIGS. 7A-7LL are provided by one or more of the devices described in FIGS. 1A-1P. For example, FIG. 7O2 illustrates an embodiment in which spatially-constrained representations 714-1 and 716-1 (e.g., as described in FIGS. 7B1-7N) is displayed on display module X702-1 of head-mounted device (HMD) X700-1. In some embodiments, device X700-1 includes a pair of display modules that provide stereoscopic content to different eyes of the same user. For example, HMD X700-1 includes display module X702-1 (which provides content to a left eye of the user) and a second display module (which provides content to a right eye of the user). In some embodiments, the second display module displays a slightly different image than display module X702-1 to generate the illusion of stereoscopic depth.

At FIG. 7O2, based on HMD X700-1 request to transition to the spatially-flexible representation mode, HMD X700-2 displays indication 750-2, and HMD X700-3 displays indication 750-3. At FIG. 7O2, HMD X700-2 detects user input X752 corresponding to selection of control 712*e*-2. In some embodiments, user input X752 is a non-touch input, such as a gesture or other action taken by a user. For example, at FIG. 7O2, HMD X700-2 is a head-mounted system, and user input X752 includes, for example, a gaze input directed to control 712*e*-2 (e.g., the user looking at control 712*e*-2) while the user performs an air gesture (e.g., a pinch air gesture). In some embodiments, HMD X700-2 detects hands X750A and/or X750B of the user of HMD X700-2 and determines whether motion of hands X750A and/or X750B perform a predetermined air gesture corresponding to selection of control 712*e*-2. In some embodiments, the predetermined air gesture includes a pinch gesture. In some embodiments, the pinch gesture includes detecting movement of finger X750C and thumb X750D toward one another. In some embodiments, HMD X700-2 detects selection of control 712*e*-2 based on a gaze and air gesture input performed by the user of HMD X700-2. In some embodiments, the gaze and air gesture input includes detecting that the user of HMD X700-2 is looking at control 712*e*-2 (e.g., for more than a predetermined amount of time) and hands X750A and/or X750B of the user of HMD X700-2 perform a pinch gesture.

In some embodiments, HMD X700-1, HMD X700-2, and/or HMD X700-3 detect one or more inputs (e.g., user inputs) based on an air gesture performed by a user of HMD X700-1, HMD X700-2, and/or HMD X700-3. In some embodiments, HMD X700-1, HMD X700-2, and/or HMD X700-3 detect hands X750A and/or X750B of the user of HMD X700-1, HMD X700-2, and/or HMD X700-3 and determine whether motion of hands X750A and/or X750B perform a predetermined air gesture corresponding to an input. In some embodiments, the predetermined air gesture includes a pinch gesture. In some embodiments, the pinch gesture includes detecting movement of finger X750C and thumb X750D toward one another. In some embodiments, HMD X700-1, HMD X700-2, and/or HMD X700-3 detect an input based on a gaze and air gesture input performed by the user of HMD X700-1, HMD X700-2, and/or HMD X700-3. In some embodiments, the gaze and air gesture input includes detecting that the user of HMD X700-1, HMD X700-2, and/or HMD X700-3 is looking at a selectable object (e.g., for more than a predetermined amount of time) and hands X750A and/or X750B of the user of HMD X700-1, HMD X700-2, and/or HMD X700-3 perform a pinch gesture. For instance, in some embodiments, at FIGS. 7E and/or 7H, HMD X700-1 detects hands X750A and/or X750B of a user of HMD X700-1 and determines that hands X750A and/or X750B perform a predetermined gesture (e.g., a gaze and pinch gesture) corresponding to selection of control 712*a*-1. As another example, in some embodiments, at FIGS. 7F and/or 7I, HMD X700-1 detects hands X750A and/or X750B of the user of HMD X700-1 and determines that hands X750A and/or X750B perform a predetermined gesture (e.g., a gaze and pinch gesture) corresponding to selection of option 728*b*. In some embodiments, at FIGS. 7G and/or 7J, HMD X700-1 detects hands X750A and/or X750B of the user of HMD X700-1 and determines that hands X750A and/or X750B perform a predetermined gesture (e.g., a gaze and pinch gesture) corresponding to selection of option 728*a*. Further, in some embodiments, at FIG. 7K, HMD X700-1 detects hands X750A and/or X750B of the user of HMD X700-1 and determines that hands X750A and/or X750B perform a predetermined gesture (e.g., a gaze and pinch gesture) corresponding to selection of control 712*e*-1. In some embodiments, at FIG. 7L, HMD X700-1 detects hands X750A and/or X750B of the user of HMD X700-1 and determines that hands X750A and/or X750B perform a predetermined gesture (e.g., a gaze and pinch gesture) corresponding to selection of option 742*a*.

Any of the features, components, and/or parts, including the arrangements and configurations thereof shown in FIGS. 1B-1P can be included, either alone or in any combination, in HMD X700-1, HMD X700-2, and/or HMD X700-3. For example, in some embodiments, HMD X700-1, HMD X700-1, and/or HMD X700-3 include any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702-1, display module X702-2, and/or display module X702-3 include any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700-1, HMD X700-2, and/or HMD X700-3 include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700-1, HMD X700-2, and/or HMD X700-3 include one or more input devices, which include any of the features, components, and/or parts of any of first button 1-128, button 11.1.1-114, second button 1-132, and or dial or button 1-328, either alone or in any combination. In some embodiments, HMD X700-1, HMD X700-2, and/or HMD X700-3 include one or more audio output components (e.g., electronic component 1-112) for generating audio feedback (e.g., audio output), optionally generated based on detected events and/or user inputs detected by the HMD X700-1, HMD X700-2, and/or HMD X700-3.

At FIG. 7P, in response to detecting user input 752, electronic device 700-2 displays user interface 742-2, which asks the user to confirm his or her request to transition from the spatially-constrained representation mode to the spatially-flexible representation mode. User interface 742-2 also indicates that there is a maximum number of participants that can be participate in the spatially-flexible representation mode. User interface 742-2 includes option 742*a*-2 that is selectable to confirm the request, and option 724*b*-2 that is selectable to cancel the request and cease display of user interface 742-2. At FIG. 7P, electronic device 700-2 detects user input 754 corresponding to selection of option 742*a*-2. In the depicted embodiment, user input 754 is a touch input via touch-sensitive display 702-2. However, in some embodiments, user input 754 is a non-touch input, such as a gesture or other action taken by a user. For example, in some embodiments, electronic device 700-2 is a head-mounted system, and user input 754 includes, for example, a gaze input directed to option 742*a*-2 (e.g., the user looking at option 742*a*-2) while the user performs an air gesture (e.g., a pinch air gesture).

At FIG. 7Q, in response to detecting user input 754, electronic device 700-2 displays countdown timer 746-2, which is counting down from three seconds before transitioning electronic device 700-2 into the spatially-flexible representation mode. At FIG. 7R1, after countdown timer 746-2 counts down from three seconds, countdown timer 746-2 ceases to be displayed, and electronic device 700-1 and electronic device 700-2 transition into the spatially-flexible representation mode. In FIG. 7R1, based on electronic device 700-1 and electronic device 700-2 having transitioned into the spatially-flexible representation mode, electronic device 700-1 replaces display of spatially-constrained representation 716-1 with spatially-flexible representation **716*e*-1 representative of the user of electronic device 700-2, and electronic device 700-2 replaces display of spatially-constrained representation 718-2 with spatially-flexible representation 718*e*-2. As discussed above, in some embodiments, spatially-constrained representations are displayed within a boundary, and are limited to movement within the boundary, and spatially constrained representations cannot move to different locations within the shared three-dimensional environment based on movements by their corresponding users. However, in the depicted embodiments, spatially-flexible representations 716*e*-1, 718*e*-2 are displayed without a surrounding boundary or border, and are able to move within a shared three-dimensional environment (e.g., 708-1, 708-2, 708-3**) based on movement by their corresponding users (e.g., movement within their physical environments and/or movement from a first location to a second location in their physical environments).

In FIG. 7R1, electronic device 700-3 has not transitioned into the spatially-flexible representation mode. Accordingly, the user of electronic device 700-3 is still represented in the real-time communication session using spatially-constrained representation 714-1 on electronic device 700-1 and spatially-constrained representation 714-2 on electronic device 700-2. Furthermore, because electronic device 700-3 is not in the spatially-flexible representation mode, electronic device 700-3 continues to display spatially-constrained representation 716-3 to represent the user of electronic device 700-3 and spatially-constrained representation 718-3 to represent the user of electronic device 700-1. Notification 750-3 is also updated to indicate that the user of electronic device 700-1 and the user of electronic device 700-2 are now in the spatially-flexible representation mode. In FIG. 7R1, because spatially constrained representation 714-1 is the only spatially-constrained representation displayed on electronic device 700-1, control **712*e*-1 is displayed within boundary 714-1, and controls 712*a*-1, 712*b*-1, 712*c*-1, and 712*d*-1 are displayed attached to and/or connected to boundary 714-1. Similarly because spatially constrained representation 714-2 is the only spatially-constrained representation displayed on electronic device 700-2, control 712*e*-2 is displayed within boundary 714-2, and controls 712*a*-2, 712*b*-2, 712*c*-2, and 712*d*-2 are displayed attached to and/or connected to boundary 714-2**.

In some embodiments, the techniques and user interface(s) described in FIGS. 7A-7LL are provided by one or more of the devices described in FIGS. 1A-IP. For example, FIG. 7R2 illustrates an embodiment in which spatially-flexible representations **716*e*-1 and 718*e*-2 (e.g., as described in FIG. 7R1) is displayed on display module X702-1 of head-mounted device (HMD) X700-1. In some embodiments, device X700-1 includes a pair of display modules that provide stereoscopic content to different eyes of the same user. For example, HMD X700-1 includes display module X702-1 (which provides content to a left eye of the user) and a second display module (which provides content to a right eye of the user). In some embodiments, the second display module displays a slightly different image than display module X702-1** to generate the illusion of stereoscopic depth.

At FIG. 7R2, after countdown timer 746-2 counts down from three seconds, countdown timer 746-2 ceases to be displayed, and HMD X700-1 and HMD X700-2 transition into the spatially-flexible representation mode. In FIG. 7R2, based on HMD X700-1 and HMD X700-2 having transitioned into the spatially-flexible representation mode, HMD X700-1 replaces display of spatially-constrained representation 716-1 with spatially-flexible representation **716*c*-1 representative of the user of HMD X700-2, and HMD X700-2 replaces display of spatially-constrained representation 718-2 with spatially-flexible representation 718*e*-2. As discussed above, in some embodiments, spatially-constrained representations are displayed within a boundary, and are limited to movement within the boundary, and spatially constrained representations cannot move to different locations within the shared three-dimensional environment based on movements by their corresponding users. However, in the depicted embodiments, spatially-flexible representations 716*e*-1, 718*e*-2 are displayed without a surrounding boundary or border, and are able to move within a shared three-dimensional environment (e.g., 708-1, 708-2, 708-3**) based on movement by their corresponding users (e.g., movement within their physical environments and/or movement from a first location to a second location in their physical environments).

In FIG. 7R2, HMD X700-3 has not transitioned into the spatially-flexible representation mode. Accordingly, the user of HMD X700-3 is still represented in the real-time communication session using spatially-constrained representation 714-1 on HMD X700-1 and spatially-constrained representation 714-2 on HMD X700-2. Furthermore, because HMD X700-3 is not in the spatially-flexible representation mode, HMD X700-3 continues to display spatially-constrained representation 716-3 to represent the user of HMD X700-3 and spatially-constrained representation 718-3 to represent the user of HMD X700-1. Notification 750-3 is also updated to indicate that the user of HMD X700-1 and the user of HMD X700-2 are now in the spatially-flexible representation mode. In FIG. 7R2, because spatially constrained representation 714-1 is the only spatially-constrained representation displayed on HMD X700-1, control **712*e*-1 is displayed within boundary 714-1, and controls 712*a*-1, 712*b*-1, 712*c*-1, and 712*d*-1 are displayed attached to and/or connected to boundary 714-1. Similarly because spatially constrained representation 714-2 is the only spatially-constrained representation displayed on HMD X700-2, control 712*e*-2 is displayed within boundary 714-2, and controls 712*a*-2, 712*b*-2, 712*c*-2, and 712*d*-2 are displayed attached to and/or connected to boundary 714-2**.

In some embodiments, HMD X700-1, HMD X700-2, and/or HMD X700-3 detect one or more inputs (e.g., user inputs) based on an air gesture performed by a user of HMD X700-1, HMD X700-2, and/or HMD X700-3. In some embodiments, HMD X700-1, HMD X700-2, and/or HMD X700-3 detect hands X750A and/or X750B of the user of HMD X700-1, HMD X700-2, and/or HMD X700-3 and determine whether motion of hands X750A and/or X750B perform a predetermined air gesture corresponding to an input. In some embodiments, the predetermined air gesture includes a pinch gesture. In some embodiments, the pinch gesture includes detecting movement of finger X750C and thumb X750D toward one another. In some embodiments, HMD X700-1, HMD X700-2, and/or HMD X700-3 detect an input based on a gaze and air gesture input performed by the user of HMD X700-1, HMD X700-2, and/or HMD X700-3. In some embodiments, the gaze and air gesture input includes detecting that the user of HMD X700-1, HMD X700-2, and/or HMD X700-3 is looking at a selectable object (e.g., for more than a predetermined amount of time) and hands X750A and/or X750B of the user of HMD X700-1, HMD X700-2, and/or HMD X700-3 perform a pinch gesture. For instance, in some embodiments, at FIG. 7P, HMD X700-2 detects hands X750A and/or X750B of a user of HMD X700-2 and determines that hands X750A and/or X750B perform a predetermined gesture (e.g., a gaze and pinch gesture) corresponding to selection of option 742*a*-2.

Any of the features, components, and/or parts, including the arrangements and configurations thereof shown in FIGS. 1B-IP can be included, either alone or in any combination, in HMD X700-1, HMD X700-2, and/or HMD X700-3. For example, in some embodiments, HMD X700-1, HMD X700-1, and/or HMD X700-3 include any of the features, components, and/or parts of HMD 1-100, 1-200, 3-100, 6-100, 6-200, 6-300, 6-400, 11.1.1-100, and/or 11.1.2-100, cither alone or in any combination. In some embodiments, display module X702-1, display module X702-2, and/or display module X702-3 include any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, cither alone or in any combination. In some embodiments, HMD X700-1, HMD X700-2, and/or HMD X700-3 include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, cither alone or in any combination. In some embodiments, HMD X700-1, HMD X700-2, and/or HMD X700-3 include one or more input devices, which include any of the features, components, and/or parts of any of first button 1-128, button 11.1.1-114, second button 1-132, and or dial or button 1-328, either alone or in any combination. In some embodiments, HMD X700-1, HMD X700-2, and/or HMD X700-3 include one or more audio output components (e.g., electronic component 1-112) for generating audio feedback (e.g., audio output), optionally generated based on detected events and/or user inputs detected by the HMD X700-1, HMD X700-2, and/or HMD X700-3.

At FIG. 7S, the view of three-dimensional environment 708-1 displayed on electronic device 700-1 has changed. In some embodiments, electronic device 700-1 is a head-mounted system, and the view of three-dimensional environment 708-1 displayed on electronic device 700-1 changes as the user of electronic device 700-1 moves within a physical environment that surrounds electronic device 700-1 (e.g., as the user of electronic device 700-1 turns his or her head and/or turns his or her body; and/or as the user moves from one position in the physical environment to a different position in the physical environment). In FIG. 7S, the user of electronic device 700-1 has moved from one position in a physical environment to a different position in the physical environment, and the view of three-dimensional environment 708-1 displayed by electronic device 700-1 has moved accordingly such that electronic device 700-1 now shows content window 756-1, which was previously out of view. Additionally, because electronic device 700-1 is now in the spatially-flexible representation mode, the representation of the user of electronic device 700-1 moves within the shared three-dimensional environment, and electronic device 700-2 shows spatially-flexible representation 718*c*-2 moving from a first position within three-dimensional environment 708-2 to a second position within three-dimensional environment 708-2 based on movement by the user of electronic device 700-1. On electronic device 700-3, representation 718*a*-3 does not change positions within three-dimensional environment 718-3, and remains within boundary 718*b*-3, because electronic device 700-3 is still in the spatially-constrained representation mode.

At FIG. 7T, the user of electronic device 700-1 has moved back to their previous position (e.g., their previous position in a physical environment that surrounds electronic device 700-1) and, in response, electronic device 700-2 displays spatially-flexible representation 718*e*-2 move back to a position to the right of spatially-constrained representation 714-2. The view of three-dimensional environment 708-1 displayed on electronic device 700-1 has also changed so that electronic device 700-1 displays spatially-flexible representation 716*e*-1 next to spatially-constrained representation 714-1. At FIG. 7T, electronic device 700-1 detects user input 758 corresponding to selection of control 712*c*-1. In the depicted embodiment, user input 758 is a touch input via touch-sensitive display 702-1. However, in some embodiments, user input 758 is a non-touch input, such as a gesture or other action taken by a user. For example, in some embodiments, electronic device 700-1 is a head-mounted system, and user input 758 includes, for example, a gaze input directed to control 712*c*-1 (e.g., the user looking at control 712*c*-1) while the user performs an air gesture (e.g., a pinch air gesture). In some embodiments, user input 758 corresponding to selection of control 712*c*-1 represents a user request to share a viewpoint of the user of electronic device 700-1 into the real-time communication session.

At FIG. 7U, in response to detecting user input 758, electronic device 700-1 displays user interface 760-1, which prompts the user of electronic device 700-1 to confirm their request to share their viewpoint into the real-time communication session. User interface 760-1 includes option 760*a*-1 that is selectable to initiate viewpoint sharing, and option 760*b*-1 that is selectable to cease display of user interface 760-1 without sharing the viewpoint of the user of electronic device 700-1 into the real-time communication session. At FIG. 7U, electronic device 700-1 detects user input 762 corresponding to selection of option 760*a*-1. In the depicted embodiment, user input 762 is a touch input via touch-sensitive display 702-1. However, in some embodiments, user input 762 is a non-touch input, such as a gesture or other action taken by a user. For example, in some embodiments, electronic device 700-1 is a head-mounted system, and user input 762 includes, for example, a gaze input directed to option 760*a*-1 (e.g., the user looking at option 760*a*-1) while the user performs an air gesture (e.g., a pinch air gesture).

At FIG. 7V1, in response to detecting user input 762, electronic device 700-1 begins sharing the viewpoint of the user of electronic device 700-1 (e.g., begins sharing content displayed by display 702-1 of electronic device 700-1) into the real-time communication session. Electronic device 700-1 displays brackets 766-1 indicating that the user is sharing content (e.g., his or her viewpoint) into the real-time communication session. Furthermore, in response to user input 762, electronic device 700-2 displays window 764-2 within three-dimensional environment 708-2 which displays the content being shared by electronic device 700-1, and electronic device 700-3 displays window 764-3, which also displays the content being shared by electronic device 700-1. In the depicted embodiment, because electronic device 700-2 is in the spatially-flexible representation mode, window 764-2 is displayed within three-dimensional environment 708-2 without affecting the spatial positions of spatially-constrained representation 714-2 or spatially-flexible representation 718e-2 within three-dimensional environment 708-2. However, due to electronic device 700-3 being in the spatially-constrained representation mode, electronic device 700-3 moves spatially-constrained representations 716-3, 718-3 to the side, and makes them smaller in size, and displays window 764-3 in a display region that was previously being occupied by spatially-constrained representation 716-3 and/or spatially-constrained representation 718-3. In some embodiments, window 764-2 is displayed as an environment-locked object within three-dimensional environment 708-2, and window 764-3 is displayed as an environment-locked object within three-dimensional environment 708-3.

In some embodiments, the techniques and user interface(s) described in FIGS. 7A-7LL are provided by one or more of the devices described in FIGS. 1A-IP. For example, FIG. 7V2 illustrates an embodiment in which a viewpoint of a user of HMD X700-1 (e.g., as described in FIG. 7V1) is displayed on display module X702-1 of head-mounted device (HMD) X700-1. In some embodiments, device X700-1 includes a pair of display modules that provide stereoscopic content to different eyes of the same user. For example, HMD X700-1 includes display module X702-1 (which provides content to a left eye of the user) and a second display module (which provides content to a right eye of the user). In some embodiments, the second display module displays a slightly different image than display module X702-1 to generate the illusion of stereoscopic depth.

At FIG. 7V2, in response to detecting user input 762, HMD X700-1 begins sharing the viewpoint of the user of HMD X700-1 (e.g., begins sharing content displayed by display X702-1 of HMD X700-1) into the real-time communication session. HMD X700-1 displays brackets 766-1 indicating that the user is sharing content (e.g., his or her viewpoint) into the real-time communication session. Furthermore, in response to user input 762, HMD X700-2 displays window 764-2 within three-dimensional environment 708-2 which displays the content being shared by HMD X700-1, and HMD X700-3 displays window 764-3, which also displays the content being shared by HMD X700-1. In the depicted embodiment, because HMD X700-2 is in the spatially-flexible representation mode, window 764-2 is displayed within three-dimensional environment 708-2 without affecting the spatial positions of spatially-constrained representation 714-2 or spatially-flexible representation 718e-2 within three-dimensional environment 708-2. However, due to HMD X700-3 being in the spatially-constrained representation mode, HMD X700-3 moves spatially-constrained representations 716-3, 718-3 to the side, and makes them smaller in size, and displays window 764-3 in a display region that was previously being occupied by spatially-constrained representation 716-3 and/or spatially-constrained representation 718-3. In some embodiments, window 764-2 is displayed as an environment-locked object within three-dimensional environment 708-2, and window 764-3 is displayed as an environment-locked object within three-dimensional environment 708-3.

In some embodiments, HMD X700-1, HMD X700-2, and/or HMD X700-3 detect one or more inputs (e.g., user inputs) based on an air gesture performed by a user of HMD X700-1, HMD X700-2, and/or HMD X700-3. In some embodiments, HMD X700-1, HMD X700-2, and/or HMD X700-3 detect hands X750A and/or X750B of the user of HMD X700-1, HMD X700-2, and/or HMD X700-3 and determine whether motion of hands X750A and/or X750B perform a predetermined air gesture corresponding to an input. In some embodiments, the predetermined air gesture includes a pinch gesture. In some embodiments, the pinch gesture includes detecting movement of finger X750C and thumb X750D toward one another. In some embodiments, HMD X700-1, HMD X700-2, and/or HMD X700-3 detect an input based on a gaze and air gesture input performed by the user of HMD X700-1, HMD X700-2, and/or HMD X700-3. In some embodiments, the gaze and air gesture input includes detecting that the user of HMD X700-1, HMD X700-2, and/or HMD X700-3 is looking at a selectable object (e.g., for more than a predetermined amount of time) and hands X750A and/or X750B of the user of HMD X700-1, HMD X700-2, and/or HMD X700-3 perform a pinch gesture. For instance, in some embodiments, at FIG. 7U, HMD X700-1 detects hands X750A and/or X750B of a user of HMD X700-1 and determines that hands X750A and/or X750B perform a predetermined gesture (e.g., a gaze and pinch gesture) corresponding to selection of option 760a-1. In some embodiments, at FIG. 7W, HMD X700-3 detects hands X750A and/or X750B of a user of HMD X700-3 and determines that hands X750A and/or X750B perform a predetermined gesture (e.g., a gaze and pinch gesture) corresponding to selection of control 712c-3. In some embodiments, at FIG. 7X, HMD X700-3 detects hands X750A and/or X750B of a user of HMD X700-3 and determines that hands X750A and/or X750B perform a predetermined gesture (e.g., a gaze and pinch gesture) corresponding to selection of option 760a-3. In some embodiments, at FIG. 7Y, HMD X700-3 detects hands X750A and/or X750B of a user of HMD X700-3 and determines that hands X750A and/or X750B perform a predetermined gesture (e.g., a gaze and pinch gesture) corresponding to selection of indication 711-3. In some embodiments, at FIG. 7Z, HMD X700-3 detects hands X750A and/or X750B of a user of HMD X700-3 and determines that hands X750A and/or X750B perform a predetermined gesture (e.g., a gaze and pinch gesture) corresponding to selection of control 772h. In some embodiments, at FIG. 7AA, HMD X700-3 detects hands X750A and/or X750B of a user of HMD X700-3 and determines that hands X750A and/or X750B perform a predetermined gesture (e.g., a gaze and pinch gesture) corresponding to selection of control 712e-3. In some embodiments, at FIG. 7BB, HMD X700-3 detects hands X750A and/or X750B of a user of HMD X700-3 and determines that hands X750A and/or X750B perform a predetermined gesture (e.g., a gaze and pinch gesture) corresponding to selection of option 742a-3. In some embodiments, at FIG. 7DD, HMD X700-2 detects hands X750A and/or X750B of a user of HMD X700-2 and determines that hands X750A and/or X750B perform a predetermined gesture (e.g., a gaze and pinch gesture) corresponding to selection of indication 711-2. In some embodiments, at FIG. 7EE, HMD X700-2 detects hands X750A and/or X750B of a user of HMD X700-2 and determines that hands X750A and/or X750B perform a predetermined gesture (e.g., a gaze and pinch gesture) corresponding to selection of control 772g-2.

Any of the features, components, and/or parts, including the arrangements and configurations thereof shown in FIGS. 1B-1P can be included, either alone or in any combination, in HMD X700-1, HMD X700-2, and/or HMD X700-3. For example, in some embodiments, HMD X700-1, HMD X700-1, and/or HMD X700-3 include any of the features, components, and/or parts of HMD 1-100, 1-200, 3-100,

6-100, 6-200, 6-300, 6-400, 11.1.1-100, and/or 11.1.2-100, either alone or in any combination. In some embodiments, display module X702-1, display module X702-2, and/or display module X702-3 include any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700-1, HMD X700-2, and/or HMD X700-3 include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700-1, HMD X700-2, and/or HMD X700-3 include one or more input devices, which include any of the features, components, and/or parts of any of first button 1-128, button 11.1.1-114, second button 1-132, and or dial or button 1-328, either alone or in any combination. In some embodiments, HMD X700-1, HMD X700-2, and/or HMD X700-3 include one or more audio output components (e.g., electronic component 1-112) for generating audio feedback (e.g., audio output), optionally generated based on detected events and/or user inputs detected by the HMD X700-1, HMD X700-2, and/or HMD X700-3.

FIG. 7V3 depicts an embodiment in which, when a user chooses to share his or her viewpoint into the real-time communication session, representations of other users cease to be displayed on the user's device. At FIG. 7V3, in response to detecting user input 762 in FIG. 7U, HMD X700-1 ceases display of representation 716*e*-1 and representation 714*b*-1 and begins sharing the viewpoint of the user of HMD X700-1 (e.g., begins sharing content displayed by display X702-1 of HMD X700-1) into the real-time communication session. HMD X700-1 displays brackets 766-1 indicating that the user is sharing content (e.g., his or her viewpoint) into the real-time communication session. While the depicted embodiments show brackets 766-1, other embodiments display a different indication that the user is sharing his or her viewpoint into the real-time communication session, such as a glowing board, a circular view (e.g., a porthole), and/or a different boundary or visual indication. Furthermore, in response to user input 762, HMD X700-2 displays window 764-2 within three-dimensional environment 708-2 which displays the content being shared by HMD X700-1, and HMD X700-3 displays window 764-3, which also displays the content being shared by HMD X700-1. It can be seen that in FIG. 7V3, windows 764-2, 764-3 do not show representations of the users of HMD X700-2 and HMD X700-3, because HMD X700-1 has ceased display of those representations.

Furthermore, in the embodiment depicted in FIG. 7V3, when a user chooses to share his or her viewpoint into the real-time communication session, the representation of the user that is visible and/or displayed on other devices changes from a higher fidelity representation to a lower fidelity representation. For example, in FIG. 7V3, in response to detecting user input 762 in FIG. 7U, HMD X700-1 causes HMD X700-2 to replace display of representation 718*c*-2 to represent the user of HMD X700-1 with representation 718*e*-2*a* to represent the user of HMD X700-1. In some embodiments, representation 718*e*-2 is an anthropomorphic representation of the user of HMD X700-1 that has a plurality of points of movement that correspond to detected movement by the user of HMD X700-1, and representation 718*c*-2*a* is a non-anthropomorphic representation that has fewer points of movement that correspond to detected movement by the user of HMD X700-1. Similarly, in FIG. 7V3, in response to detecting user input 762 in FIG. 7U, HMD X700-1 causes HMD X700-3 to replace display of representation 718-3 to represent the user of HMD X700-1 with representation 718-3*a* to represent the user of HMD X700-1. In some embodiments, representation 718-3 is an anthropomorphic representation of the user of HMD X700-1 that has a plurality of points of movement that correspond to detected movement by the user of HMD X700-1, and representation 718-3*a* is a non-anthropomorphic representation that has fewer points of movement that correspond to detected movement by the user of HMD X700-1.

At FIG. 7W, the view of three-dimensional environment 708-1 displayed by electronic device 700-1 changes (e.g., based on movement by the user of electronic device 700-1) (e.g., the user turning his or her head and/or turning his or her body). The change in view is also reflected and/or mirrored in window 764-2 displayed on electronic device 700-2 and window 764-3 displayed on electronic device 700-3. At FIG. 7W, electronic device 700-3 detects user input 767 corresponding to selection of control 712*c*-3. In the depicted embodiment, user input 767 is a touch input via touch-sensitive display 702-3. However, in some embodiments, user input 767 is a non-touch input, such as a gesture or other action taken by a user. For example, in some embodiments, electronic device 700-3 is a head-mounted system, and user input 767 includes, for example, a gaze input directed to control 712*c*-3 (e.g., the user looking at control 712*c*-3) while the user performs an air gesture (e.g., a pinch air gesture).

At FIG. 7X, in response to detecting user input 767, electronic device 700-3 displays user interface 760-3, which includes option 760*a*-3 that is selectable to start viewpoint sharing, and option 760*b*-3 that is selectable to cease displayer of user interface 760-3 without initiating viewpoint sharing. At FIG. 7X, electronic device 700-3 detects user input 768 corresponding to selection of option 760*a*-3. In the depicted embodiment, user input 768 is a touch input via touch-sensitive display 702-3. However, in some embodiments, user input 768 is a non-touch input, such as a gesture or other action taken by a user. For example, in some embodiments, electronic device 700-3 is a head-mounted system, and user input 768 includes, for example, a gaze input directed to option 760*a*-3 (e.g., the user looking at option 760*a*-3) while the user performs an air gesture (e.g., a pinch air gesture).

At FIG. 7Y, in response to detecting user input 768, electronic device 700-3 begins sharing the viewpoint of the user of electronic device 700-3 (e.g., begins sharing content displayed by display 702-3 of electronic device 700-3) into the real-time communication session. Electronic device 700-3 displays brackets 766-3 indicating that the user is sharing content (e.g., his or her viewpoint) into the real-time communication session. Electronic device 700-3 also ceases display of window 764-3, and moves spatially-constrained representations 718-3, 716-3 back to their previous display positions. Furthermore, based on electronic device 700-3 sharing content into the real-time communication session, electronic device 700-1 stops sharing its viewpoint into the real-time communication session. Additionally, in response to user input 762, electronic device 700-2 displays content shared by electronic device 700-3 in window 764-2 (rather than content shared by electronic device 700-1), and electronic device 700-1 displays window 764-1 at a spatial position within three-dimensional environment 708-1. Window 764-1 also displays the content being shared by electronic device 700-3 (e.g., the viewpoint of electronic device 700-3). At FIG. 7Y, electronic device 700-3 detects user input 770 directed to indication 711-3. In some embodiments, user input 770 is a gaze input direct towards indication 711-3 (e.g., the user gazing at and/or looking at indication 711-3).

At FIG. 7Z, in response to detecting user input 770, electronic device 700-3 displays user interface 772. In some embodiments, user interface 772 is a system user interface that is displayed in response to a user looking at a predetermined display position (e.g., corresponding to the position of indication 711-3). User interface 772 includes controls 772*a*-772*i*. Control 772 corresponds to and performs the same function as control 712*a*-3. Control 772*b* corresponds to and performs the same function as control 712*d*-3. Control 772*c* corresponds to and performs the same function as control 712*b*-3. Control 772 corresponds to and performs the same function as control 712*c*-3. Control 772*g* corresponds to and performs the same function as control 712*e*-3. By displaying these controls in system user interface 772, a user can either perform these related functions by interacting with user interface 712-3, or by invoking and interacting with system user interface 772. This is particularly useful in some situations where user interface 712-3 is not displayed. For example, in some embodiments, when all participants in a real-time communication session are in the spatially-flexible representation mode, the corresponding electronic devices do not display controls 712*a*-712*e* (e.g., electronic device 700-3 does not display controls 712*a*-3, 712*b*-3, 712*c*-3, 712*d*-3, and/or 712*e*-3; electronic device 700-2 does not display controls 712*a*-2, 712*b*-2, 712*c*-2, 712*d*-2, and/or 712*e*-2; and/or electronic device 700-1 does not display controls 712*a*-1, 712*b*-1, 712*c*-1, 712*d*-1, and/or 712*e*-1), such that a user can only access these controls by invoking user interface 772. Control 772*e* can be interacted with by a user to modify a display brightness setting. Control 772*f* can be interacted with by a user to modify a volume setting. Control 772*h* is selectable to stop sharing the viewpoint of electronic device 700-3 into the real-time communication session. In some embodiments while viewpoint sharing, a user can also stop viewpoint sharing by selecting control 772*d* or control 712*c*-3. Control 772*i* is selectable to cease display of user interface 772. At FIG. 7Z, electronic device 700-3 detects user input 774 corresponding to selection of control 772*h*. In the depicted embodiment, user input 774 is a touch input via touch-sensitive display 702-3. However, in some embodiments, user input 774 is a non-touch input, such as a gesture or other action taken by a user. For example, in some embodiments, electronic device 700-3 is a head-mounted system, and user input 774 includes, for example, a gaze input directed to control 772*h* (e.g., the user looking at control 772*h*) while the user performs an air gesture (e.g., a pinch air gesture).

At FIG. 7AA, in response to detecting user input 774, electronic device 700-3 stops sharing content into the real-time communication session, and ceases displaying brackets 766-3. Furthermore, based on user input 774, and based on no devices sharing content into the real-time communication session, electronic device 700-1 ceases display of window 764-1, and electronic device 700-2 ceases display of window 764-2. At FIG. 7AA, electronic device 700-3 detects user input 776 corresponding to selection of control 712*e*-3. In the depicted embodiment, user input 776 is a touch input via touch-sensitive display 702-3. However, in some embodiments, user input 776 is a non-touch input, such as a gesture or other action taken by a user. For example, in some embodiments, electronic device 700-3 is a head-mounted system, and user input 766 includes, for example, a gaze input directed to control 712*e*-3 (e.g., the user looking at control 712*e*-2) while the user performs an air gesture (e.g., a pinch air gesture).

At FIG. 7BB, in response to detecting user input 776, electronic device 700-3 displays user interface 742-3, which asks the user to confirm his or her request to transition from the spatially-constrained representation mode to the spatially-flexible representation mode. User interface 742-3 also indicates that there is a maximum number of participants that can be participate in the spatially-flexible representation mode (which, in the depicted embodiment, is five total participants). User interface 742-3 includes option 742*a*-3 that is selectable to confirm the request to transition to the spatially-flexible representation mode, and option 724*b*-3 that is selectable to cancel the request and cease display of user interface 742-3. At FIG. 7BB, electronic device 700-3 detects user input 778 corresponding to selection of option 742*a*-3. In the depicted embodiment, user input 778 is a touch input via touch-sensitive display 702-3. However, in some embodiments, user input 778 is a non-touch input, such as a gesture or other action taken by a user. For example, in some embodiments, electronic device 700-3 is a head-mounted system, and user input 778 includes, for example, a gaze input directed to option 742*a*-3 (e.g., the user looking at option 742*a*-3) while the user performs an air gesture (e.g., a pinch air gesture).

At FIG. 7CC, in response to detecting user input 778, electronic device 700-3 displays countdown timer 746-3 that counts down a predetermined amount of time (e.g., three seconds) until electronic device 700-3 transitions to the spatially-flexible representation mode. At FIG. 7DD, after passage of the predetermined amount of time, electronic device 700-3 ceases display of countdown timer 746-3, and transitions into the spatially-flexible representation mode. Electronic device 700-3, now in the spatially-flexible representation mode, displays spatially-flexible representation 718*e*-3 representative of the user of electronic device 700-1, and spatially-flexible representation 716*e*-3 representative of the user of electronic device 700-2. Furthermore, in response to electronic device 700-3 transitioning into the spatially-flexible representation mode, electronic device 700-1 replaces display of spatially-constrained representation 714-1 with spatially-flexible representation 714*e*-1, and electronic device 700-2 replaces display of spatially-constrained representation 714-2 with spatially-flexible representation 714*e*-2. All three participants in the real-time communication session are now free to move around the shared three-dimensional environment (e.g., three-dimensional environments 708-1, 708-2, and 708-3) with their spatially-flexible representations. Additionally, in FIG. 7DD, based on all participants being in the spatially-flexible representation mode, electronic devices 700-1, 700-2, 700-3 cease display of controls 712*a*-712*e* (e.g., 712*a*-1, 712*a*-2, 712*a*-3, 712*b*-1, 712*b*-2, 712*b*-3, 712*c*-1, 712*c*-2, 712*c*-3, 712*d*-1, 712*d*-2, 712*d*-3, 712*e*-1, 712*e*-2, and 712*e*-3). These controls can be accessed by invoking a system user interface (e.g., by looking at indication 711-1, 711-2, and/or 711-3).

At FIG. 7DD, electronic device 700-2 detects user input 779. In some embodiments, user input 779 is a gaze input directed at indication 711-2.

At FIG. 7EE, in response to detecting user input 779, electronic device 700-2 displays user interface 772-2. User interface 772-2 includes controls **772*a*-2, 772*b*-2, 772*c*-2, 772*d*-2, 772*e*-2, 772*f*-2, 772*g*-2, and 772*i*-2. Control 772*a*-2 performs the same function as control 772*a*, described above. Control 772*b*-2 performs the same function as control 772*b*, described above. Control 772*c*-2 performs the same function as control 772*c*, described above. Control 772*d*-2 performs the same function as control 772*d*, described above. Control 772*c*-2 performs the same function as control 772*e*, described above. Control 772*f*-2 performs the same function as control 772*f*, described above. Control 772*g*-2 performs the same function as control 772*g*, described above. Control 772*i*-2 performs the same function as control 772*i*, described above. At FIG. 7EE, electronic device 700-2 detects user input 780 corresponding to selection of control 772*g*-2. In some embodiments, user input 780 corresponds to a user request to transition from the spatially-flexible representation mode to the spatially-constrained representation mode. In some embodiments, in response to user input 780, electronic device 700-2 exits the spatially-flexible representation mode such that electronic device 700-2 displays spatially-constrained representations of the users of electronic device 700-1 and electronic device 700-3, and the user of electronic device 700-2 is represented with a spatially-constrained representation on electronic device 700-1 and electronic device 700-3**.

FIG. 7FF depicts an example scenario in which a new participant joins the real-time communication session. In response to detecting that a new participant has joined the real-time communication session, electronic device 700-1 displays notification 782-1, electronic device 700-2 displays notification 78-2, and electronic device 700-3 displays notification 782-3. Furthermore, in the depicted scenario, the new participant results in the total number of participants exceeding a threshold number of participants for the spatially-flexible representation mode. In some embodiments, when greater than a threshold number of participants are in a real-time communication session, the spatially-flexible representation mode is not available for any participants in the real-time communication session. In some embodiments, if one or more participants were in the spatially-flexible representation mode prior to the new participant joining (and the number of participants consequently exceeding the threshold number), the one or more participants that were previously in the spatially-flexible representation mode are transitioned automatically into the spatially-constrained representation mode. In FIG. 7FF, based on a determination that the number of participants in the real-time communication session now exceed the threshold number, electronic device 700-1 displays notification 784-1 indicating that the spatially-flexible representation mode is unavailable; and electronic device 700-2 and electronic device 700-3 display similar notifications 784-2, 784-3, respectively.

FIG. 7GG depicts an example scenario in which greater than the threshold number of participants are participating in the real-time communication session. In FIG. 7GG, all participants are in the spatially-constrained representation mode. Electronic device 700-1 displays spatially-constrained representations 716-1, 714-1, **790*a*-1, 790*b*-1, 790*c*-1, and 790*d*-1, and control 712*e*-1 is displayed in a visual manner indicating that it is disabled and/or cannot be selected. Electronic device 700-2 displays spatially-constrained representations 718-2, 714-2, 790*a*-2, 790*b*-2, 790*c*-2, and 790*d*-2, and control 712*e*-2 is displayed in a visual manner indicating that it is disabled and/or cannot be selected. Electronic device 700-3 displays spatially-constrained representations 716-3, 718-3, 790*a*-3, 790*b*-3, 790*c*-3, and 790*d*-3, and control 712*e*-3** is displayed in a visual manner indicating that it is disabled and/or cannot be selected.

FIGS. 7HH-7LL depict example scenarios and embodiments in which a user shares a content window (e.g., rather than sharing their viewpoint, as was previously discussed above with reference to FIGS. 7U-7Z). As discussed above, in some embodiments, the features described herein are applicable to head-mounted devices. Accordingly, in FIGS. 7HH-7LL, electronic devices 700-1, 700-2, 700-3 are shown as head-mounted devices (HMDs) X700-1, X700-2, X700-3, as described previously. At FIG. 7HH, the user of HMD X700-1 is looking at word processing window 777-1 while participating in the real-time communication session in the spatially-flexible representation mode. The user of HMD X700-1 is looking at word processing window 777-1 as private content that is not shared with other users in the real-time communication session. In the depicted embodiments, because the users of HMD X700-1 and HMD X700-2 are participating in the real-time communication session in the spatially-flexible representation mode (and, for example, are sharing the same three-dimensional environment 708-1, 708-2), HMD X700-2 displays window 777-2 that corresponds to and/or represents window 777-1. For example, in some embodiments, window 777-2 has the same size and/or spatial position within three-dimensional environment 708-2 as window 777-1 does within three-dimensional environment 708-1. However, because window 777-1 is a private window, window 777-2 does not display the contents of window 777-1. Furthermore, in the depicted embodiment, because HMD X700-3 is participating in the real-time communication session in the spatially-constrained representation mode, HMD X700-3 does not display a representation of window 777-1. At FIG. 7HH, HMD X700-1 detects user input 781-1 corresponding to selection of option 779-1 (e.g., one or more gaze inputs and/or one or more air gesture inputs via hand X750A (e.g., a pinch air gesture while the user gazes at option 779-1)).

At FIG. 7II, in response to user input 781-1, HMD X700-1 shares the contents of window 777-1 into the real-time communication session, which causes window 777-2 on HMD X700-2 to display the contents of window 777-1, and also causes HMD X700-3 to display window 777-3, which also displays the contents of window 777-1. In FIG. 7II, option 779-1 has switched from a "share" option (shown in FIG. 7HH) to a "stop sharing" option that is selectable to stop sharing the contents of window 777-1 into the real-time communication session. Furthermore, in the depicted embodiments, based on HMD X700-1 sharing the contents of window 777-1, and based on HMD X700-1 participating in the real-time communication session in the spatially-flexible representation mode, HMD X700-1 displays resizing option 783-1. A user is able to interact with resizing option 783-1 to resize window 777-1 within three-dimensional environment 708-1. In some embodiments, resizing window 777-1 within three-dimensional environment 708-1 causes window 777-2 to change in size within three-dimensional environment 708-2 in a corresponding manner (e.g., to maintain the same size and/or spatial position within three-dimensional environment 708-2 as window 777-1 has in three-dimensional environment 708-1). In some embodiments, because HMD X700-3 is participating in the real-time communication session in the spatially-constrained representation mode, resizing of window 777-1 on HMD X700-1 does not affect the size of window 777-3 on HMD X700-3. In the depicted embodiment, the users of HMD X700-2 and HMD X700-3 are not given the option to resize window 777-2 and/or window 777-3.

FIGS. 7JJ-7LL show another example scenario and embodiment in which HMD X700-3, which is participating in the real-time communication session in the spatially-constrained representation mode, shares a content window into the real-time communication session. At FIG. 7JJ, HMD X700-3 displays content window 785-3, along with option 787-3 that is selectable to share the contents of content window 785-3 into the real-time communication session. In FIG. 7JJ, content window 785-3 is displayed as a private window that is not being shared into the real-time communication session. As noted above, HMD X700-3 is participating in the real-time communication session in the spatially-constrained representation mode. Accordingly, HMD X700-1 and HMD X700-2 do not display representations of content window 785-3 while content window 785-3 is private. At FIG. 7JJ, HMD X700-3 detects user input 789-3 corresponding to selection of option 787-3 (e.g., one or more gaze inputs and/or one or more air gesture inputs via hand X750A-3 (e.g., a pinch air gesture while the user gazes at option 787-3)).

At FIG. 7KK, in response to user input 789-3, HMD X700-3 shares the contents of window 785-3 into the real-time communication session, which causes HMD X700-1 to display window 785-1, which shows the contents of window 785-3, and HMD X700-2 to display window 785-2, which also displays the contents of window 785-3. In FIG. 7LL, option 787-3 has switched from a "share" option to a "stop sharing" option that is selectable to stop sharing the contents of window 785-3 into the real-time communication session. In some embodiments, HMD X700-3 also displays sharing information which indicates which users in the real-time communication session HMD X700-3 are receiving and/or displaying the contents of window 785-3 (e.g., Ellie and Natalie). In FIG. 7KK, because HMD X700-3 is participating in the real-time communication session in the spatially-constrained representation mode, HMD X700-3 does not display the option to resize window 785-3 (and/or windows 785-1, 785-2) within the three-dimensional environment (e.g., 708-1 and/or 708-2). HMD X700-1 and HMD X700-2, which are participating in the real-time communication session in the spatially-flexible representation mode, display resizing options 789-1, 789-2, respectively, which allow the users of those HMDs to resize windows 785-1, 785-2 within three-dimensional environments 708-1, 708-2.

In some embodiments, rather than allowing users to determine the size of windows 785-1, 785-2 within three-dimensional environments 708-1, 708-2, respectively, the size of windows 785-1, 785-2 are determined automatically by electronic devices (e.g., HMDs) participating in the real-time communication session in the spatially-flexible representation mode (e.g., HMDs X700-1, X700-2 in FIG. 7KK). For example, in some embodiments, in response to user input 789-3 on HMD X700-3 in FIG. 7JJ, HMD X700-1 and/or HMD X700-2 automatically determine an appropriate size and spatial position for windows 785-1, 785-2 within three-dimensional environments 708-1, 708-2 (e.g., a size that is appropriate for viewing the contents of window 785-3, and a spatial position that does not overlap and/or interfere with other objects within three-dimensional environments 708-1 and/or 708-2). In accordance with this embodiment, FIG. 7LL displays an example in which none of HMDs X700-1, X700-2, and/or X700-3 display resizing options for resizing windows 785-1, 785-2, and/or 785-3.

Additional descriptions regarding FIGS. 7A-7LL are provided below in reference to methods 800, 900, 1000, 1100, and 1200, described with respect to FIGS. 7A-7LL.

FIG. 8 is a flow diagram of an exemplary method 800 for real-time communication, in accordance with some embodiments. In some embodiments, method 800 is performed at a computer system (e.g., 700-1, X700-1, 700-2, X700-2, 700-3, and/or X700-3) (e.g., computer system 101 in FIG. 1A) (e.g., a smart phone, a smart watch, a tablet, a laptop, a desktop, a wearable device, and/or head-mounted device) that is in communication with one or more display generation components (e.g., 702-1, X702-1, 702-2, X702-2, 702-3, and/or X702-3) (e.g., a visual output device, a 3D display, a display having at least a portion that is transparent or translucent on which images can be projected (e.g., a see-through display), a projector, a heads-up display, and/or a display controller) (and, optionally, one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial))). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system (e.g., 700-1, X700-1, 700-2, X700-2, 700-3, and/or X700-3) displays (802), via the one or more display generation components and within a three-dimensional environment (e.g., 708-1, 708-2, and/or 708-3) (e.g., physical environment, a virtual environment, a virtual passthrough environment, an optical passthrough environment, and/or a virtual environment that is representative of a physical environment that surrounds the computer system), a real-time communication user interface (e.g., 712-1, 712-2, and/or 712-3) (e.g., one or more representations of other participants in the real-time communication session, status information for the real-time communication session, and/or one or more controls for controlling functions of the real-time communication session) that corresponds to (e.g., displays elements of and/or facilitates) a real-time communication session (e.g., audio communication, video communication, text-based communication, graphics-based communication, and/or virtual communication) between a user of the computer system and one or more participants in the real-time communication session different from the user of the computer system (e.g., one or more users of one or more external computer system different from (e.g., separate from and/or remote from) the computer system).

The computer system (e.g., 700-1, X700-1, 700-2, X700-2, 700-3, and/or X700-3) displays (804), via the one or more display generation components, a first spatially-constrained (e.g., portal based or tile based) representation of a first participant (e.g., 716-1, 714-1, 714-2, 718-2, 718-3, and/or 716-3) of the one or more participants in the real-time communication session (in some embodiments, the first spatially-constrained representation of the first participant is also displayed by one or more external computer systems associated with at least some of the one or more other participants in the real-time communication session), wherein the first spatially-constrained representation (e.g., 716-1, 714-1, 714-2, 718-2, 718-3, and/or 716-3) of the first participant includes: a first portal (e.g., **716*b*-1, 714*b*-1, 714*b*-2, 718*b*-2, 718*b*-3, and/or 716*b*-3) that has a spatial position in the three-dimensional environment (e.g., 708-1, 708-2, and/or 708-3) (e.g., a 2D or 3D region, a tile, a shape, and/or a boundary) that is determined by the computer system (e.g., 700-1, X700-1, 700-2, X700-2, 700-3, and/or X700-3) (e.g., automatically selected by the computer system or selected based on inputs from a user of the computer system); and a first visual representation of the first participant (e.g., 716*a*-1, 714*a*-1, 714*a*-2, 718*a*-2, 718*a*-33, and/or 716-3**) that moves based on detected movement (e.g., detected by an external computer system associated with the first participant) of the first participant (e.g., movement of the first participant in a physical environment of the first participant), wherein the first visual representation is displayed at least partially (or fully) within the first portal; In some embodiments, the first portal is displayed within the three-dimensional environment, and the first visual representation is displayed within (e.g., partially within, substantially within, and/or completely within) the first portal.

While displaying the first spatially-constrained representation (e.g., 716-1, 714-1, 714-2, 718-2, 718-3, and/or 716-3) of the first participant within the real-time communication user interface, the computer system (e.g., 700-1, X700-1 700-2, X700-2, 700-3, and/or X700-3) detects (806) (e.g., via the one or more input devices) a request from a respective participant (e.g., the user of the computer system, the first participant, or a different participant) in the real-time communication session to transition from a spatially-constrained representation mode (e.g., a mode in which all participants in the real-time communication session are visually represented using spatially-constrained representations that are bound by portals) to a spatially-flexible representation mode (e.g., a mode in which at least some of the participants in the real-time communication session are visually represented using spatially-flexible representations that are not bounded by portals)) different from the spatially-constrained representation mode (e.g., FIGS. 7K-7Q).

In response to detecting the request from the respective participant in the real-time communication session to transition from the spatially-constrained representation mode to the spatially-flexible representation mode, the computer system (e.g., 700-1, X700-1, 700-2, X700-2, 700-3, and/or X700-3) displays (808), via the one or more display generation components, a first spatially-flexible representation of the first participant (e.g., **716*e*-1 and/or 718*e*-2) that moves based on detected movement (e.g., detected by an external computer system associated with the first participant) of the first participant (e.g., movement of the first participant in a physical environment of the first participant) and has a spatial position in the three-dimensional environment (e.g., 708-1, 708-2, and/or 708-3**) relative to one or more other objects in the three-dimensional environment (e.g., relative to a viewpoint of the user, relative to one or more virtual objects, relative to shared content, and/or relative to representations of one or more other participants in the real-time communication session) that is determined at least in part based on movement of the first participant. In some embodiments, the spatially-flexible representation of the first participant wasn't displayed prior to detecting the request from the respective participant in the real-time communication session to transition from the spatially-constrained representation mode to the spatially-flexible representation mode. In some embodiments, the first spatially-flexible representation of the first participant is displayed without the first portal. In some embodiments, the first spatially-flexible representation of the first participant is displayed within the three-dimensional environment without a visible border and/or frame surrounding (e.g., partially surrounding, substantially surrounding, and/or completely surrounding) the first spatially-flexible representation. In some embodiments, the first spatially-constrained representation has a limited range of motion and/or freedom of movement (e.g., the first portal has a fixed position within the three-dimensional environment and/or does not move within the three-dimensional environment based on detected movement by the first participant; and/or the first visual representation is restricted and/or prevented from moving outside of the first portal and/or beyond the boundaries of the first portal); and the first spatially-flexible representation has a greater range of motion and/or greater freedom of movement (e.g., the first spatially-flexible representation is configured to move within the three-dimensional environment and/or move from one position in the three-dimensional environment to another position in the three-dimensional environment based on detected movement of the first participant). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, prior to displaying the real-time communication user interface that corresponds to the real-time communication session between the user of the computer system and one or more participants in the real-time communication session different from the user of the computer system, the computer system (e.g., 700-1, X700-1, 700-2, X700-2, 700-3, and/or X700-3) receives, via one or more input devices, one or more user inputs corresponding to a user request to initiate the real-time communication session. In response to receiving the one or more user inputs corresponding to the user request to initiate the real-time communication session: the computer system (e.g., 700-1, X700-1, 700-2, X700-2, 700-3, and/or X700-3) displays, via the one or more display generation components and within the three-dimensional environment, the real-time communication user interface (e.g., 712-1, 712-2, and/or 712-3); and the first spatially-constrained representation of the first participant (e.g., 716-1, 714-1, 714-2, 718-2, 718-3, and/or 716-3). In some embodiments, when a real-time communication session is initiated, participants are represented using spatially-constrained representations. Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first visual representation of the first participant (e.g., **716*a*-1, 714*a*-1, 714*a*-2, 718*a*-2, 718*a*-3, and/or 716*a*-3**) is a three-dimensional representation that moves within the first portal based on detected movement of the first participant (e.g., as detected by one or more sensors of a first external device being used by the first participant). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the computer system (e.g., 700-1, X700-1, 700-2, X700-2, 700-3, and/or X700-3) displays, via the one or more display generation components and concurrently with the first spatially-constrained representation of the first participant (e.g., 716-1, 714-1, 714-2, 718-2, 718-3, and/or 716-3), a second spatially-constrained representation of a second participant (e.g., 716-1, 714-1, 714-2, 718-2, 718-3, and/or 716-3) of the one or more participants different from the first participant, wherein the second spatially-constrained representation of the first participant includes: a second portal (e.g., **716*b*-1, 714*b*-1, 714*b*-2, 718*b*-2, 718*b*-3, and/or 716*b*-3), and a second visual representation of the second participant (e.g., 716*a*-1, 714*a*-1, 714*a*-2, 718*a*-2, 718*a*-3, and/or 716*a*-3**) that moves based on detected movement of the second participant, wherein: the second visual representation is displayed at least partially within the second portal, and in accordance with a determination that the real-time communication session includes greater than a threshold number of participants (e.g., more than 4 participants, more than 5 participants, more than 6 participants, more than 7 participants, more than 8 participants, or more than 9 participants), the second portal does not have a spatial position in the three-dimensional environment (e.g., in some embodiments, the second portal is displayed as a viewpoint-fixed object, whereas the first portal is displayed within the three-dimensional environment as an environment-fixed object). Automatically displaying certain representations in a particular manner based on the number of participants in a communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first spatially-flexible representation (e.g., **716*e*-1 and/or 718*e*-2**) of the first participant does not include the first portal (e.g., the first spatially-flexible representation of the first participant is not surrounded by a frame). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first portal (e.g., **716*b*-1, 714*b*-1, 714*b*-2, 718*b*-2, 718*b*-3, and/or 716*b*-3) displays visual content (e.g., 716*c*-1, 714*c*-1, 714*c*-2, 718*c*-2, 718*c*-3, and/or 716*c*-3) that is determined at least in part based on one or more video feeds captured by one or more cameras (e.g., 704-1, 704-2, and/or 704-3**) of a first external device being used by the first participant. Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, in response to detecting the request from the respective participant in the real-time communication session to transition from the spatially-constrained representation mode to the spatially-flexible representation mode: the computer system (e.g., 700-1, X700-1, 700-2, X700-2, 700-3, and/or X700-3) displays the first spatially-flexible representation of the first participant (e.g., **716*e*-1 and/or 718*e*-2) at a first spatial position within the three-dimensional environment (e.g., 708-1, 708-2, and/or 708-3**). In some embodiments, in response to detecting the request from the respective participant in the real-time communication session to transition from the spatially constrained representation mode to the spatially-flexible representation mode, the computer system displays a second spatially-flexible representation of a second participant different from the first participant at a second spatial position within the three-dimensional environment different from the first spatial position. Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the first spatially-flexible representation of the first participant (e.g., **716*e*-1 and/or 718*e*-2**) is performed in accordance with a determination that at least two of the participants in the real-time communication session have requested to transition from the spatially-constrained representation mode to the spatially-flexible representation mode. In some embodiments, in order for any device participating in the real-time communication session to display spatially-flexible representations, at least two participants in the real-time communication session are required to request to transition to the spatially-flexible representation mode. In some embodiments, in response to detecting the request from the respective participant in the real-time communication session to transition from the spatially-constrained representation mode to the spatially-flexible representation mode, in accordance with a determination that fewer than two participants in the real-time communication session have requested to transition from the spatially-constrained representation mode to the spatially-flexible representation mode (e.g., only the respective user has requested to transition), the computer system maintains display of the first spatially-constrained representation and forgoes display of the first spatially-flexible representation (e.g., the computer system does not transition from the spatially-constrained representation mode to the spatially-flexible representation mode). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the first spatially-flexible representation of the first participant (e.g., 716*e*-1 and/or 718*e*-2) is performed in accordance with a determination that the user of the computer system has requested to transition from the spatially-constrained representation mode to the spatially-flexible representation mode (e.g., via one or more user inputs at the computer system and/or via selection of one or more displayed objects). In some embodiments, in order for the computer system to display spatially-flexible representations, the user of the computer system is required to have requested to transition to the spatially-flexible representation mode. In some embodiments, in response to detecting the request from the respective participant in the real-time communication session to transition from the spatially-constrained representation mode to the spatially-flexible representation mode, in accordance with a determination that the user of the computer system has not requested to transition from the spatially-constrained representation mode to the spatially-flexible representation mode, the computer system maintains display of the first spatially-constrained representation and forgoes display of the first spatially-flexible representation (e.g., the computer system does not transition from the spatially-constrained representation mode to the spatially-flexible representation mode). Switching to a spatially-flexible representation mode when the user of the computer system requests to switch to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, prior to detecting the request from the respective participant in the real-time communication session to transition from the spatially-constrained representation mode to the spatially-flexible representation mode, the computer system (e.g., 700-1, X700-1, 700-2, X700-2, 700-3, and/or X700-3) detects a request from the first participant to transition from the spatially-constrained representation mode to the spatially-flexible representation mode, wherein the respective participant is the user of the computer system (e.g., 700-1, X700-1, 700-2, X700-2, 700-3, and/or X700-3) (e.g., FIGS. 7K-7R1). In some embodiments, displaying the first spatially-flexible representation of the first participant is performed in accordance with a determination that at least two of the participants in the real-time communication session (e.g., including the user of the computer system) have requested to transition from the spatially-constrained representation mode to the spatially-flexible representation mode and the user of the computer system has requested to transition from the spatially-constrained representation mode to the spatially-flexible representation mode. Switching to a spatially-flexible representation mode when the user of the computer system requests to switch to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, prior to detecting the request from the respective participant in the real-time communication session to transition from the spatially-constrained representation mode to the spatially-flexible representation mode, the computer system (e.g., 700-1, X700-1, 700-2, X700-2, 700-3, and/or X700-3) detects a request from the user of the computer system to transition from the spatially-constrained representation mode to the spatially-flexible representation mode, wherein the respective participant is the first participant (e.g., FIGS. 7K-7R1). In some embodiments, displaying the first spatially-flexible representation of the first participant is performed in accordance with a determination that at least two of the participants in the real-time communication session (e.g., including the user of the computer system) have requested to transition from the spatially-constrained representation mode to the spatially-flexible representation mode and the user of the computer system has requested to transition from the spatially-constrained representation mode to the spatially-flexible representation mode. Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the first spatially-flexible representation of the first participant (e.g., 716*c*-1 and/or 718*c*-2), the computer system (e.g., 700-1, X700-1, 700-2, X700-2, 700-3, and/or X700-3) detects that less than a threshold number of participants (e.g., less than two, three, or four) in the real-time communication session have enabled the spatially-flexible representation mode (e.g., detecting that one or more participants (e.g., the first participant and/or the user of the computer system) that had previously enabled the spatially-flexible representation mode have disabled the spatially-flexible representation mode and/or have left the real-time communication session). In response to detecting that less than the threshold number of participants in the real-time communication session have enabled the spatially-flexible representation mode: the computer system (e.g., 700-1, X700-1, 700-2, X700-2, 700-3, and/or X700-3) ceases display of the first spatially-flexible representation of the first participant; and the computer system (e.g., 700-1, X700-1, 700-2, X700-2, 700-3, and/or X700-3) displays, via the one or more display generation components, the first spatially-constrained representation of the first participant (e.g., in some embodiments, in FIG. 7R1, if electronic device 700-1 or electronic device 700-2 left the spatially flexible representation mode, the other electronic device would also leave the spatially flexible representation mode and/or, in FIG. 7R2, if HMD X700-1 or HMD X700-2 left the spatially flexible representation mode, the other HMD would also leave the spatially flexible representation mode). Automatically switching to the spatially-constrained representation mode when less than a threshold number of participants have enabled the spatially-flexible representation mode allows for this operation to be performed with further user inputs, and enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first spatially-flexible representation of the first participant (e.g., 716e-1 and/or 718e-2), the computer system (e.g., 700-1, X700-1, 700-2, X700-2, 700-3, and/or X700-3) receives, via one or more input devices, a first set of user inputs (e.g., one or more touch inputs, one or more gesture inputs, one or more air gesture inputs, one or more gaze inputs, and/or one or more mechanical inputs) corresponding to a user request (e.g., from the user of the computer system) to transition from the spatially-flexible representation mode to the spatially-constrained representation mode (e.g., selection of option 712e-1 and/or 712e-2). In response to detecting the first set of user inputs: the computer system (e.g., 700-1, X700-1, 700-2, X700-2, 700-3, and/or X700-3) ceases display of the first spatially-flexible representation of the first participant (e.g., 716e-1 and/or 718e-2); and the computer system (e.g., 700-1, X700-1, 700-2, X700-2, 700-3, and/or X700-3) displays, via the one or more display generation components, the first spatially-constrained representation of the first participant (e.g., 716-1, 714-1, 714-2, 718-2, 718-3, and/or 716-3). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the first spatially constrained representation of the first participant (e.g., 716-1, 714-1, 714-2, 718-2, 718-3, and/or 716-3), the computer system (e.g., 700-1, X700-1, 700-2, X700-2, 700-3, and/or X700-3) receives, via one or more input devices, a second set of user inputs (e.g., one or more touch inputs, one or more gesture inputs, one or more air gesture inputs, one or more gaze inputs, and/or one or more mechanical inputs) corresponding to a user request (e.g., from the user of the computer system) to transition from the spatially-constrained representation mode to the spatially-flexible representation mode (e.g., selection of control 712e-1, 712e-2 or 712e-3). In response to receiving the second set of user inputs and in accordance with a determination that less than a threshold number of participants (e.g., less than two participants (e.g., including the user of the computer system)) in the real-time communication session have requested to transition from the spatially-constrained representation mode to the spatially-flexible representation mode, the computer system (e.g., 700-1, X700-1, 700-2, X700-2, 700-3, and/or X700-3) maintains display of the first spatially-constrained representation of the first participant (and, in some embodiments, forgoing transitioning from the spatially-constrained representation mode to the spatially-flexible representation mode) (e.g., 716-1, 714-1, 714-2, 718-2, 718-3, and/or 716-3) (e.g., FIGS. 701-7Q after electronic device 700-1 and/or HMD X700-1 has requested transition to the spatially-flexible representation mode). Subsequent to receiving the second set of user inputs, and while displaying the first spatially-constrained representation of the first participant, the computer system (e.g., 700-1, X700-1, 700-2, X700-2, 700-3, and/or X700-3) receives, via the one or more input devices a third set of user inputs (e.g., one or more touch inputs, one or more gesture inputs, one or more air gesture inputs, one or more gaze inputs, and/or one or more mechanical inputs) corresponding to a repeated user request (e.g., from the user of the computer system) to transition from the spatially-constrained representation mode to the spatially-flexible representation mode (e.g., selection of control 712e-1, 712e-2, and/or 712e-3). In response to receiving the third set of user inputs and in accordance with a determination that less than a threshold number of participants in the real-time communication session have requested to transition from the spatially-constrained representation mode to the spatially-flexible representation mode, the computer system (e.g., 700-1, X700-1, 700-2, X700-2, 700-3, and/or X700-3) displays a first indication that indicates that less than the threshold number of participants in the real-time communication session have requested to transition from the spatially-constrained representation mode to the spatially-flexible representation mode (e.g., displaying an indication that no one else in the real-time communication session has requested to transition from the spatially-constrained representation mode to the spatially-flexible representation mode) (and, in some embodiments, maintaining display of the first spatially-constrained representation of the first participant) (and, in some embodiments, forgoing transitioning from the spatially-constrained representation mode to the spatially-flexible representation mode). Displaying an indication that other users have not enabled the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the computer system (e.g., 700-1, X700-1, 700-2, X700-2, 700-3, and/or X700-3) displays, concurrently with the first indication, a spatial mode object (e.g., 712e-1, 712e-2, and/or 712e-3) that is selectable to cancel the user request to transition from the spatially-constrained representation mode to the spatially-flexible representation mode (e.g., selectable to indicate that the user no longer requests to transition from the spatially-constrained representation mode to the spatially-flexible representation mode). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while the computer system displays the first spatially-constrained representation of the first participant (e.g., 716-1, 714-1, 714-2, 718-2, 718-3, and/or 716-3) (e.g., while the computer system is operating in the spatially-constrained representation mode), the user of the computer system is visually represented by one or more external devices (e.g., 700-1, X700-1, 700-2, X700-2, 700-3, and/or X700-3) corresponding to the one or more participants in the real-time communication session in a first manner (e.g., with a spatially-constrained representation that includes a portal positioned in a three-dimensional environment and a visual representation of the user that is displayed at least partially within the portal and moves based on detected movement of the user). In some embodiments, while the computer system (e.g., 700-1, X700-1, 700-2, X700-2, 700-3, and/or X700-3) displays the first spatially-flexible representation of the first participant (e.g., 716e-1, 714e-1, 714e-2, 718e-2, 718c-3, and/or 716e-3) (e.g., while the computer system is operating in the spatially-flexible representation mode), the user of the computer system (e.g., 700-1, X700-1, 700-2, X700-2, 700-3, and/or X700-3) is visually representation by the one or more external devices in a second manner different from the first manner (e.g., with a spatially-flexible representation that moves based on detected movement of the user and has a spatial position in a three-dimensional environment relative to one or more other objects in the three-dimensional environment that is determined at least in part based on movement of the user). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the first spatially-constrained representation of the first participant (e.g., 716-1, 714-1, 714-2, 718-2, 718-3, and/or 716-3) (e.g., while the computer system is operating in the spatially-constrained representation mode), the computer system (e.g., 700-1, X700-1, 700-2, X700-2, 700-3, and/or X700-3) displays, via the one or more display generation components, a mode transition indication (e.g., 750-2 and/or 750-3) indicating that one or more participants in the real-time communication session have requested to transition from the spatially-constrained representation mode to the spatially-flexible representation mode (e.g., a graphical object and/or text indicating that one or more participants in the real-time communication session have requested to transition from the spatially-constrained representation mode to the spatially-flexible representation mode). Displaying an indication that indicates that one or more participants have requested to transition to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the mode transition indication (e.g., 750-2 and/or 750-3) is a first notification that is displayed in response to detecting a request from a first respective participant in the real-time communication session to transition from the spatially-constrained mode to the spatially-flexible representation mode. Displaying an indication that indicates that one or more participants have requested to transition to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the mode transition indication (e.g., 750-2 and/or 750-3) is persistently displayed (e.g., persists for more than a threshold duration of time; and/or continues to be displayed as the real-time communication user interface changes visually in one or more ways (e.g., as the real-time communication user interface is moved to a different position in the three-dimensional environment, and/or as the real-time communication user interface displays one or more other notifications (e.g., that one or more users have left and/or joined the communication session))) while one or more participants in the real-time communication session have requested to transition from the spatially-constrained representation mode to the spatially-flexible representation mode (e.g., while one or more participants in the real-time communication session maintain their request and/or do not cancel their request to transition from the spatially-constrained representation mode to the spatially-flexible representation mode). Displaying an indication that indicates that one or more participants have requested to transition to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the mode transition indication (e.g., 750-2 and/or 750-3) indicates how many participants have request to transition from the spatially-constrained representation mode to the spatially-flexible representation mode. Displaying an indication that indicates how many participants have requested to transition to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the mode transition indication (e.g., 750-2 and/or 750-3) indicates which participants of the one or more participants have request to transition from the spatially-constrained representation mode to the spatially-flexible representation mode. In some embodiments, displaying the mode transition indication comprises: in accordance with a determination that a first participant has requested to transition from the spatially-constrained representation mode to the spatially-flexible representation mode, displaying the mode transition indication with a first set of visual characteristics (e.g., with a first set of information, with a first set of text, at a first location, at a first size, and/or with a first color); and in accordance with a determination that a second participant different from the first participant has requested to transition from the spatially-constrained representation mode to the spatially-flexible representation mode, displaying the mode transition indication with a second set of visual characteristics (e.g., with a second set of information, with a second set of text, at a second location, at a second size, and/or with a second color) different from the first set of visual characteristics. Displaying an indication that indicates which participants have requested to transition to the spatially-flexible representation mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while displaying the first spatially-constrained representation of the first participant (e.g., 716-1, 714-1, 714-2, 718-2, 718-3, and/or 716-3) (e.g., while the computer system is operating in the spatially-constrained representation mode), the computer system (e.g., 700-1, X700-1, 700-2, X700-2, 700-3, and/or X700-3) displays, via the one or more display generation components, a mode transition object (e.g., 712*e*-1, 712*e*-2, and/or 712*e*-3) that is selectable by the user of the computer system to indicate a user request (e.g., by the user of the computer system) to transition from the spatially-constrained representation mode to the spatially-flexible representation mode, wherein: detecting the request from the respective participant in the real-time communication session to transition from the spatially-constrained representation mode to the spatially-flexible representation mode comprises detecting a selection input (e.g., one or more touch inputs, one or more gesture inputs, one or more air gesture inputs, one or more gaze inputs, and/or one or more mechanical inputs) corresponding to selection of the mode transition object. Displaying a selectable object to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the mode transition object comprises displaying the mode transition object (e.g., 712*e*-3) within the first portal (e.g., 714*b*-2 and/or 716*b*-3 in FIG. 7A). In some embodiments, displaying the mode transition object comprises: in accordance with a determination that the first participant is the only other participant in the real-time communication session, displaying the mode transition object within the first portal. Displaying a selectable object to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the mode transition object (e.g., 712*e*-1, 712*e*-2, and/or 712*e*-3) comprises displaying the mode transition object outside of the first portal (e.g., 716*b*-1, 714*b*-1, 714*b*-2, 718*b*-2, 718*b*-3, and/or 716*b*-3) (e.g., FIG. 7B1) (e.g., outside of any portal corresponding to any spatially-constrained representations of other participants in the real-time communication session). In some embodiments, displaying the mode transition object comprises: in accordance with a determination that there are a plurality of other participants in the real-time communication session, displaying the mode transition object outside of the first portal (e.g., outside of any portal corresponding to any spatially-constrained representations of other participants in the real-time communication session). Displaying a selectable object to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, in response to initiation of the real-time communication session (e.g., at the start of the real-time communication session), the computer system (e.g., 700-1, X700-1, 700-2, X700-2, 700-3, and/or X700-3) displays, via the one or more display generation components, the mode transition object (e.g., 712*e*-1, 712*e*-2, and/or 712*e*-3) and a notification identifying the mode transition object (e.g., directing the user's attention to the mode transition object and/or explaining the function of the mode transition object). In some embodiments, the notification identifying the mode transition object is temporarily displayed (e.g., ceases to be displayed after a threshold amount of time (e.g., after 3 seconds, after 5 seconds, or after 10 seconds). Displaying the notification identifying the mode transition object enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the mode transition object comprises: in accordance with a determination that the real-time communication session includes greater than a threshold number of participants (e.g., greater than 4 participants, greater than 5 participants, or greater than 6 participants), displaying the mode transition object (e.g., 712*e*-1, 712*e*-2, and/or 712*e*-3) in a first manner (e.g., with a first set of visual characteristics (e.g., color, opacity, saturation, sharpness, and/or contrast) indicating that the mode transition object is disabled (e.g., 712*e*-1, 712*e*-2, and/or 712*e*-3 in FIG. 7GG) (e.g., indicating that the spatially-flexible representation mode is not available). In some embodiments, displaying the mode transition object comprises: in accordance with a determination that the real-time communication session includes less than the threshold number of participants, displaying the mode transition object in a second manner (e.g., with a second set of visual characteristics (e.g., color, opacity, saturation, sharpness, and/or contrast) different from the first manner and indicating that the mode transition object is not disabled (e.g., is selectable) (e.g., indicating that the spatially-flexible representation mode is available). In some embodiments, while displaying the mode transition object in the first manner, the computer system receives a selection input corresponding to selection of the mode transition object; and in response to receiving the selection input, the computer system displays an indication that the spatially-flexible representation mode is not available (e.g., due to there being greater than the threshold number of participants in the real-time communication session). Displaying the mode transition object as a disabled object when greater than a threshold number of participants are in the real time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 700-1, X700-1, 700-2, X700-2, 700-3, and/or X700-3) detects, via one or more input devices, one or more gaze inputs directed to a predefined location (e.g., 711-1, 711-2, and/or 711-3) relative to a viewport into the three-dimensional environment of the computer system (e.g., a predefined location within the field of view of the user, the computer system, and/or one or more components of the computer system (e.g., one or more cameras of the computer system); a predefined display position of the one or more display generation components; and/or a predefined position within a three-dimensional environment) (e.g., one or more gaze inputs in which the user is looking at the predefined location). In response to detecting the one or more gaze inputs directed to the predefined location (e.g., 711-1, 711-2, and/or 711-3) relative to the viewport into the three-dimensional environment, the computer system (e.g., 700-1, X700-1, 700-2, X700-2, 700-3, and/or X700-3) displays, via the one or more display generation components, a system user interface (e.g., 772-2 and/or 772-3) (e.g., a user interface that is displayed concurrently with and/or overlaid on a representation of a three-dimensional environment (e.g., an optical passthrough environment or a virtual passthrough environment) (In some embodiments, a transparent and/or semi-transparent user interface.) that includes a plurality of controls pertaining to the real-time communication session (e.g., 772*a*-2, 772*b*-2, 77*c*-2, 772*d*-2, and/or 772*g*-3) (e.g., an end control that is selectable to end the real-time communication session; and/or a mode transition control that is selectable to indicate a user request (e.g., by the user of the computer system) to transition from the spatially-constrained representation mode to the spatially-flexible representation mode, to transition from the spatially-constrained representation mode to the spatially-flexible representation mode, and/or transition from the spatially-flexible representation mode to the spatially-constrained representation mode). Displaying a selectable object to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, in response to detecting the request from the respective participant in the real-time communication session to transition from the spatially-constrained representation mode to the spatially-flexible representation mode, the computer system (e.g., 700-1, X700-1, 700-2, X700-2, 700-3, and/or X700-3) displays, via the one or more display generation components, a first notice (e.g., 742 and/or 742-2) pertaining to the spatially-flexible representation mode (e.g., a first notice indicating that the spatially-flexible representation mode is limited to a threshold number of participants). Displaying the first notice enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first spatially-flexible representation of the first participant (e.g., 716*e*-1, 714*e*-1, 714*e*-2, 718*e*-2, 718*e*-3, and/or 716*e*-3) (e.g., while the computer system is operating in the spatially-flexible representation mode), the computer system (e.g., 700-1, X700-1, 700-2, X700-2, 700-3, and/or X700-3) detects that a new participant has joined the real-time communication session (e.g., FIG. 7FF). In response to detecting that the new participant has joined the real-time communication session: in accordance with a determination that the real-time communication session has greater than a threshold number of participants (e.g., greater than four participants, greater than five participants, greater than six participants, or greater than seven participants): ceasing display of the first spatially-flexible representation of the first participant (e.g., FIGS. 7FF-7GG); and displaying, via the one or more display generation components, the first spatially-constrained representation of the first participant (e.g., 716-1, 714-1, 714-2, 718-2, 718-3, and/or 716-3) (e.g., in some embodiments, transitioning from the spatially-flexible representation mode to the spatially-constrained representation mode). Automatically switching to the spatially-constrained representation mode when greater than the threshold number of participants join the real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 700-1, X700-1, 700-2, X700-2, 700-3, and/or X700-3) displays, via the one or more display generation components, a share view option (e.g., 712*c*-1, 712*c*-2, and/or 712*c*-3). While displaying share view option, the computer system (e.g., 700-1, X700-1, 700-2, X700-2, 700-3, and/or X700-3) detects, via one or more input devices, a selection input (e.g., one or more touch inputs, one or more gaze inputs, one or more gesture inputs, one or more air gesture inputs, and/or one or more mechanical inputs) corresponding to selection of the share view option. In response to detecting the selection input corresponding to selection of the share view option, the computer system (e.g., 700-1, X700-1, 700-2, X700-2, 700-3, and/or X700-3) causes one or more external devices corresponding to the one or more participants in the real-time communication session to display visual content (e.g., 764-1, 764-2, and/or 764-3) that corresponds to a viewpoint of the user of the computer system (e.g., visual content that depicts the viewpoint of the user of the computer system (e.g., as captured by one or more cameras of the computer system)). Providing the user with an option to share their view enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the visual content (e.g., 764-1, 764-2, and/or 764-3) that corresponds to the viewpoint of the user of the computer system (e.g., 700-1, X700-1, 700-2, X700-2, 700-3, and/or X700-3) is displayed on the one or more external devices (e.g., 700-1, X700-1, 700-2, X700-2, 700-3, and/or X700-3) concurrently with a spatially-flexible representation (e.g., 716*e*-1, 714*c*-1, 714*e*-2, 718*e*-2, 718*e*-3, and/or 716*e*-3) of the user of the computer system (e.g., 700-1, X700-1, 700-2, X700-2, 700-3, and/or X700-3) (e.g., a spatially-flexible representation that has a spatial position in a three-dimensional environment relative to one or more other objects in the three-dimensional environment and that is determined at least in part based on movement of the user of the computer system). Providing the user with an option to share their view enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first spatially-constrained representation of the first participant (e.g., 716-1, 714-1, 714-2, 718-2, 718-3, and/or 716-3) (e.g., while the computer system is operating in the spatially-constrained representation mode), the computer system (e.g., 700-1, X700-1, 700-2, X700-2, 700-3, and/or X700-3) displays, via the one or more display generation components, a mode object (e.g., 712*e*-1, 712*e*-2, and/or 712*e*-3) that is selectable by the user of the computer system to indicate a user request (e.g., by the user of the computer system) to transition from the spatially-constrained representation mode to the spatially-flexible representation mode. While displaying the mode object, the computer system (e.g., 700-1, X700-1, 700-2, X700-2, 700-3, and/or X700-3) detects a selection input (e.g., one or more touch inputs, one or more gesture inputs, one or more air gesture inputs, one or more gaze inputs, and/or one or more mechanical inputs) corresponding to selection of the mode object. In response to detecting the selection input corresponding to selection of the mode object, the computer system (e.g., 700-1, X700-1, 700-2, X700-2, 700-3, and/or X700-3) displays, via the one or more display generation components, a first visual indicator (e.g., 746, 746-2, 746-3, 712*e*-1, 712*e*-2, and/or 712*e*-3) (e.g., a visual indicator indicative of user selection of the mode object). Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first visual indicator (e.g., 712*e*-1, 712*e*-2, and/or 712*e*-3) is displayed in a system user interface (e.g., 772 and/or 772-2) (e.g., a user interface that is displayed concurrently with and/or overlaid on a representation of a three-dimensional environment (e.g., an optical passthrough environment or a virtual passthrough environment) (In some embodiments, a transparent and/or semi-transparent user interface) that includes a plurality of controls pertaining to the real-time communication session (e.g., 772*a*-2, 772*b*-2, 772*c*-2, 772*d*-2, and/or 772*g*-1) (e.g., an end control that is selectable to end the real-time communication session; and/or a mode transition control that is selectable to indicate a user request (e.g., by the user of the computer system) to transition from the spatially-constrained representation mode to the spatially-flexible representation mode, to transition from the spatially-constrained representation mode to the spatially-flexible representation mode, and/or transition from the spatially-flexible representation mode to the spatially-constrained representation mode). In some embodiments, the system user interface is a user interface that is displayed in response to one or more user gaze inputs directed to a predefined location relative to the viewport into the three-dimensional environment (e.g., a predefined location within the field of view of the user, the computer system, and/or one or more components of the computer system (e.g., one or more cameras of the computer system); a predefined display position of the one or more display generation components; and/or a predefined position within a three-dimensional environment). Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first visual indicator includes a countdown timer (e.g., 746 and/or 746-2) counting down until the transition from the spatially-constrained representation mode to the spatially-flexible representation mode occurs (e.g., a countdown timer counting down to the transition from the spatially-constrained representation mode to the spatially-flexible representation mode). Displaying a countdown timer enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provide the user with feedback about a state of the device.

In some embodiments, the first visual indicator includes a location indication that indicates where in the three-dimensional environment a spatially-flexible representation of the user of the computer system (e.g., 700-1, X700-1, 700-2, X700-2, 700-3, and/or X700-3) will be positioned (e.g., when the computer system transitions from the spatially-constrained representation mode to the spatially-flexible representation mode). Displaying the location indication enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provide the user with feedback about a state of the device.

In some embodiments, in response to detecting the request from the respective participant in the real-time communication session to transition from the spatially-constrained representation mode to the spatially-flexible representation mode, the computer system (e.g., 700-1, X700-1, 700-2, X700-2, 700-3, and/or X700-3) ceases display of the first spatially-constrained representation of the first participant (e.g., 716-1, 714-1, 714-2, 718-2, 718-3, and/or 716-3). Allowing a user to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, aspects/operations of methods 800, 900, 1000, 1100, and/or 1200 may be interchanged, substituted, and/or added between these methods. For example, the real-time communication user interface recited in method 800 is the real-time communication user interface recited in methods 900, 1000, 1100, and/or 1200. For brevity, these details are not repeated here.

FIG. 9 is a flow diagram of an exemplary method 900 for real-time communication, in accordance with some embodiments. In some embodiments, method 900 is performed at a computer system (e.g., 700-1, X700-1, 700-2, X700-2, 700-3, and/or X700-3) (e.g., computer system 101 in FIG. 1A) (e.g., a smart phone, a smart watch, a tablet, a laptop, a desktop, a wearable device, and/or head-mounted device) that is in communication with one or more display generation components (e.g., 702-1, X702-1, 702-2, X702-2, 702-3, and/or X702-3) (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown;

and/or a dial)). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

The computer system (e.g., 700-1, X700-1, 700-2, X700-2, 700-3, and/or X700-3) displays (902), via the one or more display generation components and within a first three-dimensional environment (e.g., 708-1, 708-2, and/or 708-3) (e.g., physical environment, a virtual environment, a virtual passthrough environment, an optical passthrough environment, and/or a virtual environment that is representative of a physical environment that surrounds the computer system), a real-time communication user interface (e.g., 712-1, 712-2, and/or 712-3) (e.g., one or more representations of other participants in the real-time communication session, status information for the real-time communication session, and/or one or more controls for controlling functions of the real-time communication session) that corresponds to (e.g., displays elements of and/or facilitates) a real-time communication session (e.g., audio communication, video communication, text-based communication, graphics-based communication, and/or virtual communication) between a user of the computer system and one or more participants in the real-time communication session different from the user of the computer system (e.g., one or more users of one or more external computer system different from (e.g., separate from and/or remote from) the computer system), wherein the real-time communication user interface includes a spatially-flexible representation option (e.g., 712*e*-1, 712*e*-2, and/or 712*e*-3).

While displaying the real-time communication session user interface, including the spatially-flexible representation option, the computer system (e.g., 700-1, X700-1, 700-2, X700-2, 700-3, and/or X700-3) receives (904), via the one or more input devices, one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the spatially-flexible representation option (e.g., 712*e*-1, 712*e*-2, and/or 712*e*-3) (in some embodiments, the one or more user inputs corresponding to selection of the spatially-flexible representation option represents a user request (e.g., from the user of the computer system) to transition from a spatially-constrained representation mode (e.g., a mode in which all participants in the real-time communication session are visually represented using spatially-constrained representations that are bound by portals (e.g., visual, displayed, and/or visible portals)) to a spatially-flexible representation mode (e.g., a mode in which at least some of the participants in the real-time communication session are visually represented using spatially-flexible representations that are not bounded by portals (e.g., visual, displayed, and/or visible portals))).

In response to receiving the one or more user inputs corresponding to selection of the spatially-flexible representation option, the computer system (e.g., 700-1, X700-1, 700-2, X700-2, 700-3, and/or X700-3) changes (906) whether the user is represented to other participants in the real-time communication session (e.g., visually represented) with a spatially-flexible representation (e.g., 716*e*-1, 714*e*-1, 714*e*-2, 718*e*-2, 718*e*-3, and/or 716*e*-3) or a spatially-constrained representation (e.g., 716-1, 714-1, 714-2, 718-2, 718-3, and/or 716-3), wherein: a spatially-flexible representation (908) has a spatial position in a second three-dimensional environment (e.g., 708-1, 708-2, and/or 708-3) relative to one or more other objects in the second three-dimensional environment (e.g., relative to a viewpoint of a user (e.g., a user of a second computer system different from the computer system), relative to one or more virtual objects, relative to shared content, and/or relative to representations of one or more other participants in the real-time communication session) that is determined at least in part based on movement of the user in the physical environment in which the user is located, wherein the second three-dimensional environment is a three-dimensional environment in which a participant in the real-time communication session other than the user is viewing user interface elements corresponding to the real-time communication session (e.g., including a representation of the user); and a spatially-constrained representation (910) (e.g., 716-1, 714-1, 714-2, 718-2, 718-3, and/or 716-3) has a spatial position in the second three-dimensional environment (e.g., 708-1, 708-2, and/or 708-3) (e.g., relative to a viewpoint of a user (e.g., a user of a second computer system different from the computer system), relative to one or more virtual objects, relative to shared content, and/or relative to representations of one or more other participants in the real-time communication session) that is determined by a second computer system that is controlling display of the second three-dimensional environment (and, in some embodiments, is not determined based on movement of the user in the physical environment in which the user is located and/or does not change based on movement of the user in the physical environment in which the user is located), wherein the second computer system is different from the computer system.

In some embodiments, the spatially constrained representation (e.g., 716-1, 714-1, 714-2, 718-2, 718-3, and/or 716-3) of the user includes: a first portal (e.g., 716*b*-1, 714*b*-1, 714*b*-2, 718*b*-2, 718*b*-3, and/or 716*b*-3) (e.g., a 2D or 3D region, a tile, a shape, and/or a boundary) that has a spatial position in the second three-dimensional environment that is determined by the second computer system (e.g., automatically selected by the second computer system or selected based on inputs from a user of the second computer system); and a first visual representation of the user (e.g., 716*a*-1, 714*a*-1, 714*a*-2, 718*a*-2, 718*a*-3, and/or 716*a*-3) that moves based on detected movement (e.g., detected by the computer system) of the user (e.g., movement of the user in a physical environment of the user), wherein the first visual representation is displayed at least partially (or fully) within the first portal. In some embodiments, the first portal is displayed within the second three-dimensional environment, and the first visual representation is displayed within (e.g., partially within, substantially within, and/or completely within) the first portal. In some embodiments, the spatially-flexible representation of the user (e.g., 716*e*-1, 714*c*-1, 714-2, 718*e*-2, 718*e*-3, and/or 716*e*-3) is displayed without the first portal. In some embodiments, the spatially-flexible representation of the user is displayed within the second three-dimensional environment. In some embodiments, the spatially-flexible representation of the user is displayed within the second three-dimensional environment without a visible border and/or frame surrounding (e.g., partially surrounding, substantially surrounding, and/or completely surrounding) the spatially-flexible representation. In some embodiments, the spatially-constrained representation has a limited range of motion and/or freedom of movement (e.g., the first portal has a fixed position within the second three-dimensional environment and/or does not move within the second three-dimensional environment based on detected movement by the user; and/or the first visual representation is restricted and/or prevented from moving outside of the first portal and/or beyond the boundaries of the first portal); and the spatially-flexible representation has a greater range of motion and/or greater freedom of movement (e.g., the spatially-flexible representation is configured to move within the second three-dimensional environment and/or move from one position in the second three-dimensional environment to another position in the second three-dimensional environment based on detected movement of the user). In some embodiments, in response to receiving the one or more user inputs corresponding to selection of the spatially-flexible representation option: (and, in some embodiments, in accordance with a determination that a first set of criteria are satisfied (e.g., one or more other participants in the real-time communication session has selected a respective spatially-flexible representation option displayed via their corresponding computer systems; a user of the second computer system has selected a second spatially-flexible representation option displayed by the second computer system; one or more other participants in the real-time communication session have requested to transition from a spatially-constrained representation mode to a spatially-flexible representation mode; and/or a user of the second computer system has requested to transition from a spatially-constrained representation mode to a spatially-flexible representation mode)) the computer system causes one or more external computer systems corresponding to the one or more participants in the real-time communication session, including the second computer, to transition from displaying a spatially-constrained representation of the user (e.g., 716-1, 714-1, 714-2, 718-2, 718-3, and/or 716-3) of the computer system (e.g., a spatially-constrained representation of the user that includes a visual representation of the user of the computer system that moves based on detected movement of the user of the computer system; and a portal (e.g., a visual portal, a displayed portal, and/or a visible portal) that at least partially surrounds the visual representation of the user of the computer system) to displaying a spatially-flexible representation of the user of the computer system different from the spatially-constrained representation of the user of the computer system. In some embodiments, in response to receiving the one or more user inputs corresponding to selection of the spatially-flexible representation option: in accordance with a determination that the first set of criteria are not satisfied (e.g., in accordance with a determination that a user of the second computer system has not requested to transition from the spatially-constrained representation mode to the spatially-flexible representation mode and/or no other participant has requested to transition from the spatially-constrained representation mode to the spatially-flexible representation mode), the computer system causes one or more external computer systems corresponding to the one or more participants in the real-time communication session, including a first external computer system corresponding to the first participant, to display an indication that a participant in the real-time communication session has requested to transition from a spatially-constrained representation mode to a spatially-flexible representation mode. Providing the user with an option to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the real-time communication user interface (e.g., 712-1, 712-2, and/or 712-3) includes an avatar option (e.g., **712*a*-1, 712*a*-2, and/or 712*a*-3). In some embodiments, while displaying the real-time communication session user interface, including the avatar option, the computer system (e.g., 700-1, X700-1, 700-2, X700-2, 700-3, and/or X700-3) receives, via the one or more input devices, one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the avatar option. In response to receiving the one or more user inputs corresponding to selection of the avatar option, the computer system (e.g., 700-1, X700-1, 700-2, X700-2, 700-3, and/or X700-3) changes whether the user is represented to other participants in the real-time communication session with an avatar visual representation (e.g., 716*a*-1, 714*a*-1, 714*a*-2, 718*a*-2, 718*a*-3, and/or 716*a*-3) (e.g., 716*e*-1, 714*c*-1, 714*c*-2, 718*e*-2, 718*c*-3, and/or 716*e*-3) that includes a plurality of points of movement that move based on detected movement of corresponding parts of the body of the user of the computer system (e.g., an avatar visual representation that includes a first portion (e.g., an avatar head) that moves based on movement of the user's head, a second portion (e.g., an avatar torso) that moves based on movement of the user's torso, a third portion (e.g., an avatar face) that moves based on movement of the user's face, and/or a fourth portion (e.g., avatar arms) that moves based on movement of the user's arms) or a non-avatar visual representation (e.g., 718*d*-2 and/or 718*d*-3**) that has fewer points of movement that move based on detected movement of the body of the user of the computer system than the avatar-based visual representation. In some embodiments, the non-avatar visual representation is a monogram and/or shape. In some embodiments the avatar visual representation is humanoid. Providing the user with an option to enable or disable an avatar visual representation enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the avatar visual representation (e.g., **716*a*-1, 714*a*-1, 714*a*-2, 718*a*-2, 718*a*-3, and/or 716*a*-3) (e.g., 716*c*-1, 714*e*-1, 714*e*-2, 718*e*-2, 718*c*-3, and/or 716*e*-3**) moves (e.g., changes visually) based on detected changes in facial expression of the user (e.g., the avatar visual representation includes a face that moves based on detected changes in the facial expression of the user (e.g., in some embodiments, the avatar visual representation that includes eyes that move based on detected movement in the eyes of the user and/or a mouth that moves based on detected movement in the mouth of the user)). In some embodiments, the non-avatar visual representation does not move (e.g., changes visually) based on detected changes in facial expression of the user. Providing the user with an option to enable or disable an avatar visual representation enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the avatar visual representation (e.g., **716*a*-1, 714*a*-1, 714*a*-2, 718*a*-2, 718*a*-3, and/or 716*a*-3) (e.g., 716*e*-1, 714*e*-1, 714*c*-2, 718*e*-2, 718*e*-3, and/or 716*c*-3) moves (e.g., changes visually) based on movement of one or more body parts of the user relative to one or more other body parts of the user (e.g., movement of the user's hands relative to the body of the user cause movement of one or more hands of the avatar visual representation to move relative to other portions of the avatar visual representation; and/or movement of the user's head relative to the body of the user (e.g., head tilt) causes movement of the head of the avatar relative to other portion of the avatar). In some embodiments, the non-avatar visual (e.g., 718*d*-2 and/or 718*d*-3**) representation does not move (e.g., changes visually) based on movement of one or more body parts of the user relative to one or more other body parts of the use. Providing the user with an option to enable or disable an avatar visual representation enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, in accordance with a determination that the avatar option is in a first state (e.g., is enabled) the spatially-flexible representation (e.g., **716*e*-1, 714*c*-1, 714*c*-2, 718*c*-2, 718*e*-3, and/or 716*e*-3) includes (e.g., uses) the avatar visual representation (e.g., without using and/or including the non-avatar visual representation); and in accordance with a determination that the avatar option is in a second state (e.g., is disabled) different from the first state, the spatially flexible representation includes (e.g., uses) the non-avatar visual representation (e.g., a spatially-flexible version of 718*d*-2 and/or 718*d*-3**) (e.g., without including and/or using the avatar visual representation). Providing the user with an option to enable or disable an avatar visual representation enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the real-time communication user interface includes a first visual indicator (e.g., **712*c*-1, 712*e*-2, 712*e*-3, 712*a*-1, 712*a*-2, and/or 712*a*-3**) that indicates whether the user is represented to other participants in the real-time communication session with the spatially-flexible representation or the spatially-constrained representation and whether the user is represented to other participants in the real-time communication session with the avatar visual representation or the non-avatar visual representation. Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first visual indicator (e.g., **712*e*-1, 712*e*-2, 712*e*-3, 712*a*-1, 712*a*-2, and/or 712*a*-3**) is displayed in a first manner (e.g., with a first set of visual characteristics) to indicate that the user is being represented to other participants in the real-time communication session with the spatially-flexible representation and the avatar visual representation. Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first visual indicator (e.g., **712*e*-1, 712*e*-2, 712*e*-3, 712*a*-1, 712*a*-2, and/or 712*a*-3**) is displayed in a second manner (e.g., with a second set of visual characteristics) to indicate that the user is being represented to other participants in the real-time communication session with the spatially-constrained representation and the avatar visual representation. Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first visual indicator (e.g., **712*e*-1, 712*e*-2, 712*e*-3, 712*a*-1, 712*a*-2, and/or 712*a*-3**) is displayed in a third manner (e.g., with a third set of visual characteristics) to indicate that the user is being represented to other participants in the real-time communication session with the spatially-flexible representation and the non-avatar visual representation. Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first visual indicator (e.g., **712*e*-1, 712*e*-2, 712*e*-3, 712*a*-1, 712*a*-2, and/or 712*a*-3**) is displayed in a fourth manner (e.g., with a fourth set of visual characteristics) to indicate that the user is being represented to other participants in the real-time communication session with the spatially-constrained representation and the non-avatar visual representation. Displaying the first visual indicator enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the spatially-flexible representation option (e.g., **712*e*-1, 712*c*-2, and/or 712*e*-3) and the avatar option (e.g., 712*a*-1, 712*a*-2, and/or 712*a*-3) are in the real-time communication session user interface (e.g., 712-1, 712-2, and/or 712-3) (e.g., are part of the real-time communication session user interface). In some embodiments, a second avatar option (e.g., 772*d*, 772*d*-2) corresponding to the avatar option (e.g., that performs the same function as the avatar option) is displayed within a system user interface (e.g., 772 and/or 772-2) (e.g., a user interface that is displayed concurrently with and/or overlaid on a representation of a three-dimensional environment (e.g., an optical passthrough environment or a virtual passthrough environment) (In some embodiments, a transparent and/or semi-transparent user interface) different from the real-time communication session user interface (e.g., 712-1, 712-2, and/or 712-3**), and that includes a plurality of controls pertaining to the real-time communication session (e.g., an end control that is selectable to end the real-time communication session; the second avatar option; and/or a second spatially-flexible representation option (e.g., that performs the same function as the spatially-flexible representation option). In some embodiments, the system user interface is a user interface that is displayed in response to one or more user gaze inputs directed to a predefined location relative to a viewpoint of the user of the computer system (e.g., a predefined location within the field of view of the user, the computer system, and/or one or more components of the computer system (e.g., one or more cameras of the computer system); a predefined display position of the one or more display generation components; and/or a predefined position within a three-dimensional environment). Providing the user with an option to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, a spatially-constrained representation (e.g., 716-1, 714-1, 714-2, 718-2, 716-3, and/or 718-3) includes: a first portal (e.g., 716*b*-1, 714*b*-1, 714*b*-2, 718*b*-2, 716*b*-3, and/or 718*b*-3) (e.g., a 2D or 3D region, a tile, a shape, and/or a boundary) that has a spatial position in the second three-dimensional environment (e.g., 708-1, 708-2, and/or 708-3) that is determined by the second computer system (e.g., automatically selected by the second computer system or selected based on inputs from a user of the second computer system); and a first visual representation of the user (e.g., 716*a*-1, 714*a*-1, 714*a*-2, 718*a*-2, 716*a*-3, and/or 718*a*-3) that moves based on detected movement (e.g., detected by the computer system) of the user (e.g., movement of the user in a physical environment of the user), wherein the first visual representation is displayed at least partially (or fully) within the first portal and the first portal displays background content (e.g., 716*c*-1, 714*c*-1, 714*c*-2, 718*c*-2, 716*c*-3, and/or 718*c*-3) displayed behind the first visual representation. In some embodiments, the real-time communication user interface (e.g., 712-1, 712-2, and/or 712-3) includes a background change option. In some embodiments, while displaying the real-time communication session user interface, including the background change option, the computer system (e.g., 700-1, X700-1, 700-2, X700-2, 700-3, and/or X700-3) receives, via the one or more input devices, one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the background change option. In response to receiving the one or more user inputs corresponding to selection of the background change option, the computer system (e.g., 700-1, X700-1, 700-2, X700-2, 700-3, and/or X700-3) changes the background (e.g., 716*c*-1, 714*c*-1, 714*c*-2, 718*c*-2, 716*c*-3, and/or 718*c*-3) for a spatially-constrained representation of the user (e.g., 716-1, 714-1, 714-2, 718-2, 716-3, and/or 718-3) from a first background to a second background different from the first background (e.g., a background and/or a spatially-constrained representation of the user that is displayed by one or more external devices corresponding to the other participants in the real-time communication session). Providing the user with an option to change a background enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first background is a first background that includes visual content that is based on the first three-dimensional environment (e.g., 708-1, 708-2, and/or 708-3) (e.g., visual content that depicts and/or displays portions of the first three-dimensional environment and/or representations of portions of the first three-dimensional environment). Providing the user with an option to change a background enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first background is a first background that includes visual content that is based on a physical environment (e.g., 722) that surrounds the computer system (e.g., 700-1, X700-1, 700-2, X700-2, 700-3, and/or X700-3) (e.g., visual content that depicts and/or displays portions of the physical environment that surrounds the computer system and/or representations of portions of the physical environment that surrounds the computer system). Providing the user with an option to change a background enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first background includes visual content that changes based on changes in lighting in the physical environment (e.g., 722) that surrounds the computer system (e.g., 700-1, X700-1, 700-2, X700-2, 700-3, and/or X700-3) (e.g., changes based on changes in brightness and/or color in the physical environment that surrounds the computer system). Providing the user with an option to change a background enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the real-time communication user interface (e.g., 712-1, 712-2, and/or 712-3) includes a self-view option (e.g., 712*a*-1, 712*a*-2, and/or 712*a*-3). In some embodiments, while displaying the real-time communication session user interface, including the self-view option, the computer system (e.g., 700-1, X700-1, 700-2, X700-2, 700-3, and/or X700-3) receives, via the one or more input devices, one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the self-view option. In response to receiving the one or more user inputs corresponding to selection of the self-view option, the computer system (e.g., 700-1, X700-1, 700-2, X700-2, 700-3, and/or X700-3) displays, via the one or more display generation components, a self-view preview (e.g., 728, 728*c*) that portrays how the user is visually represented to the other participants in the real-time communication session. Providing the user with an option to display a self view enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 700-1, X700-1, 700-2, X700-2, 700-3, and/or X700-3) displays, via the one or more display generation components, a first spatially-flexible representation (e.g., 716*e*-1, 714*e*-1, 714*c*-2, 718*e*-2, 716*e*-3, and/or 718*e*-3) of a first participant in the real-time communication session that moves based on detected movement (e.g., detected by an external computer system associated with the first participant) of the first participant (e.g., movement of the first participant in a physical environment of the first participant) and has a spatial position in the first three-dimensional environment (e.g., 708-1, 708-2, and/or 708-3) relative to one or more other objects in the first three-dimensional environment (e.g., relative to a viewpoint of the user, relative to one or more virtual objects, relative to shared content, and/or relative to representations of one or more other participants in the real-time communication session) that is determined at least in part based on movement of the first participant. In some embodiments, while displaying the first spatially-flexible representation of the first participant, and while the user of the computer system (e.g., 700-1, X700-1, 700-2, X700-2, 700-3, and/or X700-3) is represented to other participants in the real-time communication session with a spatially-flexible representation, the computer system (e.g., 700-1, X700-1, 700-2, X700-2, 700-3, and/or X700-3) receives, via the one or more input devices, one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the spatially-flexible representation option (e.g., 712*e*-1, 712*e*-2, 712*e*-3, 772*g*, and/or 772*g*-2). In response to receiving the one or more user inputs corresponding to selection of the spatially-flexible representation option: the computer system (e.g., 700-1, X700-1, 700-2, X700-2, 700-3, and/or X700-3) ceases display of the first spatially-flexible representation of the first participant (and, in some embodiments, displaying a first spatially-constrained representation of the first participant in the first three-dimensional environment); and the computer system (e.g., 700-1, X700-1, 700-2, X700-2, 700-3, and/or X700-3) causes the user of the computer system to be represented to other participants in the real-time communication session with a spatially-constrained representation (e.g., 716-1, 714-1, 714-2, 718-2, 716-3, and/or 718-3). Providing the user with an option to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the computer system (e.g., 700-1, X700-1, 700-2, X700-2, 700-3, and/or X700-3) displays, via the one or more display generation components, a system user interface (e.g., 772 and/or 772-2) (e.g., a user interface that is displayed concurrently with and/or overlaid on a representation of a three-dimensional environment (e.g., an optical passthrough environment or a virtual passthrough environment) (In some embodiments, a transparent and/or semi-transparent user interface) different from the real-time communication session user interface (e.g., 712-1, 712-2, and/or 712-3), and that includes a plurality of controls (e.g., 772*a*, 772*a*-2, 772*b*, 772*b*-2, 772*c*, 772*c*-2, 772*d*, 772*d*-2, 772*g*, and/or 772*g*-2) pertaining to the real-time communication session (e.g., an end control that is selectable to end the real-time communication session; a second avatar option; and/or a second spatially-flexible representation option (e.g., that performs the same function as the spatially-flexible representation option), including a second spatially-flexible representation option (e.g., 772*g* and/or 772*g*-2) corresponding to the spatially-flexible representation option that is displayed in the real-time communication user interface (e.g., performs the same function as the spatially-flexible representation option). In some embodiments, one or more portions of the real-time communication user interface, including the spatially-flexible representation option that is displayed in the real-time communication user interface, cease to be displayed when all participants in the real-time communication session participate in the spatially-flexible representation mode (and/or when no participates participate in the spatially-constrained representation mode). In some such embodiments, the second spatially-flexible representation option in the system user interface is the only spatially-flexible representation option available to the user. In some embodiments, the spatially-flexible representation option is selectable to either transition from the spatially-constrained representation mode to the spatially-flexible representation mode (e.g., if the user of the computer system is currently in the spatially-constrained representation mode), or from the spatially-flexible representation mode to the spatially-constrained representation mode (e.g., if the user of the computer system is currently in the spatially-flexible representation mode). In some embodiments, the system user interface is a user interface that is displayed in response to one or more user gaze inputs directed to a predefined location relative to the viewport into the three-dimensional environment (e.g., a predefined location within the field of view of the user, the computer system, and/or one or more components of the computer system (e.g., one or more cameras of the computer system); a predefined display position of the one or more display generation components; and/or a predefined position within a three-dimensional environment). Providing the user with an option to transition between different types of representations enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, aspects/operations of methods 800, 900, 1000, 1100, and/or 1200 may be interchanged, substituted, and/or added between these methods. For example, the real-time communication session recited in method 900 is the real-time communication session recited in methods 800, 1000, 1100, and/or 1200. For brevity, these details are not repeated here.

FIG. 10 is a flow diagram of an exemplary method 1000 for real-time communication, in accordance with some embodiments. In some embodiments, method 1000 is performed at a computer system (e.g., 700-1, X700-1, 700-2, X700-2, 700-3, and/or X700-3) (e.g., computer system 101 in FIG. 1A) (e.g., a smart phone, a smart watch, a tablet, a laptop, a desktop, a wearable device, and/or head-mounted device) that is in communication with one or more display generation components (e.g., 702-1, X702-1, 702-2, X702-2, 702-3, and/or X702-3) (e.g., a visual output device, a 3D display, a display having at least a portion that is transparent or translucent on which images can be projected (e.g., a see-through display), a projector, a heads-up display, and/or a display controller) (and, optionally, one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial))). In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

The computer system (e.g., 700-1, X700-1, 700-2, X700-2, 700-3, and/or X700-3) displays (1002), via the one or more display generation components and within a three-dimensional environment (e.g., 708-1, 708-2, and/or 708-3) (e.g., physical environment, a virtual environment, a virtual passthrough environment, an optical passthrough environment, and/or a virtual environment that is representative of a physical environment that surrounds the computer system), a real-time communication user interface (e.g., 712-1, 712-2, and/or 712-3) (e.g., one or more representations of other participants in the real-time communication session, status information for the real-time communication session, and/or one or more controls for controlling functions of the real-time communication session) that corresponds to (e.g., displays elements of and/or facilitates) a real-time communication session (e.g., audio communication, video communication, text-based communication, graphics-based communication, and/or virtual communication) between a user of the computer system (e.g., 700-1, X700-1, 700-2, X700-2, 700-3, and/or X700-3) and one or more participants in the real-time communication session different from the user of the computer system (e.g., one or more users of one or more external computer system different from (e.g., separate from and/or remote from) the computer system), wherein displaying the real-time communication user interface includes displaying a first spatially-constrained representation (e.g., 716-1, 714-1, 714-2, 718-2, 716-3, and/or 718-3) of a first participant of the one or more participants in the real-time communication session (in some embodiments, the first spatially-constrained representation of the first participant is also displayed by one or more external computer systems associated with at least some of the one or more other participants in the real-time communication session). The first spatially-constrained representation of the first participant includes: a first portal (e.g., 716*b*-1, 714*b*-1, 714*b*-2, 718*b*-2, 716*b*-3, and/or 718*b*-3) (e.g., a tile, a shape, and/or a boundary); and a first three-dimensional representation of the first participant (e.g., 716*a*-1, 714*a*-1, 714*a*-2, 718*a*-2, 716*a*-3, and/or 718*a*-3) that is displayed within the portal, and In some embodiments, the first portal is displayed within the three-dimensional environment, and the first three-dimensional representation is displayed within (e.g., partially within, substantially within, and/or completely within) the first portal.

While displaying the real-time communication user interface, including the first spatially-constrained representation of the first participant, the computer system (e.g., 700-1, X700-1, 700-2, X700-2, 700-3, and/or X700-3) receives (1004) an indication of detected movement by the first participant (e.g., receiving information from a first external computer system corresponding to the first participant indicative of detected movement by the first participant (e.g., detected by the first external computer system)). In some embodiments, the indication of detected movement by the first participant includes instructions for displaying movement of the first three-dimensional representation.

In response to receiving the indication of detected movement by the first participant, the computer system (e.g., 700-1, X700-1, 700-2, X700-2, 700-3, and/or X700-3) displays (1006), via the one or more display generation components, movement of the first three-dimensional representation (e.g., 716*a*-1, 714*a*-1, 714*a*-2, 718*a*-2, 716*a*-3, and/or 718*a*-3) within the first portal (e.g., 716*b*-1, 714*b*-1, 714*b*-2, 718*b*-2, 716*b*-3, and/or 718*b*-3). Displaying a spatially-constrained representation that moves based on detected movement of the first participant enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the first spatially-constrained representation of the first participant (e.g., 716-1, 714-1, 714-2, 718-2, 716-3, and/or 718-3), the computer system (e.g., 700-1, X700-1, 700-2, X700-2, 700-3, and/or X700-3) detects movement by the user of the computer system that shifts a viewpoint of the user of the computer system relative to the first spatially-constrained representation of the first participant (e.g., movement of the user to the left of, to the right of, farther away from, and/or closer to the first spatially-constrained representation of the first participant) (e.g., electronic device 700-3 in FIG. 7E). In response to detecting the movement by the user of the computer system: the computer system (e.g., 700-1, X700-1, 700-2, X700-2, 700-3, and/or X700-3) moves the first three-dimensional representation of the first participant (e.g., 716*a*-1, 714*a*-1, 714*a*-2, 718*a*-2, 716*a*-3, and/or 718*a*-3) within the first portal (e.g., 716*b*-1, 714*b*-1, 714*b*-2, 718*b*-2, 716*b*-3, and/or 718*b*-3) based on the detected movement by the user of the computer system (e.g., based on a direction of movement by the user of the computer system and/or based on a magnitude of movement by the user of the computer system). Automatically adjusting the position of the first three-dimensional representation based on movement by the user of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, moving the first three-dimensional representation of the first participant (e.g., 716*a*-1, 714*a*-1, 714*a*-2, 718*a*-2, 716*a*-3, and/or 718*a*-3) within the first portal (e.g., 716*b*-1, 714*b*-1, 714*b*-2, 718*b*-2, 716*b*-3, and/or 718*b*-3) based on the detected movement by the user of the computer system (e.g., 700-1, X700-1, 700-2, X700-2, 700-3, and/or X700-3) comprises moving the first three-dimensional representation of the first participant within the first portal after a first delay period (e.g., a delay of a predetermined duration of time (e.g., 0.1 seconds, 0.25 seconds, 0.5 seconds, or 1 second)) after detecting the movement by the user of the computer system (e.g., 700-1, X700-1, 700-2, X700-2, 700-3, and/or X700-3). Automatically adjusting the position of the first three-dimensional representation based on movement by the user of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, moving the first three-dimensional representation of the first participant (e.g., 716*a*-1, 714*a*-1, 714*a*-2, 718*a*-2, 716*a*-3, and/or 718*a*-3) within the first portal (e.g., 716*b*-1, 714*b*-1, 714*b*-2, 718*b*-2, 716*b*-3, and/or 718*b*-3) based on the detected movement by the user of the computer system (e.g., 700-1, X700-1, 700-2, X700-2, 700-3, and/or X700-3) comprises moving the first three-dimensional representation of the first participant in a horizontal direction while maintaining a depth of the first three-dimensional representation of the first participant within the first portal. In some embodiments, moving the first three-dimensional representation of the first participant within the first portal based on the detected movement by the user of the computer system comprises moving the first three-dimensional representation of the first participant in a horizontal direction and/or a vertical direction while maintaining a depth of the first three-dimensional representation of the first participant within the first portal. In some embodiments, moving the first three-dimensional representation of the first participant within the first portal based on the detected movement by the user of the computer system comprises moving the first three-dimensional representation of the first participant in a horizontal direction based on horizontal movement of the user and/or in a vertical direction based on vertical movement of the user, while maintaining a depth of the first three-dimensional representation of the first participant within the first portal. Automatically adjusting the position of the first three-dimensional representation based on movement by the user of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the first spatially-constrained representation of the first participant (e.g., 716-1, 714-1, 714-2, 718-2, 716-3, and/or 718-3), the computer system (e.g., 700-1, X700-1, 700-2, X700-2, 700-3, and/or X700-3) detects, via one or more input devices, a gaze input by the user of the computer system. In response to detecting the gaze input by the user of the computer system: in accordance with a determination that the gaze input is directed toward the first spatially-constrained representation of the first participant (e.g., 716-1, 714-1, 714-2, 718-2, 716-3, and/or 718-3) (e.g., the user is looking at the first spatially-constrained representation of the first participant), the computer system (e.g., 700-1, X700-1, 700-2, X700-2, 700-3, and/or X700-3) displays the first spatially-constrained representation of the first participant turned to face the user of the computer system (e.g., turning the first three-dimensional representation of the first participant while maintaining the position of the first portal and/or while not turning and/or moving the first portal); and in accordance with a determination that the gaze input is not directed toward the first spatially-constrained representation of the first participant (e.g., the user is not looking at the first spatially-constrained representation of the first participant), the computer system (e.g., 700-1, X700-1, 700-2, X700-2, 700-3, and/or X700-3) displays the first spatially-constrained representation of the first participant with the first spatially-constrained representation of the first participant turned away from facing the user of the computer system (e.g., facing a different direction or turned so that the first spatially-constrained representation of the first participant is not facing the user of the computer system). Automatically turning the spatially-constrained representation when the user gazes that the spatially-constrained representation enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the first spatially-constrained representation of the first participant (e.g., 716-1, 714-1, 714-2, 718-2, 716-3, and/or 718-3) comprises: in accordance with a determination that a position of the user of the computer system (e.g., 700-1, X700-1, 700-2, X700-2, 700-3, and/or X700-3) with respect to the first spatially-constrained representation of the first participant is at a first angle with respect to the first spatially-constrained representation of the first participant, displaying a first portion of the first three-dimensional representation without displaying a second portion of the first three-dimensional representation (e.g., cropping, obscuring, and/or fading out the second portion of the first three-dimensional representation); and in accordance with a determination that the position of the user of the computer system (e.g., 700-1, X700-1, 700-2, X700-2, 700-3, and/or X700-3) with respect to the first spatially-constrained representation of the first participant is at a second angle with respect to the first spatially-constrained representation of the first participant different from the first angle, displaying the first portion and the second portion of the first three-dimensional representation (e.g., forgoing cropping, obscuring, and/or fading out the second portion of the first three-dimensional representation). Automatically fading out portions of the spatially-constrained representation based on a viewing angle of the user of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the first portion of the first three-dimensional representation without displaying the second portion of the first three-dimensional representation comprises forgoing display of the second portion of the first three-dimensional representation (e.g., cropping, obscuring, and/or fading out the second portion of the first three-dimensional representation) based on a determination that the second portion of the first three-dimensional representation is within a threshold proximity of the first portal (e.g., 716_a_-1, 714_a_-1, 714_a_-2, 718_a_-2, 716_a_-3, and/or 718_a_-3) (e.g., a boundary of the first portal). Automatically fading out portions of the spatially-constrained representation based on a viewing angle of the user of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the first spatially-constrained representation of the first participant (e.g., 716-1, 714-1, 714-2, 718-2, 716-3, and/or 718-3), the computer system (e.g., 700-1, X700-1, 700-2, X700-2, 700-3, and/or X700-3) changes a visual appearance of the first three-dimensional representation of the first participant (e.g., 716_a_-1, 714_a_-1, 714_a_-2, 718_a_-2, 716_a_-3, and/or 718_a_-3) based on a determination that a first portion of the first three-dimensional representation is approaching a boundary of the first portal (e.g., 716_b_-1, 714_b_-1, 714_b_-2, 718_b_-2, 716_b_-3, and/or 718_b_-3) (e.g., a first portion of the first three-dimensional representation that is approaching a boundary of the first portal based on detected movement of the first participant). Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first portion of the first three-dimensional representation comprises one or more hands of the first three-dimensional representation (e.g., 716_a_-1, 714_a_-1, 714_a_-2, 718_a_-2, 716_a_-3, and/or 718_a_-3) (e.g., one or more hands of the first three-dimensional representation that move based on detected movement of one or more hands of the first participant). Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, changing the visual appearance of the first three-dimensional representation of the first participant (e.g., 716_a_-1, 714_a_-1, 714_a_-2, 718_a_-2, 716_a_-3, and/or 718_a_-3) comprises moving the first three-dimensional representation of the first participant to change a depth of the first three-dimensional representation of the first participant within the first portal (e.g., 716_b_-1, 714_b_-1, 714_b_-2, 718_b_-2, 716_b_-3, and/or 718_b_-3). Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, changing the visual appearance of the first three-dimensional representation of the first participant comprises visually distorting the first portion of the first three-dimensional representation (e.g., 716_a_-1, 714_a_-1, 714_a_-2, 718_a_-2, 716_a_-3, and/or 718_a_-3) (e.g., without distorting other portions of the first three-dimensional representation) based on the determination that the first portion of the first three-dimensional representation is approaching a boundary of the first portal (e.g., 716_b_-1, 714_b_-1, 714_b_-2, 718_b_-2, 716_b_-3, and/or 718_b_-3) (e.g., 716_a_-1 and/or 716_aa_-3 in FIG. 7E). In some embodiments, visually distorting the first portion of the first three-dimensional representation based on the determination that the first portion of the first three-dimensional representation is approaching a boundary of the first portal comprises: in accordance with a determination that the first portion of the first three-dimensional representation is located at a first position (e.g., a first position with the first portal, and/or a first position relative to the boundary of the first portal), visually distorting the first portion in a first manner (e.g., by a first amount, in a first direction, and/or with a first type of distortion); and in accordance with a determination that the first portion of the first three-dimensional representation is located at a second position (e.g., a second position with the first portal, and/or a second position relative to the boundary of the first portal) different from the first position, visually distorting the first portion in a second manner (e.g., by a second amount, in a second direction, and/or with a second type of distortion) different from the first manner. In some embodiments, visually distorting the first portion of the first three-dimensional representation based on the determination that the first portion of the first three-dimensional representation is approaching a boundary of the first portal comprises: in accordance with a determination that the first portion of the first three-dimensional representation is approaching a first boundary (e.g., a left boundary, a right boundary, a top boundary, a bottom boundary, a back boundary, and/or a front boundary) of the first portal, visually distorting the first portion in a first direction (e.g., a first direction that is directed away from the first boundary and/or a first direction of a plurality of directions); and in accordance with a determination that the first portion of the first three-dimensional representation is approaching a second boundary (e.g., a left boundary, a right boundary, a top boundary, a bottom boundary, a back boundary, and/or a front boundary)

of the first portal different from the first boundary, visually distorting the first portion in a second direction (e.g., a second direction that is directed away from the second boundary and/or a second direction of a plurality of directions) different from the first direction. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first portion of the first three-dimensional representation comprises one or more hands of the first three-dimensional representation (e.g., 716a-1 and/or 716a-3 in FIG. 7E) (e.g., one or more hands of the first three-dimensional representation that move based on detected movement of one or more hands of the first participant). In some embodiments, a plurality of hands (e.g., two or more hands) of the first three-dimensional representation are distorted concurrently and, optionally, differently from one another. For example, in some embodiments, two hands of the first three-dimensional representation are distorted differently based on the different positions of the two hands. For example, in some embodiments, a first hand of the first three-dimensional representation is distorted in a first manner and/or a first direction based on the location of the first hand, and a second hand of the first three-dimensional representation is distorted in a second manner and/or in a second direction based on the location of the second hand. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the determination that the first portion of the first three-dimensional representation (e.g., 716a-1, 714a-1, 714a-2, 718a-2, 716a-3, and/or 718a-3) is approaching a boundary of the first portal (e.g., 716b-1, 714b-1, 714b-2, 718b-2, 716b-3, and/or 718b-3) comprises a determination that the first portion of the first three-dimensional representation is approaching a front boundary of the first portal (e.g., 716a-1 and/or 716a-3 in FIG. 7E) (e.g., as opposed to a left boundary, a right boundary, a top boundary, and/or a bottom boundary of the first portal) (e.g., a front surface and/or plane of the first portal). In some embodiments, multiple portions of the first three-dimensional representation (e.g., two hands, one hand and a face, and/or both hands and the face) are distorted independently and/or concurrently. For example, in some embodiments, two portions of the first three-dimensional representation are distorted differently based on the different positions of the two portions. For example, in some embodiments, a first portion of the first three-dimensional representation is distorted in a first manner and/or a first direction based on the location of the first portion, and a second portion of the first three-dimensional representation is distorted in a second manner and/or in a second direction based on the location of the second portion. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, visually distorting the first portion of the first three-dimensional representation (e.g., 716a-1, 714a-1, 714a-2, 718a-2, 716a-3, and/or 718a-3) comprises distorting a size of the first portion of the first three-dimensional representation based on the determination that the first portion of the first three-dimensional representation is approaching a boundary of the first portal (e.g., modifying the size of the first portion of the first three-dimensional representation in a manner that is different from any modification in size that would have occurred had the first participant moved in the same way, but the first portion of the first three-dimensional representation was not approaching the boundary of the first portal). In some embodiments, multiple portions of the first three-dimensional representation (e.g., two hands, one hand and a face, and/or both hands and the face) are distorted independently and/or concurrently. For example, in some embodiments, the size of two portions of the first three-dimensional representation are distorted differently based on the different positions of the two portions. For example, in some embodiments, the size of a first portion of the first three-dimensional representation is distorted in a first manner and/or a first direction based on the location of the first portion, and the size of a second portion of the first three-dimensional representation is distorted in a second manner and/or in a second direction based on the location of the second portion. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, visually distorting the first portion of the first three-dimensional representation comprises blurring the first portion of the first three-dimensional representation (e.g., 716a-1, 714a-1, 714a-2, 718a-2, 716a-3, and/or 718a-3) based on the determination that the first portion of the first three-dimensional representation is approaching a boundary of the first portal. In some embodiments, multiple portions of the first three-dimensional representation (e.g., two hands, one hand and a face, and/or both hands and the face) are distorted independently and/or concurrently. For example, in some embodiments, two portions of the first three-dimensional representation are blurred differently based on the different positions of the two portions. For example, in some embodiments, a first portion of the first three-dimensional representation is blurred in a first manner and/or a first direction based on the location of the first portion, and a second portion of the first three-dimensional representation is blurred in a second manner and/or in a second direction based on the location of the second portion. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, visually distorting the first portion of the first three-dimensional representation comprises applying spherical distortion to the first portion of the first three-dimensional representation (e.g., 716*a*-1, 714*a*-1, 714*a*-2, 718*a*-2, 716*a*-3, and/or 718*a*-3) (e.g., applying circular and/or spherical qualities to the first portion of the first three-dimensional representation) based on the determination that the first portion of the first three-dimensional representation is approaching a boundary of the first portal. In some embodiments, multiple portions of the first three-dimensional representation (e.g., two hands, one hand and a face, and/or both hands and the face) are distorted independently and/or concurrently. For example, in some embodiments, spherical distortion is applied to two portions of the first three-dimensional representation differently based on the different positions of the two portions. For example, in some embodiments, spherical distortion is applied to a first portion of the first three-dimensional representation in a first manner and/or a first direction based on the location of the first portion, and spherical distortion is applied to a second portion of the first three-dimensional representation in a second manner and/or in a second direction based on the location of the second portion. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, visually distorting the first portion of the first three-dimensional representation comprises applying simulated lens distortion to the first portion of the first three-dimensional representation (e.g., 716*a*-1, 714*a*-1, 714*a*-2, 718*a*-2, 716*a*-3, and/or 718*a*-3) (e.g., applying distortion that simulates the effect of viewing the first portion of the first three-dimensional representation through a curved optical lens) based on the determination that the first portion of the first three-dimensional representation is approaching a boundary of the first portal. In some embodiments, multiple portions of the first three-dimensional representation (e.g., two hands, one hand and a face, and/or both hands and the face) are distorted independently and/or concurrently. For example, in some embodiments, lens distortion is applied to two portions of the first three-dimensional representation differently based on the different positions of the two portions. For example, in some embodiments, lens distortion is applied to a first portion of the first three-dimensional representation in a first manner and/or a first direction based on the location of the first portion, and lens distortion is applied to a second portion of the first three-dimensional representation in a second manner and/or in a second direction based on the location of the second portion. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, changing the visual appearance of the first three-dimensional representation of the first participant (e.g., 716*a*-1, 714*a*-1, 714*a*-2, 718*a*-2, 716*a*-3, and/or 718*a*-3) based on a determination that a first portion of the first three-dimensional representation is approaching a boundary of the first portal comprises changing the visual appearance of the first three-dimensional representation to prevent any portion of the first three-dimensional representation from extending outside of the first portal (e.g., 716*b*-1, 714*b*-1, 714*b*-2, 718*b*-2, 716*b*-3, and/or 718*b*-3) (e.g., stopping movement of the first portion, cropping the first portion, and/or fading the first portion). Preventing portions of the three-dimensional representation from extending outside the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, changing the visual appearance of the first three-dimensional representation of the first participant comprises ceasing movement of the first portion (e.g., ceasing movement of one or more hands of the first three-dimensional representation) even as further movement by the first participant is detected in a direction that corresponds to a direction toward the boundary of the portal (e.g., further movement by the first participant that would have resulted in movement of the first portion had the first portion not been proximate and/or near the boundary of the first portal) (e.g., 716*a*-1 and/or 716*a*-3 in FIG. 7E). Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, changing the visual appearance of the first three-dimensional representation of the first participant (e.g., 716*a*-1, 714*a*-1, 714*a*-2, 718*a*-2, 716*a*-3, and/or 718*a*-3) comprises slowing movement of the first portion (e.g., slowing movement of one or more hands of the first three-dimensional representation) without corresponding slowing of movement by the first participant (e.g., 716*a*-1 and/or 716*a*-3 in FIG. 7E) (e.g., asymptotically approaching the boundary of the first portal with additional movement by the first participant). In some embodiments, in response to a first movement by the first participant having a first magnitude (e.g., movement by a first amount) and in a first direction, the first three-dimensional representation moves by a first amount when the first three-dimensional representation is not near a boundary of the first portal, and the first three-dimensional representation moves by less than the first amount when the first three-dimensional representation approaches a boundary of the first portal. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, changing the visual appearance of the first three-dimensional representation of the first participant (e.g., 716*a*-1, 714*a*-1, 714*a*-2, 718*a*-2, 716*a*-3, and/or 718*a*-3) comprises cropping (e.g., ceasing display of) the first portion of the first three-dimensional representation (e.g., 714*a*-1 and/or 714*a*-3 in FIG. 7E). In some embodiments, as the first participant continues to move in a particular direction, more and more of the first three-dimensional representation is cropped based on the further movement by the first participant. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, cropping the first portion of the first three-dimensional representation (e.g., 716*a*-1, 714*a*-1, 714*a*-2, 718*a*-2, 716*a*-3, and/or 718*a*-3) comprises gradually fading the first portion of the first three-dimensional representation as the first portion of the first three-dimensional representation approaches the boundary of the first portal (e.g., 716*b*-1, 714*b*-1, 714*b*-2, 718*b*-2, 716*b*-3, and/or 718*b*-3) (e.g., gradually fading any portion of the first three-dimensional representation that gets within a threshold distance of the first portal). In some embodiments, as the first participant continues to move in a particular direction, more and more of the first three-dimensional representation is faded based on the further movement by the first participant. Automatically changing an appearance of the first spatially-constrained representation when a portion of the first three-dimensional representation approaches a boundary of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, displaying the first spatially-constrained representation of the first participant (e.g., 716-1, 714-1, 714-2, 718-2, 716-3, and/or 718-3) comprises concurrently displaying: a first section of the first three-dimensional representation of the first participant (e.g., 716*a*-1, 714*a*-1, 714*a*-2, 718*a*-2, 716*a*-3, and/or 718*a*-3) within the first portal (e.g., 716*b*-1, 714*b*-1, 714*b*-2, 718*b*-2, 716*b*-3, and/or 718*b*-3); and a second section of the first three-dimensional representation (e.g., hands and/or face) of the first participant extending outside of the first portal. In some embodiments, as the first participant continues to move in a particular direction, more of the first three-dimensional representation extends outside of the first portal based on the further movement by the first participant. Allowing portions of the first three-dimensional representation to extend outside of the first portal enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first spatially-constrained representation of the first participant (e.g., 716-1, 714-1, 714-2, 718-2, 716-3, and/or 718-3) further comprises background content (e.g., 716*c*-1, 714*c*-1, 714*c*-2, 718*c*-2, 716*c*-3, and/or 718*c*-3) displayed within the first portal (e.g., 716*b*-1, 714*b*-1, 714*b*-2, 718*b*-2, 716*b*-3, and/or 718*b*-3); and the background content displayed within the first portal is selected (e.g., from a plurality of background content options) by the first participant. Allowing a user to modify their background enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first spatially-constrained representation of the first participant (e.g., 716-1, 714-1, 714-2, 718-2, 716-3, and/or 718-3) further comprises first background content (e.g., 716*c*-1, 714*c*-1, 714*c*-2, 718*c*-2, 716*c*-3, and/or 718*c*-3) displayed within the first portal (e.g., 716*b*-1, 714*b*-1, 714*b*-2, 718*b*-2, 716*b*-3, and/or 718*b*-3); and the first background content includes visual content that is determined based on a first three-dimensional environment (e.g., corresponding to a portion of a virtual environment and/or a portion of a physical environment) that surrounds the user of the computer system (e.g., 700-1, X700-1, 700-2, X700-2, 700-3, and/or X700-3) (e.g., based on a blurred or otherwise obscured version of the physical environment that surrounds the user of the computer system and/or the computer system; and/or a virtual representation of the physical environment that surrounds the user of the computer system and/or the computer system). In some embodiments, the visual content of the first background content changes over time as the three-dimensional environment that surrounds the user of the computer system changes (e.g., as the user moves from one location to another in the three-dimensional environment, and/or as the three-dimensional environment changes while the user remains stationary (e.g., changes in lighting as the sun moves across the sky, changes in weather, and/or movement by objects in the three-dimensional environment)). Displaying varied background content enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first spatially-constrained representation of the first participant (e.g., 716-1, 714-1, 714-2, 718-2, 716-3, and/or 718-3) further comprises second background content (e.g., **716*c*-1, 714*c*-1, 714*c*-2, 718*c*-2, 716*c*-3, and/or 718*c*-3) displayed within the first portal (e.g., 716*b*-1, 714*b*-1, 714*b*-2, 718*b*-2, 716*b*-3, and/or 718*b*-3**); and the second background content includes visual content that is determined based on a first three-dimensional environment (e.g., corresponding to a portion of a virtual environment and/or a portion of a physical environment) that surrounds the first participant (e.g., a blurred version of the physical environment that surrounds the first participant or a representation of computationally generated representation of the physical environment that surrounds the first participant; and/or a virtual representation of the physical environment that surrounds the first participant). In some embodiments, the visual content of the second background content changes over time as the three-dimensional environment that surrounds the first participant changes (e.g., as the first participant moves from one location to another in the three-dimensional environment, and/or as the three-dimensional environment changes while the first participant remains stationary (e.g., changes in lighting as the sun moves across the sky, changes in weather, and/or movement by objects in the three-dimensional environment)). Displaying varied background content enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, aspects/operations of methods 800, 900, 1000, 1100, and/or 1200 may be interchanged, substituted, and/or added between these methods. For example, the real-time communication session recited in method 1000 is the real-time communication session recited in methods 800, 900, 1100, and/or 1200. For brevity, these details are not repeated here.

FIG. 11 is a flow diagram of an exemplary method 1100 for real-time communication, in accordance with some embodiments. In some embodiments, method 1100 is performed at a computer system (e.g., 700-1, X700-1, 700-2, X700-2, 700-3, and/or X700-3) (e.g., computer system 101 in FIG. 1A) (e.g., a smart phone, a smart watch, a tablet, a laptop, a desktop, a wearable device, and/or head-mounted device) that is in communication with one or more display generation components (e.g., 702-1, X702-1, 702-2, X702-2, 702-3, and/or X702-3) (e.g., a visual output device, a 3D display, a display having at least a portion that is transparent or translucent on which images can be projected (e.g., a see-through display), a projector, a heads-up display, and/or a display controller) (and, optionally) one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial))). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

The computer system (e.g., 700-1, X700-1, 700-2, X700-2, 700-3, and/or X700-3) displays (1102), via the one or more display generation components (and, optionally, within a three-dimensional environment (e.g., physical environment, a virtual environment, a virtual passthrough environment, an optical passthrough environment, and/or a virtual environment that is representative of a physical environment that surrounds the computer system)), a real-time communication user interface (e.g., 712-1, 712-2, and/or 712-3) (e.g., one or more representations of other participants in the real-time communication session, status information for the real-time communication session, and/or one or more controls for controlling functions of the real-time communication session) that corresponds to (e.g., displays elements of and/or facilitates) a real-time communication session (e.g., audio communication, video communication, text-based communication, graphics-based communication, and/or virtual communication) between a user of the computer system (e.g., 700-1, X700-1, 700-2, X700-2, 700-3, and/or X700-3) and one or more participants in the real-time communication session different from the user of the computer system (e.g., one or more users of one or more external computer system different from (e.g., separate from and/or remote from) the computer system). Displaying the real-time communication user interface includes: displaying a first representation of a first participant (e.g., 716-1, 714-1, 714-2, 718-2, 716-3, and/or 718-3) of the one or more participants in the real-time communication session (in some embodiments, the first representation of the first participant is also displayed by one or more external computer systems associated with at least some of the one or more other participants in the real-time communication session), wherein: the first participant corresponds (1104) to (e.g., is using and/or is wearing) a first external device separate from the computer system; the first representation is displayed (1106) with a first background (e.g., a first background that is displayed behind the first representation) (e.g., **716*c*-1, 714*c*-1, 714*c*-2, 718*c*-2, 716*c*-3, and/or 718*c*-3); and the first background is displayed (1108) (e.g., includes content, is generated, and/or includes content that is generated) based on visual information captured by one or more cameras of the first external device that are directed away from the first participant (e.g., FIG. 7**D) (e.g., one or more outward facing cameras that face away from the first participant and/or do not face toward the first participant) (in some embodiments, the first external device is a head-mounted system that is worn on the head of the first participant, and the one or more cameras of the first external device are directed outward from the first external device while the first external device is worn on the head of the first participant).

In some embodiments, the first external device displays a representation of the user of the computer system (e.g., 716-1, 714-1, 714-2, 718-2, 716-3, and/or 718-3) against a second background (e.g., **716*c*-1, 714*c*-1, 714*c*-2, 718*c*-2, 716*c*-3, and/or 718*c*-3) that is displayed (e.g., includes content, is generated, and/or includes content that is generated) based on visual information captured by one or more cameras of the computer system that are directed away from the user of the computer system (e.g., one or more outward facing cameras that face away from the user of the computer system and/or do not face toward the user of the computer system) (in some embodiments, the computer system is a head-mounted system that is worn on the head of the user of the computer system, and the one or more cameras of the computer system are directed outward from the computer system while the computer system is worn on the head of the user of the computer system). In some embodiments, displaying the real-time communication user interface includes: displaying a second representation of a second participant (e.g., 716-1, 714-1, 714-2, 718-2, 716-3, and/or 718-3) of the one or more participants in the real-time communication session different from the first participant (in some embodiments, the second representation of the second participant is also displayed by one or more external computer systems associated with at least some of the one or more other participants in the real-time communication session), wherein: the second participant corresponds to (e.g., is using and/or is wearing) a second external device separate from the first external device and the computer system; the second representation is displayed with a second background (e.g., 716*c*-1, 714*c*-1, 714*c*-2, 718*c*-2, 716*c*-3, and/or 718*c*-3**), and the second background is displayed (e.g., includes content, is generated, and/or includes content that is generated) based on visual information captured by one or more cameras of the second external device that are directed away from the second participant (e.g., one or more outward facing cameras that face away from the second participant and/or do not face toward the second participant) (in some embodiments, the second external device is a head-mounted system that is worn on the head of the second participant, and the one or more cameras of the second external device are directed outward from the second external device while the second external device is worn on the head of the second participant). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the first background (e.g., 716*c*-1, 714*c*-1, 714*c*-2, 718*c*-2, 716*c*-3, and/or 718*c*-3) is a computer-generated background that is generated based on the visual information captured by the one or more cameras of the first external device that are directed away from the first participant. In some embodiments, the first background is generated using artificial intelligence (e.g., generative artificial intelligence) based on the visual information captured by the one or more cameras of the first external device that are directed away from the first participant. In some embodiments, the first background is not a photographic and/or video background that directly relays and/or displays the exact visual information captured by the one or more cameras (e.g., the first background includes additions to the visual information captured by the one or more cameras and/or modifications and/or distortions to the visual information captured by the one or more cameras). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the first background (e.g., 716*c*-1, 714*c*-1, 714*c*-2, 718*c*-2, 716*c*-3, and/or 718*c*-3) is computationally generated using a first computational model (e.g., a first machine learning model and/or a first artificial intelligence model) and the first background changes over time as the first external device moves and the one or more cameras capture additional visual information that is provided to the first computational model. Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the first external device (e.g., 700-1, X700-1, 700-2, X700-2, 700-3, and/or X700-3) is surrounded by a first physical environment (e.g., 722). In some embodiments, the first background (e.g., 716*c*-1, 714*c*-1, 714*c*-2, 718*c*-2, 716*c*-3, and/or 718*c*-3) comprises one or more background portions that correspond to one or more portions of the first physical environment that are not visible to the one or more cameras (e.g., 724*b*) (e.g., are not currently visible to the one or more cameras). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the one or more portions of the first physical environment (e.g., 724*b*) are not currently visible to the one or more cameras but were previously visible to the one or more cameras (e.g., were previously visible to the one or more cameras during the real-time communication session) (e.g., based on movement of the first external device). In some embodiments, the one or more background portions are filled in and/or generated based on previous visual information captured by the one or more cameras when the one or more portions of the first physical environment were visible to the one or more cameras. Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the one or more portions of the first physical environment (e.g., 724*b*) are not currently visible to the one or more cameras and have never been visible to the one or more cameras during the real-time communication session. In some embodiments, the one or more background portions are filled in and/or generated based on visual content captured by the one or more cameras of other portions of the first physical environment. Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the one or more background portions are generated using a machine learning model (e.g., based on visual content captured by the one or more cameras corresponding to and/or depicting other portions of the first physical environment). Generating background content using a machine learning model enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience. Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the first background (e.g., 716*c*-1, 714*c*-1, 714*c*-2, 718*c*-2, 716*c*-3, and/or 718*c*-3) is blurred (e.g., has a blurring filter applied to it). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the first background (e.g., 716*c*-1, 714*c*-1, 714*c*-2, 718*c*-2, 716*c*-3, and/or 718*c*-3) is visually distorted (e.g., spherical distortion, lens distortion, and/or fish-eye distortion) to emphasize a portion of the first background that is positioned behind the first representation (and, in some embodiments, de-emphasize portions of the first background that are not positioned behind the first representation (e.g., are to the left of the first representation and/or are to the right of the first representation)). In some embodiments, the first background is visually distorted to show the portion of the first background at a larger size (e.g., increase the size of the portion of the first background) and to decrease the size of other portions of the first background. Displaying a user representation with distorted background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, at a first time, while a first portion of the first background (e.g., 716*c*-1, 714*c*-1, 714*c*-2, 718*c*-2, 716*c*-3, and/or 718*c*-3) is displayed behind the first representation, the computer system (e.g., 700-1, X700-1, 700-2, X700-2, 700-3, and/or X700-3) applies visual distortion to the first background to visually emphasize the first portion (e.g., to show the first portion at an enlarged size). In some embodiments, at a second time, while a second portion of the first background (e.g., 716*c*-1, 714*c*-1, 714*c*-2, 718*c*-2, 716*c*-3, and/or 718*c*-3) different from the first portion is positioned behind the first representation (e.g., 716*a*-1, 714*a*-1, 714*a*-2, 718*a*-2, 716*a*-3, and/or 718*a*-3), the computer system (e.g., 700-1, X700-1, 700-2, X700-2, 700-3, and/or X700-3) applies visual distortion to the first background to visually emphasize the second portion (e.g., to show the second portion at an enlarged size) (e.g., without visually emphasizing the first portion and/or without enlarging the first portion). In some embodiments, the first representation moves with respect to the first background (e.g., to cause different portions of the first background to be visually emphasized and/or to cause different portions of the first background to be positioned behind the first representation) based on movement of the user of the computer system and/or movement of the viewpoint of the user of the computer system relative to the first representation. Displaying a user representation with distorted background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the three-dimensional environment (e.g., 722) (e.g., corresponding to a portion of a virtual environment and/or a portion of a physical environment) of the first participant includes one or more faces. In some embodiments, generating the first background (e.g., 716*c*-1, 714*c*-1, 714*c*-2, 718*c*-2, 716*c*-3, and/or 718*c*-3) includes deemphasizing (or optionally, entirely removing) the one or more faces from the first background (e.g., to exclude faces that are captured by the one or more cameras). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the three-dimensional environment (e.g., 722) (e.g., corresponding to a portion of a virtual environment and/or a portion of a physical environment) of the first participant includes one or more light sources. In some embodiments, the computer system (e.g., 700-1, X700-1, 700-2, X700-2, 700-3, and/or X700-3) generates the first background includes deemphasizing (or optionally entirely removing) the one or more light sources (e.g., to dim light sources that are brighter than a threshold brightness). In some embodiments, generating the first background includes deemphasizing a first light source of the one or more light sources, wherein: in accordance with a determination that the first light source has a first brightness, deemphasizing the first light source by a first amount (e.g., decreasing the brightness by a first amount and/or decreasing the size of the light source by a first amount); and in accordance with a determination that the first light source has a second brightness different from the first brightness, deemphasizing the first light source by a second amount (e.g., decreasing the brightness by a second amount and/or decreasing the size of the light source by a second amount) different from the first amount. In some embodiments, generating the first background includes deemphasizing a first light source of the one or more light sources, wherein: in accordance with a determination that the first light source has a first brightness, deemphasizing the first light source by a first amount (e.g., decreasing the brightness by a first amount and/or decreasing the size of the light source by a first amount); and in accordance with a determination that the first light source has a second brightness that is brighter than the first brightness, deemphasizing the first light source by a second amount that is greater than the first amount (e.g., a greater degree of deemphasizing) (e.g., decreasing the brightness by a second amount greater than the first amount and/or decreasing the size of the light source by a second amount greater than the first amount). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, at a first time, computer system (e.g., 700-1, X700-1, 700-2, X700-2, 700-3, and/or X700-3) displays, via the one or more display generation components, the first representation (e.g., 716-1, 714-1, 714-2, 718-2, 716-3, and/or 718-3) with the first background (e.g., 716*c*-1, 714*c*-1, 714*c*-2, 718*c*-2, 716*c*-3, and/or 718*c*-3) displaying first visual content based on visual information captured by the one or more cameras prior to the first time. In some embodiments, at a second time subsequent to the first time, computer system (e.g., 700-1, X700-1, 700-2, X700-2, 700-3, and/or X700-3) displays, via the one or more display generation components, changing of the first background from displaying the first visual content to displaying second visual content different from the first visual content based on visual information captured by the one or more cameras after the first time (e.g., and before the second time). Updating the background content over time based on new visual information captured by one or more cameras enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience. Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the first representation (e.g., 716*a*-1, 714*a*-1, 714*a*-2, 718*a*-2, 716*a*-3, and/or 718*a*-3) is displayed with a first visual appearance that is determined based on visual information captured by a second set of one or more cameras of the first eternal device that are directed toward the first participant (e.g., one or more inward facing cameras that face toward the first participant and) (in some embodiments, the first external device is a head-mounted system that is worn on the head of the first participant, and the second set of one or more cameras of the first external device are directed toward the first participant while the first external device is worn on the head of the first participant). Displaying a representation of a participant based on one or more inward-facing cameras enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, computer system (e.g., 700-1, X700-1, 700-2, X700-2, 700-3, and/or X700-3) displays, via the one or more display generation components, the first representation (e.g., 716-1, 714-1, 714-2, 718-2, 716-3, and/or 718-3) with the first background (e.g., 716*c*-1, 714*c*-1, 714*c*-2, 718*c*-2, 716*c*-3, and/or 718*c*-3) displaying first visual content. While displaying the first representation with the first background, computer system (e.g., 700-1, X700-1, 700-2, X700-2, 700-3, and/or X700-3) detects a shift in a viewpoint of the user relative to the first representation (e.g., based on movement of the user relative to the first representation and/or based on movement of the first representation (e.g., within the three-dimensional environment) (e.g., while the user remains stationary)). In response to detecting the shift in the viewpoint of the user relative to the first representation, computer system (e.g., 700-1, X700-1, 700-2, X700-2, 700-3, and/or X700-3) displays, via the one or more display generation components, the first visual content with a different appearance determined based on movement of the viewpoint of the user of the computer system relative to the first representation and the first background. In some embodiments, the first background shifts as the viewpoint of the user of the computer system shifts relative to the first representation and the first background. In some embodiments, in response to detecting a shift in the viewpoint of the user relative to the first representation, the computer system displays the first visual content with a different appearance, wherein: in accordance with a determination that the shift in the viewpoint of the user relative to the first representation is a first shift (e.g., a shift with a first direction and/or a first magnitude), the first visual content is displayed with a first appearance; and in accordance with a determination that the shift in the viewpoint of the user relative to the first representation is a second shift (e.g., a shift in a second direction different from the first direction and/or a shift with second magnitude different from the first magnitude) different from the first shift, the first visual content is displayed with a second appearance different from the first appearance. Automatically shifting the background based on movement of the user of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first external device (e.g., 700-1, X700-1, 700-2, X700-2, 700-3, and/or X700-3) displays a second real-time communication user interface (e.g., 712-1, 712-2, and/or 712-3) that corresponds to the real-time communication session and the second real-time communication user interface is displayed on the first external device within a second three-dimensional environment (e.g., 708-1, 708-2, and/or 708-3). In some embodiments, the computer system (e.g., 700-1, X700-1, 700-2, X700-2, 700-3, and/or X700-3) displays, via the one or more display generation components, the first representation with the first background (e.g., 716*c*-1, 714*c*-1, 714*c*-2, 718*c*-2, 716*c*-3, and/or 718*c*-3) displaying first respective visual content. The computer system (e.g., 700-1, X700-1, 700-2, X700-2, 700-3, and/or X700-3) displays, via the one or more display generation components, shifting of the first respective visual content based on the first participant moving the second real-time communication user interface within the second three-dimensional environment (e.g., moving the second real-time communication user interface from a first position in the second three-dimensional environment to a second position in the second three-dimensional environment). In some embodiments, a direction of the movement of the second real-time communication user interface within the second three-dimensional environment at least partially determines a direction of the shifting of the first respective visual content. In some embodiments, a magnitude of the movement of the second real-time communication user interface within the second three-dimensional environment at least partially determines a magnitude of the shifting of the first respective visual content. Automatically shifting the background based on interactions by the first participant enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first background (e.g., **716*c*-1, 714*c*-1, 714*c*-2, 718*c*-2, 716*c*-3, and/or 718*c*-3**) is displayed on a surface (e.g., a virtual surface) (e.g., projected onto the surface) positioned behind the first representation. Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, the surface is a concave surface (e.g., an interior surface of a sphere). Displaying a user representation with background content that is displayed based on visual information captured by one or more outward facing cameras of a device provides a sense of the user's current context and environment while preserving privacy of the user. Furthermore, doing so also reduces the complexity of the device by not requiring rear-facing cameras.

In some embodiments, aspects/operations of methods 800, 900, 1000, 1100, and/or 1200 may be interchanged, substituted, and/or added between these methods. For example, the real-time communication session recited in method 1100 is the real-time communication session recited in methods 800, 900, 1000, and/or 1200. For brevity, these details are not repeated here.

FIG. 12 is a flow diagram of an exemplary method 1200 for real-time communication, in accordance with some embodiments. In some embodiments, method 1200 is performed at a computer system (e.g., 700-1, X700-1, 700-2, X700-2, 700-3, and/or X700-3) (e.g., computer system 101 in FIG. 1A) (e.g., a smart phone, a smart watch, a tablet, a laptop, a desktop, a wearable device, and/or head-mounted device) that is in communication with one or more display generation components (e.g., 702-1, X702-1, 702-2, X702-2, 702-3, and/or X702-3) (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

The computer system (e.g., 700-1, X700-1, 700-2, X700-2, 700-3, and/or X700-3) displays (1202), via the one or more display generation components and within a three-dimensional environment (e.g., 708-1, 708-2, and/or 708-3) (e.g., physical environment, a virtual environment, a virtual passthrough environment, an optical passthrough environment, and/or a virtual environment that is representative of a physical environment that surrounds the computer system), a real-time communication user interface (e.g., 712-1, 712-2, and/or 712-3) (e.g., one or more representations of other participants in the real-time communication session, status information for the real-time communication session, and/or one or more controls for controlling functions of the real-time communication session) that corresponds to (e.g., displays elements of and/or facilitates) a real-time communication session (e.g., audio communication, video communication, text-based communication, graphics-based communication, and/or virtual communication) between a user of the computer system and one or more participants in the real-time communication session different from the user of the computer system (e.g., one or more users of one or more external computer system different from (e.g., separate from and/or remote from) the computer system).

While displaying the real-time communication session user interface, the computer system (e.g., 700-1, X700-1, 700-2, X700-2, 700-3, and/or X700-3) receives (1204), via the one or more input devices, one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to a user request to share content corresponding to a viewpoint of the user of the computer system (e.g., 700-1, X700-1, 700-2, X700-2, 700-3, and/or X700-3) (e.g., selection of control **712*c*-1, 712*c*-2, and/or 712*c*-3**) (in some embodiments, the viewpoint of the user of the computer system and/or the content corresponding to the viewpoint of the user of the computer system includes at least a portion of the three-dimensional environment; in some embodiments, the viewpoint of the user of the computer system and/or the content corresponding to the viewpoint of the user of the computer system includes one or more virtual elements displayed by the one or more display generation components; in some embodiments, the viewpoint of the user of the computer system and/or the content corresponding to the viewpoint of the user of the computer system includes the real-time communication user interface and/or visual representations of the one or more participants in the real-time communication session).

In response to receiving the one or more user inputs corresponding to a user request to share content corresponding to the viewpoint of the user of the computer system, the computer system (e.g., 700-1, X700-1, 700-2, X700-2, 700-3, and/or X700-3) shares (1206) a view of the three-dimensional environment (e.g., 708-1, 708-2, and/or 708-3) that corresponds to the viewpoint of the user of the computer system in the real-time communication session, including causing a first external device (e.g., 700-1, X700-1, 700-2, X700-2, 700-3, and/or X700-3) corresponding to a first participant of the one or more participants in the real-time communication session to display a representation of the view of the three-dimensional environment (e.g., 764-2 and/or 764-3) that corresponds to the viewpoint of the user of the computer system. In some embodiments, causing the first external device to display a representation of the view of the three-dimensional environment that corresponds to the viewpoint of the user of the computer system includes causing the first external device to display content that mirrors at least a portion of the view of the three-dimensional environment from the viewpoint of the user of the computer system and/or mirrors at least a portion of content that is displayed by the one or more display generation components of the computer system (e.g., content that includes at least a portion of the three-dimensional environment). In some embodiments, the representation of the view of the three-dimensional environment that corresponds to the viewpoint of the user of the computer system is displayed by the first external device within a window. In some embodiments, the window is displayed by the first external device within a second three-dimensional environment (e.g., physical environment, a virtual environment, a virtual passthrough environment, an optical passthrough environment, and/or a virtual environment that is representative of a physical environment that surrounds the computer system). In some embodiments, based on one or more user inputs by the first participant corresponding to a request by the first participant to share content corresponding to a viewpoint of the first participant, the computer system displays content corresponding to the viewpoint of the first participant and/or a representation of the view of a second-three dimensional environment and/or the three-dimensional environment that corresponds to the viewpoint of the first participant. In some embodiments, the first external device displays, within a second three-dimensional environment, a second real-time communication user interface that corresponds to the real-time communication session. In some embodiments, the content corresponding to the viewpoint of the first participant and/or a representation of the view of the second three-dimensional environment that corresponds to the viewpoint of the first participant includes at least a portion of the second three-dimensional environment. In some embodiments, the content corresponding to the viewpoint of the first participant and/or the representation of the view of the second three-dimensional environment mirrors at least a portion of the viewpoint of the first participant and/or mirrors at least a portion of content displayed by one or more display generation components of the first external device. Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, sharing the view of the three-dimensional environment that corresponds to the viewpoint of the user of the computer system (e.g., 700-1, X700-1, 700-2, X700-2, 700-3, and/or X700-3) further includes: causing a second external device (e.g., 700-1, X700-1, 700-2, X700-2, 700-3, and/or X700-3) corresponding to a second participant of the one or more participants in the real-time communication session to display a second representation (e.g., 764-2 and/or 764-3) of the view of the three-dimensional environment that corresponds to the viewpoint of the user of the computer system (e.g., 700-1, X700-1, 700-2, X700-2, 700-3, and/or X700-3), wherein the second external device is different from the first external device and the second participant is different from the first participant. Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, sharing the view of the three-dimensional environment that corresponds to the viewpoint of the user of the computer system (e.g., 700-1, X700-1, 700-2, X700-2, 700-3, and/or X700-3) in the real-time communication session comprises causing a first shared window (e.g., 764-1 and/or 764-2) that displays the view of the three-dimensional environment that corresponds to the viewpoint of the user of the computer system (e.g., 700-1, X700-1, 700-2, X700-2, 700-3, and/or X700-3) to be displayed within the three-dimensional environment (e.g., 708-1, 708-2, and/or 708-3). In some embodiments, causing the first external device corresponding to the first participant to display the representation of the view of the three-dimensional environment that corresponds to the viewpoint of the user of the computer system comprises causing the first external device to display the first shared window (e.g., a representation of the first shared window) (e.g., within the three-dimensional environment). In some embodiments, causing the second external device corresponding to the second participant of the one or more participants in the real-time communication session to display the second representation of the view of the three-dimensional environment that corresponds to the viewpoint of the user of the computer system comprises causing the second external device to display the first shared window (e.g., a representation of the first shared window) (e.g., within the three-dimensional environment). In some embodiments, the three-dimensional environment is a shared environment that is visible to all participants in the real-time communication session and/or a plurality of participants in the real-time communication session. Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, the first shared window (e.g., 746-1 and/or 764-2) is displayed at a first position within the three-dimensional environment (e.g., 708-1, 708-2, and/or 708-3). In some embodiments, causing the first external device to display the first shared window comprises causing the first external device to display the first shared window at the first position within the three-dimensional environment. In some embodiments, causing the second external device to display the first shared window comprises causing the second external device to display the first shared window at the first position within the three-dimensional environment. Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, causing the first external device to display a representation of the view of the three-dimensional environment that corresponds to the viewpoint of the user of the computer system (e.g., 700-1, X700-1, 700-2, X700-2, 700-3, and/or X700-3) comprises causing the first external device to display a first window (e.g., 764-3) that displays the view of the three-dimensional environment that corresponds to the viewpoint of the user of the computer system. In some embodiments, causing the second external device to display a representation of the view of the three-dimensional environment that corresponds to the viewpoint of the user of the computer system comprises causing the second external device to display a second window (e.g., 764-3) (e.g., a second window different from the first window) that displays the view of the three-dimensional environment that corresponds to the viewpoint of the user of the computer system (e.g., 700-1, X700-1, 700-2, X700-2, 700-3, and/or X700-3). Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while the first external device (e.g., 700-1, X700-1, 700-2, X700-2, 700-3, and/or X700-3) displays the representation (e.g., 764-2 and/or 764-3) of the view of the three-dimensional environment that corresponds to the viewpoint of the user of the computer system, the computer system (e.g., 700-1, X700-1, 700-2, X700-2, 700-3, and/or X700-3) does not display a representation of the view of the three-dimensional environment that corresponds to the viewpoint of the user of the computer system (e.g., electronic device 700-1 in FIG. 7W) (e.g., in some embodiments, the computer system displays a view of the three-dimensional environment, but does not display a separate window and/or a separate representation that depicts the view of the three-dimensional environment that corresponds to the viewpoint of the user of the computer system). Forgoing displaying the share view window on the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while the first external device displays the representation of the view of the three-dimensional environment that corresponds to the viewpoint of the user of the computer system, the computer system (e.g., 700-1, X700-1, 700-2, X700-2, 700-3, and/or X700-3) displays, via the one or more display generation components, a first graphical indication (e.g., 766-1, and/or 766-3) indicating what portion of the three-dimensional environment is visible to (e.g., is being shared to) other participants in the real-time communication session (e.g., a first graphical indication indicating what portion of the three-dimensional environment is being displayed on the first external device within the representation of the view of the three-dimensional environment that corresponds to the viewpoint of the user of the computer system). Providing the user with an indication of what portion of a three-dimensional environment is being shared in the real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first graphical indication comprises one or more brackets (e.g., 766-1 and/or 766-3) displayed concurrently with (e.g., embedded in or overlaid on) a view of a three-dimensional environment that is visible to the user (e.g., one or more brackets that surround and/or encapsulate a portion of the three-dimensional environment). Providing the user with an indication of what portion of a three-dimensional environment is being shared in the real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first graphical indication (e.g., 766-1 and/or 766-3) comprises an outline displayed concurrently with (e.g., embedded in or overlaid on) a view of a three-dimensional environment that is visible to the user (e.g., a rectangular outline or other closed outline) (e.g., an outline that surrounds and/or encapsulates a portion of the three-dimensional environment). Providing the user with an indication of what portion of a three-dimensional environment is being shared in the real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the real-time communication session user interface (e.g., 712-1, 712-2, and/or 712-3) includes a share option (e.g., 712*c*-1, 712*c*-2, and/or 712*c*-3). In some embodiments, the one or more user inputs corresponding to the user request to share content corresponding to the viewpoint of the user of the computer system comprises one or more user inputs (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the share option. Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, prior to receiving the one or more user inputs corresponding to a user request to share content corresponding to the viewpoint of the user of the computer system, the computer system (e.g., 700-1, X700-1, 700-2, X700-2, 700-3, and/or X700-3) displays, via the one or more display generation components, a first representation (e.g., 764-3 on electronic device 700-3) of (e.g., a first window displaying) content (e.g., an application, a media item, a game or other shared content) that is being shared in the real-time communication session (e.g., content that is being viewed by the user and one or more other participants concurrently). In response to receiving the one or more user inputs (e.g., 767 and/or 768) corresponding to the user request to share content corresponding to the viewpoint of the user of the computer system, the computer system (e.g., 700-1, X700-1, 700-2, X700-2, 700-3, and/or X700-3) causes the content to cease to be shared in the real-time communication session (e.g., in FIG. 7Y, electronic device

700-1 stops sharing based on electronic device 700-3 starting sharing). Automatically ceasing another device's sharing when the computer system starts sharing enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, causing the content to cease to be shared in the real-time communication session includes ceasing to display the content (e.g., for the user and for one or more other participants in the real-time communication session) (e.g., in FIG. 7Y, electronic device 700-1 stops sharing based on electronic device 700-3 starting sharing). Automatically ceasing another device's sharing when the computer system starts sharing enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, causing the content to cease to be shared in the real-time communication session includes transitioning the content from being shared content to being private content (e.g., for the user) and, optionally, causing the content to cease to be displayed for one or more other participants in the real-time communication session because the content has become private content that is no longer shared in the real-time communication session (e.g., in FIG. 7Y, electronic device 700-1 stops sharing based on electronic device 700-3 starting sharing). Automatically ceasing another device's sharing when the computer system starts sharing enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the real-time communication session user interface (e.g., 712-1, 712-2, and/or 712-3) includes a sharing object (e.g., 712*c*-1, 712*c*-2, and/or 712*c*-3). In some embodiments, while sharing the view of the three-dimensional environment that corresponds to the viewpoint of the user of the computer system in the real-time communication session, the computer system (e.g., 700-1, X700-1, 700-2, X700-2, 700-3, and/or X700-3) receives, via the one or more input devices, a selection input (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the sharing object. In response to receiving the selection input corresponding to selection of the sharing object, the computer system (e.g., 700-1, X700-1, 700-2, X700-2, 700-3, and/or X700-3) ceases sharing the view of the three-dimensional environment that corresponds to the viewpoint of the user of the computer system in the real-time communication session. In some embodiments, ceasing sharing the view of the three-dimensional environment that corresponds to the viewpoint of the user of the computer system in the real-time communication session includes causing the first external device to cease display of the representation of the view of the three-dimensional environment that corresponds to the viewpoint of the user of the computer system. Providing the user with an option to end viewpoint sharing enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while sharing the view of the three-dimensional environment that corresponds to the viewpoint of the user of the computer system in the real-time communication session, the computer system (e.g., 700-1, X700-1, 700-2, X700-2, 700-3, and/or X700-3) displays the sharing object (e.g., 712*c*-1, 712*c*-2, and/or 712*c*-3) with a first set of visual characteristics (e.g., color, shape, size, opacity, saturation, outline, fill color, and/or contrast) indicative of ongoing sharing of the viewpoint of the user of the computer system in the real-time communication session. In response to receiving the selection input corresponding to selection of the sharing object, the computer system (e.g., 700-1, X700-1, 700-2, X700-2, 700-3, and/or X700-3) displays the sharing object with a second set of visual characteristics (e.g., color, shape, size, opacity, saturation, outline, fill color, and/or contrast) different from the first set of visual characteristics (e.g., a second set of visual characteristics indicative of not sharing the viewpoint of the user of the computer system in the real-time communication session). Varying visual characteristics of the sharing object based on whether or not the computer system is sharing enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while sharing the view of the three-dimensional environment that corresponds to the viewpoint of the user of the computer system in the real-time communication session, the computer system (e.g., 700-1, X700-1, 700-2, X700-2, 700-3, and/or X700-3) receives first information indicative of a user request to share other content in the real-time communication session (e.g., a user request from the user of the computer system and/or other participants in the real-time communication session) (e.g., in FIGS. 7X-7Y, electronic device 700-1 receives information indicating electronic device 700-3 has requested to share). In response to receiving the first information, the computer system (e.g., 700-1, X700-1, 700-2, X700-2, 700-3, and/or X700-3) ceases sharing the view of the three-dimensional environment that corresponds to the viewpoint of the user of the computer system. In some embodiments, ceasing sharing the view of the three-dimensional environment that corresponds to the viewpoint of the user of the computer system in the real-time communication session includes causing the first external device to cease display of the representation of the view of the three-dimensional environment that corresponds to the viewpoint of the user of the computer system. In some embodiments, in response to receiving the first information, the computer system displays, via the one or more display generation components, the other content that is being shared in the real-time communication session. Automatically stopping sharing when another user attempts to share content enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while sharing the view of the three-dimensional environment that corresponds to the viewpoint of the user of the computer system in the real-time communication session, the computer system (e.g., 700-1, X700-1, 700-2, X700-2, 700-3, and/or X700-3) receives an indication that the first participant has requested to share content corresponding to the viewpoint of the first participant in the real-time communication session. In response to receiving the indication that the first participant has requested to share content corresponding to the viewpoint of the first participant in the real-time communication session, the computer system (e.g., 700-1, X700-1, 700-2, X700-2, 700-3, and/or X700-3) ceases sharing the view of the three-dimensional environment that corresponds to the viewpoint of the user of the computer system in the real-time communication session (e.g., in FIGS. 7X-7Y, electronic device 700-1 receives information indicating electronic device 700-3 has requested to share). In some embodiments, ceasing sharing the view of the three-dimensional environment that corresponds to the viewpoint of the user of the computer system in the real-time communication session includes causing the first external device to cease display of the representation of the view of the three-dimensional environment that corresponds to the viewpoint of the user of the computer system. In some embodiments, in response to receiving the indication that the first participant has requested to share content corresponding to the viewpoint of the first participant in the real-time communication session, the computer system displays, via the one or more display generation components, a representation of a view of the three-dimensional environment that corresponds to a viewpoint of the first participant. Automatically stopping sharing when another user attempts to share content enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the indication that the first participant has requested to share content corresponding to the viewpoint of the first participant in the real-time communication session, the computer system (e.g., 700-1, X700-1, 700-2, X700-2, 700-3, and/or X700-3) displays, via the one or more display generation components, a first window (e.g., 764-1 on electronic device 700-1) that displays a view of the three-dimensional environment that corresponds to a viewpoint of the first participant. Displaying the shared viewpoint of another user within the first window enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more interesting and/or immersive user experience.

In some embodiments, prior to receiving the one or more user inputs corresponding to the user request to share content corresponding to the viewpoint of the user of the computer system, the computer system (e.g., 700-1, X700-1, 700-2, X700-2, 700-3, and/or X700-3) detects, via one or more input devices, one or more gaze inputs directed to a predefined location (e.g., 711-1, 711-2, and/or 711-3) relative to a viewpoint of the user of the computer system (e.g., a predefined location within the field of view of the user, the computer system, and/or one or more components of the computer system (e.g., one or more cameras of the computer system); a predefined display position of the one or more display generation components; and/or a predefined position within a three-dimensional environment) (e.g., one or more gaze inputs in which the user is looking at the predefined location). In response to detecting the one or more gaze inputs (and optionally one or more selection inputs) directed to the predefined location relative to the viewport into the three-dimensional environment, the computer system (e.g., 700-1, X700-1, 700-2, X700-2, 700-3, and/or X700-3) displays, via the one or more display generation components, a system user interface (e.g. 772 and/or 772-2) (e.g., a user interface that is displayed concurrently with and/or overlaid on a representation of a three-dimensional environment (e.g., an optical passthrough environment or a virtual passthrough environment) (In some embodiments, a transparent and/or semi-transparent user interface.) that includes a plurality of controls (e.g., 772*a*, 772*a*-2, 772*b*, 772*b*-2, 772*c*, 772*c*-2, 772*d*, 772*d*-2, 772*g*, and/or 772*g*-2) pertaining to the real-time communication session (e.g., an end control that is selectable to end the real-time communication session; and/or a mode transition control that is selectable to indicate a user request (e.g., by the user of the computer system) to transition from the spatially-constrained representation mode to the spatially-flexible representation mode, to transition from the spatially-constrained representation mode to the spatially-flexible representation mode, and/or transition from the spatially-flexible representation mode to the spatially-constrained representation mode) including a share viewpoint object (e.g., 772*d*-2), wherein: the one or more user inputs corresponding to the user request to share corresponding to a viewpoint of the user of the computer system comprises one or more user inputs corresponding to selection of the share viewpoint object. In some embodiments, the system user interface is a user interface that is displayed in response to one or more user gaze inputs directed to a predefined location relative to a viewpoint of the user of the computer system (e.g., a predefined location within the field of view of the user, the computer system, and/or one or more components of the computer system (e.g., one or more cameras of the computer system); a predefined display position of the one or more display generation components; and/or a predefined position within a three-dimensional environment). Providing the user with an option to share their viewpoint in a real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, varied, and/or interesting user experience.

In some embodiments, while displaying the system user interface (e.g., 772 and/or 772-2), the computer system (e.g., 700-1, X700-1, 700-2, X700-2, 700-3, and/or X700-3) detects one or more gaze inputs directed to a second location different from the predefined location. In response to detecting the one or more gaze inputs: in accordance with a determination that the computer system is sharing the viewpoint of the user of the computer system in the real-time communication session, the computer system (e.g., 700-1, X700-1, 700-2, X700-2, 700-3, and/or X700-3) maintains display of the system user interface (e.g., a system user interface that includes one or more controls for ending, changing or otherwise managing the sharing of the viewpoint of the user of the computer system in the real-time communication session); and in accordance with a determination that the computer system is not sharing the viewpoint of the user of the computer system in the real-time communication session, the computer system (e.g., 700-1, X700-1, 700-2, X700-2, 700-3, and/or X700-3) ceases display of the system user interface (e.g., a system user interface that includes one or more controls for starting sharing of the viewpoint of the user of the computer system in the real-time communication session). In some embodiments, the system user interface is persistently displayed while the computer system is sharing the viewpoint of the user of the computer system in the real-time communication session. In some embodiments, when the computer system is not sharing the viewpoint of the user of the computer system in the real-time communication session, the system user interface automatically ceases to be displayed when certain criteria are met (e.g., the user is no longer looking at the system user interface and/or the predefined location). Persistently displaying the system user interface when viewpoint sharing, and automatically ceasing display of the system user interface when not viewpoint sharing, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, prior to sharing the view of the three-dimensional environment that corresponds to the viewpoint of the user of the computer system in the real-time communication session, the computer system (e.g., 700-1, X700-1, 700-2, X700-2, 700-3, and/or X700-3) displays, via the one or more display generation components, a representation of the first participant (e.g., a virtual representation and/or an avatar) (e.g., 716*e*-1, 714*c*-1, 714*e*-2, 718*e*-2, 718*e*-3, 716*e*-3, 716-1, 714-1, 714-2, 718-2, 718-3, and/or 716-3) at a first position within the real-time communication session user interface. In some embodiments, in response to receiving the one or more user inputs corresponding to a user request to share content corresponding to the viewpoint of the user of the computer system, the computer system (e.g., 700-1, X700-1, 700-2, X700-2, 700-3, and/or X700-3) shifts the representation of the first participant from the first position to a second position in the real-time communication session user interface different from the first position. In some embodiments, when the computer system starts to share the viewpoint of the user of the computer system in the real-time communication session, spatial locations of one or more representations of the one or more participants are moved within the real-time communication session user interface. In some embodiments, when the computer system starts to share the viewpoint of the user of the computer system in the real-time communication session, spatial locations of a plurality of representations corresponding to a plurality of participants are moved within the real-time communication session user interface (e.g., in some embodiments, to different locations in the three-dimensional environment). Automatically shifting participant representations when viewpoint sharing starts enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the real-time communication user interface comprises displaying a first visual representation of a first participant (e.g., 716*e*-1 and/or 714*a*-1 in FIG. 7U) of the one or more participants (e.g., a first participant different from the user of the computer system) (e.g., a spatially-constrained representation; a spatially-flexible representation; and/or a representation that moves based on detected movement of the first participant). In response to receiving the one or more user inputs (e.g., 762) corresponding to the user request to share content corresponding to the viewpoint of the user of the computer system, the computer system (e.g., 700-1, 700-2, 700-3. X700-1. X700-2, and/or X700-3) ceases display of the first visual representation of the first participant (e.g., while the content corresponding to the viewpoint of the user of the computer system is being shared into the real-time communication session) (e.g., HMD X700-1 ceases display of representations 716*e*-1 and 714*a*-1 in FIG. 7V3). Hiding representations of other participants when the user shares his or her viewpoint into the real-time communication session enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the users with visual feedback about the state of the system (e.g., the user is sharing his or her viewpoint into the real-time communication session).

In some embodiments, in response to receiving the one or more user inputs (e.g., 762) corresponding to the user request to share content corresponding to the viewpoint of the user of the computer system, the computer system (e.g., 700-1, 700-2, 700-3. X700-1. X700-2, and/or X700-3) causes the first external device (e.g., X700-2 and/or X700-3) corresponding to the first participant to transition from visually representing the user of the computer system with a first representation (e.g., 718*e*-2 and/or 7183) (e.g., a visual representation, an avatar representation, an anthropomorphic avatar, an avatar visual representation that includes a first portion (e.g., an avatar head) that moves based on movement of the user's head, a second portion (e.g., an avatar torso) that moves based on movement of the user's torso, a third portion (e.g., an avatar face) that moves based on movement of the user's face, and/or a fourth portion (e.g., avatar arms) that moves based on movement of the user's arms) that includes a plurality of points of movement that move based on detected movement of corresponding parts of the body of the user of the computer system, to visually representing the user of the computer system with a second representation (e.g., 718*e*-2*a* and/or 718-3*a*) (e.g., a second visual representation, a non-anthropomorphic representation, a monogram, and/or a shape) different from the first representation, wherein the second representation has fewer points of movement that move based on detected movement of the body of the user of the computer system than the first representation. Switching the representation of the user from one type of visual representation to a different visual representation when the user is sharing his or her viewpoint into the real-time communication session provides other participants with visual feedback about the state of the system (e.g., the user is sharing his or her viewpoint into the real-time communication session). Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying first content within a first content window (e.g., 777-1 in FIG. 7HH) (e.g., a user interface and/or content being displayed by an application (or, in some embodiments, one or more applications)) (e.g., a first content window that has a spatial position within the three-dimensional environment), the computer system receives, via the one or more input devices, one or more user inputs (e.g., 781-1) (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to a user request to share the first content into the real-time communication session. In response to receiving the one or more user inputs corresponding to the user request to share the first content into the real-time communication session, the computer system causes the first external device (e.g., X700-2 and/or X700-3) to display the first content within a second content window (e.g., 777-2 and/or 777-3) (e.g., a second content window that has a spatial position within the three-dimensional environment (e.g., a spatial position that corresponds to and/or is the same as the first content window)) (e.g., a second content window that is representative of the first content window and/or corresponds to the first content window), wherein: the first content window (e.g., 777-1) is resizable in response to user input by the user of the computer system (e.g., resizing option 783-1); and the second content window (e.g., 777-3 and/or 777-3) is not resizable in response to user input by the first participant. In some embodiments, the user of the computer system (e.g., X700-1) (e.g., the sharer of the first content) is able to resize the first content and/or the first content window, while the first participant and/or other participants are not able to resize the first content. In some embodiments, while displaying the first content within the first content window (e.g., 777-1), and while the first external device (e.g., X700-2 and/or X700-3) displays the first content within the second content window (e.g., 777-2 and/or 777-3), the computer system receives one or more user inputs corresponding to a user request to resize the first content window from a first size to a second size different from the first size (e.g., one or more inputs interacting with option 783-1). In response to receiving the one or more user inputs corresponding to the user request to resize the first content window from the first size to the second size, the computer system displays the first content window (e.g., 777-1) changing from the first size to the second size; and causes the first external device (e.g., X700-2) to display the second content window (e.g., 777-2) changing from a third size (e.g., a third size that is the same as and/or corresponds to the first size) to a fourth size (e.g., a fourth size that is the same as and/or corresponds to the second size) different from the third size. Allowing a sharing user to resize shared content, while prohibiting other users from resizing the shared content, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying third content within a third content window (e.g., 785-3) (e.g., a user interface and/or content being displayed by an application (or, in some embodiments, one or more applications)) (e.g., a third content window that has a spatial position within the three-dimensional environment), the computer system (e.g., X700-3) receives, via the one or more input devices, one or more user inputs (e.g., 789-3) (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to a user request to share the third content into the real-time communication session. In response to receiving the one or more user inputs corresponding to the user request to share the third content into the real-time communication session, the computer system causes the first external device (e.g., X700-1 and/or X700-2) to display the third content within a fourth content window (e.g., 785-1 and/or 785-2) (e.g., a fourth content window that has a spatial position within the three-dimensional environment (e.g., a spatial position that corresponds to and/or is the same as the third content window)) (e.g., a fourth content window that is representative of the third content window and/or corresponds to the third content window), wherein: in accordance with a determination that the computer system (e.g., X700-3) is participating in the real-time communication session in a first manner (e.g., a spatially-constrained manner, and/or in a first manner in which the user of the computer system is represented in the real-time communication session with a spatially-constrained representation), the fourth content window (e.g., 785-1 and/or 785-2) is resizable in response to user input by the first participant (and, in some embodiments, is not resizable in response to user input by the user of the computer system) (e.g., interacting with resizing option 789-1 and/or 789-2); and in accordance with a determination that the computer system is participating in the real-time communication session in a second manner (e.g., a spatially-flexible manner, and/or in a second manner in which the user of the computer system is represented in the real-time communication session with a spatially-flexible representation) different from the first manner, the fourth content window is not resizable in response to user input by the first participant (and, in some embodiments, is resizable in response to user input by the user of the computer system) (e.g., in FIG. 7II, windows 777-2 and/or 777-3 are not resizable by the users of HMD X700-2 and/or X700-3 because HMD X700-1 is participating in the real-time communication session in the spatially-flexible representation mode). Allowing the first participant to resize the third content when the sharing user is participating in the real-time communication session in a first manner, and prohibiting the first participant from resizing the third content when the sharing user is participating in the real-time communication session in a second manner, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 900, 1000, 1100, and/or 1200 may be interchanged, substituted, and/or added between these methods For example, the real-time communication session recited in method 1200 is the real-time communication session recited in methods 800, 900, 1000, and/or 1100. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components, comprising:

one or more processors; and memory storing one or more programs configured to be executed by the one or more processors, the one or more programs including instructions for:

displaying, via the one or more display generation components and within a three-dimensional environment, a real-time communication user interface that corresponds to a real-time communication session between a user of the computer system and one or more participants in the real-time communication session different from the user of the computer system;

displaying, via the one or more display generation components, a first spatially-constrained representation of a first participant of the one or more participants in the real-time communication session, wherein the first spatially-constrained representation of the first participant includes:

a first portal that has a spatial position in the three-dimensional environment that is determined by the computer system; and a first visual representation of the first participant that moves based on detected movement of the first participant, wherein the first visual representation is displayed at least partially within the first portal;

while displaying the first spatially-constrained representation of the first participant within the real-time communication user interface, detecting a request from a respective participant in the real-time communication session to transition from a spatially-constrained representation mode, in which the first participant in the real-time communication session is visually represented using the first spatially-constrained representation, to a spatially-flexible representation mode, in which the first participant in the real-time communication session is visually represented using a first spatially-flexible representation, wherein the spatially-flexible representation mode is different from the spatially-constrained representation mode; and in response to detecting the request from the respective participant in the real-time communication session to transition from the spatially-constrained representation mode to the spatially-flexible representation mode:

displaying, via the one or more display generation components, the first spatially-flexible representation of the first participant that moves based on detected movement of the first participant and has a spatial position in the three-dimensional environment relative to one or more other objects in the three-dimensional environment that is determined at least in part based on movement of the first participant, wherein the spatially-flexible representation mode includes one of displaying the first participant without the first portal, displaying the first participant with the first portal having a non-visible border, and displaying the first participant with the first portal having a partially surrounding border.

2. The computer system of claim 1, the one or more programs further including instructions for:

prior to displaying the real-time communication user interface that corresponds to the real-time communication session between the user of the computer system and one or more participants in the real-time communication session different from the user of the computer system, receiving, via one or more input devices, one or more user inputs corresponding to a user request to initiate the real-time communication session; and in response to receiving the one or more user inputs corresponding to the user request to initiate the real-time communication session:

displaying, via the one or more display generation components and within the three-dimensional environment:

the real-time communication user interface; and the first spatially-constrained representation of the first participant.

3. The computer system of claim 1, wherein the first visual representation of the first participant is a three-dimensional representation that moves within the first portal based on detected movement of the first participant.

4. The computer system of claim 1, wherein the first spatially-flexible representation of the first participant does not include the first portal.

5. The computer system of claim 1, wherein the first portal displays visual content that is determined at least in part based on one or more video feeds captured by one or more cameras of a first external device being used by the first participant.

6. The computer system of claim 1, the one or more programs further including instructions for:

in response to detecting the request from the respective participant in the real-time communication session to transition from the spatially-constrained representation mode to the spatially-flexible representation mode:

displaying the first spatially-flexible representation of the first participant at a first spatial position within the three-dimensional environment.

7. The computer system of claim 1, wherein displaying the first spatially-flexible representation of the first participant is performed in accordance with a determination that at least two of the participants in the real-time communication session have requested to transition from the spatially-constrained representation mode to the spatially-flexible representation mode.

8. The computer system of claim 1, the one or more programs further including instructions for:

while displaying the first spatially-constrained representation of the first participant, receiving, via one or more input devices, a second set of user inputs corresponding to a user request to transition from the spatially-constrained representation mode to the spatially-flexible representation mode;

in response to receiving the second set of user inputs:

in accordance with a determination that less than a threshold number of participants in the real-time communication session have requested to transition from the spatially-constrained representation mode to the spatially-flexible representation mode, maintaining display of the first spatially-constrained representation of the first participant;

subsequent to receiving the second set of user inputs, and while displaying the first spatially-constrained representation of the first participant, receiving, via the one or more input devices a third set of user inputs corresponding to a repeated user request to transition from the spatially-constrained representation mode to the spatially-flexible representation mode; and in response to receiving the third set of user inputs:

in accordance with a determination that less than a threshold number of participants in the real-time communication session have requested to transition from the spatially-constrained representation mode to the spatially-flexible representation mode, displaying a first indication that indicates that less than the threshold number of participants in the real-time communication session have requested to transition from the spatially-constrained representation mode to the spatially-flexible representation mode.

9. The computer system of claim 1, wherein:

while the computer system displays the first spatially-constrained representation of the first participant, the user of the computer system is visually represented by one or more external devices corresponding to the one or more participants in the real-time communication session in a first manner; and while the computer system displays the first spatially-flexible representation of the first participant, the user of the computer system is visually represented by the one or more external devices in a second manner different from the first manner.

10. The computer system of claim 1, the one or more programs further including instructions for:

while displaying the first spatially-constrained representation of the first participant, displaying, via the one or more display generation components, a mode transition indication indicating that one or more participants in the real-time communication session have requested to transition from the spatially-constrained representation mode to the spatially-flexible representation mode.

11. The computer system of claim 1, the one or more programs further including instructions for:

while displaying the first spatially-constrained representation of the first participant, displaying, via the one or more display generation components, a mode transition object that is selectable by the user of the computer system to indicate a user request to transition from the spatially-constrained representation mode to the spatially-flexible representation mode, wherein:

detecting the request from the respective participant in the real-time communication session to transition from the spatially-constrained representation mode to the spatially-flexible representation mode comprises detecting a selection input corresponding to selection of the mode transition object.

12. The computer system of claim 1, the one or more programs further including instructions for:

detecting, via one or more input devices, one or more gaze inputs directed to a predefined location relative to a viewport into the three-dimensional environment of the computer system; and in response to detecting the one or more gaze inputs directed to the predefined location relative to the viewport into the three-dimensional environment, displaying, via the one or more display generation components, a system user interface that includes a plurality of controls pertaining to the real-time communication session.

13. The computer system of claim 1, the one or more programs further including instructions for:

in response to detecting the request from the respective participant in the real-time communication session to transition from the spatially-constrained representation mode to the spatially-flexible representation mode, displaying, via the one or more display generation components, a first notice pertaining to the spatially-flexible representation mode.

14. The computer system of claim 1, the one or more programs further including instructions for:

while displaying the first spatially-flexible representation of the first participant, detecting that a new participant has joined the real-time communication session; and in response to detecting that the new participant has joined the real-time communication session:

in accordance with a determination that the real-time communication session has greater than a threshold number of participants:

ceasing display of the first spatially-flexible representation of the first participant; and displaying, via the one or more display generation components, the first spatially-constrained representation of the first participant.

15. The computer system of claim 1, the one or more programs further including instructions for:

displaying, via the one or more display generation components, a share view option;

while displaying share view option, detecting, via one or more input devices, a selection input corresponding to selection of the share view option; and in response to detecting the selection input corresponding to selection of the share view option, causing one or more external devices corresponding to the one or more participants in the real-time communication session to display visual content that corresponds to a viewpoint of the user of the computer system.

16. The computer system of claim 1, the one or more programs further including instructions for:

while displaying the first spatially-constrained representation of the first participant, displaying, via the one or more display generation components, a mode object that is selectable by the user of the computer system to indicate a user request to transition from the spatially-constrained representation mode to the spatially-flexible representation mode;

while displaying the mode object, detecting a selection input corresponding to selection of the mode object; and in response to detecting the selection input corresponding to selection of the mode object, displaying, via the one or more display generation components, a first visual indicator.

17. The computer system of claim 1, the one or more programs further including instructions for:

in response to detecting the request from the respective participant in the real-time communication session to transition from the spatially-constrained representation mode to the spatially-flexible representation mode, ceasing display of the first spatially-constrained representation of the first participant.

18. A non-transitory computer-readable storage medium storing one or more programs configured to be executed by one or more processors of a computer system that is in communication with one or more display generation components, the one or more programs including instructions for:

displaying, via the one or more display generation components and within a three-dimensional environment, a real-time communication user interface that corresponds to a real-time communication session between a user of the computer system and one or more participants in the real-time communication session different from the user of the computer system;

displaying, via the one or more display generation components, a first spatially-constrained representation of a first participant of the one or more participants in the real-time communication session, wherein the first spatially-constrained representation of the first participant includes:

a first portal that has a spatial position in the three-dimensional environment that is determined by the computer system; and a first visual representation of the first participant that moves based on detected movement of the first participant, wherein the first visual representation is displayed at least partially within the first portal;

while displaying the first spatially-constrained representation of the first participant within the real-time communication user interface, detecting a request from a respective participant in the real-time communication session to transition from a spatially-constrained representation mode, in which the first participant in the real-time communication session is visually represented using the first spatially-constrained representation, to a spatially-flexible representation mode, in which the first participant in the real-time communication session is visually represented using a first spatially-flexible representation, wherein the spatially-flexible representation mode is different from the spatially-constrained representation mode; and in response to detecting the request from the respective participant in the real-time communication session to transition from the spatially-constrained representation mode to the spatially-flexible representation mode:

displaying, via the one or more display generation components, the first spatially-flexible representation of the first participant that moves based on detected movement of the first participant and has a spatial position in the three-dimensional environment relative to one or more other objects in the three-dimensional environment that is determined at least in part based on movement of the first participant, wherein the spatially-flexible representation mode includes one of displaying the first participant without the first portal, displaying the first participant with the first portal having a non-visible border, and displaying the first participant with the first portal having a partially surrounding border.

19. The non-transitory computer-readable storage medium of claim 18, the one or more programs further including instructions for:

prior to displaying the real-time communication user interface that corresponds to the real-time communication session between the user of the computer system and one or more participants in the real-time communication session different from the user of the computer system, receiving, via one or more input devices, one or more user inputs corresponding to a user request to initiate the real-time communication session; and in response to receiving the one or more user inputs corresponding to the user request to initiate the real-time communication session:

displaying, via the one or more display generation components and within the three-dimensional environment:

the real-time communication user interface; and the first spatially-constrained representation of the first participant.

20. The non-transitory computer-readable storage medium of claim 18, wherein the first visual representation of the first participant is a three-dimensional representation that moves within the first portal based on detected movement of the first participant.

21. The non-transitory computer-readable storage medium of claim 18, wherein the first spatially-flexible representation of the first participant does not include the first portal.

22. The non-transitory computer-readable storage medium of claim 18, wherein the first portal displays visual content that is determined at least in part based on one or more video feeds captured by one or more cameras of a first external device being used by the first participant.

23. The non-transitory computer-readable storage medium of claim 18, the one or more programs further including instructions for:

in response to detecting the request from the respective participant in the real-time communication session to transition from the spatially-constrained representation mode to the spatially-flexible representation mode:

displaying the first spatially-flexible representation of the first participant at a first spatial position within the three-dimensional environment.

24. The non-transitory computer-readable storage medium of claim 18, wherein displaying the first spatially-flexible representation of the first participant is performed in accordance with a determination that at least two of the participants in the real-time communication session have requested to transition from the spatially-constrained representation mode to the spatially-flexible representation mode.

25. The non-transitory computer-readable storage medium of claim 18, the one or more programs further including instructions for:

while displaying the first spatially-constrained representation of the first participant, receiving, via one or more input devices, a second set of user inputs corresponding to a user request to transition from the spatially-constrained representation mode to the spatially-flexible representation mode;

in response to receiving the second set of user inputs:

in accordance with a determination that less than a threshold number of participants in the real-time communication session have requested to transition from the spatially-constrained representation mode to the spatially-flexible representation mode, maintaining display of the first spatially-constrained representation of the first participant;

subsequent to receiving the second set of user inputs, and while displaying the first spatially-constrained representation of the first participant, receiving, via the one or more input devices a third set of user inputs corresponding to a repeated user request to transition from the spatially-constrained representation mode to the spatially-flexible representation mode; and in response to receiving the third set of user inputs:

in accordance with a determination that less than a threshold number of participants in the real-time communication session have requested to transition from the spatially-constrained representation mode to the spatially-flexible representation mode, displaying a first indication that indicates that less than the threshold number of participants in the real-time communication session have requested to transition from the spatially-constrained representation mode to the spatially-flexible representation mode.

26. The non-transitory computer-readable storage medium of claim 18, wherein:

while the computer system displays the first spatially-constrained representation of the first participant, the user of the computer system is visually represented by one or more external devices corresponding to the one or more participants in the real-time communication session in a first manner; and while the computer system displays the first spatially-flexible representation of the first participant, the user of the computer system is visually represented by the one or more external devices in a second manner different from the first manner.

27. The non-transitory computer-readable storage medium of claim 18, the one or more programs further including instructions for:

while displaying the first spatially-constrained representation of the first participant, displaying, via the one or more display generation components, a mode transition indication indicating that one or more participants in the real-time communication session have requested to transition from the spatially-constrained representation mode to the spatially-flexible representation mode.

28. The non-transitory computer-readable storage medium of claim 18, the one or more programs further including instructions for:

while displaying the first spatially-constrained representation of the first participant, displaying, via the one or more display generation components, a mode transition object that is selectable by the user of the computer system to indicate a user request to transition from the spatially-constrained representation mode to the spatially-flexible representation mode, wherein:

detecting the request from the respective participant in the real-time communication session to transition from the spatially-constrained representation mode to the spatially-flexible representation mode comprises detecting a selection input corresponding to selection of the mode transition object.

29. The non-transitory computer-readable storage medium of claim 18, the one or more programs further including instructions for:

detecting, via one or more input devices, one or more gaze inputs directed to a predefined location relative to a viewport into the three-dimensional environment of the computer system; and in response to detecting the one or more gaze inputs directed to the predefined location relative to the viewport into the three-dimensional environment, displaying, via the one or more display generation components, a system user interface that includes a plurality of controls pertaining to the real-time communication session.

30. The non-transitory computer-readable storage medium of claim 18, the one or more programs further including instructions for:

in response to detecting the request from the respective participant in the real-time communication session to transition from the spatially-constrained representation mode to the spatially-flexible representation mode, displaying, via the one or more display generation components, a first notice pertaining to the spatially-flexible representation mode.

31. The non-transitory computer-readable storage medium of claim 18, the one or more programs further including instructions for:

while displaying the first spatially-flexible representation of the first participant, detecting that a new participant has joined the real-time communication session; and in response to detecting that the new participant has joined the real-time communication session:

in accordance with a determination that the real-time communication session has greater than a threshold number of participants:

ceasing display of the first spatially-flexible representation of the first participant; and displaying, via the one or more display generation components, the first spatially-constrained representation of the first participant.

32. The non-transitory computer-readable storage medium of claim 18, the one or more programs further including instructions for:

displaying, via the one or more display generation components, a share view option;

while displaying share view option, detecting, via one or more input devices, a selection input corresponding to selection of the share view option; and in response to detecting the selection input corresponding to selection of the share view option, causing one or more external devices corresponding to the one or more participants in the real-time communication session to display visual content that corresponds to a viewpoint of the user of the computer system.

33. The non-transitory computer-readable storage medium of claim 18, the one or more programs further including instructions for:

while displaying the first spatially-constrained representation of the first participant, displaying, via the one or more display generation components, a mode object that is selectable by the user of the computer system to indicate a user request to transition from the spatially-constrained representation mode to the spatially-flexible representation mode;

while displaying the mode object, detecting a selection input corresponding to selection of the mode object; and in response to detecting the selection input corresponding to selection of the mode object, displaying, via the one or more display generation components, a first visual indicator.

34. The non-transitory computer-readable storage medium of claim 18, the one or more programs further including instructions for:

in response to detecting the request from the respective participant in the real-time communication session to transition from the spatially-constrained representation mode to the spatially-flexible representation mode, ceasing display of the first spatially-constrained representation of the first participant.

35. A method, comprising:

at a computer system that is in communication with one or more display generation components:

displaying, via the one or more display generation components and within a three-dimensional environment, a real-time communication user interface that corresponds to a real-time communication session between a user of the computer system and one or more participants in the real-time communication session different from the user of the computer system;

displaying, via the one or more display generation components, a first spatially-constrained representation of a first participant of the one or more participants in the real-time communication session, wherein the first spatially-constrained representation of the first participant includes:

a first portal that has a spatial position in the three-dimensional environment that is determined by the computer system; and a first visual representation of the first participant that moves based on detected movement of the first participant, wherein the first visual representation is displayed at least partially within the first portal;

while displaying the first spatially-constrained representation of the first participant within the real-time communication user interface, detecting a request from a respective participant in the real-time communication session to transition from a spatially-constrained representation mode, in which the first participant in the real-time communication session is visually represented using the first spatially-constrained representation, to a spatially-flexible representation mode, in which the first participant in the real-time communication session is visually represented using a first spatially-flexible representation, wherein the spatially-flexible representation mode is different from the spatially-constrained representation mode; and in response to detecting the request from the respective participant in the real-time communication session to transition from the spatially-constrained representation mode to the spatially-flexible representation mode:

displaying, via the one or more display generation components, the first spatially-flexible representation of the first participant that moves based on detected movement of the first participant and has a spatial position in the three-dimensional environment relative to one or more other objects in the three-dimensional environment that is determined at least in part based on movement of the first participant, wherein the spatially-flexible representation mode includes one of displaying the first participant without the first portal, displaying the first participant with the first portal having a non-visible border, and displaying the first participant with the first portal having a partially surrounding border.

36. The method of claim 35, further comprising:

prior to displaying the real-time communication user interface that corresponds to the real-time communication session between the user of the computer system and one or more participants in the real-time communication session different from the user of the computer system, receiving, via one or more input devices, one or more user inputs corresponding to a user request to initiate the real-time communication session; and in response to receiving the one or more user inputs corresponding to the user request to initiate the real-time communication session:

displaying, via the one or more display generation components and within the three-dimensional environment:

the real-time communication user interface; and the first spatially-constrained representation of the first participant.

37. The method of claim 35, wherein the first visual representation of the first participant is a three-dimensional representation that moves within the first portal based on detected movement of the first participant.

38. The method of claim 35, wherein the first spatially-flexible representation of the first participant does not include the first portal.

39. The method of claim 35, wherein the first portal displays visual content that is determined at least in part based on one or more video feeds captured by one or more cameras of a first external device being used by the first participant.

40. The method of claim 35, further comprising:

in response to detecting the request from the respective participant in the real-time communication session to transition from the spatially-constrained representation mode to the spatially-flexible representation mode:

displaying the first spatially-flexible representation of the first participant at a first spatial position within the three-dimensional environment.

41. The method of claim 35, wherein displaying the first spatially-flexible representation of the first participant is performed in accordance with a determination that at least two of the participants in the real-time communication session have requested to transition from the spatially-constrained representation mode to the spatially-flexible representation mode.

42. The method of claim 35, further comprising:

while displaying the first spatially-constrained representation of the first participant, receiving, via one or more input devices, a second set of user inputs corresponding to a user request to transition from the spatially-constrained representation mode to the spatially-flexible representation mode;

in response to receiving the second set of user inputs:

in accordance with a determination that less than a threshold number of participants in the real-time communication session have requested to transition from the spatially-constrained representation mode to the spatially-flexible representation mode, maintaining display of the first spatially-constrained representation of the first participant;

subsequent to receiving the second set of user inputs, and while displaying the first spatially-constrained representation of the first participant, receiving, via the one or more input devices a third set of user inputs corresponding to a repeated user request to transition from the spatially-constrained representation mode to the spatially-flexible representation mode; and in response to receiving the third set of user inputs:

in accordance with a determination that less than a threshold number of participants in the real-time communication session have requested to transition from the spatially-constrained representation mode to the spatially-flexible representation mode, displaying a first indication that indicates that less than the threshold number of participants in the real-time communication session have requested to transition from the spatially-constrained representation mode to the spatially-flexible representation mode.

43. The method of claim 35, wherein:

while the computer system displays the first spatially-constrained representation of the first participant, the user of the computer system is visually represented by one or more external devices corresponding to the one or more participants in the real-time communication session in a first manner; and while the computer system displays the first spatially-flexible representation of the first participant, the user of the computer system is visually represented by the one or more external devices in a second manner different from the first manner.

44. The method of claim 35, further comprising:

while displaying the first spatially-constrained representation of the first participant, displaying, via the one or more display generation components, a mode transition indication indicating that one or more participants in the real-time communication session have requested to transition from the spatially-constrained representation mode to the spatially-flexible representation mode.

45. The method of claim 35, further comprising:

while displaying the first spatially-constrained representation of the first participant, displaying, via the one or more display generation components, a mode transition object that is selectable by the user of the computer system to indicate a user request to transition from the spatially-constrained representation mode to the spatially-flexible representation mode, wherein:

detecting the request from the respective participant in the real-time communication session to transition from the spatially-constrained representation mode to the spatially-flexible representation mode comprises detecting a selection input corresponding to selection of the mode transition object.

46. The method of claim 35, further comprising:

detecting, via one or more input devices, one or more gaze inputs directed to a predefined location relative to a viewport into the three-dimensional environment of the computer system; and in response to detecting the one or more gaze inputs directed to the predefined location relative to the viewport into the three-dimensional environment, displaying, via the one or more display generation components, a system user interface that includes a plurality of controls pertaining to the real-time communication session.

47. The method of claim 35, further comprising:

in response to detecting the request from the respective participant in the real-time communication session to transition from the spatially-constrained representation mode to the spatially-flexible representation mode, displaying, via the one or more display generation components, a first notice pertaining to the spatially-flexible representation mode.

48. The method of claim 35, further comprising:

while displaying the first spatially-flexible representation of the first participant, detecting that a new participant has joined the real-time communication session; and in response to detecting that the new participant has joined the real-time communication session:

in accordance with a determination that the real-time communication session has greater than a threshold number of participants:

ceasing display of the first spatially-flexible representation of the first participant; and displaying, via the one or more display generation components, the first spatially-constrained representation of the first participant.

49. The method of claim 35, further comprising:

displaying, via the one or more display generation components, a share view option;

while displaying share view option, detecting, via one or more input devices, a selection input corresponding to selection of the share view option; and in response to detecting the selection input corresponding to selection of the share view option, causing one or more external devices corresponding to the one or more participants in the real-time communication session to display visual content that corresponds to a viewpoint of the user of the computer system.

50. The method of claim 35, further comprising:

while displaying the first spatially-constrained representation of the first participant, displaying, via the one or more display generation components, a mode object that is selectable by the user of the computer system to indicate a user request to transition from the spatially-constrained representation mode to the spatially-flexible representation mode;

while displaying the mode object, detecting a selection input corresponding to selection of the mode object; and in response to detecting the selection input corresponding to selection of the mode object, displaying, via the one or more display generation components, a first visual indicator.

51. The method of claim 35, further comprising:

in response to detecting the request from the respective participant in the real-time communication session to transition from the spatially-constrained representation mode to the spatially-flexible representation mode, ceasing display of the first spatially-constrained representation of the first participant.

* * * * *